United States Patent
Takeshita et al.

(10) Patent No.: US 12,049,583 B2
(45) Date of Patent: Jul. 30, 2024

(54) COMPOUND, COMPOSITION FOR ANISOTROPIC DYE FILMS INCLUDING THE COMPOUND, ANISOTROPIC DYE FILM, AND OPTICAL ELEMENT

(71) Applicant: Mitsubishi Chemical Corporation, Tokyo (JP)

(72) Inventors: Kei Takeshita, Tokyo (JP); Yasushi Shiga, Tokyo (JP); Seiji Akiyama, Tokyo (JP); Masami Kadowaki, Tokyo (JP); Terutsune Osawa, Tokyo (JP); Junichi Oizumi, Tokyo (JP); Yoshie Takami, Tokyo (JP); Souya Kojima, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 18/156,670

(22) Filed: Jan. 19, 2023

(65) Prior Publication Data

US 2023/0151275 A1 May 18, 2023

Related U.S. Application Data

(63) Continuation of application No. PCT/JP2021/028316, filed on Jul. 30, 2021.

(30) Foreign Application Priority Data

| Aug. 3, 2020 | (JP) | 2020-131810 |
| Aug. 3, 2020 | (JP) | 2020-131811 |

(51) Int. Cl.

| G02F 1/1333 | (2006.01) |
| C09B 29/40 | (2006.01) |
| C09B 31/043 | (2006.01) |
| C09K 19/38 | (2006.01) |
| C09K 19/60 | (2006.01) |
| G02B 5/30 | (2006.01) |

(52) U.S. Cl.
CPC ........ *C09K 19/601* (2013.01); *C09B 29/3608* (2013.01); *C09B 31/043* (2013.01); *C09K 19/3895* (2013.01); *G02B 5/3016* (2013.01)

(58) Field of Classification Search
CPC ............ C09K 19/04; C09K 19/0414; C09K 19/0425; C09K 19/3491; C09K 19/601; C09K 19/3804
See application file for complete search history.

(56) References Cited

U.S. PATENT DOCUMENTS

| 4,959,172 | A | 9/1990 | Miura et al. |
| 10,690,953 | B2 | 6/2020 | Hatanaka |
| 2009/0274853 | A1 | 11/2009 | Morishima |
| 2013/0092874 | A1 | 4/2013 | Bacher et al. |
| 2018/0067348 | A1 | 3/2018 | Hatanaka |
| 2020/0264460 | A1 | 8/2020 | Hatanaka |
| 2023/0151275 | A1* | 5/2023 | Takeshita ............ C09K 19/601 252/299.1 |

FOREIGN PATENT DOCUMENTS

| JP | 64-70585 A | 3/1989 |
| JP | 1-105204 A | 4/1989 |
| JP | 1-198684 A | 8/1989 |
| JP | 2009-263649 A | 11/2009 |
| JP | 2013-534945 A | 9/2013 |
| JP | 2013-210624 A | 10/2013 |
| JP | 2016-170368 A | 9/2016 |
| JP | 2019-164346 A | 9/2019 |
| WO | WO-2023063249 A1 * | 4/2023 ........... G02F 1/1335 |

OTHER PUBLICATIONS

International Search Report issued Oct. 26, 2021 in PCT/JP2021/028316 filed on Jul. 30, 2021, 3 pages.

* cited by examiner

*Primary Examiner* — Geraldina Visconti
(74) *Attorney, Agent, or Firm* — Oblon, McClelland, Maier & Neustadt, L.L.P.

(57) ABSTRACT

A compound of formula (1) or (11):

$$X-A^1-(N{=}N-A^2)_n-N{=}N-A^3-Y \qquad (1)$$

$$X-A^{41}-(N{=}N-A^{42})_n-N{=}N-A^{43}-Y \qquad (11),$$

-$A^1$- and -$A^2$- being independently a divalent group of an S-containing aromatic heterocyclic ring, with no adjacent non-carbons in the ring, a divalent group of a benzisothiazole ring, or a divalent group of an aromatic hydrocarbon ring, -$A^3$- being a divalent group of an aromatic hydrocarbon ring, —X is a branched alkyl, alkoxy, or alkylsulfanyl group having 3 or more carbon atoms, —Y is a monovalent organic group, n is 1, 2, or 3, when n is 2 or 3, a plurality of -$A^2$-s and/or -$A^{42}$-s optionally differing, wherein -$A^1$- and -$A^2$- are not both a divalent group of an aromatic hydrocarbon ring, at least one -$A^{42}$- is a divalent group of an S-containing aromatic heterocyclic ring, -$A^{41}$- and -$A^{43}$- are independently a divalent group of an aromatic hydrocarbon ring.

20 Claims, No Drawings

COMPOUND, COMPOSITION FOR ANISOTROPIC DYE FILMS INCLUDING THE COMPOUND, ANISOTROPIC DYE FILM, AND OPTICAL ELEMENT

CROSS-REFERENCE TO RELATED APPLICATIONS

The present application is a bypass continuation of international application PCT/JP2021/028316, filed on Jul. 30, 2021, and claims the benefit of the filing date of Japanese Appl. No. 2020-131810, filed on Aug. 3, 2020, and the filing date of Japanese Appl. No. 2020-131811, filed on Aug. 3, 2020, the content of each of which is incorporated by reference.

TECHNICAL FIELD

The present invention relates to a compound useful for polarizing films and the like included in display elements of light controlling devices, liquid crystal devices (LCDs), and organic electroluminescent devices (OLEDs). The present invention relates also to an anisotropic dye film-forming composition that includes the compound, an anisotropic dye film, and an optical element.

BACKGROUND ART

LCDs include linearly and circularly polarizing films in order to control the optical rotatory power and birefringence of the displays. OLEDs also include a circularly polarizing film in order to prevent the reflection of outside light under daylight condition.

Elements that include, as a polarizing film, for example, a polarizing film (iodine-PVA polarizing film) produced by coloring polyvinyl alcohol (PVA) with low-concentration iodine are known (PTL 1). However, the tint of a low-concentration iodine-PVA polarizing plate may change disadvantageously as a result of sublimation of iodine or degradation depending on the service conditions. Furthermore, the relaxation of the stretched PVA may result in warpage.

It is also known that an anisotropic dye film formed by the application of a liquid crystal composition containing a dye serves as a polarizing film (PTL 2). However, a dichroic dye that has a local maximum absorption at wavelengths of 560 to 800 nm and has both sufficient dichroic ratio and sufficient solubility has not been disclosed.

An anisotropic dye film that includes a dye having a benzothiazole or thienothiazole skeleton, which is a dichroic dye having a local maximum absorption at wavelengths of 550 to 800 nm, and a polymerizable liquid crystal in a combined manner is known (PTL 3). However, the dye having a benzothiazole or thienothiazole skeleton may precipitate in an anisotropic dye film-forming composition, in which high solubility is required.

PTL 1: JP-H1-105204A
PTL 2: JP2013-210624A
PTL 3: JP2016-170368A

Object of First Invention

It is required that a polarizing film formed by the application of a liquid crystal composition containing a dye have high light absorption selectivity and that light do not pass through the polarizing film at wavelengths of 350 to 800 nm even when the thickness of the polarizing film is small. Accordingly, it is necessary to use a plurality of dyes having high dichroism and perform control such that wavelengths of 350 to 800 nm are exhaustively absorbed. However, in such a case, since the composition contains a plurality of dyes, the dye concentration in the composition is increased. In the case where the composition is applied under thin-film conditions, the dye concentration relative to liquid crystals becomes high. This increases the precipitation of the dyes and consequently degrades the coating performance.

For reducing the precipitation of the dye, it is necessary to enhance the solubility of the dye. One of the approaches to enhancing the solubility of the dye is to introduce, to the dye, a substituent having high compatibility with a compound included in the composition. However, depending on the type of the substituent introduced and the position at which the substituent is introduced, the dichroic ratio may be reduced as a result of an increase in the angle formed by the transition moment, which determines the absorption axis of the dye, and the direction of the major axis of the molecule. Furthermore, if the substituent is excessively bulky, the molecular alignment of the dye may be disturbed and, consequently, the dichroic ratio may be reduced.

It is known that the dichroic ratio and the local maximum absorption wavelength of an anisotropic dye film formed by the application of an anisotropic dye film-forming composition that includes a polymerizable liquid crystal compound and a dye vary by the intermolecular interaction between the dye and the liquid crystal compound. In the combination of the dye and the liquid crystal compound, it is important that the dye have a molecular structure compatible with the liquid crystal molecules.

Under the circumstances, the development of a dye molecule with which an anisotropic dye film having high dichroism can be formed and which enables suitable coating film performance to be achieved and an anisotropic dye film-forming composition that includes such a dye molecule has been anticipated.

Object of Second Invention

An iodine-PVA polarizing film colored with low-concentration iodine has the following issues depending on the service conditions: the tint of the polarizing film may change as a result of sublimation of iodine or degradation; and the relaxation of the stretched PVA may result in the warpage of the polarizing film.

A polarizing film formed by the application of a liquid crystal composition containing a dye has high light absorption selectivity even when the thickness of the polarizing film is small. It is required that the light do not pass through the polarizing film at wavelengths of 380 to 780 nm. Accordingly, it is necessary to use a plurality of dyes having high dichroism and perform control such that wavelengths of 380 to 780 nm are exhaustively absorbed. However, in such a case, since the composition contains a plurality of dyes, the dye concentration in the composition is increased. In the case where the composition is applied under thin-film conditions, the dye concentration relative to liquid crystals becomes high. This increases the precipitation of the dyes and consequently degrades the coating performance.

One of the methods for producing a dye having a local maximum absorption at wavelengths of 550 to 800 nm is to introduce a heterocyclic ring to the dye. In order to achieve suitable dichroism, the heterocyclic ring introduced needs to be a heterocyclic ring that enables the linearity of the molecular structure of the dye to be enhanced. In the case where, among heterocyclic rings, a benzothiazole or thienothiazole skeleton is introduced to the dye, the linearity of the molecular structure is likely to be enhanced and the dichroic ratio can be increased. However, the molecular structure becomes bulky, which degrades solubility and may cause the dye to precipitate in the anisotropic dye film-forming composition. Furthermore, depending on the type of the heterocyclic ring introduced, the intermolecular interaction may be changed due to the difference in electron distribution and, consequently, the alignment may be disturbed.

It is known that the dichroic ratio and the local maximum absorption wavelength of a polarizing film formed by the application of a composition that includes a polymerizable liquid crystal compound and a dichroic dye vary by the intermolecular interaction between the dye and the liquid crystal compound. It is important to use a liquid crystal compound in combination with a dichroic dye having a molecular structure compatible with the liquid crystal compound.

Under the circumstances, the development of an anisotropic dye film-forming composition which has suitable coating performance since the solubility of the dye is high and the possibility of the dye or the like precipitating in the composition is negligible and with which an anisotropic dye having high dichroism can be produced has been anticipated.

SUMMARY OF INVENTION

An object of the first invention is to provide a compound having high dichroism and high solubility.

Another object is to provide an anisotropic dye film-forming composition including the above compound, an anisotropic dye film, and an optical element.

The first invention achieves the above objects by using a compound having a specific structure.

The first invention has the following aspects.

[1] A compound represented by Formula (1) or (11) below,

$\text{X-A}^1\text{-(N=N-A}^2)_n\text{-N=N-A}^3\text{-Y}$ (1)

(in Formula (1),

-$A^1$- and -$A^2$- each independently represent an unsubstituted or substituted divalent group of an aromatic heterocyclic ring including one or more S atoms wherein atoms constituting the aromatic heterocyclic ring other than a carbon atom are not adjacent to one another, an unsubstituted or substituted divalent group of a benzisothiazole ring, or an unsubstituted or substituted divalent group of an aromatic hydrocarbon ring;

-$A^3$- represents an unsubstituted or substituted divalent group of an aromatic hydrocarbon ring;

—X represents a branched alkyl, alkoxy, or alkylsulfanyl group having 3 or more carbon atoms;

—Y represents a monovalent organic group;

n represents 1, 2, or 3;

when n is 2 or 3, a plurality of -$A^2$-'s may be identical to or different from one another; and -$A^1$- and -$A^2$- do not represent an unsubstituted or substituted divalent group of an aromatic hydrocarbon ring at the same time),

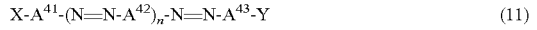

$\text{X-A}^{41}\text{-(N=N-A}^{42})_n\text{-N=N-A}^{43}\text{-Y}$ (11)

(in Formula (11), at least one -$A^{42}$- represents an unsubstituted or substituted divalent group of an aromatic heterocyclic ring including one or more S atoms;

-$A^{41}$- and -$A^{43}$- each independently represent an unsubstituted or substituted divalent group of an aromatic hydrocarbon ring;

—X represents a branched alkyl, alkoxy, or alkylsulfanyl group having 3 or more carbon atoms;

—Y represents a monovalent organic group;

n represents 1, 2, or 3; and when n is 2 or 3, a plurality of -$A^{42}$-'s may be identical to or different from one another).

[2] The compound according to [1], wherein, in Formula (1) above, the aromatic heterocyclic ring including one or more S atoms wherein atoms constituting the aromatic heterocyclic ring other than a carbon atom are not adjacent to one another is a thiophene ring, a benzothiophene ring, a thiazole ring, a thienopyrrole ring, a thienothiophene ring, a furothiazole ring, a thienofuran ring, a thienothiazole ring, or a benzothiazole ring.

[3] The compound according to [1] or [2], wherein, in Formula (1) above, -$A^3$- is an unsubstituted or substituted phenylene group.

[4] The compound according to any one of [1] to [3], wherein, in Formula (1) above, -$A^2$- is an unsubstituted or substituted phenylene group.

[5] The compound according to any one of [1] to [4], wherein, in Formula (1) above, —Y is —O—$R^x$ or —N(—$R^y$)—$R^x$, where —$R^x$ and —$R^y$ each independently represent a linear or branched alkyl group having 1 to 15 carbon atoms, a cycloalkyl group having 5 to 14 ring-forming atoms, or an aryl group having 5 to 14 ring-forming atoms;

—$R^x$ and —$R^y$ may be bonded to each other to form a ring;

the linear or branched alkyl group having 1 to 15 carbon atoms and the aryl group having 5 to 14 ring-forming atoms may be substituted;

one or more methylene groups included in the linear or branched alkyl group having 1 to 15 carbon atoms, the cycloalkyl group having 5 to 14 ring-forming atoms, or the ring formed by —$R^x$ and —$R^y$ being bended to each other may be replaced with —O—, —S—, —NH—, —N($R^z$)—, —C(=O)—, —C(=O)—O—, —C(=O)—NH—, —CHF—, —CF$_2$—, —CHCl—, —CCl$_2$—, an acryloyloxy group, a methacryloyloxy group, or a glycidyloxy group; and $R^z$ represents a linear or branched alkyl group having 1 to 6 carbon atoms.

[6] The compound according to any one of [1] to [5], wherein, in Formula (11) above, when n is 2 or 3, -$A^{42}$-'s each independently represent an unsubstituted or substituted divalent group of an aromatic hydrocarbon ring or an unsubstituted or substituted divalent group of an aromatic heterocyclic ring including one or more S atoms.

[7] The compound according to any one of [1] to [6], wherein, in Formula (11) above, the aromatic heterocyclic ring represented by -$A^{42}$- is a thiophene ring, a benzothiophene ring, a thiazole ring, an isothiazole ring, a 1,3,4-thiadiazole ring, a thienopyrrole ring, a thienothiophene ring, a furothiazole ring, a thienofuran ring, a thienothiazole ring, a benzisothiazole ring, or a benzothiazole ring.

[8] The compound according to any one of [1] to [7], wherein, in Formula (11) above, -$A^{43}$- is an unsubstituted or substituted phenylene group.

[9] The compound according to any one of [1] to [8], wherein, in Formula (11) above, -$A^{41}$- is an unsubstituted or substituted phenylene group.

[10] An anisotropic dye film-forming composition comprising the compound according to any one of [1] to [9] and a polymerizable liquid crystal compound.

[11] An anisotropic dye film-forming composition comprising a compound represented by Formula (21) below and a polymerizable liquid crystal compound,

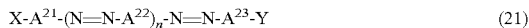

$$X\text{-}A^{21}\text{-}(N=N\text{-}A^{22})_n\text{-}N=N\text{-}A^{23}\text{-}Y \qquad (21)$$

(in Formula (21),

-$A^{21}$- and -$A^{22}$- each independently represent an unsubstituted or substituted divalent group of an aromatic heterocyclic ring including one or more S atoms or an unsubstituted or substituted divalent group of an aromatic hydrocarbon ring;

-$A^{23}$- represents an unsubstituted or substituted divalent group of an aromatic hydrocarbon ring;

—X represents a branched alkyl, alkoxy, or alkylsulfanyl group having 3 or more carbon atoms;

—Y represents a monovalent organic group;

n represents 1, 2, or 3;

when n is 2 or 3, a plurality of -$A^{22}$-'s may be identical to or different from one another; and at least one of -$A^{21}$- and -$A^{22}$- is an unsubstituted or substituted divalent group of an aromatic heterocyclic ring including one or more S atoms).

An object of the second invention is to provide an anisotropic dye film-forming composition that has suitable coating performance since the solubility of the dye is high and the possibility of precipitation or the like of the dye or the like in the composition is negligible, that enables the formation of an anisotropic dye film having high dichroism, and that enables a sufficient dichroic ratio to be achieved particularly at wavelengths of 550 to 800 nm. Another object of the second invention is to provide an anisotropic dye film having excellent optical performance and, in particular, a sufficient dichroic ratio and an optical element.

The second invention achieves the above objects by using an anisotropic dye film-forming composition that includes a dye having a specific structure and a polymerizable liquid crystal compound.

The second invention has the following aspects.

[12] An anisotropic dye film-forming composition comprising a compound represented by Formula (31) below and a polymerizable liquid crystal compound, $$A^{31}\text{-}(N=N\text{-}A^{32})_n\text{-}N=N\text{-}A^{33}\text{-}Y \qquad (31)$$

(in Formula (31),

-$A^{31}$ represents an unsubstituted or substituted group represented by any one of Formulae (a-2) to (a-7) below (in Formulae (a-2) to (a-7) below, * represents a linkage to —N and $S_4$ to $S_{14}$ represent a position at which a substituent is attached to the group when the group is substituted),

[Chem. 1]

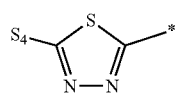
(a-2)

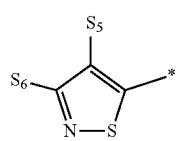
(a-3)

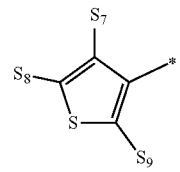
(a-4)

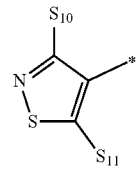
(a-5)

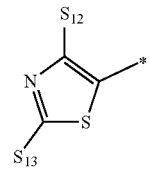
(a-6)

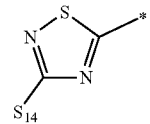
(a-7)

-$A^{32}$- represents an unsubstituted or substituted divalent group of an aromatic hydrocarbon ring or an unsubstituted or substituted divalent group of an aromatic heterocyclic ring, -$A^{33}$- represents an unsubstituted or substituted phenylene group, —Y represents a monovalent organic group, n represents 1, 2, or 3, and when n is 2 or 3, a plurality of -$A^{32}$-'s may be identical to or different from one another).

[13] The anisotropic dye film-forming composition according to [12], wherein, in Formula (31) above, -$A^{32}$- is an unsubstituted or substituted divalent group of an aromatic hydrocarbon ring.

[14] The anisotropic dye film-forming composition according to [12] or [13], wherein, in Formula (3) above, —Y is —O—$R^x$ or —N(—$R^y$)—$R^x$, where —$R^x$ and —$R^y$ each independently represent a linear or branched alkyl group having 1 to 15 carbon atoms, a cycloalkyl group having 5 to 14 ring-forming atoms, or an aryl group having 5 to 14 ring-forming atoms;

—$R^x$ and —$R^y$ may be bonded to each other to form a ring; the linear or branched alkyl group having 1 to 15 carbon atoms and the aryl group having 5 to 14 ring-forming atoms may be substituted;

one or more methylene groups included in the linear or branched alkyl group having 1 to 15 carbon atoms, the cycloalkyl group having 5 to 14 ring-forming atoms, or the ring formed by —$R^x$ and —$R^y$ being bended to each other may be replaced with —O—, —S—, —NH—, —N($R^z$)—, —C(=O)—, —C(=O)—O—, —C(=O)—NH—, —CHF—, —CF$_2$—, —CHCl—, —CCl$_2$—, an acryloyloxy group, a methacryloyloxy group, or a glycidyloxy group; and $R^z$ represents a linear or branched alkyl group having 1 to 6 carbon atoms.

The first invention and the second invention also have the following common aspects.

[15] The anisotropic dye film-forming composition according to any one of [10] to [14], wherein a ratio ($r_{n1}/r_{n2}$) of the number ($r_{n1}$) of ring structures included in the polymerizable liquid crystal compound to the number ($r_{n2}$) of ring structures included in the compound represented by Formula (1), (11), (21), or (31) above is 0.7 to 1.5.

[16] The anisotropic dye film-forming composition according to any one of [10] to [15], wherein the polymerizable liquid crystal compound is a compound having a carbon-carbon triple bond.

[17] The anisotropic dye film-forming composition according to any one of [10] to [16], further comprising a dye wherein a wavelength at which an absorption curve of the dye is a maximum in a wavelength range of 350 to 800 nm is smaller than a wavelength at which an absorption curve of the compound represented by Formula (1), (11), (21), or (31) above is a maximum in a wavelength range of 350 to 800 nm.

[18] An anisotropic dye film produced using the anisotropic dye film-forming composition according to any one of [10] to [17].

[19] An optical element comprising the anisotropic dye film according to [18].

[20] A method for producing an anisotropic dye film, the method comprising applying the anisotropic dye film-forming composition according to any one of [10] to [17] to a substrate.

Advantageous Effects of Invention

The compound according to the first invention has a bulky substituent, and enables both high dichroism and high solubility.

Since the anisotropic dye film-forming composition according to the first invention includes the above-described compound according to the present invention, the precipitation of the compound can be reduced and, consequently, the coating performance can be enhanced. Furthermore, a high dichroic ratio can be achieved.

Since the anisotropic dye film according to the first invention is produced using the anisotropic dye film-forming composition according to the present invention, the anisotropic dye film has a plurality of local maximum absorptions and enables excellent coating film properties and excellent optical performance to be achieved.

Since the optical element according to the first invention includes the anisotropic dye film according to the present invention, the optical element has a plurality of local maximum absorptions and enables excellent coating film properties and excellent optical performance to be achieved.

Since the solubility of the dye in the anisotropic dye film-forming composition according to the second invention is high and the possibility of precipitation or the like of the dye or the like in the composition is negligible, the anisotropic dye film-forming composition has suitable coating performance. An anisotropic dye film produced using the anisotropic dye film-forming composition has high dichroism. Therefore, the anisotropic dye film-forming composition according to the second invention enables an anisotropic dye film that has excellent optical performance and has a sufficient dichroic ratio particularly at wavelengths of 550 to 800 nm to be provided with high productivity.

The anisotropic dye film and optical element according to the present invention enable excellent optical performance and, in particular, a sufficient dichroic ratio to be achieved.

DESCRIPTION OF EMBODIMENTS

Embodiments of the present invention are specifically described below. It should be noted that the present invention is not limited by the following embodiments and various modification may be made to the present invention within the scope of the present invention.

As described above, the present invention includes first and second inventions. The first and second inventions are referred to as "the present invention".

<Anisotropic Dye Film>

The term "anisotropic dye film" used in the present invention refers to a dye film having anisotropic electromagnetic properties in any two directions selected from the three directions in total in a three-dimensional coordinate system defined by the thickness direction of the anisotropic dye film and two directions in a plane orthogonal to the thickness direction. Examples of the electromagnetic properties include optical properties, such as absorption and refraction, and electrical properties, such as resistance and capacitance.

Examples of a film having an anisotropy in terms of optical properties, such as absorption and refraction, include a polarizing film, such as a linear or circular polarizing film, a phase difference film, and a conductive anisotropic dye film. The anisotropic dye film according to the present invention is preferably used as a polarizing film or a conductive anisotropic dye film and is more preferably used as a polarizing film.

<Anisotropic Dye Film-Forming Composition>

The anisotropic dye film-forming composition according to the present invention includes a dye and a polymerizable liquid crystal compound.

The anisotropic dye film-forming composition according to the present invention may be a solution, liquid crystals, or in a dispersed state as long as phase separation does not occur. The anisotropic dye film-forming composition is preferably a solution in order to make it easy to apply the composition to a substrate. The solid component of the anisotropic dye film-forming composition, which remains after the solvent has been removed from the anisotropic dye film-forming composition, is preferably in the state of liquid crystal phase at a predetermined temperature in order to perform alignment on a substrate as described below.

The expression "be in the state of liquid crystal phase" used in the present invention specifically means that the substance is in a liquid crystal state that exhibits the properties of both liquid and crystal or the properties that lie halfway between liquid and crystal as described in Pages 1 to 16 of "Liquid Crystals: Fundamentals and Applications (Ekisho no Kiso to Ohyo)" (Shoichi MATSUMOTO, Ichiro TSUNODA; 1991), such as a nematic phase, a smectic phase, a cholesteric phase, or a discotic phase.

<Dye>

The term "dye" used in the present invention refers to a substance or compound that absorbs at least part of wavelengths of the visible light region (350 to 800 nm).

Examples of the dye that can be used in the present invention include a dichroic dye. The term "dichroic dye" refers to a dye having different absorbances in major and minor axis directions of the molecule. The dye may have, but does not necessarily have, liquid crystallinity. The expression "have liquid crystallinity" used herein means that the substance is brought into a liquid crystal phase at a predetermined temperature.

[Compound According to First Invention]

The compound according to the first invention is the novel compound represented by Formula (1) or (11) below.

 (1)

(in Formula (1),

-$A^1$- and -$A^2$- each independently represent an unsubstituted or substituted divalent group of an aromatic heterocyclic ring including one or more S atoms wherein atoms constituting the aromatic heterocyclic ring other than a carbon atom are not adjacent to one another, an unsubstituted or substituted divalent group of a benzisothiazole ring, or an unsubstituted or substituted divalent group of an aromatic hydrocarbon ring;

-$A^3$- represents an unsubstituted or substituted divalent group of an aromatic hydrocarbon ring;

—X represents a branched alkyl, alkoxy, or alkylsulfanyl group having 3 or more carbon atoms;

—Y represents a monovalent organic group;

n represents 1, 2, or 3;

when n is 2 or 3, a plurality of -$A^2$-'s may be identical to or different from one another; and -$A^1$- and -$A^2$- do not represent an unsubstituted or substituted divalent group of an aromatic hydrocarbon ring at the same time.)

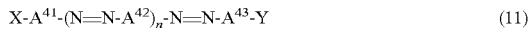 (11)

(in Formula (11), at least one -$A^{42}$- represents an unsubstituted or substituted divalent group of an aromatic heterocyclic ring including one or more S atoms;

-$A^{41}$- and -$A^{43}$- each independently represent an unsubstituted or substituted divalent group of an aromatic hydrocarbon ring;

—X represents a branched alkyl, alkoxy, or alkylsulfanyl group having 3 or more carbon atoms;

—Y represents a monovalent organic group;

n represents 1, 2, or 3; and when n is 2 or 3, a plurality of -$A^{42}$-'s may be identical to or different from one another.)

The anisotropic dye film-forming composition according to the first invention, which is described below, includes a polymerizable liquid crystal compound and the compound represented by Formula (21) below.

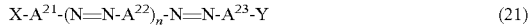 (21)

(in Formula (21),

-$A^{21}$- and -$A^{22}$- each independently represent an unsubstituted or substituted divalent group of an aromatic heterocyclic ring including one or more S atoms or an unsubstituted or substituted divalent group of an aromatic hydrocarbon ring;

-$A^{23}$- represents an unsubstituted or substituted divalent group of an aromatic hydrocarbon ring;

—X represents a branched alkyl, alkoxy, or alkylsulfanyl group having 3 or more carbon atoms;

—Y represents a monovalent organic group;

n represents 1, 2, or 3;

when n is 2 or 3, a plurality of -$A^{22}$-'s may be identical to or different from one another; and at least one of -$A^{21}$- and -$A^{22}$- is an unsubstituted or substituted divalent group of an aromatic heterocyclic ring including one or more S atoms.)

Hereinafter, the compound represented by Formula (1) is referred to as "compound (1)", the compound represented by Formula (11) is referred to as "compound (11)", the compound represented by Formula (21) is referred to as "compound (21)", and the compounds (1), (11), and (21) are referred to collectively as "compound according to the first invention".

(—X)

—X represents a branched alkyl group (—R), alkoxy group (—O—R), or alkylsulfanyl group (—S—R) having 3 or more carbon atoms. The number of carbon atoms included in —X is preferably 3 or more and 15 or less and is more preferably 3 or more and 10 or less in order to enhance molecular alignment with respect to the polymerizable liquid crystal compound used in the first invention.

—R includes, for example, a 1-methylethyl group, a 1,1-dimethylethyl group, a 1-methylpropyl group, a 2-methylpropyl group, a 1,2-dimethylpropyl group, a 2,2-dimethylpropyl group, a 1,2,2-trimethylpropyl group, a 1-methylbutyl group, a 2-methylbutyl group, a 3-methylbutyl group, a 3,3-dimethylbutyl group, a 1,3,3-trimethylbutyl group, a 2,3,3-trimethylbutyl group, a 2,2,3-trimethylbutyl group, a 1,2,2-trimethylbutyl group, a 4-methylpentyl group, a 3-methylpentyl group, a 2-methylpentyl group, a 1-methylpentyl group, a 4,4-dimethyl pentyl group, a 3,3-dimethylpentyl group, a 2,2-dimethylpentyl group, a 2,4-dimethylpentyl group, a 1,4-dimethylpentyl group, a 3,4,4-trimethylpentyl group, a 2,4,4-trimethylpentyl group, a 1,4,4-trimethylpentyl group, a 3,3,4-trimethylpentyl group, a 2,3,3-trimethylpentyl group, a 1,3,3-trimethylpentyl group, a 2,2,4-trimethylpentyl group, a 2,2,3-trimethylpentyl group, a 1,2,2-trimethylpentyl group, a 5-methylhexyl group, a 4-methylhexyl group, a 3-methylhexyl group, a 2-methylhexyl group, a 1-methylhexyl group, a 5,5-dimethylhexyl group, a 4,4-dimethylhexyl group, a 3,3-dimethylhexyl group, a 2,2-dimethylhexyl group, a 1,5-dimethylhexyl group, a 1,4-dimethylhexyl group, a 3,5,5-trimethylhexyl group, a 5-methylheptyl group, a 6-methyloctyl group, a 3-methyloctyl group, a 1-methyloctyl group, a 1-methylnonyl group and the like.

In order to enhance the molecular alignment of the compound according to the first invention, among these, a structure having a branch on the —R terminal-side is desirable, and a 2-methylpropyl group, a 3-methylbutyl group, a 3,3-dimethylbutyl group, a 2,3,3-trimethylbutyl group, a 4-methylpentyl group, a 3-methylpentyl group, a 2-methylpentyl group, a 4,4-dimethylpentyl group, a 3,3-dimethylpentyl group, a 2,4-dimethylpentyl group, a 3,4,4-trimethylpentyl group, a 2,4,4-trimethylpentyl group, a 3,3,4-trimethylpentyl group, a 2,3,3-trimethylpentyl group, a 5-methylhexyl group, a 4-methylhexyl group, a 3-methylhexyl group, a 2-methylhexyl group, a 5,5-dimethylhexyl group, a 4,4-dimethylhexyl group, a 3,3-dimethylhexyl group, a 3,5,5-trimethylhexyl group, a 5-methylheptyl group, a 6-methyloctyl group, a 3-methyloctyl group, a 1-methyloctyl group, and a 1-methylnonyl group are preferable.

It is preferable that —X do not have a cycloalkyl structure in order to enhance the molecular alignment with respect to the polymerizable liquid crystal compound used in the first invention.

In the case where the molecular alignment with respect to the polymerizable liquid crystal compound used in the first invention is to be enhanced, —X preferably does not have the polymerizable group described below.

On the other hand, in the case where the mechanical strength of the anisotropic dye film is to be increased, —X preferably has the polymerizable group described below.

(-A$^1$-, -A$^2$-, -A$^3$-, -A$^{41}$-, -A$^{42}$-, -A$^{43}$-, -A$^{21}$-, -A$^{22}$-, and -A$^{23}$-)

In Formula (1), -A$^1$- and -A$^2$- each independently represent an unsubstituted or substituted divalent group of an aromatic heterocyclic ring including one or more S atoms wherein atoms constituting the aromatic heterocyclic ring other than a carbon atom are not adjacent to one another, an unsubstituted or substituted divalent group of a benzisothiazole ring, or an unsubstituted or substituted divalent group of an aromatic hydrocarbon ring; and -A$^3$- represents an unsubstituted or substituted divalent group of an aromatic hydrocarbon ring.

Note that both -A$^1$- and -A$^2$- do not represent an unsubstituted or substituted divalent group of an aromatic hydrocarbon ring at the same time.

In Formula (11), at least one -A$^{42}$- is an unsubstituted or substituted divalent group of an aromatic heterocyclic ring including one or more S atoms; and -A$^{41}$- and -A$^{43}$- each independently represent an unsubstituted or substituted divalent group of an aromatic hydrocarbon ring.

In Formula (21), -A$^{21}$- and -A$^{22}$- each independently represent an unsubstituted or substituted divalent group of an aromatic heterocyclic ring including one or more S atoms or an unsubstituted or substituted divalent group of an aromatic hydrocarbon ring; and -A$^{23}$- represents an unsubstituted or substituted divalent group of an aromatic hydrocarbon ring.

Note that at least one of -A$^{21}$- and -A$^{22}$- is an unsubstituted or substituted divalent group of an aromatic heterocyclic ring including one or more S atoms.

Unsubstituted or Substituted Divalent Aromatic Heterocyclic Group Including One or More S Atoms:

The aromatic heterocyclic group included in the unsubstituted or substituted divalent aromatic heterocyclic group including one or more S atoms is a monocyclic or condensed aromatic heterocyclic group. The number of carbon atoms included in the aromatic heterocyclic ring is preferably, but not limited to, 4 or more and 20 or less.

Examples of the aromatic heterocyclic ring include a thiophene ring, a benzothiophene ring, a thiazole ring, an isothiazole ring, a 1,3,4-thiadiazole ring, a thienopyrrole ring, a thienothiophene ring, a furothiazole ring, a thienofuran ring, a thienothiazole ring, a benzisothiazole ring, and a benzothiazole ring. Among these, a thiophene ring, a benzothiophene ring, a thiazole ring, an isothiazole ring, a 1,3,4-thiadiazole ring, a thienothiophene ring, a furothiazole ring, a thienofuran ring, a thienothiazole ring, a benzisothiazole ring, and a benzothiazole ring are preferable in order to enhance the molecular alignment of the compound according to the first invention. The structures described below are more preferable because, in such a case, the absorption transition moment of the compound according to the first invention is likely to coincide with the major axis direction of the dye and the dichroic ratio can be increased (in the following structures, *1 denotes a linkage to —X or —N of Formula (1), and *2 denotes a linkage to —N of Formula (1)).

[Chem. 2]

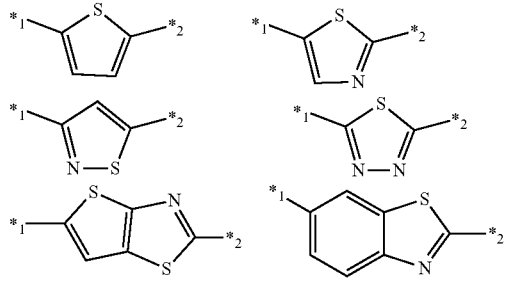

Examples of the substituent that may be included in the divalent group of an aromatic heterocyclic ring including one or more S atoms are the same as those of the substituent that may be included in the unsubstituted or substituted divalent group of an aromatic hydrocarbon ring, which is described below. The same applies to preferable substituents.

In order to achieve further high molecular linearity, it is preferable that the divalent group of an aromatic heterocyclic ring including one or more S atoms do not have a substituent.

Unsubstituted or Substituted Divalent Group of Aromatic Hydrocarbon Ring:

Examples of the aromatic hydrocarbon ring included in the unsubstituted or substituted divalent group of an aromatic hydrocarbon ring include a benzene ring, a naphthalene ring, an anthracene ring, a phenanthrene ring, a perylene ring, a tetracene ring, a pyrene ring, a benzpyrene ring, a chrysene ring, a triphenylene ring, an acenaphthene ring, a fluoranthene ring, and a fluorene ring.

The divalent group of an aromatic hydrocarbon ring is preferably a divalent group of a benzene ring (phenylene group) or a divalent group of a naphthalene ring (naphthylene group) and is more preferably a divalent group of a benzene ring (phenylene group) because, in such a case, the absorption transition moment of the compound according to the first invention is likely to coincide with the major axis direction of the dye and the dichroic ratio can be increased. In particular, a 1,4-phenylene group, a 1,4-naphthylene group, and a 2,6-naphthylene group are more preferable, a 1,4-phenylene group is further preferable, and a 1,4-phenylene group that does not have a substituent is particularly preferable. When the divalent group of an aromatic hydrocarbon ring is selected from the above groups, the absorption transition moment of the compound according to the first invention is likely to coincide with the major axis direction of the compound and the dichroic ratio can be increased.

Examples of the substituent that can be included in the divalent group of an aromatic hydrocarbon ring include —R$^A$, —OH, —O—R$^A$, —O—C(=O)—R$^A$, —NH$_2$, —NH—R$^A$, —N(—R$^B$)_R$^A$, —C(=O) R$^A$, —C(=O)—O—R$^A$, —C(=O)—NH$_2$, —C(=O)—NH—R$^A$, —C(=O)—N(—R$^B$)_R$^A$, —SH, —S—R$^A$, a trifluoromethyl group, a sulfamoyl group, a carboxyl group, a cyano group, a nitro group, and a halogen, where —R$^A$ and —R$^B$ each independently represent a linear or branched alkyl group having 1 to 15 carbon atoms. The numbers of the carbon atoms included in —R$^A$ and —R$^B$ are preferably 1 or more and 12 or less and is further preferably 1 or more and 9 or less in order to enhance the molecular alignment with respect to the polymerizable liquid crystal compound used in the first invention.

One or more methylene groups included in the linear or branched alkyl group may be replaced with an ether-type oxygen atom, a thioether-type sulfur atom, an amine-type nitrogen atom (—NH— or —N($R^z$)—: where $R^z$ represents a linear or branched alkyl group having 1 to 6 carbon atoms and preferably having 1 to 4 carbon atoms), a carbonyl group, an ester bond, an amide bond, —CHF—, —$CF_2$—, —CHCl—, or —$CCl_2$—. The above methylene groups may also be replaced with a polymerizable group, such as an acryloyloxy group, a methacryloyloxy group, or a glycidyloxy group.

Among these, —$R^A$, —O—$R^A$, a trifluoromethyl group, and a fluoro group are preferable as a substituent that can be included in the divalent group of an aromatic hydrocarbon ring. Examples of —$R^A$ include n-propyl, n-butyl, n-pentyl, n-hexyl, n-heptyl, n-octyl, and 5,5-dimethyl-3-methylhexyl. When the divalent group of an aromatic hydrocarbon ring includes any of the above substituents, the molecular alignment of the compound according to the first invention, which is a dye, is likely to be enhanced.

In Formula (1), -$A^1$- and -$A^2$- each independently represent an unsubstituted or substituted divalent group of an aromatic heterocyclic ring including one or more S atoms wherein atoms constituting the aromatic heterocyclic ring other than a carbon atom are not adjacent to one another, an unsubstituted or substituted divalent group of a benzisothiazole ring, or an unsubstituted or substituted divalent group of an aromatic hydrocarbon ring (where -$A^1$- and -$A^2$- do not represent an unsubstituted or substituted divalent group of an aromatic hydrocarbon ring at the same time). Examples of the unsubstituted or substituted aromatic heterocyclic ring including one or more S atoms wherein atoms constituting the aromatic heterocyclic ring other than a carbon atom are not adjacent to one another include a thiophene ring, a benzothiophene ring, a thiazole ring, a thienopyrrole ring, a thienothiophene ring, a furothiazole ring, a thienofuran ring, a thienothiazole ring, and a benzothiazole ring. In particular, when -$A^2$- is an unsubstituted or substituted aromatic heterocyclic ring including one or more S atoms wherein atoms constituting the aromatic heterocyclic ring other than a carbon atom are not adjacent to one another, a thienopyrrole ring, a thienothiophene ring, a furothiazole ring, a thienofuran ring, and a thienothiazole ring are preferable in order to enhance molecular linearity.

In Formula (1), -$A^2$- and -$A^3$- are preferably each independently an unsubstituted or substituted phenylene group.

In Formula (11), at least one -$A^{42}$- is an unsubstituted or substituted divalent group of an aromatic heterocyclic ring including one or more S atoms. The above aromatic heterocyclic ring is preferably a thiophene ring, a benzothiophene ring, a thiazole ring, an isothiazole ring, a 1,3,4-thiadiazole ring, a thienopyrrole ring, a thienothiophene ring, a furothiazole ring, a thienofuran ring, a thienothiazole ring, a benzisothiazole ring, or a benzothiazole ring, is more preferably a benzothiophene ring, a thienopyrrole ring, a thienothiophene ring, a furothiazole ring, a thienofuran ring, a thienothiazole ring, or a benzothiazole ring, and is further preferably a thienopyrrole ring, a thienothiophene ring, a furothiazole ring, a thienofuran ring, or a thienothiazole ring in order to enhance molecular linearity.

In Formula (11), in the case where n is 2 or 3, it is preferable that at least one of the two or three -$A^{42}$-'s be an unsubstituted or substituted divalent group of an aromatic heterocyclic ring including one or more S atoms and the other -$A^{42}$-'s be each independently an unsubstituted or substituted divalent group of an aromatic hydrocarbon ring or an unsubstituted or substituted divalent group of an aromatic heterocyclic ring including one or more S atoms.

In Formula (11), -$A^{41}$- and -$A^{43}$- are preferably each independently an unsubstituted or substituted phenylene group.

In Formula (21), -$A^{23}$- is preferably an unsubstituted or substituted phenylene group.

In Formula (21), at least one of -$A^{21}$- and -$A^{22}$- is an unsubstituted or substituted divalent group of an aromatic heterocyclic ring including one or more S atoms. The aromatic heterocyclic ring is more preferably a thiophene ring, a benzothiophene ring, a thiazole ring, an isothiazole ring, a 1,3,4-thiadiazole ring, a thienopyrrole ring, a thienothiophene ring, a furothiazole ring, a thienofuran ring, a thienothiazole ring, a benzisothiazole ring, or a benzothiazole ring and is further preferably a thienopyrrole ring, a thienothiophene ring, a furothiazole ring, a thienofuran ring, or a thienothiazole ring in order to enhance molecular linearity.

In the case where, in Formula (21), -$A^{21}$- and -$A^{22}$- include an unsubstituted or substituted divalent group of an aromatic hydrocarbon ring, the group is preferably an unsubstituted or substituted phenylene group.

(—Y)

—Y represents a monovalent organic group.

Examples of the monovalent organic group represented by —Y include a hydrogen atom, a hydroxyl group, an amino group, a cyano group, a carbamoyl group, a nitro group, a halogen atom, —$R^x$, —O—$R^x$, —NH—$R^x$, —N(—$R^y$)—$R^x$, —C(=O)—$R^x$, —C(=O)—O—$R^x$, —C(=O)—NH—$R^x$, —C(=O)—N(—$R^y$)—$R^x$, —O—C(=O)—$R^x$, —NH—C(=O)—$R^x$, and —N(—$R^y$)—C(=O)—$R^x$, where —$R^x$ and —$R^y$ each independently represent a linear or branched alkyl group having 1 to 15 carbon atoms, a cycloalkyl group having 5 to 14 ring-forming atoms, or an aryl group having 5 to 14 ring-forming atoms, and —$R^x$ and —$R^y$ may be combined with each other to form a ring having 2 to 15 carbon atoms or preferably having 2 to 10 carbon atoms.

In the case where the molecular alignment with respect to the polymerizable liquid crystal compound used in the first invention is to be enhanced, it is preferable that the monovalent organic group represented by —Y do not have the polymerizable group described below. On the other hand, in the case where the mechanical strength of the anisotropic dye film is to be increased, it is preferable that the monovalent organic group represented by —Y have the polymerizable group described below.

The number of carbon atoms included in the linear or branched alkyl group having 1 to 15 carbon atoms is preferably 1 to 6. The number of ring-forming atoms included in the cycloalkyl group having 5 to 14 ring-forming atoms is preferably 5 to 10. The number of ring-forming atoms included in the aryl group having 5 to 14 ring-forming atoms is preferably 5 to 10.

The linear or branched alkyl group having 1 to 15 carbon atoms, the cycloalkyl group having 5 to 14 ring-forming atoms, and the aryl group having 5 to 14 ring-forming atoms may be either unsubstituted or substituted.

One or more methylene groups included in the linear or branched alkyl group having 1 to 15 carbon atoms, the cycloalkyl group having 5 to 14 ring-forming atoms, or the ring formed by —$R^x$ and —$R^y$ being combined with each other may be replaced (displaced) with —O—, —S—, —NH—, —N($R^z$)—, —C(=O)—, —C(=O)—O—, —C(=O)—NH—, —CHF—, —$CF_2$—, —CHCl—, or —$CCl_2$— and may be replaced with a polymerizable group, such as an acryloyloxy group, a methacryloyloxy group, or a glycidyloxy group, where $R^z$ represents a linear or branched alkyl group having 1 to 6 carbon atoms.

Examples of the substituent that may be included in the linear or branched alkyl group having 1 to 15 carbon atoms which is represented by —$R^x$ or —$R^y$ include —OH, —O—$R^f$, —O—C(=O)—$R^f$, —$NH_2$, —NH—$R^f$, —N(—$R^g$)—$R^f$, —C(=O)—$R^f$, —C(=O)—O—$R^f$, —C(=O)—$NH_2$, —C(=O)—NH—$R^f$, —C(=O)—N(—$R^g$)—$R^f$, —SH, —S—$R^f$, a sulfamoyl group, a carboxyl group, a cyano group, a nitro group, and a halogen atom, where —$R^f$ and —$R^g$ each independently represent a linear or branched alkyl group having 1 to 15 carbon atoms and preferably having 1 to 10 carbon atoms.

One or more methylene groups included in the linear or branched alkyl group having 1 to 15 carbon atoms may be replaced (displaced) with —O—, —S—, —NH—, —N($R^h$), —C(=O)—, —C(=O)—O—, —C(=O)—NH—, —CHF—, —$CF_2$—, —CHCl—, or —$CCl_2$— and may be replaced with a polymerizable group, such as an acryloyloxy group, a methacryloyloxy group, or a glycidyloxy group, where $R^h$ represents a linear or branched alkyl group having 1 to 6 carbon atoms.

Among these, —O—$R^f$ is preferable as a substituent that may be included in the linear or branched alkyl group having 1 to 15 carbon atoms which is represented by —$R^x$ or —$R^y$. Examples thereof include methoxy, ethoxy, n-propoxy, n-butoxy, n-pentoxy, n-hexoxy, n-heptoxy, n-octoxy, acryloyloxy, methacryloyloxy, and glycidyloxy.

Examples of the substituent that may be included in the cycloalkyl or aryl group having 5 to 14 ring-forming atoms which is represented by —$R^x$ or —$R^y$ include —$R^i$, —OH, —O—$R^i$, —O—C(=O)—$R^i$, —$NH_2$, —NH—$R^i$, —N(—$R^j$)—$R^i$, —C(=O)—$R^i$, —C(=O)—O—$R^i$, —C(=O)—$NH_2$, —C(=O)—NH—$R^i$, —C(=O)—N(—$R^j$)—$R^i$, —SH, —S—$R^i$, a trifluoromethyl group, a sulfamoyl group, a carboxyl group, a cyano group, a nitro group, and a halogen, where —$R^i$ and —$R^j$ each independently represent a linear or branched alkyl group having 1 to 10 carbon atoms and preferably having 1 to 5 carbon atoms.

Among these, —$R^i$ and —O—$R^i$ are preferable as a substituent that may be included in the cycloalkyl or aryl group having 5 to 14 ring-forming atoms which is represented by —$R^x$ or —$R^y$. Examples thereof include methyl, ethyl, n-propyl, n-butyl, n-pentyl, n-hexyl, n-heptyl, n-octyl, 2-ethylhexyl, methoxy, ethoxy, n-propoxy, n-butoxy, n-pentoxy, n-hexoxy, n-heptoxy, n-octoxy, 2-ethylhexyloxy, and 5,5-dimethyl-3-methylhexyloxy.

Examples of the cycloalkane ring included in the cycloalkyl group having 5 to 14 ring-forming atoms which is represented by —$R^x$ or —$R^y$ include a cyclopropane ring, a cyclobutane ring, a cyclopentane ring, a cyclohexane ring, a cycloheptane ring, a cyclooctane ring, a cyclohexene ring, a norbornane ring, a bornane ring, an adamantane ring, a tetrahydronaphthalene ring, and a bicyclo[2.2.2]octane ring.

Examples of the aryl group having 5 to 14 ring-forming atoms which is represented by —$R^x$ or —$R^y$ include monovalent groups of the rings described as examples of the aromatic heterocyclic ring represented by -$A^1$- in Formula (1) above and the aromatic hydrocarbon rings represented by -$A^2$- and -$A^3$- in Formula (1) above.

It is preferable that —$R^x$ and —$R^y$ be linear or branched alkyl groups having 1 to 15 carbon atoms or that —$R^x$ and —$R^y$ be combined with each other to form an unsubstituted or substituted ring having 2 to 15 carbon atoms. It is more preferable that —$R^x$ and —$R^y$ be linear or branched alkyl groups having 1 to 6 carbon atoms or that —$R^x$ and —$R^y$ be combined with each other to form a ring having 2 to 10 carbon atoms. It is further preferable that —$R^x$ and —$R^y$ be linear or branched alkyl groups having 1 to 3 carbon atoms or that —$R^x$ and —$R^y$ be combined with each other to form a ring having 2 to 6 carbon atoms. It is particularly preferable that —$R^x$ and —$R^y$ be linear alkyl groups having 1 to 3 carbon atoms or that —$R^x$ and —$R^y$ be combined with each other to form a ring having 2 to 6 carbon atoms. When the above conditions are satisfied, the compound according to the first invention is likely to have suitable molecular alignment.

The monovalent organic group represented by —Y is preferably —$R^x$, —O—$R^x$, —O—C(=O)—$R^x$, —C(=O)—O—$R^x$, or —N(—$R^y$)—$R^x$, is more preferably —O—$R^x$, —O—C(=O)—$R^x$, or —N(—$R^y$)—$R^x$, is further preferably —O—$R^x$ or —N(—$R^y$)—$R^x$, and is particularly preferably —N(—$R^y$)—$R^x$. Specifically, for example, a dimethylamino group, a diethylamino group, a di-n-propylamino group, an ethylmethylamino group, a methylpropylamino group, an azetidinyl group, a pyrrolidinyl group, a piperidinyl group, an azepanyl group, a morpholinyl group, a piperazinyl group, and a thiomorpholinyl group are preferable as —N(—$R^y$)—$R^x$. A diethylamino group, a pyrrolidinyl group, and a piperidinyl group are more preferable. In such a case, the absorption transition moment of the compound according to the first invention is likely to coincide with the major axis direction of the compound and, consequently, dichroism may be enhanced.

(n)

n represents 1, 2, or 3.

n is preferably 1 or 2 and is more preferably 1. In such a case, the compound according to the first invention is likely to have suitable molecular alignment.

When n is 2 or 3, the -$A^2$-'s may be identical to or different from one another, the -$A^{42}$-'s may be identical to or different from one another, and the -$A^{22}$-'s may be identical to or different from one another.

It is preferable that, in Formulae (1), (11), and (21), —N=N— be in a trans form in order to enhance the linearity of the compound according to the first invention.

(Specific Examples of Compound According to First Invention)

Specific examples of the compound according to the first invention include, but are not limited to, the following compounds.

[Chem. 3]

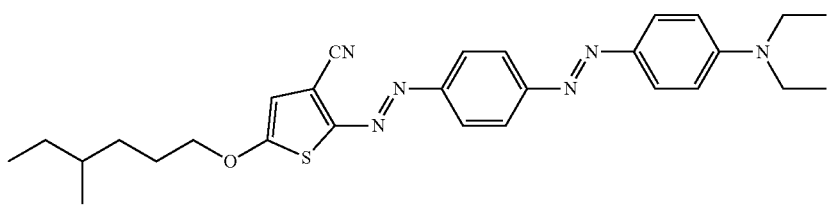

-continued
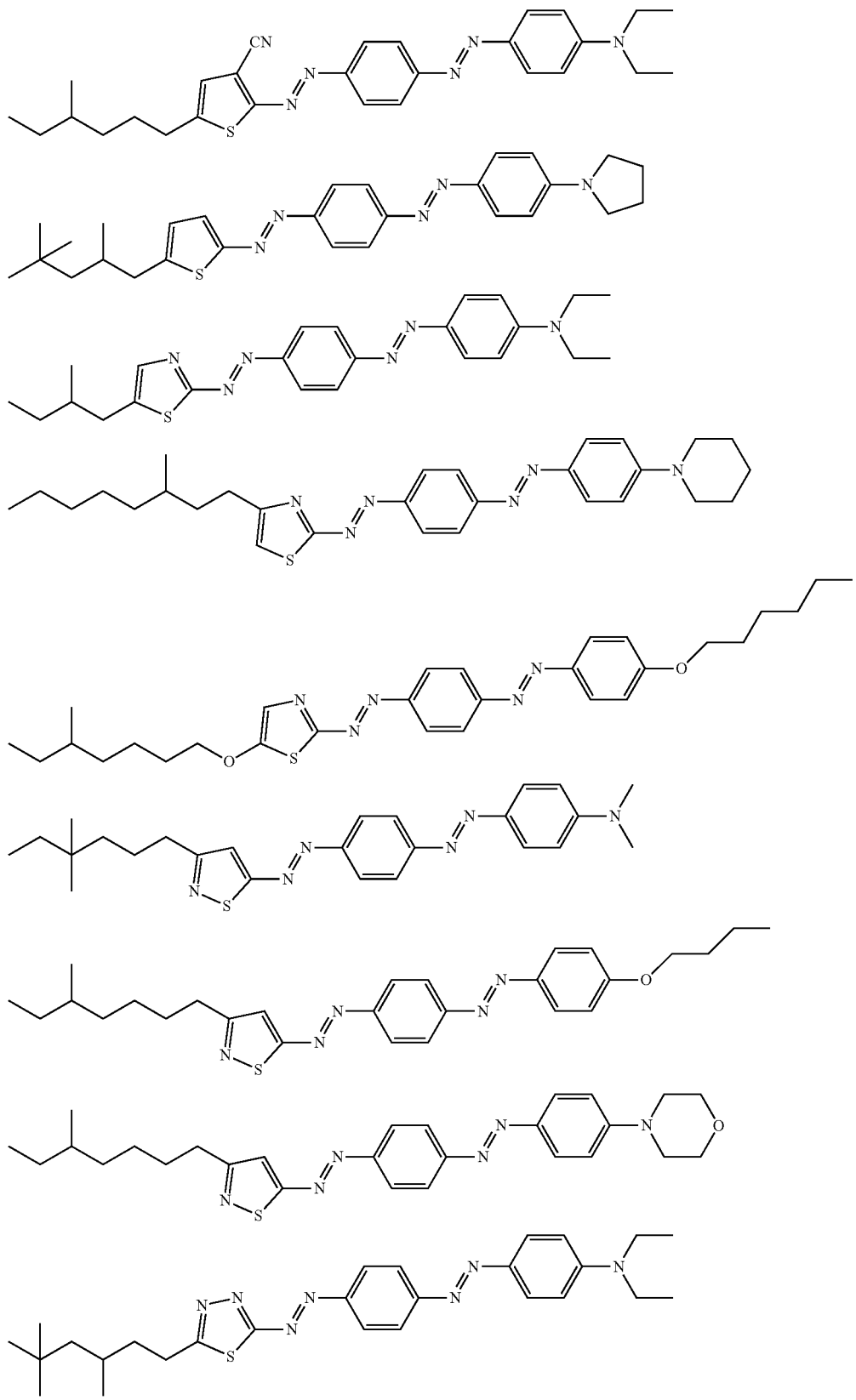

-continued
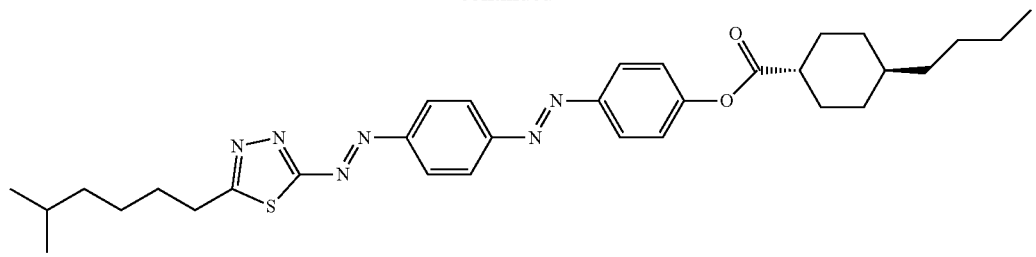
[Chem. 4]
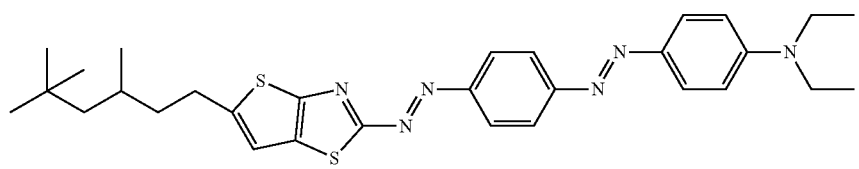
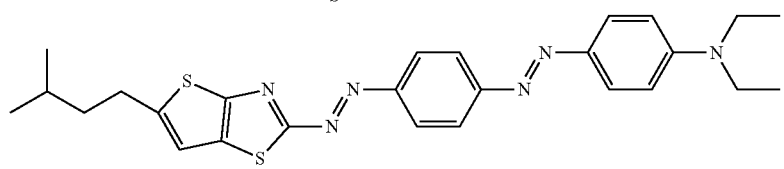
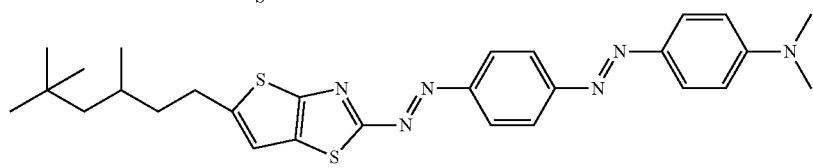
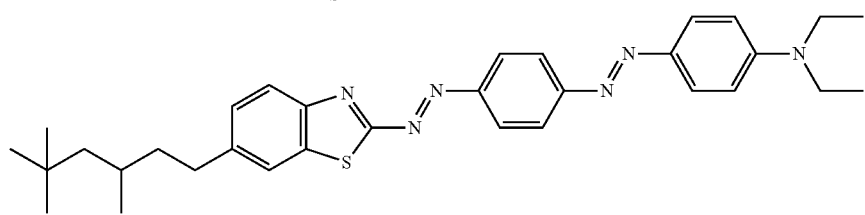
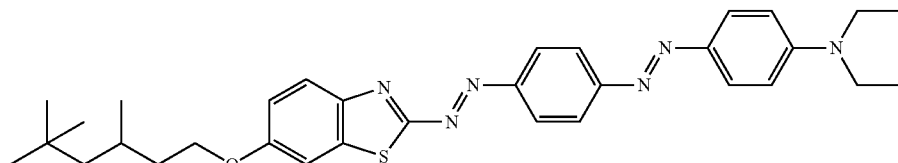
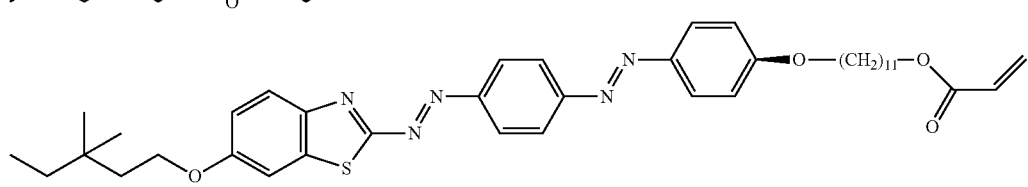
[Chem. 5]
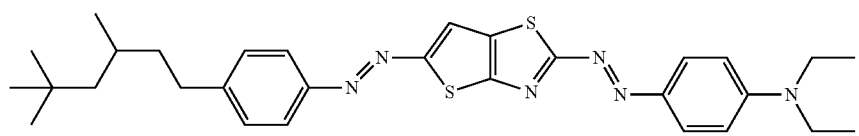

-continued
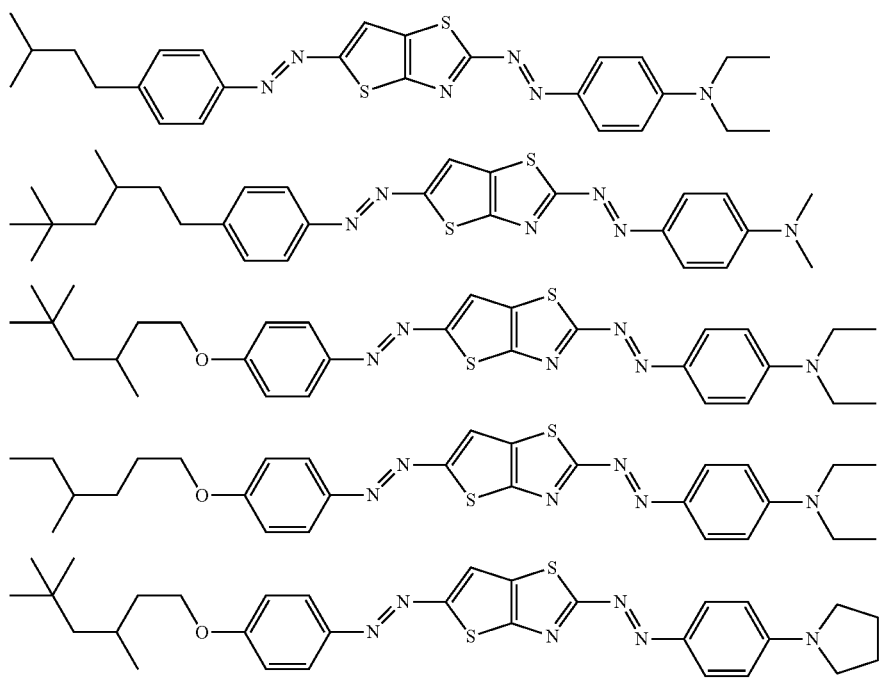
[Chem. 6]
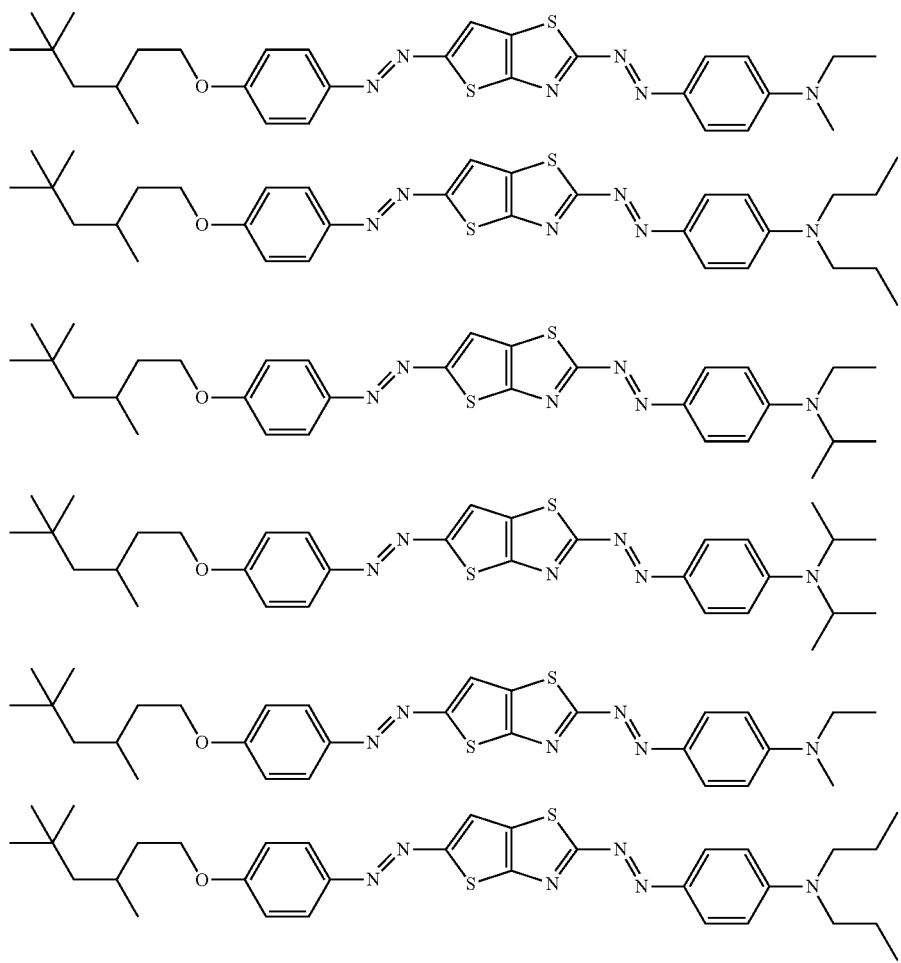

-continued

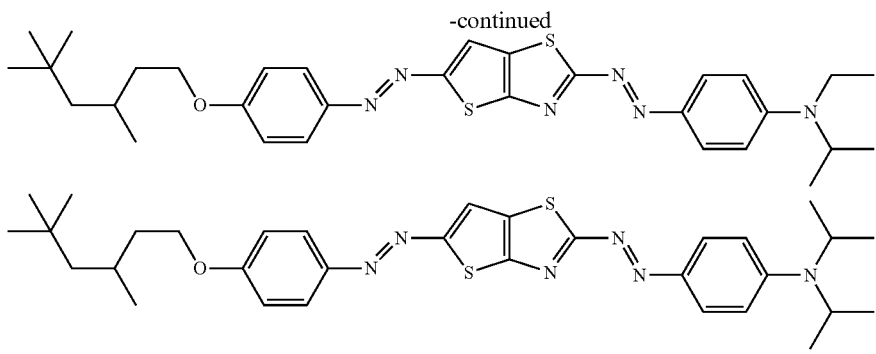

(Absorption Properties)

In an anisotropic dye film prepared by the method described below, the compound according to the first invention may have a local maximum absorption (λmax1) at wavelengths of 350 to 800 nm, preferably has a local maximum absorption at wavelengths of 450 to 800 nm, more preferably has a local maximum absorption at wavelengths of 510 to 750 nm, and further preferably has a local maximum absorption at wavelengths of 510 to 700 nm. When the local maximum absorption (λmax1) falls within the above wavelength ranges, it may become possible to exhaustively absorb wavelengths of 350 to 800 nm by using the compound in combination with a dye having a local maximum absorption at shorter wavelengths.

It is preferable that the local maximum absorption (the above λmax1) of the compound according to the first invention in the anisotropic dye film be present at longer wavelengths than the local maximum absorption (λmax2) of the compound which is measured when the compound is dissolved in a solvent. This long-wavelength shift is a phenomenon that occurs as a result of the compound according to the first invention being dispersed in a polymerizable liquid crystal compound and/or a polymer having a unit based on the polymerizable liquid crystal compound and indicates a strong intermolecular interaction between the compound according to the first invention and the polymerizable liquid crystal compound and/or the polymer having a unit based on the polymerizable liquid crystal compound. The long-wavelength shift means that the difference in local maximum absorption (λmax1−λmax2) is positive. The difference is preferably 10 nm or more and is more preferably 20 nm or more.

(Solubility)

The solubility of the compound according to the first invention is not limited. The solubility of the compound in toluene is preferably 0.3% by mass or more and is more preferably 0.4% by mass or more. When the above solubility is equal to or more than the above lower limit, suitable coating film performance may be achieved.

[Compound According to Second Invention]

An anisotropic dye film-forming composition according to the second invention includes the compound represented by Formula (31) below (hereinafter, referred to as "compound (31)" or "compound according to the second invention") and a polymerizable liquid crystal compound.

   (31)

(in Formula (31),

-A$^{31}$ represents an unsubstituted or substituted group represented by any one of Formulae (a-2) to (a-7) below (in Formulae (a-2) to (a-7) below, * represents a linkage to —N and S$_4$ to S$_{14}$ represent a position at which a substituent is attached to the group when the group is substituted),

[Chem. 7]

 (a-2)

 (a-3)

 (a-4)

 (a-5)

 (a-6)

 (a-6)

 (a-7)

-A$^{32}$- represents an unsubstituted or substituted divalent group of an aromatic hydrocarbon ring or an unsubstituted or substituted divalent group of an aromatic heterocyclic ring, -A³³- represents an unsubstituted or substituted phenylene group, —Y represents a monovalent organic group, n represents 1, 2, or 3, and when n is 2 or 3, a plurality of -A³²-'s may be identical to or different from one another.)

(-A³¹)

-A³¹ is an unsubstituted or substituted group represented by any of Formulae (a-2) to (a-7) above. In order to enhance molecular alignment with respect to the polymerizable liquid crystal compound, -A³¹ is preferably an unsubstituted or substituted group represented by Formula (a-2) or (a-3) above.

Examples of the substituent that may be included in -A³¹ include —$R^a$, —OH, —O—$R^a$, —O—C(=O)—$R^a$, —NH$_2$, —NH—$R^a$, —N(—$R^b$)—$R^a$, —C(=O)—$R^a$, —C(=O)—O—$R^a$, —C(=O)—NH$_2$, —C(=O)—NH—$R^a$, —C(=O)—N(—$R^b$)—$R^a$, —SH, —S—$R^a$, a trifluoromethyl group, a sulfamoyl group, a carboxyl group, a cyano group, a nitro group, and a halogen. -A³¹ may have only one type of the above substituents and may have two or more selected from one or more types of substituents.

—$R^a$ and —$R^b$ each independently represent a linear or branched alkyl group having 1 to 15 carbon atoms, a cycloalkyl group having 5 to 14 ring-forming atoms, or an aryl group having 5 to 14 ring-forming atoms. When —$R^a$ or —$R^b$ is the alkyl group, the numbers of carbon atoms included in —$R^a$ and —$R^b$ are preferably 1 to 12 and are more preferably 1 to 9. When —$R^a$ or —$R^b$ is the aryl group, the numbers of carbon atoms included in —$R^a$ and —$R^b$ are preferably 5 to 12 and are more preferably 5 to 9. When —$R^a$ or —$R^b$ is the cycloalkyl group, the numbers of carbon atoms included in —$R^a$ and —$R^b$ are preferably 5 to 12 and are more preferably 5 to 9. When the numbers of carbon atoms fall within the above ranges, molecular alignment with respect to the polymerizable liquid crystal compound is likely to be enhanced.

One or more methylene groups included in the linear or branched alkyl group having 1 to 15 carbon atoms or the cycloalkyl group having 5 to 14 ring-forming atoms may be replaced with —O—, —S—, —NH—, —N(RC)—, —C(=O)—, —C(=O)—O—, —C(=O)—NH—, —CHF—, —CF$_2$—, —CHCl—, or —CCl$_2$— and may be replaced with a polymerizable group, such as an acryloyloxy group, a methacryloyloxy group, or a glycidyloxy group, where RC represents a linear or branched alkyl group having 1 to 6 carbon atoms.

Among these, —$R^a$, —O—$R^a$, —S—$R^a$, a trifluoromethyl group, a fluoro group, and a cyano group are preferable as a substituent that may be included in -A³¹. —$R^a$ is more preferably n-methyl, n-ethyl, n-propyl, n-butyl, n-pentyl, n-hexyl, n-heptyl, n-octyl, or 5,5-dimethyl-3-methylhexyl. When -A³¹ has the above-described substituent, molecular alignment with respect to the polymerizable liquid crystal compound is likely to be enhanced.

The position at which the substituent is attached to -A³¹ is not limited. In particular, in Formula (a-2), S$_4$ is preferable. In Formula (a-3), S$_5$ or S$_6$ is preferable. In the case where the number of the substituents is one, S$_6$ is more preferable. In Formula (a-4), S$_7$, S$_8$, or S$_9$ is preferable and S$_8$ is more preferable. In Formula (a-5), S$_{10}$ or S$_{11}$ is preferable. In Formula (a-6), S$_{12}$ or S$_{13}$ is preferable and S$_{13}$ is more preferable. In Formula (a-7), S$_{14}$ is preferable. When the substituent is attached to the above-described position, the absorption transition moment of the compound (31) is likely to coincide with the major axis direction of the compound (31) and, consequently, the dichroic ratio may be increased.

(-A³²- and -A³³-)

-A³²- represents an unsubstituted or substituted divalent group of an aromatic hydrocarbon ring or an unsubstituted or substituted divalent group of an aromatic heterocyclic ring.

-A³³- represents an unsubstituted or substituted phenylene group.

The aromatic hydrocarbon ring represented by -A³²- is a monocyclic or condensed aromatic hydrocarbon ring. The number of carbon atoms included in the aromatic hydrocarbon ring is preferably 6 or more and 20 or less and is more preferably 10 or less. When the number of carbon atoms falls within the above range, the absorption transition moment of the compound (31) is likely to coincide with the major axis direction of the compound (31) and, consequently, the dichroic ratio can be increased.

The aromatic hydrocarbon rings include a benzene ring, a naphthalene ring, an anthracene ring, a phenanthrene ring, perylene ring, a tetracene ring, a pyrene ring, a benzpyrene ring, a chrysene ring, a triphenylene ring, an acenaphthene ring, a fluoranthene ring, and a fluorene ring and the like.

The divalent group of an aromatic hydrocarbon ring represented by -A³²- is preferably a divalent group of a benzene ring (phenylene group) or a divalent group of a naphthalene ring (naphthylene group), is more preferably a 1,4-phenylene group, a 1,4-naphthylene group, or a 2,6-naphthylene group, or is further preferably a 1,4-phenylene group because, in such a case, the absorption transition moment of the compound (31) is likely to coincide with the major axis direction of the compound (31) and, consequently, the dichroic ratio can be increased.

The aromatic heterocyclic ring represented by -A³²- is a monocyclic or condensed aromatic heterocyclic ring. The number of carbon atoms included in the aromatic heterocyclic ring is preferably 4 or more and 20 or less and is more preferably 10 or less. When the number of carbon atoms falls within the above range, the absorption transition moment of the compound (31) is likely to coincide with the major axis direction of the compound (31) and, consequently, the dichroic ratio can be increased.

The aromatic heterocycles include a furan ring, a benzofuran ring, a thiophene ring, a benzothiophene ring, a pyrrole ring, a pyrazole ring, an imidazole ring, a thiazole ring, an isothiazole ring, an oxadiazole ring, a thiadiazole ring, a triazole ring, an indole ring, a carbazole ring, a pyrroloimidazole ring, a pyrrolopyrazole ring, a pyrrolopyrrole ring, a thienopyrrole ring, a thienothiophene ring, a furopyrrole ring, a furofuran ring, a furothiazole ring, a thienofuran ring, a thienothiazole ring, a benzisoxazole ring, a benzisothiazole ring, a benzimidazole ring, a pyridine ring, a pyrazine ring, a pyridazine ring, a pyrimidine ring, a triazine ring, a quinoline ring, an isoquinoline ring, a shinoline ring, a quinoxaline ring, a phenanthridine ring, a quinazoline ring, an azulene ring and the like.

Examples of the substituent that may be included in the divalent group of an aromatic hydrocarbon ring or the divalent group of an aromatic heterocyclic ring which is represented by -A³²- and examples of the substituent that may be included in the phenylene group represented by -A³³- are the same as those of the substituent that may be included in -A³¹-.

-A³²- is preferably an unsubstituted or substituted divalent group of an aromatic hydrocarbon ring, is more preferably an unsubstituted or substituted phenylene group, and is further preferably an unsubstituted 1,4-phenylene group. In such a case, the absorption transition moment of the compound (31) is likely to coincide with the major axis direction of the compound (31) and, consequently, the dichroic ratio can be increased.

-$A^{33}$- is further preferably an unsubstituted 1,4-phenylene group. In such a case, the absorption transition moment of the compound (31) is likely to coincide with the major axis direction of the compound (31) and, consequently, the dichroic ratio can be increased.

(—Y)

—Y represents a monovalent organic group.

Examples of the monovalent organic group represented by —Y are the same as those of the monovalent organic group represented by —Y in Formula (1) above. The same applies to preferable examples and the reasons for which those are preferable.

(n)

n represents 1, 2, or 3. In the case where n is 2 or 3, the -$A^{32}$-'s may be identical to or different from one another.

n is preferably 1 or 2 and is more preferably 1. In such a case, the compound (31) is likely to have suitable molecular alignment.

It is preferable that, in the compound (31), —N=N— be in a trans form in order to enhance the linearity of the compound (31).

Specific Examples of Compound (31)

Specific examples of the compound (31) include, but are not limited to, the following compounds.

[Chem. 8]

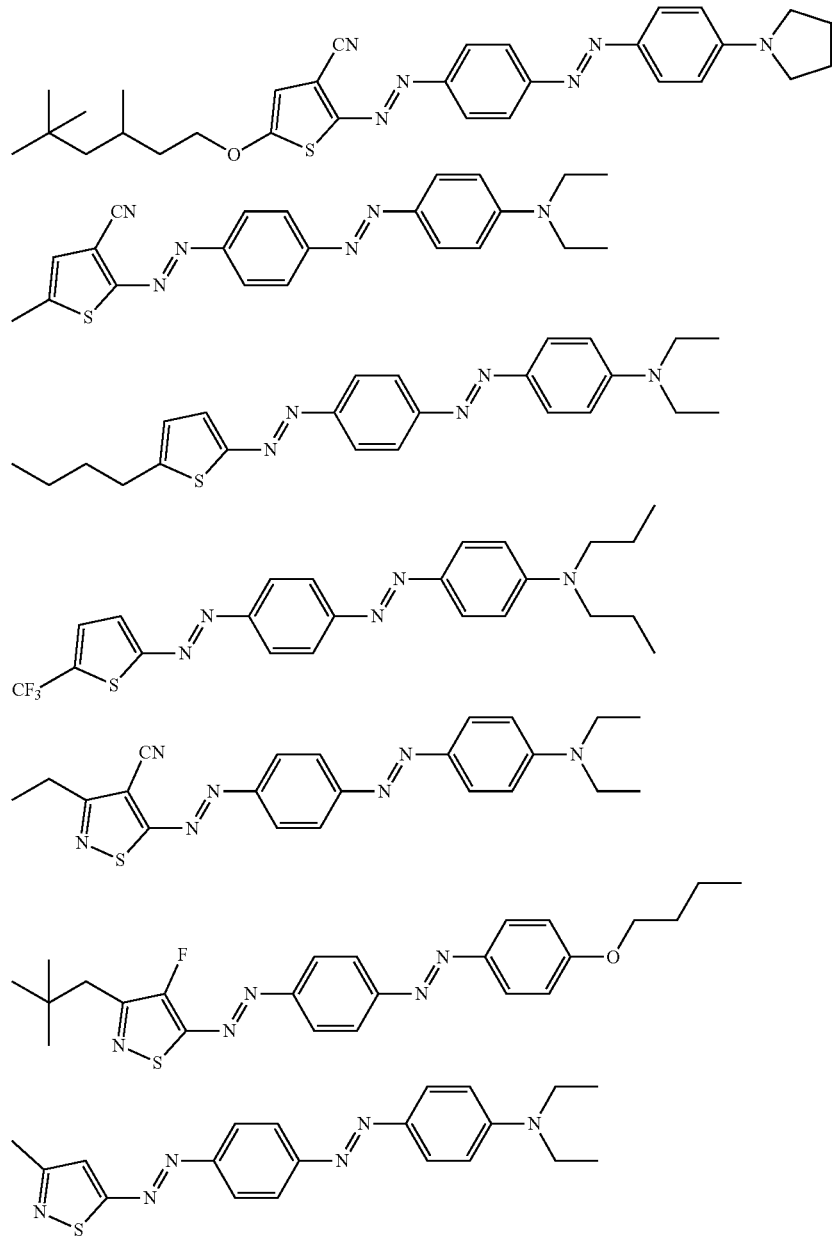

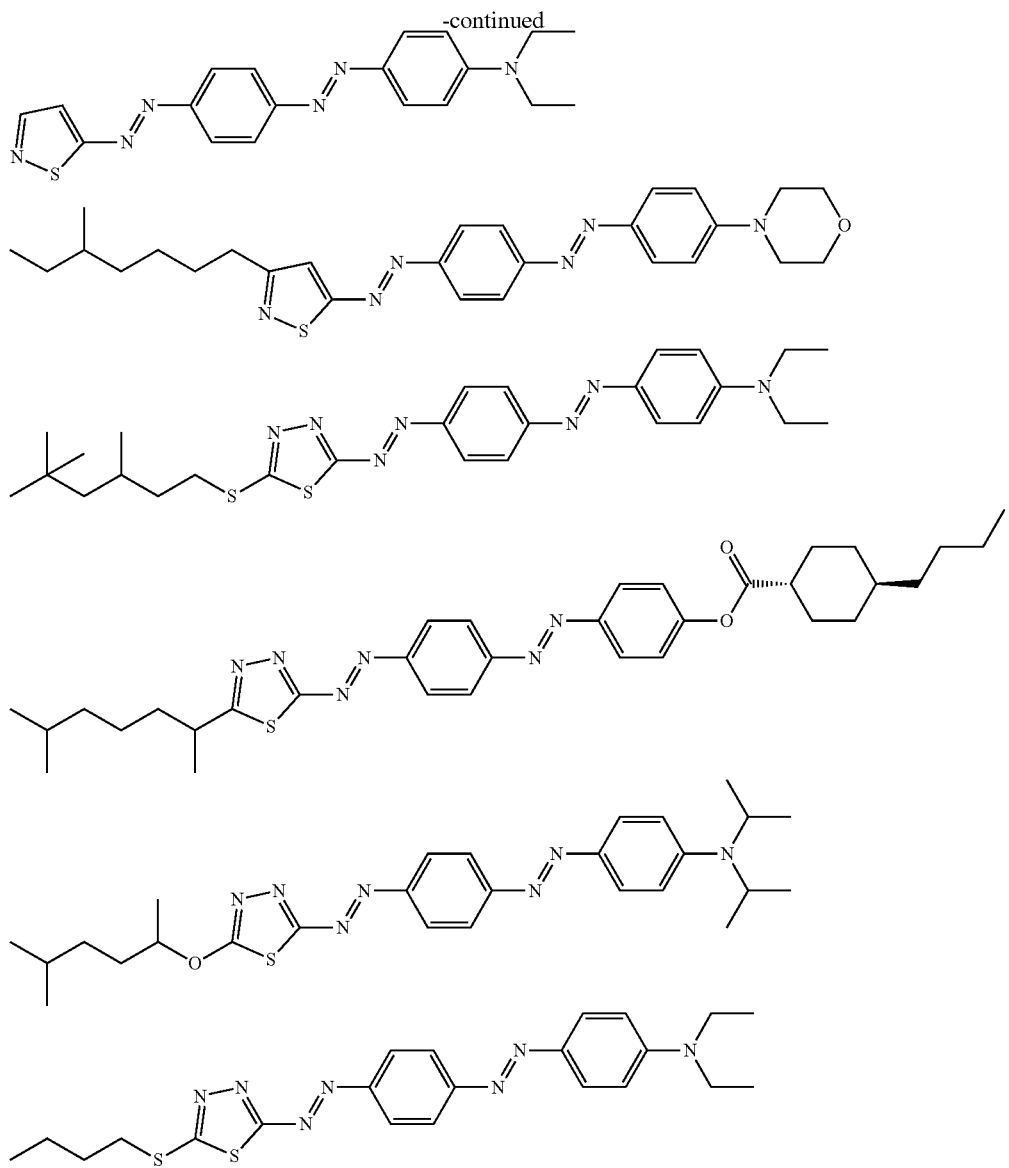

(Absorption Properties)

In an anisotropic dye film prepared by the method described below, the compound (31) according to the second invention may have a local maximum absorption (λmax1) at wavelengths of 350 to 800 nm, preferably has a local maximum absorption at wavelengths of 450 to 800 nm, more preferably has a local maximum absorption at wavelengths of 480 to 750 nm, and further preferably has a local maximum absorption at wavelengths of 510 to 700 nm. When the local maximum absorption (λmax1) falls within the above wavelength ranges, it may become possible to exhaustively absorb wavelengths of 350 to 800 nm by using the compound in combination with a dye having a local maximum absorption at shorter wavelengths.

It is preferable that the local maximum absorption (the above λmax1) of the compound according to the second invention in the anisotropic dye film be present at longer wavelengths than the local maximum absorption (λmax2) of the compound which is measured when the compound is dissolved in a solvent. This long-wavelength shift is a phenomenon that occurs as a result of the compound according to the second invention being dispersed in a polymerizable liquid crystal compound and/or a polymer having a unit based on the polymerizable liquid crystal compound and indicates a strong intermolecular interaction between the compound according to the second invention and the polymerizable liquid crystal compound and/or the polymer having a unit based on the polymerizable liquid crystal compound. The long-wavelength shift means that the difference in local maximum absorption (λmax1−λmax2) is positive. The difference is preferably 10 nm or more and is more preferably 20 nm or more.

[Anisotropic Dye Film-Forming Composition]

<Dye>

An anisotropic dye film-forming composition according to the present invention includes a dye and a polymerizable liquid crystal compound. The anisotropic dye film-forming composition includes, as a dye, at least the compound according to the first invention or the compound according to the second invention (hereinafter, these compounds are referred to as "the compound according to the present invention").

The anisotropic dye film-forming composition according to the present invention may include only one type of the compound according to the present invention and may include two or more types of the compounds according to the present invention.

<Other Dye>

The anisotropic dye film-forming composition according to the present invention, which includes the compound according to the present invention as a dye, may include a dye other than the compound according to the present invention. Examples of the dye other than the compound according to the present invention which is included in the anisotropic dye film-forming composition according to the present invention include an azo dye, a quinone dye (including a naphthoquinone dye, an anthraquinone dye, and the like), a stilbene dye, a cyanine dye, a phthalocyanine dye, an indigo dye, and a fused polycyclic dye (including a perylene dye, an oxazine dye, an acridine dye, and the like).

The number of types of the dyes other than the compound according to the present invention which are included in the composition for anisotropic dye films according to the present invention may be only one. In another case, two or more types of dyes other than the compound according to the present invention may be included in the composition for anisotropic dye films according to the present invention in any combination at any ratio.

Among the dyes described above as examples, an azo dye is preferable because it may achieve high molecular arrangement in the anisotropic dye film.

The term "azo dye" used herein refers to a dye that has at least one azo group (—N═N—). The number of azo groups per molecule is preferably 1 or more and is more preferably 2 or more; and is preferably 6 or less, is more preferably 4 or less, and is further preferably 3 or less in consideration of solubility in solvents, compatibility with liquid crystal compounds, color tone, and ease of production.

Examples of the azo dye include the compound represented by Formula (A) below.

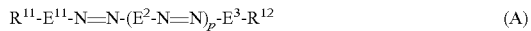

$$R^{11}\text{-}E^{11}\text{-}N{=}N\text{-}(E^2\text{-}N{=}N)_p\text{-}E^3\text{-}R^{12} \quad (A)$$

(in Formula (A),

-$E^1$-, -$E^2$-, and -$E^3$- each independently represent an unsubstituted or substituted phenylene group, an unsubstituted or substituted naphthylene group, or an unsubstituted or substituted divalent heterocyclic group, p represents an integer of 0 to 4, when p is an integer of 2 or more, a plurality of -$E^2$-'s may be identical to or different from one another; and $R^{11}$ and $R^{12}$ each independently represent a monovalent organic group)

-$E^1$-, -$E^2$-, and -$E^3$- each independently represent an unsubstituted or substituted phenylene group, an unsubstituted or substituted naphthylene group, or an unsubstituted or substituted divalent heterocyclic group.

As for the position at which the phenylene group is substituted, a 1,4-phenylene group is preferable because of high molecular linearity.

As for the position at which the naphthylene group is substituted, a 1,4-naphthylene group and a 2,6-naphthylene group are preferable because of high molecular linearity.

The divalent heterocyclic group is a heterocyclic group that preferably has 3 or more and 14 or less ring-forming carbon atoms and further preferably has 10 or less ring-forming carbon atoms. The divalent heterocyclic group is particularly preferably a monocyclic or bicyclic heterocyclic group.

The atom constituting the divalent heterocyclic group which is other than a carbon atom is, for example, at least one selected from a nitrogen atom, a sulfur atom, and an oxygen atom. In the case where the heterocyclic group includes a plurality of ring-forming atoms other than a carbon atom, they may be identical to or different from one another.

Specific examples of the divalent heterocyclic group include a pyridinediyl group, a quinolinediyl group, an isoquinolinediyl group, a thiazolediyl group, a benzothiazolediyl group, a thienothiazolediyl group, a thienothiophenediyl group, a benzimidazolidinonediyl group, a benzofurandiyl group, a phthalimidediyl group, an oxazolediyl group, and a benzoxazolediyl group.

Examples of the substituent that may be optionally included in the phenylene group, the naphthylene group, and the divalent heterocyclic group represented by -$E^1$-, -$E^2$-, and -$E^3$- include an alkyl group having 1 to 4 carbon atoms; an alkoxy group having 1 to 4 carbon atoms, such as a methoxy group, an ethoxy group, or a butoxy group; a fluoroalkyl group having 1 to 4 carbon atom, such as a trifluoromethyl group; a cyano group; a nitro group; a hydroxyl group; a halogen atom; and a substituted or unsubstituted amino group, such as an amino group, a diethylamino group, or a pyrrolidino group (the term "substituted amino group" refers to an amino group that has one or two alkyl groups having 1 to 4 carbon atoms or an amino group that has two alkyl substituents bonded to each other to form an alkanediyl group having 2 to 8 carbon atoms; an unsubstituted amino group is —$NH_2$; examples of the alkyl group having 1 to 4 carbon atoms include a methyl group, an ethyl group, and a butyl group; and examples of the alkanediyl group having 2 to 8 carbon atoms include an ethylene group, a propane-1,3-diyl group, a butane-1,3-diyl group, a butane-1,4-diyl group, a pentane-1,5-diyl group, a hexane-1,6-diyl group, a heptane-1,7-diyl group, and an octane-1,8-diyl group).

Because of high molecular linearity, the phenylene group, the naphthylene group, and the divalent heterocyclic group represented by -$E^1$-, -$E^2$-, and -$E^3$- are preferably unsubstituted. In the case where the phenylene group, the naphthylene group, and the divalent heterocyclic group are substituted, it is preferable that these groups are substituted with a methyl group, a methoxy group, a hydroxyl group, a fluorine atom, a chlorine atom, a dimethylamino group, a pyrrolidinyl group, or a piperidinyl group.

p represents an integer of 0 to 4. In consideration of solubility in solvents, compatibility with liquid crystal compounds, color tone, and ease of production, p is preferably 1 or more and 4 or less and is more preferably 3 or less.

$R^{11}$ and $R^{12}$ represent a monovalent organic group. $R^{11}$ and $R^{12}$ may be identical to or different from each other.

Examples of the monovalent organic group represented by $R^{11}$ and $R^{12}$ include a hydrogen atom and a linear or branched alkyl group having 1 to 15 carbon atoms; an alicyclic alkyl group having 1 to 15 carbon atoms; a linear or branched alkoxy group having 1 to 15 carbon atoms, such as a methoxy group, an ethoxy group, or a butoxy group; a linear or branched fluoroalkyl group having 1 to 15 carbon atoms, such as a trifluoromethyl group; a cyano group; a nitro group; a hydroxyl group; a halogen atom; a substituted or unsubstituted amino group, such as an amino group, a diethylamino group, or a pyrrolidino group (the term "substituted amino group" refers to an amino group that has one or two linear or branched alkyl groups having 1 to 15 carbon atoms or an amino group that has two alkyl substituents bonded to each other to form an alkanediyl group having 2 to 15 carbon atoms; an unsubstituted amino group is —NH$_2$; examples of the alkyl group having 1 to 15 carbon atoms include a methyl group, an ethyl group, and a butyl group; and examples of the alkanediyl group having 2 to 15 carbon atoms include an ethylene group, a propane-1,3-diyl group, a butane-1,3-diyl group, a butane-1,4-diyl group, a pentane-1,5-diyl group, a hexane-1,6-diyl group, a heptane-1,7-diyl group, and an octane-1,8-diyl group); a carboxyl group; a linear or branched alkyloxycarbonyl group having 1 to 15 carbon atoms, such as a butoxycarbonyl group; an alkylphenylalkenyl group, such as a 2-(4-butylphenyl)ethenyl group; a carbamoyl group; a linear or branched alkylcarbamoyl group having 1 to 15 carbon atoms, such as a butylcarbamoyl group; a sulfamoyl group; a linear or branched alkylsulfamoyl group having 1 to 15 carbon atoms, such as a butylsulfamoyl group; a linear or branched acylamino group having 1 to 15 carbon atoms, such as a butylcarbonylamino group; a linear or branched acyloxy group having 1 to 15 carbon atoms, such as a butylcarbonyloxy group; a sulfanyl group; an alkylsulfanyl group having 1 to 15 carbon atoms, such as a butylsulfanyl group; and —R$^1$ and —R$^2$ included in the liquid crystal compound described below.

Examples of R$^{11}$ and R$^{12}$ include a hydrogen atom, a chain group, an aliphatic organic group (the "aliphatic organic group" may be either chain-like or cyclic), and an aliphatic organic group some of the carbon atoms of which are replaced with nitrogen and/or oxygen atoms (the "aliphatic organic group some of the carbon atoms of which are replaced with nitrogen and/or oxygen atoms" may be either chain-like or cyclic and includes an aliphatic organic group some of the methyl groups of which are replaced with a hydroxyl group, an oxo group (=O), an amino group, an imino group, or the like). In an aspect, a hydrogen atom and a chain group are preferable. In another aspect, a hydrogen atom and an aliphatic organic group are preferable. In still another aspect, a hydrogen atom and an aliphatic organic group some of the carbon atoms of which are replaced with nitrogen and/or oxygen atoms are preferable.

Examples of the chain group include the linear or branched alkyl group having 1 to 15 carbon atoms; the linear or branched alkoxy group having 1 to 15 carbon atoms; the linear or branched fluoroalkyl group having 1 to 15 carbon atoms; the substituted or unsubstituted amino group (the term "substituted amino group" refers to an amino group having one or two linear or branched alkyl groups having 1 to 15 carbon atoms; and an unsubstituted amino group is —NH$_2$); a carboxyl group; the linear or branched alkyloxycarbonyl group having 1 to 15 carbon atoms; a carbamoyl group; the linear or branched alkylcarbamoyl group having 1 to 15 carbon atoms; a sulfamoyl group; the linear or branched alkylsulfamoyl group having 1 to 15 carbon atoms; the linear or branched acylamino group having 1 to 15 carbon atoms; the linear or branched acyloxy group having 1 to 15 carbon atoms; a sulfanyl group; and the alkylsulfanyl group having 1 to 15 carbon atoms. Some of the chain groups are aliphatic organic groups.

Examples of the aliphatic organic group include the linear or branched alkyl group having 1 to 15 carbon atoms and the alicyclic alkyl group having 1 to 15 carbon atoms.

Examples of the aliphatic organic group some of the carbon atoms of which are replaced with nitrogen and/or oxygen atoms include the linear or branched alkoxy group having 1 to 15 carbon atoms; the substituted or unsubstituted amino group (the term "substituted amino group" refers to an amino group that has one or two linear or branched alkyl groups having 1 to 15 carbon atoms or an amino group that has two alkyl substituents bonded to each other to form an alkanediyl group having 2 to 15 carbon atoms; an unsubstituted amino group is —NH$_2$; examples of the alkyl group having 1 to 15 carbon atoms include a methyl group, an ethyl group, and a butyl group; and examples of the alkanediyl group having 2 to 15 carbon atoms include an ethylene group, a propane-1,3-diyl group, a butane-1,3-diyl group, a butane-1,4-diyl group, a pentane-1,5-diyl group, a hexane-1,6-diyl group, a heptane-1,7-diyl group, and an octane-1,8-diyl group); a carboxyl group; the linear or branched alkyloxycarbonyl group having 1 to 15 carbon atoms; a carbamoyl group; the linear or branched alkylcarbamoyl group having 1 to 15 carbon atoms; the linear or branched acylamino group having 1 to 15 carbon atoms; and the linear or branched acyloxy group having 1 to 15 carbon atoms.

Because of high molecular linearity, R$^{11}$ and R$^{12}$ are preferably each independently substituted with a hydrogen atom, an alkyl group having 1 to 10 carbon atoms, such as a butyl group, a pentyl group, a hexyl group, a heptyl group, or an octyl group, an alkoxy group having 1 to 10 carbon atoms, such as a butoxy group, a pentyloxy group, a hexyloxy group, a heptyloxy group, or an octyloxy group, a diethylamino group, a pyrrolidino group, or a piperidinyl group. —R$^1$ and —R$^2$ included in the liquid crystal compound described below are also preferable.

The azo dye other than the compound according to the present invention which is included in the anisotropic dye film-forming composition according to the present invention is not limited and may be selected from publicly known azo dyes.

Examples of publicly known azo dyes include the dyes (dichroic dyes) described in PTL 1, JP5982762B, JP2017-025317A, and JP2014-095899A.

Specific examples thereof include, but are not limited to, the following azo dyes.

[Chem. 9]

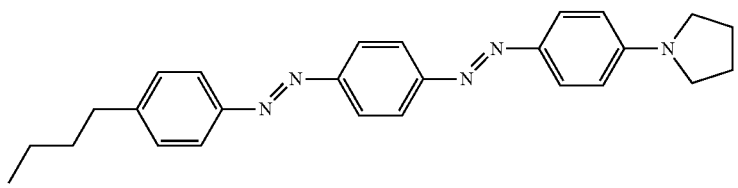

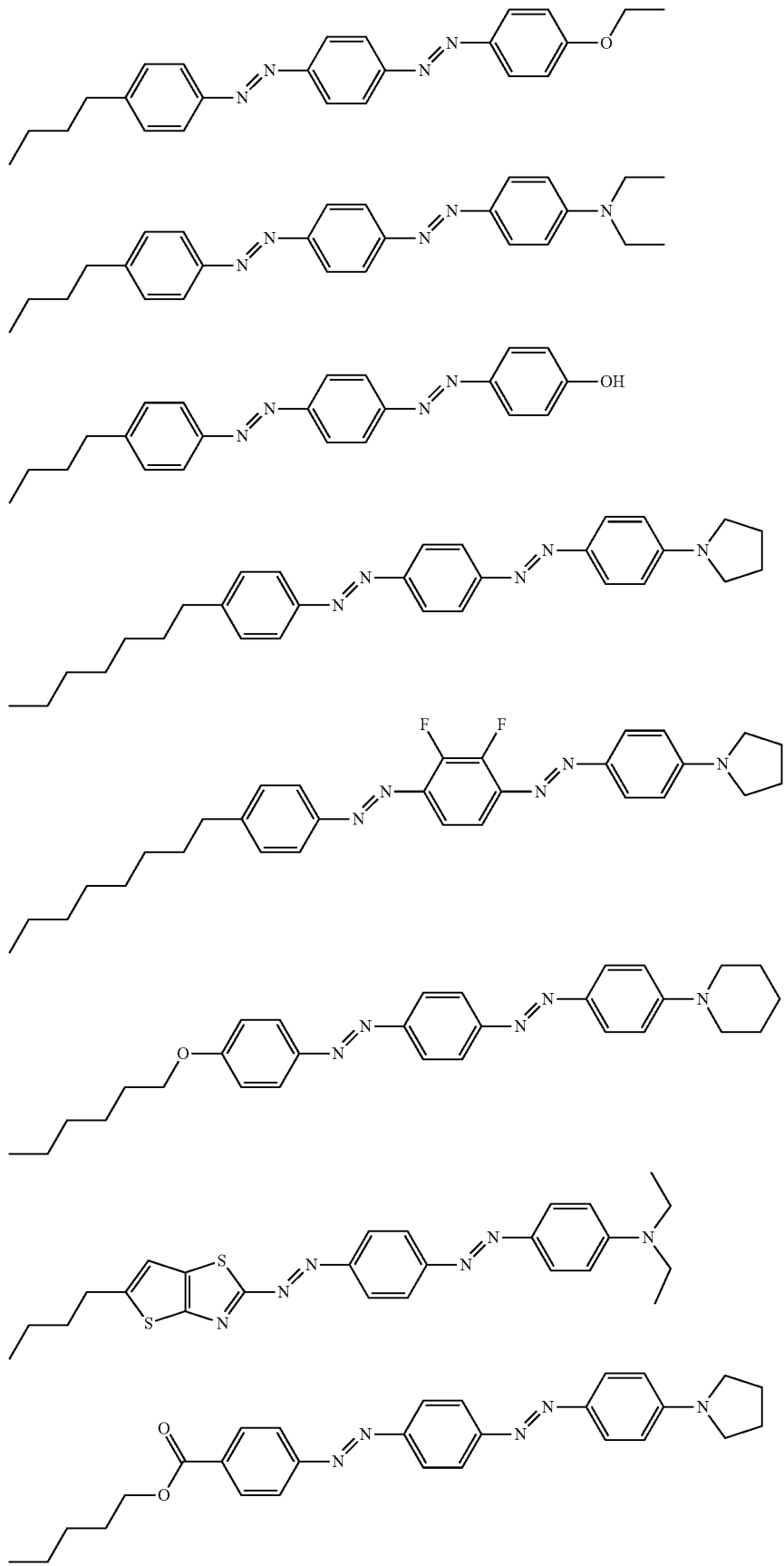

-continued
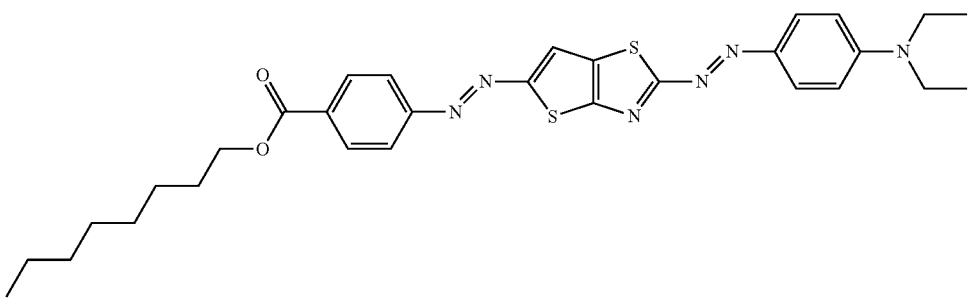
[Chem. 10]
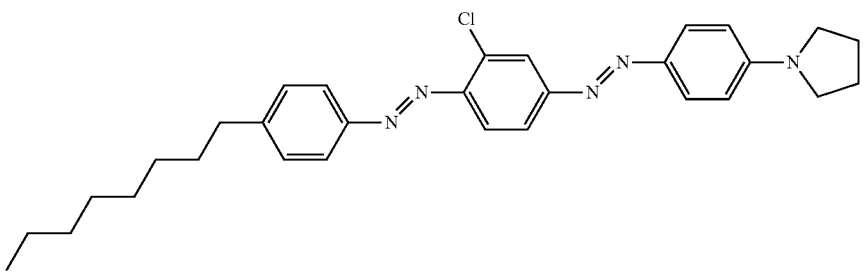
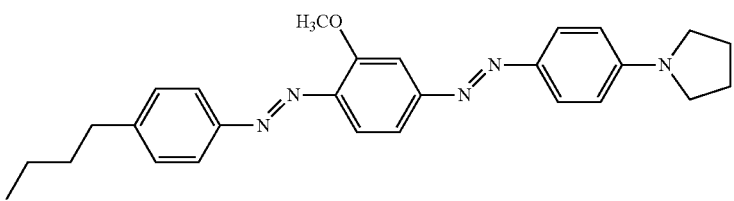
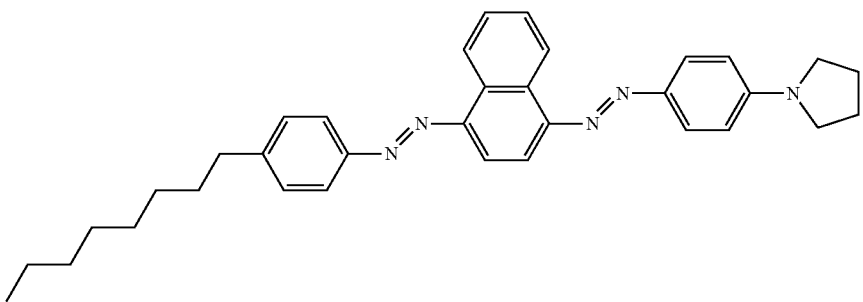
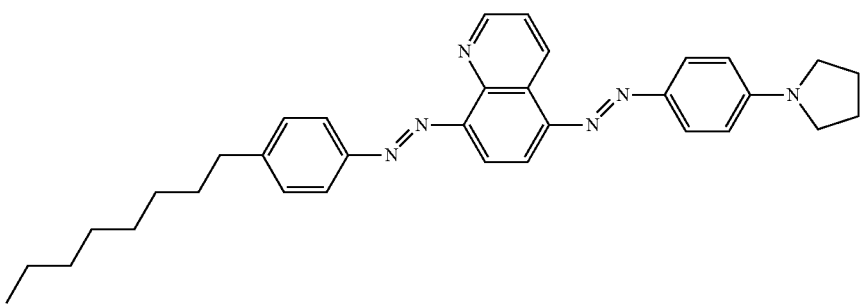

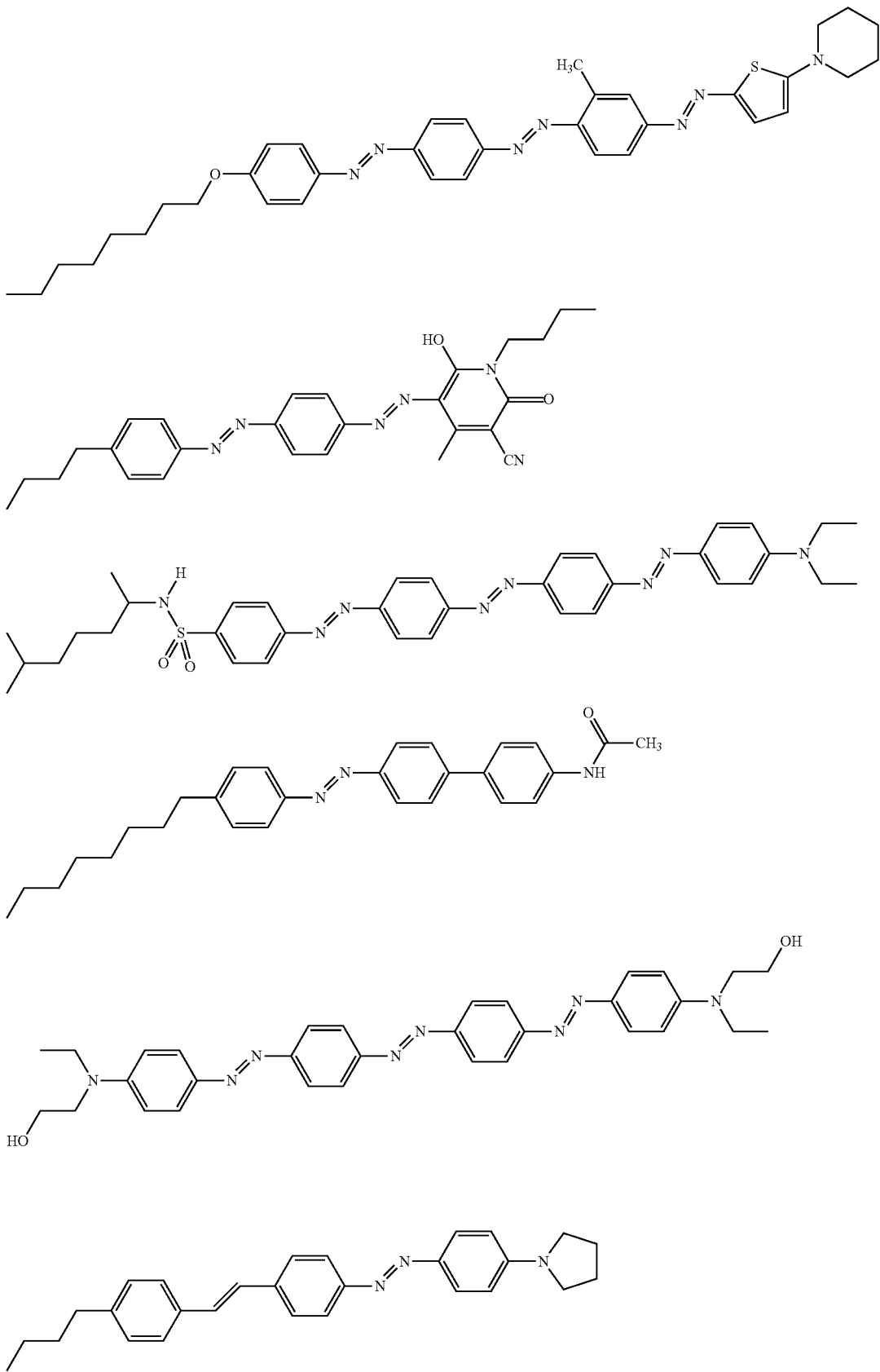

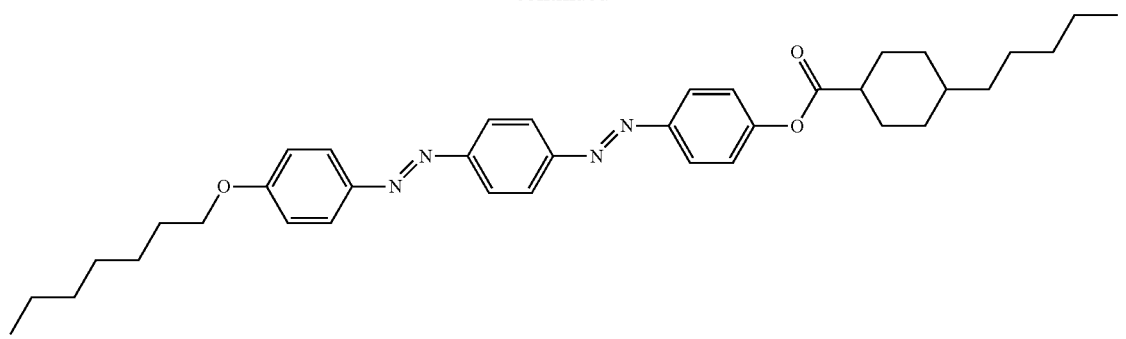
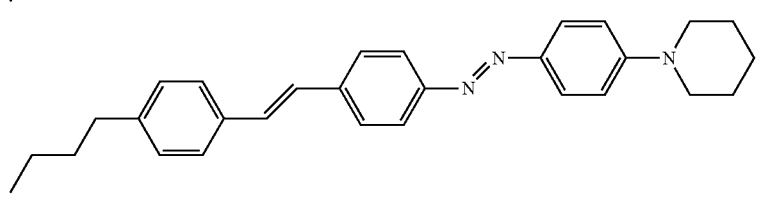
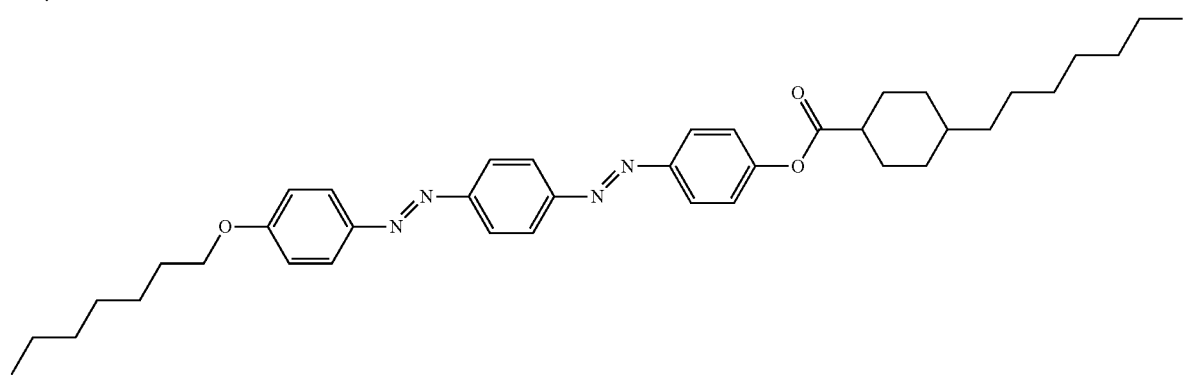
[Chem. 11]
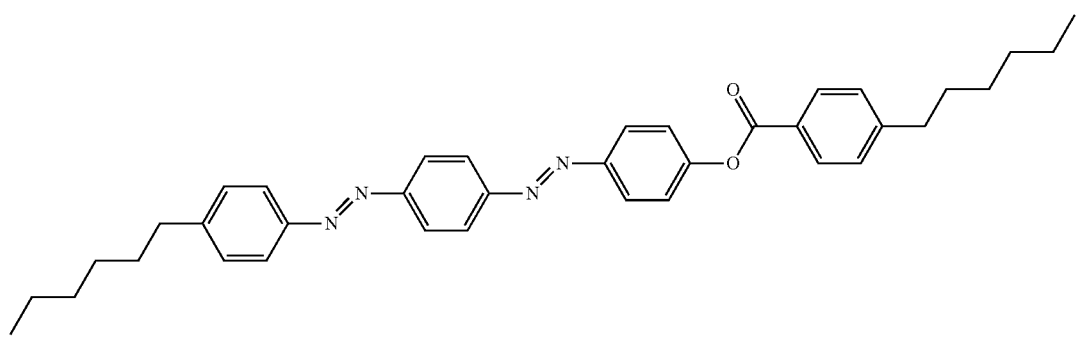
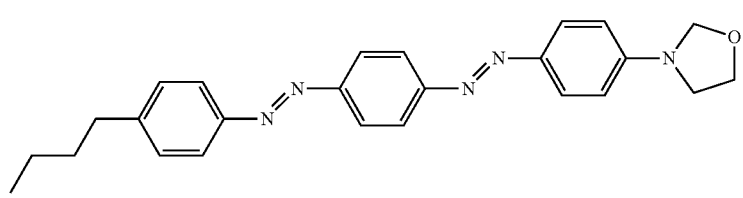

-continued
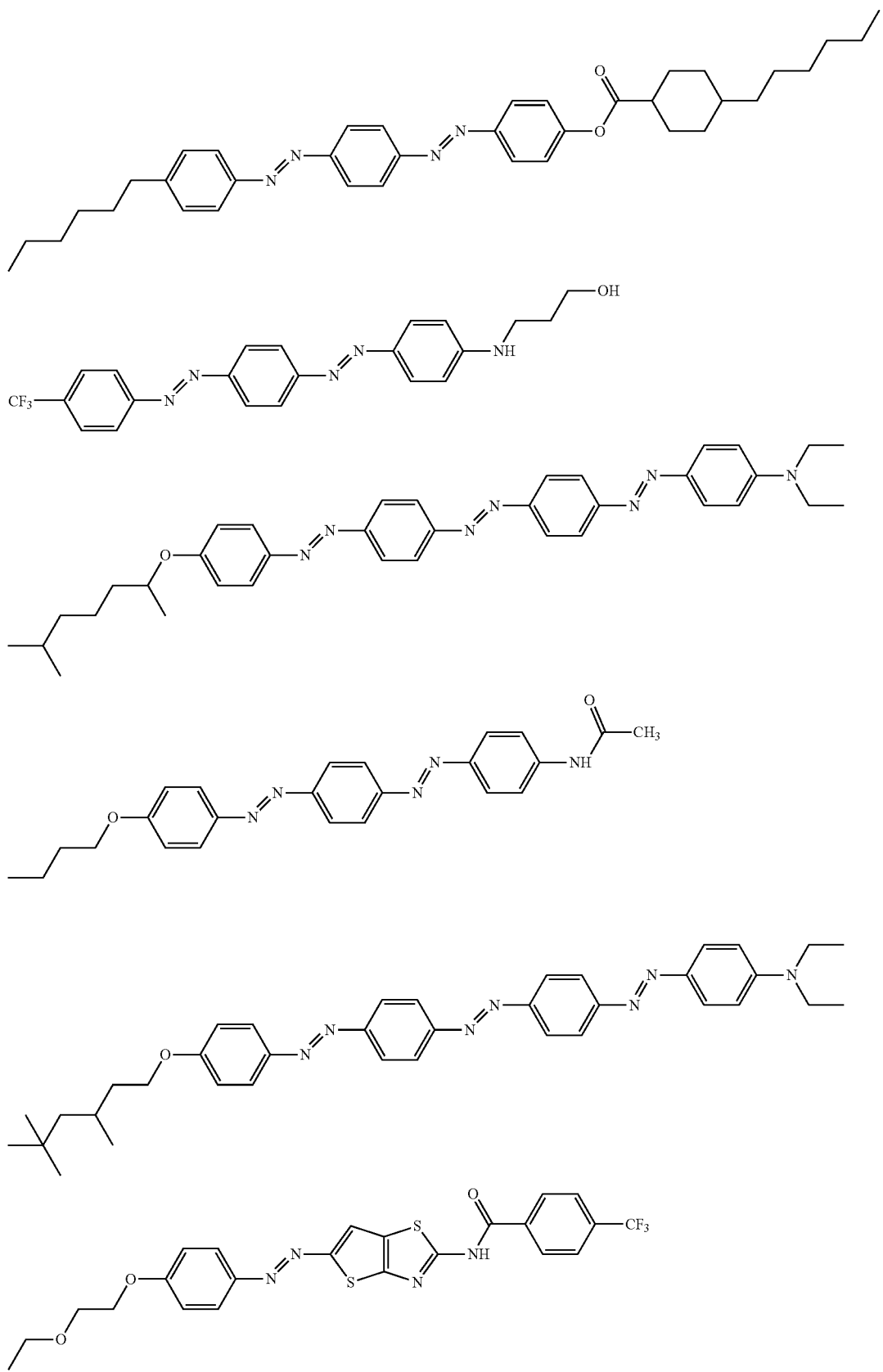

-continued
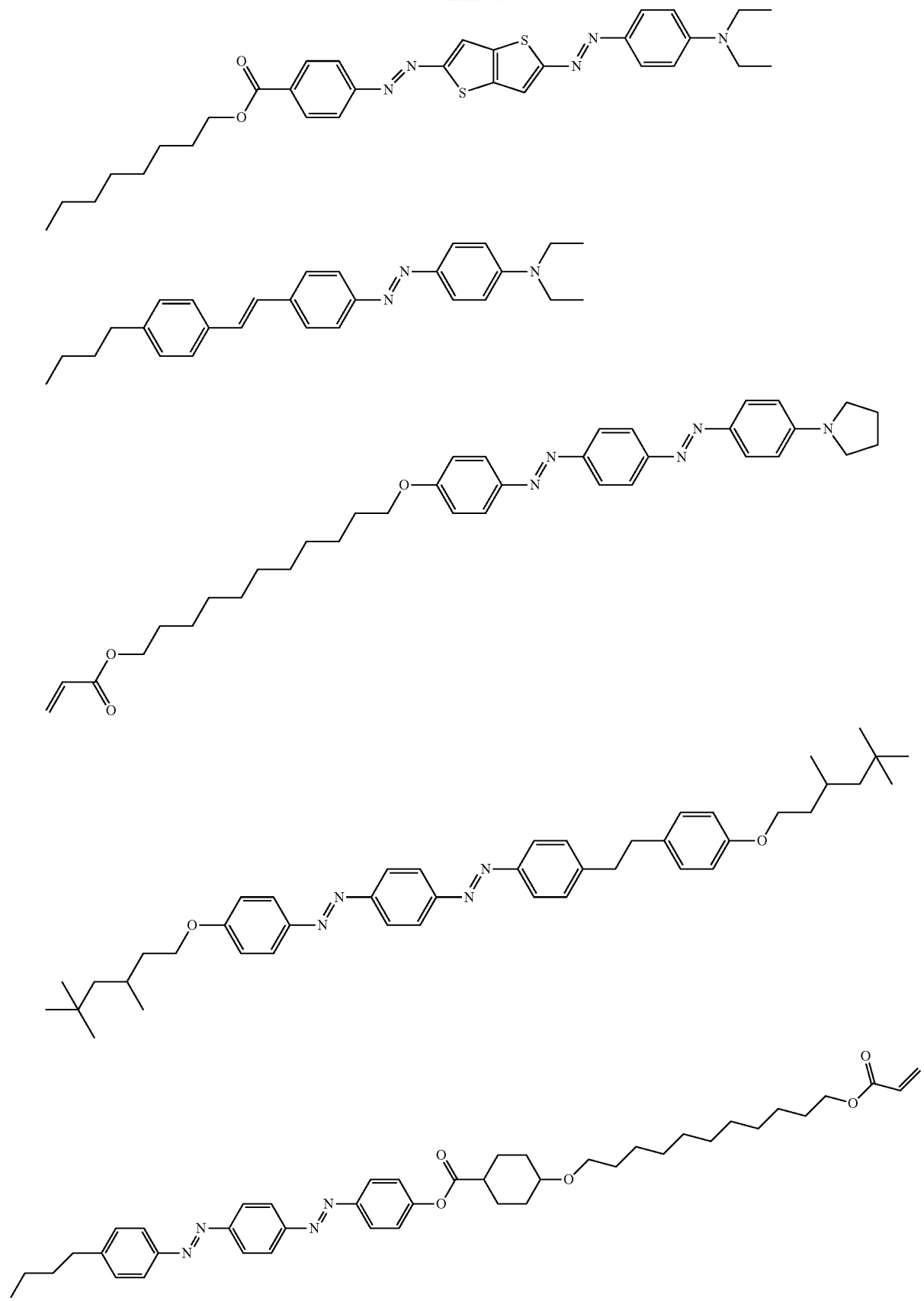

[Chem. 12]

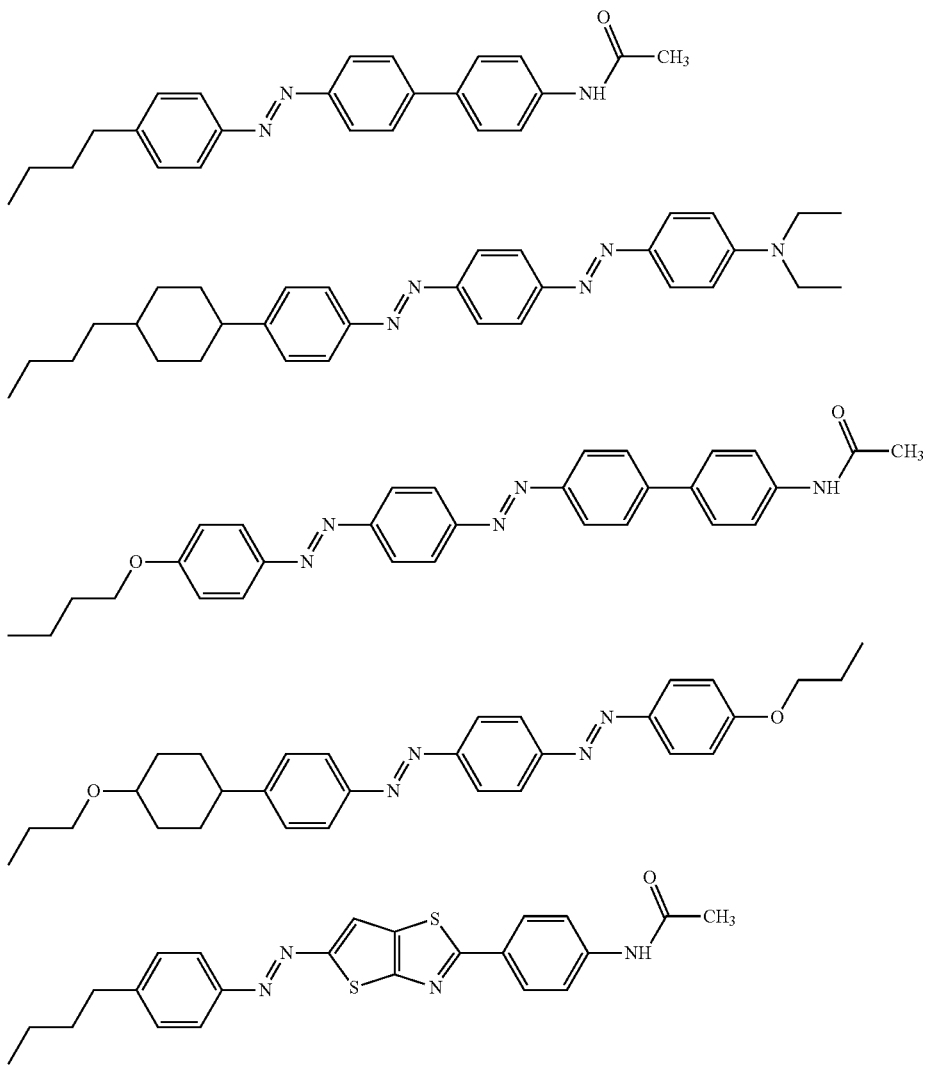

The dye other than the compound according to the first invention, which is included in the anisotropic dye film-forming composition according to the first invention, is preferably a compound such that the wavelength at which a local maximum occurs in an absorption curve of the dye at wavelengths of 350 to 800 nm differs from the wavelength at which a maximum occurs in the absorption curve of the compound according to the first invention, which is included in the anisotropic dye film-forming composition, at wavelengths of 350 to 800 nm by 5 nm or more and is further preferably a compound such that the wavelength at which a local maximum occurs in an absorption curve of the dye at wavelengths of 350 to 800 nm differs from the wavelength at which a maximum occurs in the absorption curve of the compound according to the first invention, which is included in the anisotropic dye film-forming composition, at wavelengths of 350 to 800 nm by 10 nm or more. It is preferable to satisfy the above conditions because, in the case where an anisotropic dye film produced using the anisotropic dye film-forming composition according to the first invention is used for forming a polarizing element included in a display or the like, a polarization property can be achieved in a wide range of the visible region.

The dye other than the compound according to the second invention, which is included in the anisotropic dye film-forming composition according to the second invention, is preferably a dye such that the wavelength at which a maximum occurs in an absorption curve of the dye at wavelengths of 350 to 800 nm is smaller than the wavelength at which a maximum occurs in the absorption curve of the compound according to the second invention at wavelengths of 350 to 800 nm. The above wavelength difference is preferably 5 nm or more and is preferably 10 nm or more. When the above conditions are satisfied, in the case where an anisotropic dye film produced using the anisotropic dye film-forming composition according to the second invention is used for forming a polarizing element included in a display or the like, a polarization property can be achieved in a wide range of the visible region.

(Molecular Weight of Dye)

The molecular weight of the dye included in the anisotropic dye film-forming composition according to the present invention (in the case where two or more types of dyes are used in combination, the molecular weight of each dye) is preferably 300 or more, is more preferably 350 or more, and is further preferably 380 or more; and is preferably 1500 or less, is more preferably 1200 or less, and is further preferably 1000 or less. Specifically, the molecular weight of the dye included in the anisotropic dye film-forming composition according to the present invention is preferably 300 to 1500, is more preferably 350 to 1200, and is further preferably 380 to 1000. When the molecular weight falls within the above range, the dye has an adequate molecular length and adequate bulkiness and, consequently, the molecular alignment of the dye is likely to be enhanced.

(Dye Content)

The content of the dye, such as a dichroic dye, in the anisotropic dye film-forming composition according to the present invention (in the case where two or more types of dyes are used in combination, the sum of the contents of all the dyes) is, for example, preferably 0.01 parts by mass or more, is more preferably 0.05 parts by mass or more, is preferably 30 parts by mass or less, and is more preferably 10 parts by mass or less, relative to the solid content (100 parts by mass) in the anisotropic dye film-forming composition. Specifically, the content of the dye (dichroic dye) in the anisotropic dye film-forming composition is, for example, 0.01 to 30 parts by mass and is preferably 0.05 to 10 parts by mass, relative to the solid content (100 parts by mass) in the anisotropic dye film-forming composition.

When the above dye content falls within the above range, the polymerizable liquid crystal compound included in the anisotropic dye film-forming composition according to the present invention can be polymerized without disturbing the alignment of the liquid crystal compound included in the anisotropic dye film-forming composition according to the present invention. When the dye content is equal to or more than the lower limit, a sufficient degree of light absorption can be achieved and a sufficient degree of polarization performance may be achieved. When the dye content is equal to or less than the upper limit, the disturbance of alignment of liquid crystal molecules is likely to be reduced.

Note that the solid content in the composition for anisotropic dye films corresponds to the total content of the components of the composition for anisotropic dye films which are other than a solvent.

It is only necessary that the composition for anisotropic dye films according to the present invention include the compound according to the present invention, which serves as a dye, as an essential component; the composition for anisotropic dye films according to the present invention may include the other dyes described above in addition to the compound according to the present invention.

In the case where the composition for anisotropic dye films according to the present invention includes the other dyes, the proportion of the amount of the compound according to the present invention to the total amount (100% by mass) of the dyes included in the composition for anisotropic dye films according to the present invention is preferably 5% by mass or more, is more preferably 10% by mass or more, and is particularly preferably 15% to 100% by mass in order to produce the advantageous effects of the present invention by using the compound according to the present invention with further effect.

(Method for Producing Dye)

The dye included in the anisotropic dye film-forming composition according to the present invention, such as the compound according to the present invention, can be produced by using publicly known chemical reactions, such as an alkylation reaction, an esterification reaction, an amidation reaction, an etherification reaction, an ipso substitution reaction, a diazo coupling reaction, and a coupling reaction with a metal catalyst, in a combined manner.

For example, the compound according to the present invention can be synthesized in accordance with the method described in Examples below and the methods described in "Shin Senryo Kagaku (New Dye Chemistry)" (Yutaka HOSODA, December 21, Showa 48 (1973), GIHODO SHUPPAN Co., Ltd.), "Sousetsu Gousei Senryo (Synthesis Dye Overview)" (Hiroshi HORIGUCHI, 1968, Sankyo Shuppan Co., Ltd.), "Riron Seizou Senryo Kagaku (Theoretical Production, Dye Chemistry)" (Yutaka HOSODA, 1957, GIHODO SHUPPAN Co., Ltd.).

<Polymerizable Liquid Crystal Compound>

The term "liquid crystal compound" used in the present invention refers to a substance that exhibits a liquid crystal state and specifically to a compound that does not transform from crystal to liquid directly but transforms to liquid via an intermediate state in which the compound exhibits both properties of crystal and properties of liquid, as described in Pages 1 to 28 of "Liquid Crystal Handbook" (Maruzen Co., Ltd., published on October 30, Heisei 12 (2000)).

The polymerizable liquid crystal compound included in the anisotropic dye film-forming composition according to the present invention is a liquid crystal compound that includes the polymerizable group described below.

In the polymerizable liquid crystal compound, the polymerizable group may be attached to any position inside the molecule of the liquid crystal compound. The polymerizable group is preferably attached to the terminal of the molecule of the liquid crystal compound in consideration of ease of polymerization.

In the polymerizable liquid crystal compound, the number of the polymerizable groups present in the molecule of the liquid crystal compound may be one or more. In the case where the number of the polymerizable groups is two or more, the polymerizable groups are preferably present at both terminals of the molecule of the liquid crystal compound in consideration of ease of polymerization.

The polymerizable liquid crystal compound is preferably a compound that has a carbon-carbon triple bond in the molecule of the liquid crystal compound. When the polymerizable liquid crystal compound is a compound that has a carbon-carbon triple bond, the carbon-carbon triple bond can serve as a core of the liquid crystal molecule while allowing a rotational movement. Consequently, the molecule has high mobility and the intermolecular interaction between liquid crystal molecules or between the liquid crystal molecule and a compound having a n-conjugated system, such as a dye molecule, can be increased. This may enhance molecular alignment.

The polymerizable liquid crystal compound included in the anisotropic dye film-forming composition according to the present invention is not limited and may be any liquid crystal compound having a polymerizable group.

Examples of the polymerizable liquid crystal compound included in the anisotropic dye film-forming composition according to the present invention include the compound represented by Formula (2) below (hereinafter, may be referred to as "polymerizable liquid crystal compound (2)").

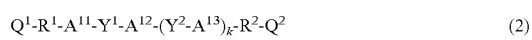

(in Formula (2),

-$Q^1$ represents a hydrogen atom or a polymerizable group,

-$Q^2$ represents a polymerizable group,

—$R^1$— and —$R^2$— each independently represent a chain organic group,

-A$^{11}$- and -A$^{13}$- each independently represent the partial structure represented by Formula (3) below, a divalent organic group, or a single bond, -A$^{12}$- represents the partial structure represented by Formula (3) below or a divalent organic group, —Y$^{1}$— and —Y$^{2}$— each independently represent a single bond, —C(=O)O—, —OC(=O)—, —C(=S)O—, —OC(=S)—, —C(=O)S—, —SC(=O)—, —CH$_2$CH$_2$—, —CH=CH—, —C≡C—, —C(=O)NH—, —NHC(=O)—, —CH$_2$O—, —OCH$_2$—, —CH$_2$S—, or —SCH$_2$—, one of -A$^{11}$- and -A$^{13}$- is the partial structure represented by Formula (3) below or a divalent organic group;

k is 1 or 2, and when k is 2, two —Y$^2$-A$^{13}$-'s may be identical to or different from one another)

(in Formula (3),

—C$^y$— represents a hydrocarbon ring group or a heterocyclic group,

—X$^1$— represents —C(=O)O—, —OC(=O)—, —C(=S)O—, —OC(=S)—, —C(=O)S—, —SC(=O)—, —CH$_2$CH$_2$—, —CH=CH—, —C(=O)NH—, —NHC(=O)—, —CH$_2$O—, —OCH$_2$—, —CH$_2$S—, or —SCH$_2$—, and —X$^2$— represents a single bond, —C(=O)O—, —OC(=O)—, —C(=S)O—, —OC(=S)—, —C(=O)S—, —SC(=O)—, —CH$_2$CH$_2$—, —CH=CH—, —C(=O)NH—, —NHC(=O)—, —CH$_2$O—, —OCH$_2$—, —CH$_2$S—, or —SCH$_2$—)

In the case where -A$^{11}$- is the partial structure represented by Formula (3), Formula (2) may be either Formula (2A) or (2B) below.

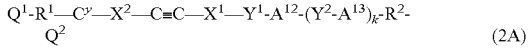

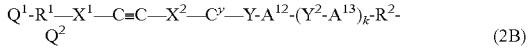

In the case where -A$^{12}$- is the partial structure represented by Formula (3), Formula (2) may be either Formula (2C) or (2D) below.

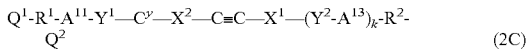

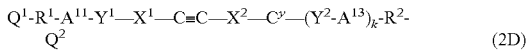

In the case where -A$^{13}$- is the partial structure represented by Formula (3), Formula (2) may be either Formula (2E) or (2F) below.

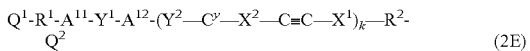

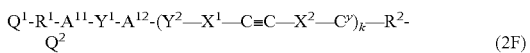

Similarly, in the case where two or more of -A$^{11}$-, -A$^{12}$-, and -A$^{13}$- are the partial structures represented by Formula (3), the partial structures represented by Formula (3) may be each independently flipped from side to side.

As described above, -A$^{11}$-, -A$^{12}$-, and -A$^{13}$- each independently represent the partial structure represented by Formula (3) or a divalent organic group. Furthermore, -A$^{11}$- and -A$^{13}$- also represent a single bond. However, -A$^{11}$- and -A$^{13}$- do not represent a single bond at the same time.

(—C$^y$—)

Examples of the hydrocarbon ring group represented by —C$^y$— include an aromatic hydrocarbon ring group and a nonaromatic hydrocarbon ring group.

Examples of the aromatic hydrocarbon ring group include a nonconnected aromatic hydrocarbon ring group and a connected aromatic hydrocarbon ring group.

The nonconnected aromatic hydrocarbon ring group is a divalent group of a monocyclic or condensed aromatic hydrocarbon ring. The number of carbon atoms included in the nonconnected aromatic hydrocarbon ring group is preferably 6 to 20 because, in such a case, the core has an adequate size and molecular alignment can be enhanced accordingly. The number of carbon atoms included in the nonconnected aromatic hydrocarbon ring group is more preferably 6 to 15. Examples of the aromatic hydrocarbon ring include a benzene ring, a naphthalene ring, an anthracene ring, a phenanthrene ring, a perylene ring, a tetracene ring, a pyrene ring, a benzpyrene ring, a chrysene ring, a triphenylene ring, an acenaphthene ring, a fluoranthene ring, and a fluorene ring.

The connected aromatic hydrocarbon ring group is a divalent group consisting of a plurality of monocyclic or condensed aromatic hydrocarbon rings connected to one another with a single bond, the divalent group having bonding hands located on the atoms constituting the rings. The number of carbon atoms included in the monocyclic or condensed rings is preferably 6 to 20 because, in such a case, the core has an adequate size and molecular alignment can be enhanced accordingly. The number of carbon atoms included in the monocyclic or condensed rings is more preferably 6 to 15. An example of the connected aromatic hydrocarbon ring group is a divalent group consisting of a first monocyclic or condensed aromatic hydrocarbon ring having 6 to 20 carbon atoms and a second monocyclic or condensed aromatic hydrocarbon ring having 6 to 20 carbon atoms which are bonded to each other with a single bond, the divalent group having a first bonding hand located on one of the atoms constituting the first monocyclic or condensed aromatic hydrocarbon ring having 6 to 20 carbon atoms, the divalent group having a second bonding hand located on one of the atoms constituting the second monocyclic or condensed aromatic hydrocarbon ring having 6 to 20 carbon atoms. Specific examples of the connected aromatic hydrocarbon ring group include a biphenyl-4,4'-diyl group.

The aromatic hydrocarbon ring group is preferably the nonconnected aromatic hydrocarbon ring group in order to optimize the intermolecular interaction between molecules of the liquid crystal compound and thereby enhance molecular alignment.

Among these, as an aromatic hydrocarbon ring group, a divalent group of a benzene ring and a divalent group of a naphthalene ring are preferable, and a divalent group of a benzene ring (a phenylene group) is more preferable. The phenylene group is preferably a 1,4-phenylene group. When —C$^y$— is any of the above groups, the linearity of the liquid crystal molecules may be enhanced and, consequently, molecular alignment may be enhanced.

Examples of the nonaromatic hydrocarbon ring group include a nonconnected nonaromatic hydrocarbon ring group and a connected nonaromatic hydrocarbon ring group.

The nonconnected nonaromatic hydrocarbon ring group is a divalent group of a monocyclic or condensed nonaromatic hydrocarbon ring. The number of carbon atoms included in the nonconnected nonaromatic hydrocarbon ring group is preferably 3 to 20 because, in such a case, the core has an adequate size and molecular alignment can be enhanced accordingly. The number of carbon atoms included in the nonconnected nonaromatic hydrocarbon ring group is more preferably 3 to 15. Examples of the nonaromatic hydrocarbon ring include a cyclopropane ring, a cyclobutane ring, a cyclopentane ring, a cyclohexane ring, a cycloheptane ring, a cyclooctane ring, a cyclohexene ring, a norbornane ring, a bornane ring, an adamantane ring, a tetrahydronaphthalene ring, and a bicyclo[2.2.2]octane ring.

Examples of the nonconnected nonaromatic hydrocarbon ring group include an alicyclic hydrocarbon ring group that does not have an unsaturated bond as an interatomic bond that constitutes the nonaromatic hydrocarbon ring and an unsaturated nonaromatic hydrocarbon ring group that has an unsaturated bond as an interatomic bond that constitutes the nonaromatic hydrocarbon ring. The nonconnected nonaromatic hydrocarbon ring group is preferably an alicyclic hydrocarbon ring group in consideration of productivity.

The connected nonaromatic hydrocarbon ring group is a divalent group consisting of a plurality of monocyclic or condensed nonaromatic hydrocarbon rings bonded to one another with a single bond, the divalent group having bonding hands each located on one of the atoms constituting the ring; or a divalent group consisting of one or more rings selected from the group consisting of a monocyclic aromatic hydrocarbon ring, a condensed aromatic hydrocarbon ring, a monocyclic nonaromatic hydrocarbon ring, and a condensed nonaromatic hydrocarbon ring and a monocyclic or condensed nonaromatic hydrocarbon ring which are bonded to one another with a single bond, the divalent group having bonding hands located on the atoms constituting the ring.

The number of carbon atoms included in the monocyclic or condensed ring is preferably 3 to 20 because, in such a case, the core has an adequate size and molecular alignment can be enhanced accordingly.

Examples of the connected nonaromatic hydrocarbon ring group include a divalent group consisting of a first monocyclic or condensed nonaromatic hydrocarbon ring having 3 to 20 carbon atoms and a second monocyclic or condensed nonaromatic hydrocarbon ring having 3 to 20 carbon atoms which are bonded to each other with a single bond, the divalent group having a first bonding hand located on one of the atoms constituting the first monocyclic or condensed nonaromatic hydrocarbon ring having 3 to 20 carbon atoms, the divalent group having a second bonding hand located on one of the atoms constituting the second monocyclic or condensed nonaromatic hydrocarbon ring having 3 to 20 carbon atoms. Another example is a divalent group consisting of a monocyclic or condensed aromatic hydrocarbon ring having 3 to 20 carbon atoms and a monocyclic or condensed nonaromatic hydrocarbon ring having 3 to 20 carbon atoms which are bonded to each other with a single bond, the divalent group having a first bonding hand located on one of the atoms constituting the monocyclic or condensed aromatic hydrocarbon ring having 3 to 20 carbon atoms, the divalent group having a second bonding hand located on one of the atoms constituting the monocyclic or condensed nonaromatic hydrocarbon ring having 3 to 20 carbon atoms.

Specific examples of the connected nonaromatic hydrocarbon ring group include a bis(cyclohexane)-4,4'-diyl group and a 1-cyclohexylbenzene-4,4'-diyl group.

The nonaromatic hydrocarbon ring group is preferably a nonconnected nonaromatic hydrocarbon ring group in order to optimize the intermolecular interaction between molecules of the liquid crystal compound and thereby enhance molecular alignment.

The nonconnected nonaromatic hydrocarbon ring group is preferably a divalent group of cyclohexane (cyclohexane diyl group). The cyclohexane diyl group is preferably a cyclohexane-1,4-diyl group. When —$C^y$— is the above-described group, the linearity of the liquid crystal molecules can be enhanced and, consequently, molecular alignment may be enhanced.

Examples of the heterocyclic group represented by —$C^y$— include an aromatic heterocyclic group and a nonaromatic heterocyclic group.

Examples of the aromatic heterocyclic group include a nonconnected aromatic heterocyclic group and a connected aromatic heterocyclic group.

The nonconnected aromatic heterocyclic group is a divalent group of a monocyclic or condensed aromatic heterocyclic ring. The number of carbon atoms included in the nonconnected aromatic heterocyclic group is preferably 4 to 20 because, in such a case, the core has an adequate size and molecular alignment can be enhanced accordingly. The number of carbon atoms included in the nonconnected aromatic heterocyclic group is more preferably 4 to 15.

Examples of the aromatic heterocyclic ring include a furan ring, a benzofuran ring, a thiophene ring, a benzothiophene ring, a pyrrole ring, a pyrazole ring, an imidazole ring, a thiazole ring, an isothiazole ring, an oxadiazole ring, a thiadiazole ring, a triazole ring, an indole ring, a carbazole ring, a pyrroloimidazole ring, a pyrrolopyrazole ring, a pyrrolopyrrole ring, a thienopyrrole ring, a thienothiophene ring, a furopyrrole ring, a furofuran ring, a thienofuran ring, a thienothiazole ring, a benzisoxazole ring, a benzisothiazole ring, a benzimidazole ring, a pyridine ring, a pyrazine ring, a pyridazine ring, a pyrimidine ring, a triazine ring, a quinoline ring, an isoquinoline ring, a shinoline ring, a quinoxaline ring, a phenanthridine ring, a quinazoline ring, a quinazolinone ring, an azulene ring and the like.

The connected aromatic heterocyclic group is a divalent group consisting of a plurality of monocyclic or condensed aromatic heterocyclic rings bonded to one another with a single bond, the divalent group having bonding hands each located on one of the atoms constituting the ring. The number of carbon atoms included in the monocyclic or condensed ring is preferably 4 to 20 because, in such a case, the core has an adequate size and molecular alignment can be enhanced accordingly. The number of carbon atoms included in the connected aromatic heterocyclic group is more preferably 4 to 15.

Examples of the connected aromatic heterocyclic group include a divalent group consisting of a first monocyclic or condensed aromatic heterocyclic ring having 4 to 20 carbon atoms and a second monocyclic or condensed aromatic heterocyclic ring having 4 to 20 carbon atoms which are bonded to each other with a single bond, the divalent group having a first bonding hand located on one of the atoms constituting the first monocyclic or condensed aromatic heterocyclic ring having 4 to 20 carbon atoms, the divalent group having a second bonding hand located on one of the atoms constituting the second monocyclic or condensed aromatic heterocyclic ring having 4 to 20 carbon atoms.

Examples of the nonaromatic heterocyclic group include a nonconnected nonaromatic heterocyclic group and a connected nonaromatic heterocyclic group.

The nonconnected nonaromatic heterocyclic group is a divalent group of a monocyclic or condensed nonaromatic heterocyclic ring. The number of carbon atoms included in the nonconnected nonaromatic heterocyclic group is preferably 4 to 20 because, in such a case, the core has an adequate size and molecular alignment can be enhanced accordingly. The number of carbon atoms included in the nonconnected nonaromatic heterocyclic group is more preferably 4 to 15.

Examples of the nonaromatic heterocyclic ring included in the divalent group of a monocyclic or condensed nonaromatic heterocyclic ring having 4 to 20 carbon atoms include a tetrahydrofuran ring, a tetrahydropyran ring, a dioxane ring, a tetrahydrothiophene ring, a tetrahydrothiopyran ring, a pyrrolidine ring, a piperidine ring, a dihydropyridine ring, a piperazine ring, a tetrahydrothiazole ring, a tetrahydrooxazole ring, an octahydroquinoline ring, a tetrahydroquinoline ring, an octahydroquinazoline ring, a tetrahydroquinazoline ring, a tetrahydroimidazole ring, a tetrahydrobenzimidazole ring, and a quinuclidine ring.

The connected nonaromatic heterocyclic group is a divalent group consisting of a plurality of monocyclic or condensed nonaromatic heterocyclic rings bonded to one another with a single bond, the divalent group having bonding hands each located on one of the atoms constituting the ring. The number of carbon atoms included in the monocyclic or condensed ring is preferably 4 to 20 because, in such a case, the core has an adequate size and molecular alignment can be enhanced accordingly. The number of carbon atoms included in the connected nonaromatic heterocyclic group is more preferably 4 to 15.

Examples of the connected nonaromatic heterocyclic group include a divalent group consisting of a first monocyclic or condensed nonaromatic heterocyclic ring having 4 to 20 carbon atoms and a second monocyclic or condensed nonaromatic heterocyclic ring having 4 to 20 carbon atoms which are bonded to each other with a single bond, the divalent group having a first bonding hand located on one of the atoms constituting the first monocyclic or condensed nonaromatic heterocyclic ring having 4 to 20 carbon atoms, the divalent group having a second bonding hand located on one of the atoms constituting the second monocyclic or condensed nonaromatic heterocyclic ring having 4 to 20 carbon atoms.

The aromatic hydrocarbon ring group, nonaromatic hydrocarbon ring group, aromatic heterocyclic group, and nonaromatic heterocyclic group represented by —$C^y$— may be each substituted with one or more groups selected from the group consisting of —$R^k$, —OH, —O—$R^k$, —O—C(=O)—$R^k$, —$NH_2$, —NH—$R^k$, —N($R^{k'}$)—$R^k$, —C(=O)—$R^k$, —C(=O)—O—$R^k$, —C(=O)—$NH_2$, —C(=O)—NH—$R^k$, —C(=O)—N($R^{k'}$)—$R^k$, —SH, —S—$R^k$, a trifluoromethyl group, a sulfamoyl group, a carboxyl group, a sulfo group, a cyano group, a nitro group, and a halogen, where —$R^k$ and —$R^{k'}$ each independently represent a linear or branched alkyl group having 1 to 6 carbon atoms.

The aromatic hydrocarbon ring group, nonaromatic hydrocarbon ring group, aromatic heterocyclic group, and nonaromatic heterocyclic group represented by —$C^y$— are each independently unsubstituted or substituted with a methyl group, a methoxy group, a fluorine atom, a chlorine atom, or a bromine atom and is more preferably unsubstituted in order to enhance the linearity of the molecular structure, increase the likelihood of association of molecules of the polymerizable liquid crystal compound (2), and make it easy to achieve a liquid crystal state.

The substituents included in the aromatic hydrocarbon ring group, nonaromatic hydrocarbon ring group, aromatic heterocyclic group, and nonaromatic heterocyclic group represented by —$C^y$— may be identical to or different from one another. All of the aromatic hydrocarbon ring group, nonaromatic hydrocarbon ring group, aromatic heterocyclic group, and nonaromatic heterocyclic group may be substituted. All of the aromatic hydrocarbon ring group, nonaromatic hydrocarbon ring group, aromatic heterocyclic group, and nonaromatic heterocyclic group may be unsubstituted. In another case, some of the aromatic hydrocarbon ring group, nonaromatic hydrocarbon ring group, aromatic heterocyclic group, and nonaromatic heterocyclic group may be substituted while the others are unsubstituted.

—$C^y$— is preferably a hydrocarbon ring group and is more preferably a phenylene group or a cyclohexane diyl group in order to enhance the molecular alignment of the polymerizable liquid crystal compound (2). —$C^y$— is further preferably a 1,4-phenylene group or a cyclohexane-1,4-diyl group and is particularly preferably a 1,4-phenylene group in order to enhance the linearity of the molecular structure of the polymerizable liquid crystal compound (2).

(—$X^1$—)

—$X^1$— represents —C(=O)O—, —OC(=O)—, —C(=S)O—, —OC(=S)—, —C(=O)S—, —SC(=O)—, —$CH_2CH_2$—, —CH=CH—, —C(=O)NH—, —NHC(=O)—, —$CH_2$O—, —O$CH_2$—, —$CH_2$S—, or —S$CH_2$—. Among these, for example, —C(=O)O—, —OC(=O)—, —C(=S)O—, —OC(=S)—, —C(=O)S—, —SC(=O)—, —$CH_2CH_2$—, —$CH_2$O—, —O$CH_2$—, —$CH_2$S—, and —S$CH_2$—, which have low n bondability, are preferable as —$X^1$— in order to enhance the linearity of the polymerizable liquid crystal compound (2) and facilitate the rotational movement around the minor axis of the molecule. Among these, —C(=O)O—, —OC(=O)—, —$CH_2CH_2$—, —$CH_2$O—, and —O$CH_2$— are more preferable. —$X^1$— is further preferably —C(=O)O— or —OC(=O)—. In another aspect, —$X^1$— is preferably —$CH_2CH_2$—, —$CH_2$O—, or —O$CH_2$—.

(—$X^2$—)

—$X^2$— represents a single bond, —C(=O)O—, —OC(=O)—, —C(=S)O—, —OC(=S)—, —C(=O)S—, —SC(=O)—, —$CH_2CH_2$—, —CH=CH—, —C(=O)NH—, —NHC(=O)—, —$CH_2$O—, —O$CH_2$—, —$CH_2$S—, or —S$CH_2$—.

In order to increase the size of the core of the polymerizable liquid crystal compound (2) and enhance the dichroism of an anisotropic dye film produced using the anisotropic dye film-forming composition, it is preferable to connect —$C^y$— to —C≡C— with a group having high linearity. Specifically, —$X^2$— is preferably a single bond or —C(=O)O—, —OC(=O)—, —C(=S)O—, —OC(=S)—, —C(=O)S—, —SC(=O)—, —CH=CH—, —C(=O)NH—, or —NHC(=O)— which has n bondability and is further preferably a single bond, which has further high linearity.

(-$Q^1$ and -$Q^2$)

The polymerizable groups represented by -$Q^1$ and -$Q^2$ are groups having a partial structure capable of polymerizing using light, heat, and/or radiation and functional or atomic groups necessary for maintaining a polymerization function. The polymerizable groups are preferably photopolymerizable groups in consideration of the production of the anisotropic dye film.

Examples of the polymerizable group include an acryloyl group, a methacryloyl group, an acryloyloxy group, a methacryloyloxy group, an acryloylamino group, a methacryloylamino group, a vinyl group, a vinyloxy group, an ethynyl group, an ethynyloxy group, a 1,3-butadienyl group, a 1,3-butadienyloxy group, an oxiranyl group, an oxetanyl group, a glycidyl group, a glycidyloxy group, a styryl group, a styryloxy group and the like. An acryloyl group, a methacryloyl group, an acryloyloxy group, a methacryloyloxy group, an acryloylamino group, a methacryloylamino group, an oxiranyl group, a glycidyl group and a glycidyloxy group are preferred, and an acryloyl group, a methacryloyl group, an acryloyloxy group, a methacryloyloxy group, an acryloylamino group, a methacryloylamino group, a glycidyl group and a glycidyloxy group is more preferred, and an acryloyloxy group, a methacryloyloxy group, and a glycidyloxy group are even more preferred.

(—$R^1$— and —$R^2$—)

The chain organic group represented by —$R^1$— and —$R^2$— is a divalent organic group that does not include a cyclic structure, such as the above-described aromatic hydrocarbon ring, nonaromatic hydrocarbon ring, aromatic heterocyclic ring, or nonaromatic heterocyclic ring described above.

Examples of the above chain organic group include -(alkylene group)-, —O-(alkylene group)-, —S-(alkylene group)-, —NH-(alkylene group)-, —N(alkyl group)-(alkylene group)-, —OC(=O)-(alkylene group)-, and —C(=O)O-(alkylene group)-.

Examples of the alkylene group included in the above chain organic group include a linear or branched alkylene group having 1 to 25 carbon atoms. Some of the carbon-carbon bonds included in the alkylene groups may be unsaturated bonds. One or more methylene groups included in the alkylene groups may be replaced (displaced) with —O—, —S—, —NH—, —N($R^m$)—, —C(=O)—, —C(=O)—O—, —C(=O)—NH—, —CHF—, —$CF_2$—, —CHCl—, or —$CCl_2$—, where $R^m$ represents a linear or branched alkyl group having 1 to 6 carbon atoms.

In order to enhance molecular linearity, the alkylene group included in the above chain organic group is preferably a linear alkylene group having 1 to 25 carbon atoms such that some of the carbon atoms included in the alkylene group may form an unsaturated bond or such that one or more methylene groups included in the alkylene group may be replaced (displaced) with the above groups.

The number of atoms included in the backbone (the term "backbone" refers to the longest chain portion of the chain organic group) of the chain organic group is preferably 3 to 25, is more preferably 5 to 20, and is further preferably 6 to 20.

The chain organic group is preferably —$(CH_2)_r$—$CH_2$—, —O—$(CH_2)_r$—$CH_2$—, —$(O)_{r1}$—$(CH_2CH_2O)_{r2}$—$(CH_2)_{r3}$—, or —$(O)_{r1}$—$(CH_2)_{r2}$—$(CH_2CH_2O)_{r3}$—. In the above formulae, r represents an integer of 1 to 24, is preferably an integer of 2 to 24, is more preferably an integer of 4 to 19, and is further preferably an integer of 5 to 19. In the above formulae, r1, r2, and r3 each independently represent an integer and are adjusted appropriately such that the number of atoms included in the backbone (the term "backbone" refers to the longest chain portion of the chain organic group) of the chain organic group is preferably 3 to 25, is more preferably 5 to 20, and is further preferably 6 to 20.

—$R^1$— and —$R^2$— are preferably each independently -(alkylene group)- or —O-(alkylene group)- and are more preferably each independently -(alkylene group)- or —O-(alkylene group)-. In an aspect, the chain organic group represented by —$R^1$— and —$R^2$— is -(alkylene group)-. In another aspect, the chain organic group represented by —$R^1$— and —$R^2$— is —O-(alkylene group)-.

In the case where —$X^1$— and —$R^1$— or —$X^1$— and —$R^2$— are bonded to each other as in Formulae (2B) and (2E) above; and in the case where -$A^{13}$- is a single bond in Formula (2B) above or, in Formula (2E), -$A^{11}$- is a single bond and —$R^1$— or —$R^2$— is bonded to —$Y^1$— or —$Y^2$—; —$R^1$— or —$R^2$— directly bonded to —$X^1$—, —$Y^1$—, or —$Y^2$— is preferably -(alkylene group)-.

—$R^1$— or —$R^2$— that is not directly bonded to —$X^1$—, —$Y^1$—, or —$Y^2$— is preferably —O-(alkylene group)-.

(Divalent Organic Group Represented by -$A^{11}$-, -$A^{12}$-, and -$A^{13}$-)

The divalent organic group represented by -$A^{11}$-, -$A^{12}$-, and -$A^{13}$- is preferably the group represented by Formula (4) below.

$$-Q^3- \quad (4)$$

(in Formula (4), $Q^3$ represents a hydrocarbon ring group or a heterocyclic group)

Examples of the hydrocarbon ring group represented by -$Q^3$- include an aromatic hydrocarbon ring group and a nonaromatic hydrocarbon ring group.

Examples of the aromatic hydrocarbon ring group include a nonconnected aromatic hydrocarbon ring group and a connected aromatic hydrocarbon ring group.

The nonconnected aromatic hydrocarbon ring group is a divalent group of a monocyclic or condensed aromatic hydrocarbon ring. The number of carbon atoms included in the nonconnected aromatic hydrocarbon ring group is preferably 6 to 20 because, in such a case, the core has an adequate size and molecular alignment can be enhanced accordingly. The number of carbon atoms included in the nonconnected aromatic hydrocarbon ring group is more preferably 6 to 15. Examples of the aromatic hydrocarbon ring include a benzene ring, a naphthalene ring, an anthracene ring, a phenanthrene ring, a perylene ring, a tetracene ring, a pyrene ring, a benzpyrene ring, a chrysene ring, a triphenylene ring, an acenaphthene ring, a fluoranthene ring, and a fluorene ring.

The connected aromatic hydrocarbon ring group is a divalent group consisting of a plurality of monocyclic or condensed aromatic hydrocarbon rings connected to one another with a single bond, the divalent group having bonding hands located on the atoms constituting the rings. The number of carbon atoms included in the monocyclic or condensed rings is preferably 6 to 20 because, in such a case, the core has an adequate size and molecular alignment can be enhanced accordingly. The number of carbon atoms included in the monocyclic or condensed rings is more preferably 6 to 15. An example of the connected aromatic hydrocarbon ring group is a divalent group consisting of a first monocyclic or condensed aromatic hydrocarbon ring having 6 to 20 carbon atoms and a second monocyclic or condensed aromatic hydrocarbon ring having 6 to 20 carbon atoms which are bonded to each other with a single bond, the divalent group having a first bonding hand located on one of the atoms constituting the first monocyclic or condensed aromatic hydrocarbon ring having 6 to 20 carbon atoms, the divalent group having a second bonding hand located on one of the atoms constituting the second monocyclic or condensed aromatic hydrocarbon ring having 6 to 20 carbon atoms. Specific examples of the connected aromatic hydrocarbon ring group include a biphenyl-4,4'-diyl group.

The aromatic hydrocarbon ring group is preferably the nonconnected aromatic hydrocarbon ring group in order to optimize the intermolecular interaction between molecules of the liquid crystal compound and thereby enhance molecular alignment.

Among these, as an aromatic hydrocarbon ring group, a divalent group of a benzene ring and a divalent group of a naphthalene ring are preferable, and a divalent group of a benzene ring (a phenylene group) is more preferable. The phenylene group is preferably a 1,4-phenylene group. When -$Q^3$- is any of the above groups, the linearity of the liquid crystal molecules may be enhanced and, consequently, molecular alignment may be enhanced.

Examples of the nonaromatic hydrocarbon ring group include a nonconnected nonaromatic hydrocarbon ring group and a connected nonaromatic hydrocarbon ring group.

The nonconnected nonaromatic hydrocarbon ring group is a divalent group of a monocyclic or condensed nonaromatic hydrocarbon ring. The number of carbon atoms included in the nonconnected nonaromatic hydrocarbon ring group is preferably 3 to 20 because, in such a case, the core has an adequate size and molecular alignment can be enhanced accordingly. The number of carbon atoms included in the nonconnected nonaromatic hydrocarbon ring group is more preferably 3 to 15. Examples of the nonaromatic hydrocarbon ring include a cyclopropane ring, a cyclobutane ring, a cyclopentane ring, a cyclohexane ring, a cycloheptane ring, a cyclooctane ring, a cyclohexene ring, a norbornane ring, a bornane ring, an adamantane ring, a tetrahydronaphthalene ring, and a bicyclo[2.2.2]octane ring.

Examples of the nonconnected nonaromatic hydrocarbon ring group include an alicyclic hydrocarbon ring group that does not have an unsaturated bond as an interatomic bond that constitutes the nonaromatic hydrocarbon ring and an unsaturated nonaromatic hydrocarbon ring group that has an unsaturated bond as an interatomic bond that constitutes the nonaromatic hydrocarbon ring. The nonconnected nonaromatic hydrocarbon ring group is preferably an alicyclic hydrocarbon ring group in consideration of productivity.

The connected nonaromatic hydrocarbon ring group is a divalent group consisting of a plurality of monocyclic or condensed nonaromatic hydrocarbon rings bonded to one another with a single bond, the divalent group having bonding hands each located on one of the atoms constituting the ring; or a divalent group consisting of one or more rings selected from the group consisting of a monocyclic aromatic hydrocarbon ring, a condensed aromatic hydrocarbon ring, a monocyclic nonaromatic hydrocarbon ring, and a condensed nonaromatic hydrocarbon ring and a monocyclic or condensed nonaromatic hydrocarbon ring which are bonded to one another with a single bond, the divalent group having bonding hands located on the atoms constituting the ring.

The number of carbon atoms included in the monocyclic or condensed ring is preferably 3 to 20 because, in such a case, the core has an adequate size and molecular alignment can be enhanced accordingly.

Examples of the connected nonaromatic hydrocarbon ring group include a divalent group consisting of a first monocyclic or condensed nonaromatic hydrocarbon ring having 3 to 20 carbon atoms and a second monocyclic or condensed nonaromatic hydrocarbon ring having 3 to 20 carbon atoms which are bonded to each other with a single bond, the divalent group having a first bonding hand located on one of the atoms constituting the first monocyclic or condensed nonaromatic hydrocarbon ring having 3 to 20 carbon atoms, the divalent group having a second bonding hand located on one of the atoms constituting the second monocyclic or condensed nonaromatic hydrocarbon ring having 3 to 20 carbon atoms. Another example is a divalent group consisting of a monocyclic or condensed aromatic hydrocarbon ring having 3 to 20 carbon atoms and a monocyclic or condensed nonaromatic hydrocarbon ring having 3 to 20 carbon atoms which are bonded to each other with a single bond, the divalent group having a first bonding hand located on one of the atoms constituting the monocyclic or condensed aromatic hydrocarbon ring having 3 to 20 carbon atoms, the divalent group having a second bonding hand located on one of the atoms constituting the monocyclic or condensed nonaromatic hydrocarbon ring having 3 to 20 carbon atoms.

Specific examples of the connected nonaromatic hydrocarbon ring group include a bis(cyclohexane)-4,4'-diyl group and a 1-cyclohexylbenzene-4,4'-diyl group.

The nonaromatic hydrocarbon ring group is preferably a nonconnected nonaromatic hydrocarbon ring group in order to optimize the intermolecular interaction between molecules of the liquid crystal compound and thereby enhance molecular alignment.

The nonconnected nonaromatic hydrocarbon ring group is preferably a divalent group of cyclohexane (cyclohexane diyl group). The cyclohexane diyl group is preferably a cyclohexane-1,4-diyl group.

Examples of the heterocyclic group represented by -$Q^3$- include an aromatic heterocyclic group and a nonaromatic heterocyclic group.

Examples of the aromatic heterocyclic group include a nonconnected aromatic heterocyclic group and a connected aromatic heterocyclic group.

The nonconnected aromatic heterocyclic group is a divalent group of a monocyclic or condensed aromatic heterocyclic ring. The number of carbon atoms included in the nonconnected aromatic heterocyclic group is preferably 4 to 20 because, in such a case, the core has an adequate size and molecular alignment can be enhanced accordingly. The number of carbon atoms included in the nonconnected aromatic heterocyclic group is more preferably 4 to 15.

Examples of the aromatic heterocyclic ring include a furan ring, a benzofuran ring, a thiophene ring, a benzothiophene ring, a pyrrole ring, a pyrazole ring, an imidazole ring, a thiazole ring, an isothiazole ring, an oxadiazole ring, a thiadiazole ring, a triazole ring, a indole ring, a carbazole ring, a pyrroloimidazole ring, a pyrrolopyrazole ring, a pyrrolopyrrole ring, a thienopyrrole ring, a thienothiophene ring, a furopyrrole ring, a furofuran ring, a thienofuran ring, a thienothiazole ring, a benzisoxazole ring, a benzisothiazole ring, a benzimidazole ring, a pyridine ring, a pyrazine ring, a pyridazine ring, a pyrimidine ring, a triazine ring, a quinoline ring, an isoquinoline ring, a shinoline ring, a quinoxaline ring, a phenanthridine ring, a quinazoline ring, a quinazolinone ring, an azulene ring and the like.

The connected aromatic heterocyclic group is a divalent group consisting of a plurality of monocyclic or condensed aromatic heterocyclic rings bonded to one another with a single bond, the divalent group having bonding hands each located on one of the atoms constituting the ring. The number of carbon atoms included in the monocyclic or condensed ring is preferably 4 to 20 because, in such a case, the core has an adequate size and molecular alignment can be enhanced accordingly. The number of carbon atoms included in the connected aromatic heterocyclic group is more preferably 4 to 15.

Examples of the connected aromatic heterocyclic group include a divalent group consisting of a first monocyclic or condensed aromatic heterocyclic ring having 4 to 20 carbon atoms and a second monocyclic or condensed aromatic heterocyclic ring having 4 to 20 carbon atoms which are bonded to each other with a single bond, the divalent group having a first bonding hand located on one of the atoms constituting the first monocyclic or condensed aromatic heterocyclic ring having 4 to 20 carbon atoms, the divalent group having a second bonding hand located on one of the atoms constituting the second monocyclic or condensed aromatic heterocyclic ring having 4 to 20 carbon atoms.

Examples of the nonaromatic heterocyclic group include a nonconnected nonaromatic heterocyclic group and a connected nonaromatic heterocyclic group.

The nonconnected nonaromatic heterocyclic group is a divalent group of a monocyclic or condensed nonaromatic heterocyclic ring. The number of carbon atoms included in the nonconnected nonaromatic heterocyclic group is preferably 4 to 20 because, in such a case, the core has an adequate size and molecular alignment can be enhanced accordingly. The number of carbon atoms included in the nonconnected nonaromatic heterocyclic group is more preferably 4 to 15.

Examples of the nonaromatic heterocyclic ring included in the divalent group of a monocyclic or condensed nonaromatic heterocyclic ring having 4 to 20 carbon atoms include a tetrahydrofuran ring, a tetrahydropyran ring, a dioxane ring, a tetrahydrothiophene ring, a tetrahydrothiopyran ring, a pyrrolidine ring, a piperidine ring, a dihydropyridine ring, a piperazine ring, a tetrahydrothiazole ring, a tetrahydrooxazole ring, an octahydroquinoline ring, a tetrahydroquinoline ring, an octahydroquinazoline ring, a tetrahydroquinazoline ring, a tetrahydroimidazole ring, a tetrahydrobenzimidazole ring, and a quinuclidine ring.

The connected nonaromatic heterocyclic group is a divalent group consisting of a plurality of monocyclic or condensed nonaromatic heterocyclic rings bonded to one another with a single bond, the divalent group having bonding hands each located on one of the atoms constituting the ring. The number of carbon atoms included in the monocyclic or condensed ring is preferably 4 to 20 because, in such a case, the core has an adequate size and molecular alignment can be enhanced accordingly. The number of carbon atoms included in the connected nonaromatic heterocyclic group is more preferably 4 to 15.

Examples of the connected non aromatic heterocyclic group include a divalent group consisting of a first monocyclic or condensed nonaromatic heterocyclic ring having 4 to 20 carbon atoms and a second monocyclic or condensed nonaromatic heterocyclic ring having 4 to 20 carbon atoms which are bonded to each other with a single bond, the divalent group having a first bonding hand located on one of the atoms constituting the first monocyclic or condensed nonaromatic heterocyclic ring having 4 to 20 carbon atoms, the divalent group having a second bonding hand located on one of the atoms constituting the second monocyclic or condensed nonaromatic heterocyclic ring having 4 to 20 carbon atoms.

The aromatic hydrocarbon ring group, nonaromatic hydrocarbon ring group, aromatic heterocyclic group, and nonaromatic heterocyclic group represented by -$Q^3$- may be each substituted with one or more groups selected from the group consisting of —R″, —OH, —O—R″, —O—C(=O)—R″, —NH$_2$, —NH—R″, —N(R″′)—R″, —C(=O)—R″, —C(=O)—O—R″, —C(=O)—NH$_2$, —C(=O)—NH—R″, —C(=O)—N(R″′)—R″, —SH, —S—R″, a trifluoromethyl group, a sulfamoyl group, a carboxyl group, a sulfo group, a cyano group, a nitro group, and a halogen, where —R″ and —R″′ each independently represent a linear or branched alkyl group having 1 to 6 carbon atoms.

The aromatic hydrocarbon ring group, nonaromatic hydrocarbon ring group, aromatic heterocyclic group, and nonaromatic heterocyclic group represented by -$Q^3$- are each independently unsubstituted or substituted with a methyl group, a methoxy group, a fluorine atom, a chlorine atom, or a bromine atom and is more preferably unsubstituted in order to enhance the linearity of the molecular structure, increase the likelihood of association of molecules of the polymerizable liquid crystal compound (2), and make it easy to achieve a liquid crystal state.

The substituents included in the aromatic hydrocarbon ring group, nonaromatic hydrocarbon ring group, aromatic heterocyclic group, and nonaromatic heterocyclic group represented by -$Q^3$- may be identical to or different from one another. All of the aromatic hydrocarbon ring group, nonaromatic hydrocarbon ring group, aromatic heterocyclic group, and nonaromatic heterocyclic group may be substituted. All of the aromatic hydrocarbon ring group, nonaromatic hydrocarbon ring group, aromatic heterocyclic group, and nonaromatic heterocyclic group may be unsubstituted. In another case, some of the aromatic hydrocarbon ring group, nonaromatic hydrocarbon ring group, aromatic heterocyclic group, and nonaromatic heterocyclic group may be substituted while the others are unsubstituted.

The substituents included in the divalent organic groups represented by -$A^{11}$-, -$A^{12}$-, and -$A^{13}$- may be identical to or different from one another. All of the divalent organic groups represented by -$A^{11}$-, -$A^{12}$-, and -$A^{13}$- may be substituted. In another case, all of the divalent organic groups represented by -$A^{11}$-, -$A^{12}$-, and -$A^{13}$- may be unsubstituted. Some of the divalent organic groups represented by -$A^{11}$-, -$A^{12}$-, and -$A^{13}$- may be substituted, while the others are unsubstituted.

-$Q^3$- is preferably a hydrocarbon ring group and is more preferably a phenylene group or a cyclohexane diyl group. In order to enhance the linearity of the molecular structure of the polymerizable liquid crystal compound (2), -$Q^3$- is further preferably a 1,4-phenylene group or a cyclohexane-1,4-diyl group.

As for the divalent organic group represented by -$A^{11}$-, -$A^{12}$-, and -$A^{13}$-, -$Q^3$- is preferably a hydrocarbon ring group. That is, the divalent organic group is preferably a hydrocarbon ring group. The divalent organic group is more preferably a phenylene group or a cyclohexane diyl group. In order to enhance the linearity of the molecular structure of the polymerizable liquid crystal compound (2), a 1,4-phenylene group and a cyclohexane-1,4-diyl group are further preferable.

For the polymerizable liquid crystal compound (2), it is preferable that one of -$A^{11}$-, -$A^{12}$-, and -$A^{13}$- be the partial structure represented by Formula (3) and the other two be each independently a divalent organic group. Among -$A^{11}$-, -$A^{12}$-, and -$A^{13}$-, it is preferable that —$C^y$— included in the partial structure represented by Formula (3) be a hydrocarbon ring group and it is particularly preferable that the divalent organic group be a hydrocarbon ring group. It is further preferable that the hydrocarbon ring group be a 1,4-phenylene group or a cyclohexane-1,4-diyl group. Furthermore, one of -$A^{11}$- and -$A^{13}$- is preferably a cyclohexane-1,4-diyl group.

It is more preferable that one of -$A^{11}$- and -$A^{13}$- be the partial structure represented by Formula (3) and the other and -$A^{12}$- be the divalent organic groups. In such a case, one of -$A^{11}$- and -$A^{13}$- which is the divalent organic group is preferably a cyclohexane-1,4-diyl group. It is particularly preferable that -$A^{12}$- be a 1,4-phenylene group.

(—$Y^1$— and —$Y^2$—)

—$Y^1$— and —$Y^2$— each independently represent a single bond, —C(=O)O—, —OC(=O)—, —C(=S)O—, —OC(=S)—, —C(=O)S—, —SC(=O)—, —CH$_2$CH$_2$—, —CH=CH—, —C≡C—, —C(=O)NH—, —NHC(=O)—, —CH$_2$O—, —OCH$_2$—, —CH$_2$S—, or —SCH$_2$—. In order to enhance the linearity of the polymerizable liquid crystal compound (2) and facilitate the rotational movement around the minor axis of the molecule, —$Y^1$— and —$Y^2$— are preferably each independently a single bond, —C(=O)O—, —OC(=O)—, —C(=S)O—, —OC(=S)—, —C(=O)S—, —SC(=O)—, —CH$_2$CH$_2$—, —CH=CH—, —C(=O)NH—, —NHC(=O)—, —CH₂O—, —OCH₂—, —CH₂S—, or —SCH₂—, which has low n bondability, and are more preferably each independently a single bond, —C(=O)O—, —OC(=O)—, —CH₂CH₂—, —CH₂O—, or —OCH₂—.

In the case where —X¹— and —Y¹— or —X¹— and —Y²— are bonded to each other as in Formulae (2A), (2C), (2D), and (2F) above, —Y¹— bonded to —X¹— or —Y²— bonded to —X¹— is preferably a single bond, and —X¹— and the other one of —Y¹— and —Y²— are each preferably —C(=O)O— or —OC(=O)—.

In the case where —X¹— is not bonded to any of —Y¹— and —Y²— as in Formulae (2B) and (2E) above, —X¹— is preferably —CH₂CH₂—, —CH₂O—, or —OCH₂—. It is preferable that both —Y¹— and —Y²— be —C(=O)O— or —OC(=O)—.

(k)

k represents 1 or 2. In one aspect, k is preferably 1. In another aspect, k is preferably 2.

When k is 2, —Y²-'s may be identical to or different from one another, and -A¹³-'s may be identical to or different from one another.

(Preferable Structure)

The polymerizable liquid crystal compound (2) is preferably the compound represented by Formula (2A), (2B), (2E), or (2F) above in order to optimize the intermolecular interaction that acts between molecules of the liquid crystal compound, to form a core having an adequate size, and to enhance molecular alignment.

(Specific Examples of Polymerizable Liquid Crystal Compound)

Specific examples of the polymerizable liquid crystal compound included in the anisotropic dye film-forming composition according to the present invention include, but are not limited to, the polymerizable liquid crystal compounds described below. In the formulae described below as examples, $C_6H_{13}$ denotes an n-hexyl group and $C_5H_{11}$ denotes an n-pentyl group.

[Chem. 13]

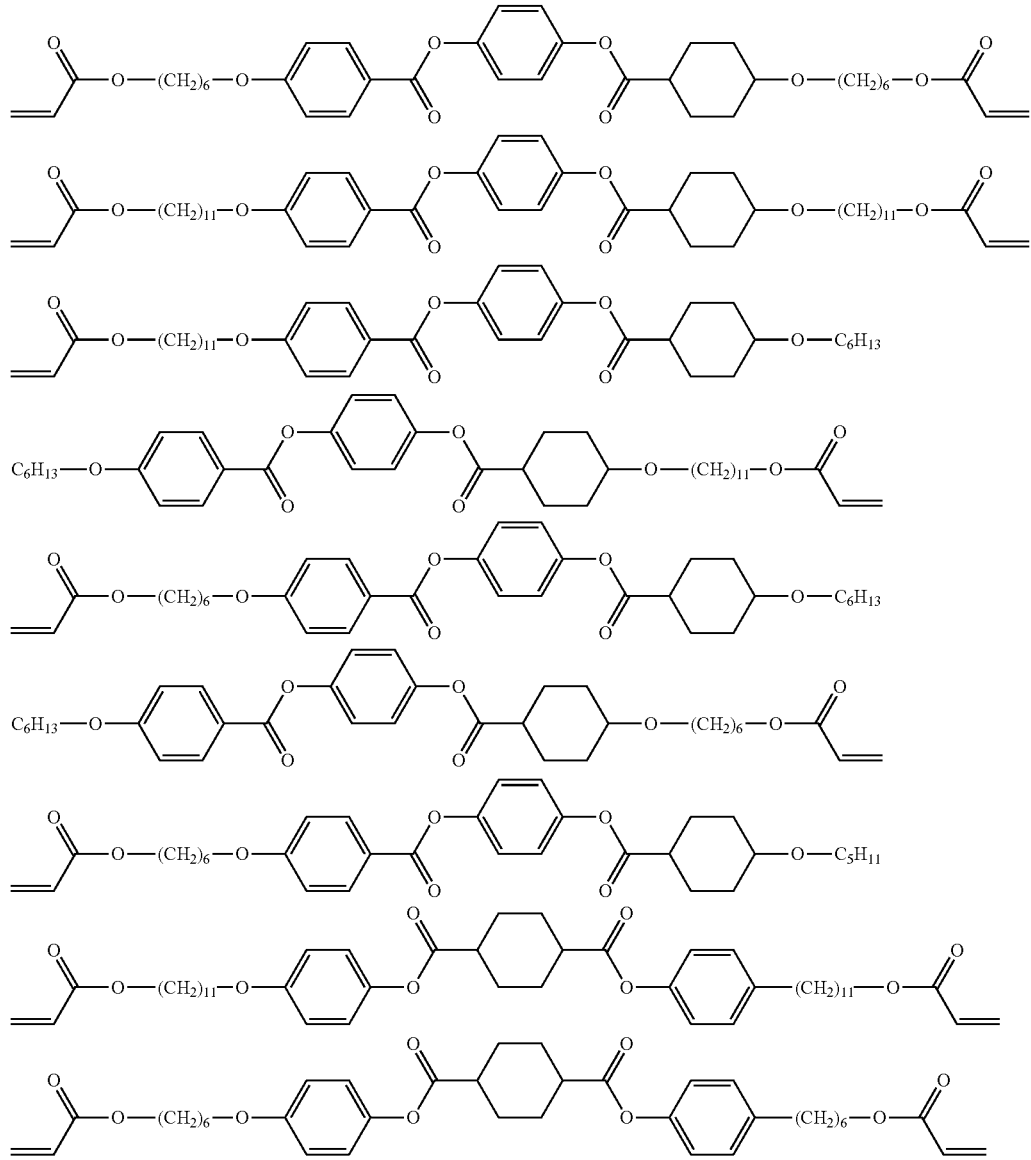

-continued
[Chem. 14]
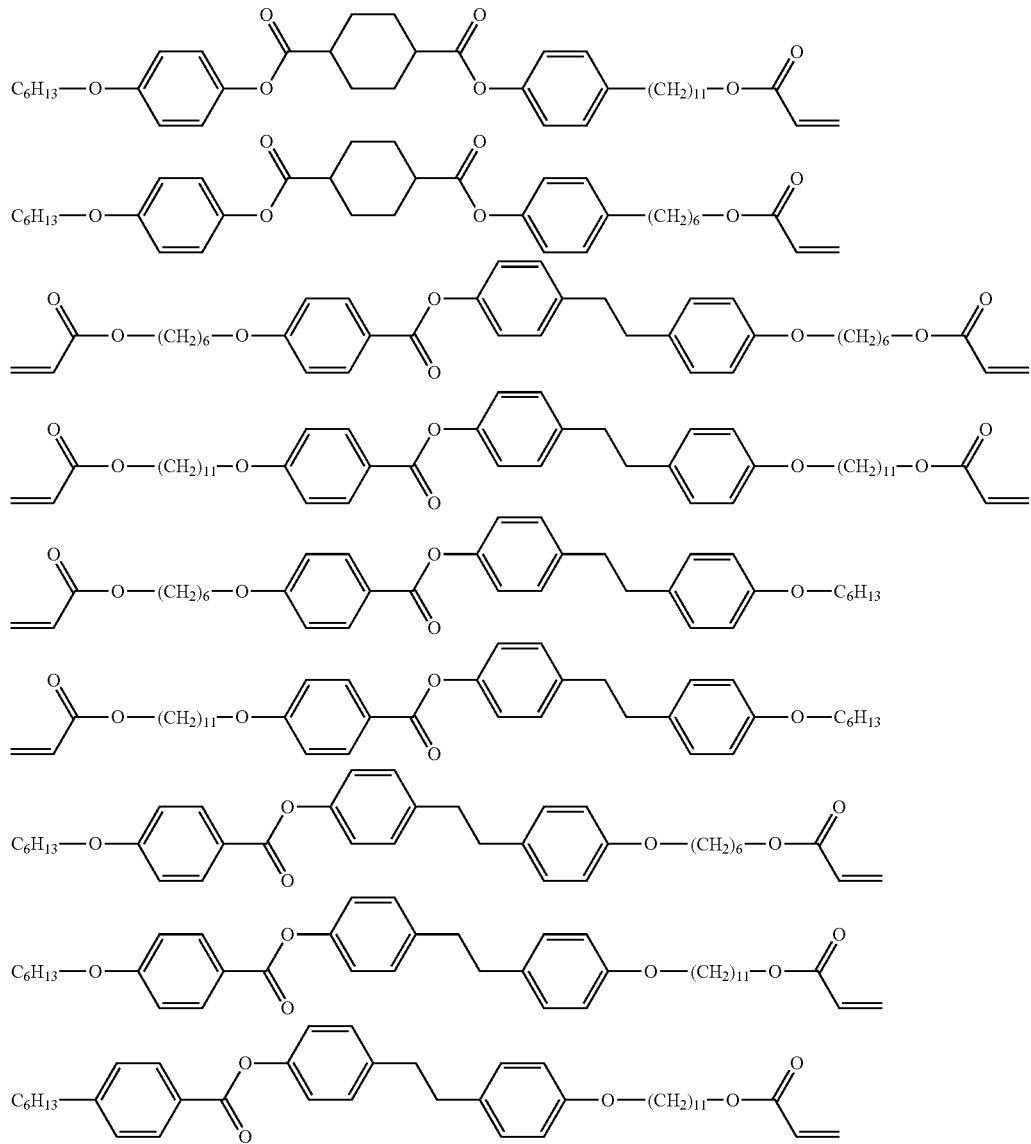
[Chem. 15]
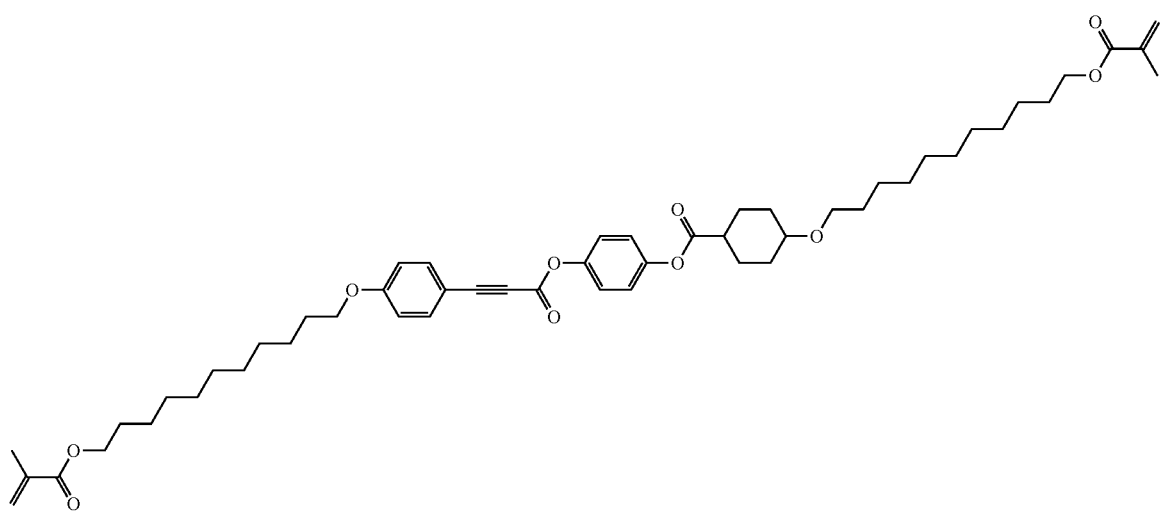

-continued
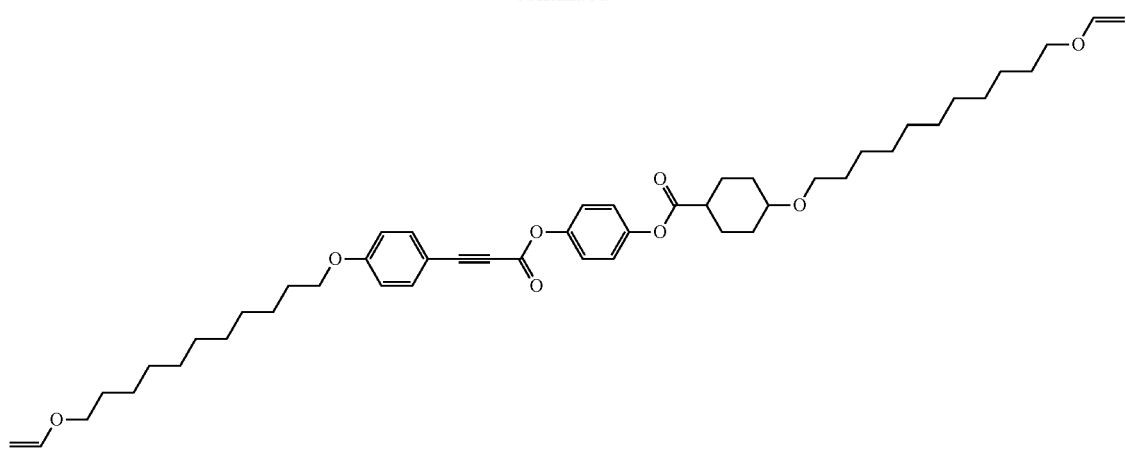
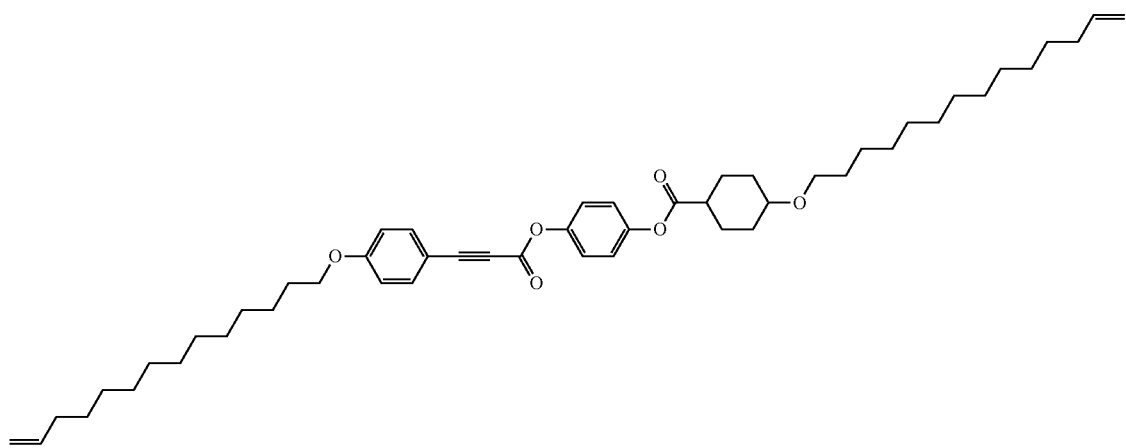
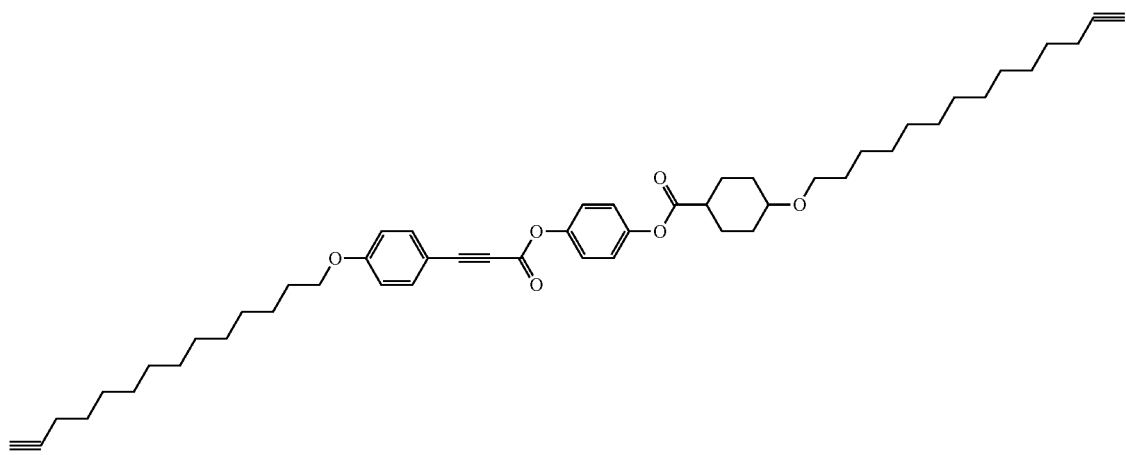

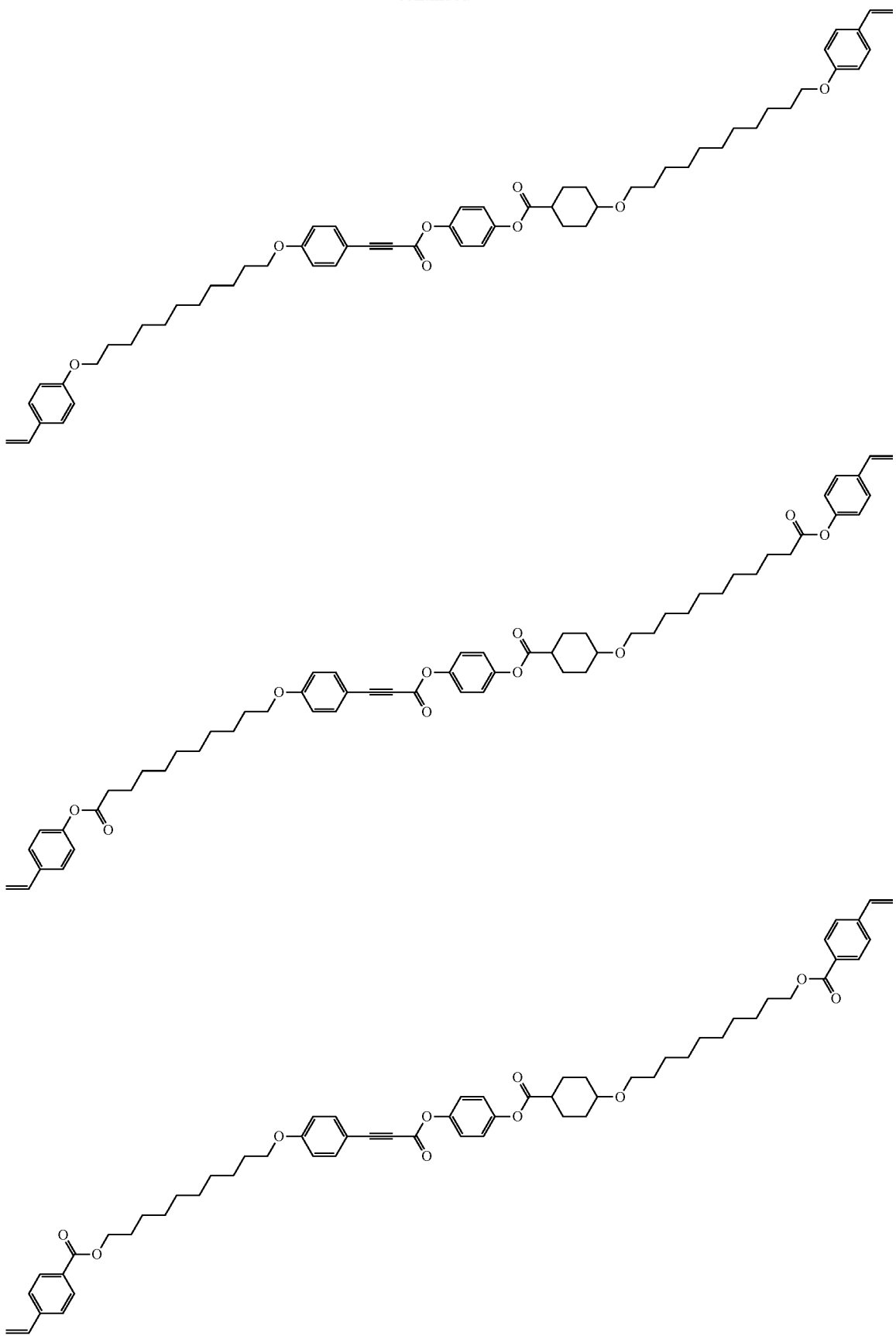

[Chem. 16]
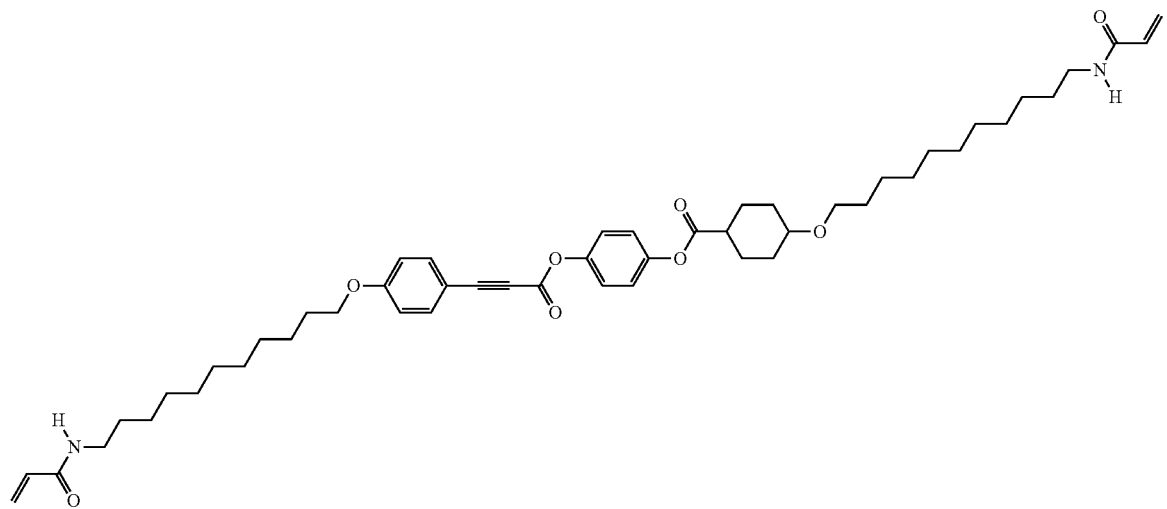
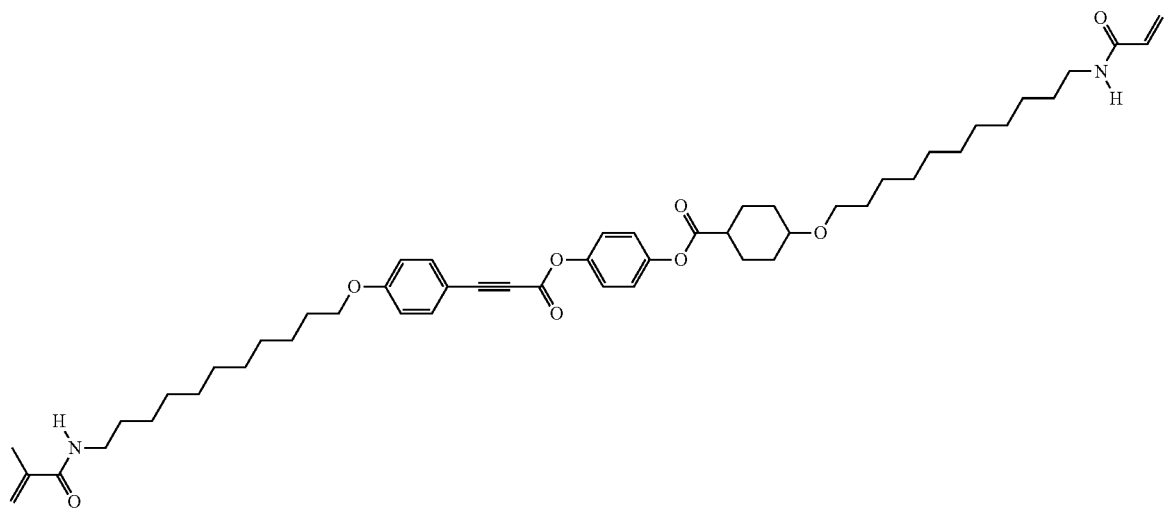
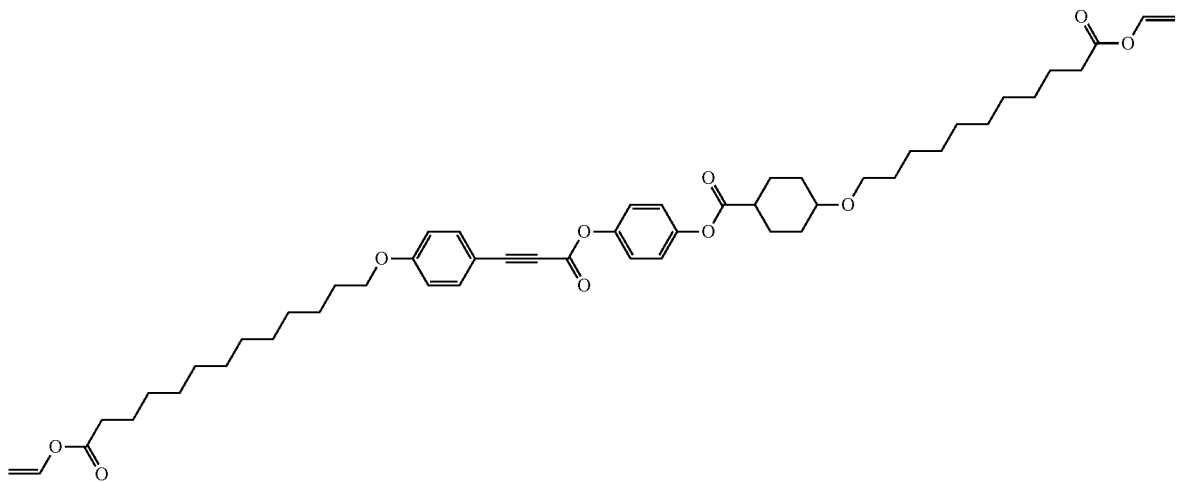

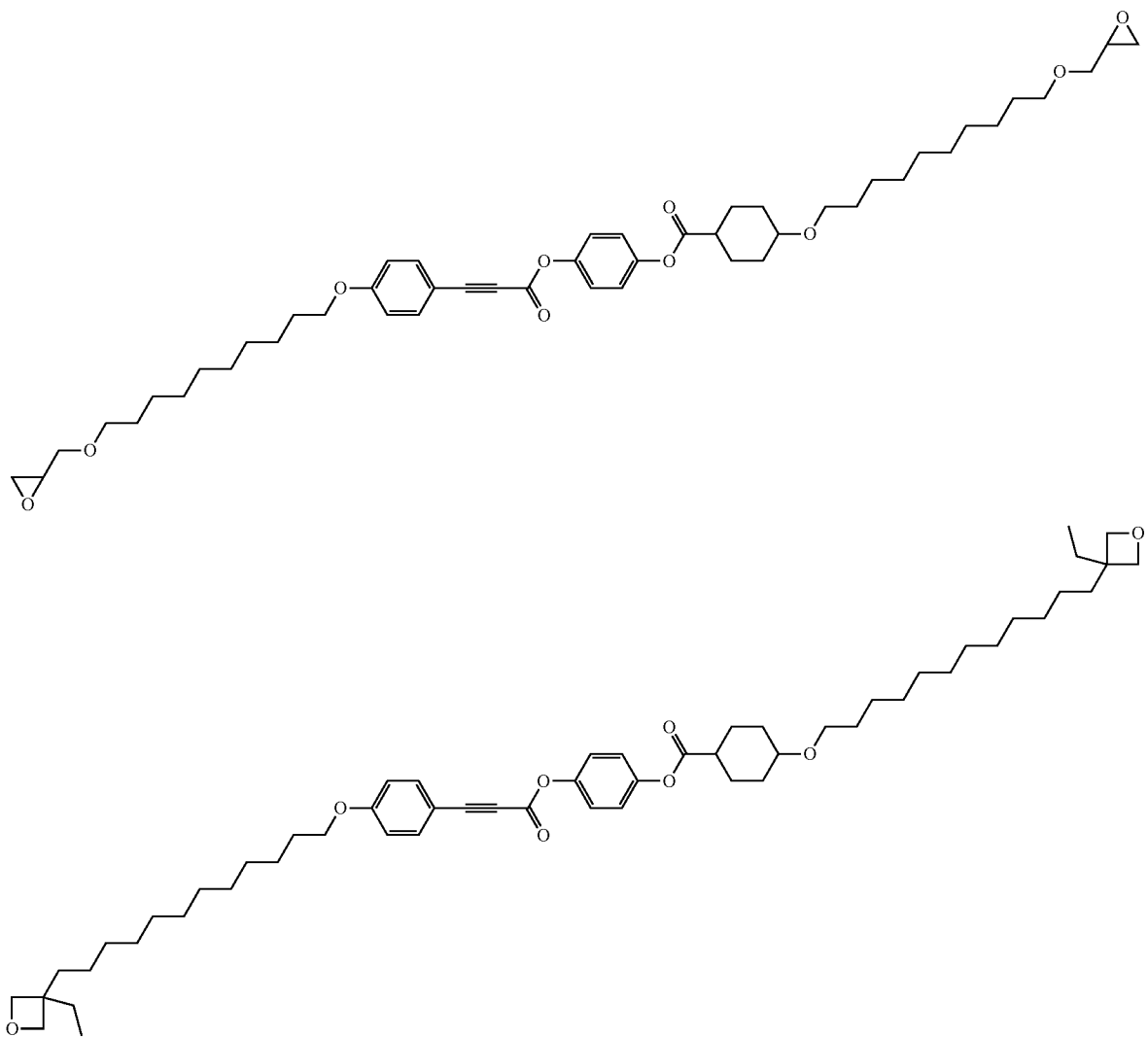
[Chem. 17]
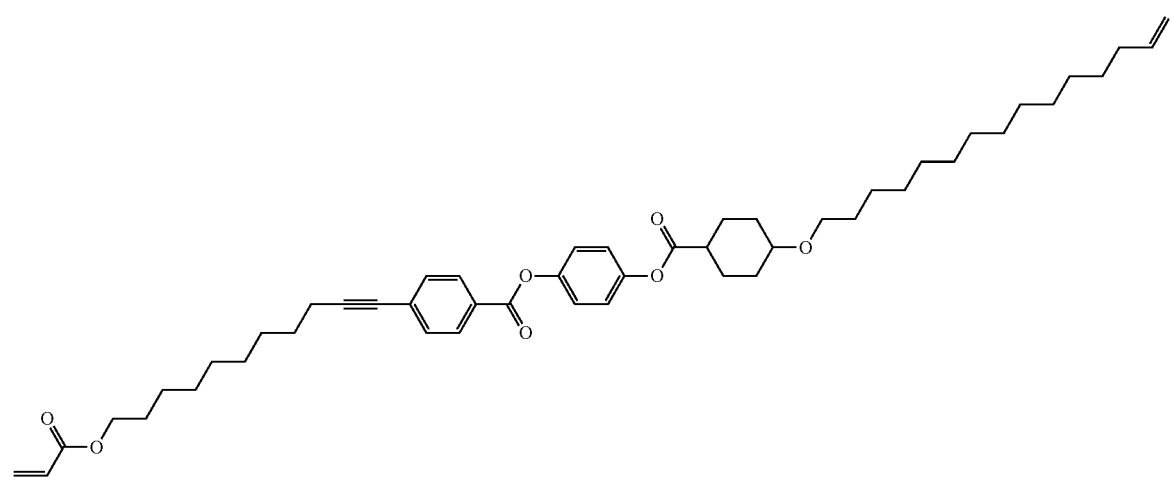

-continued
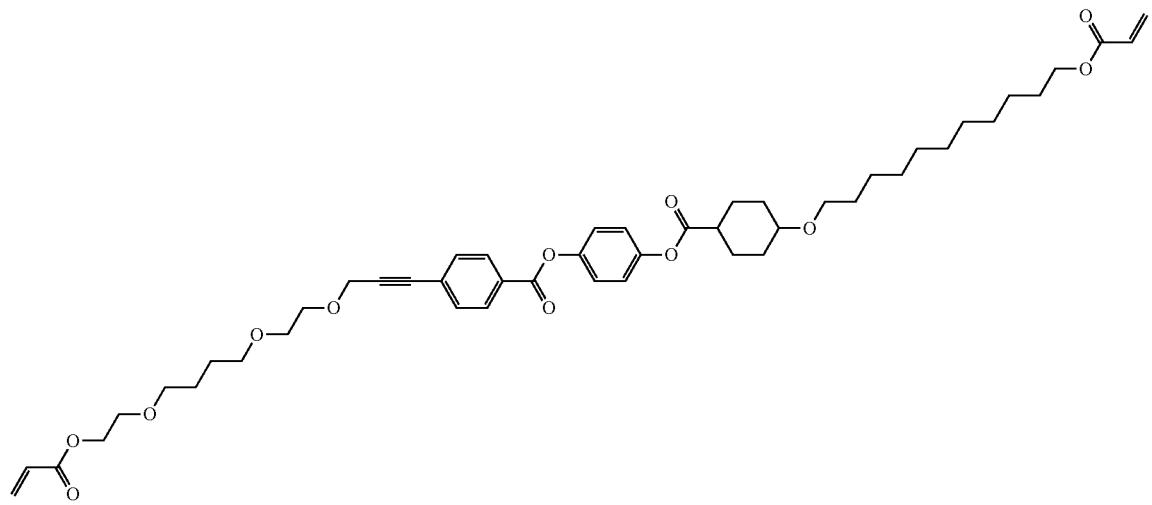
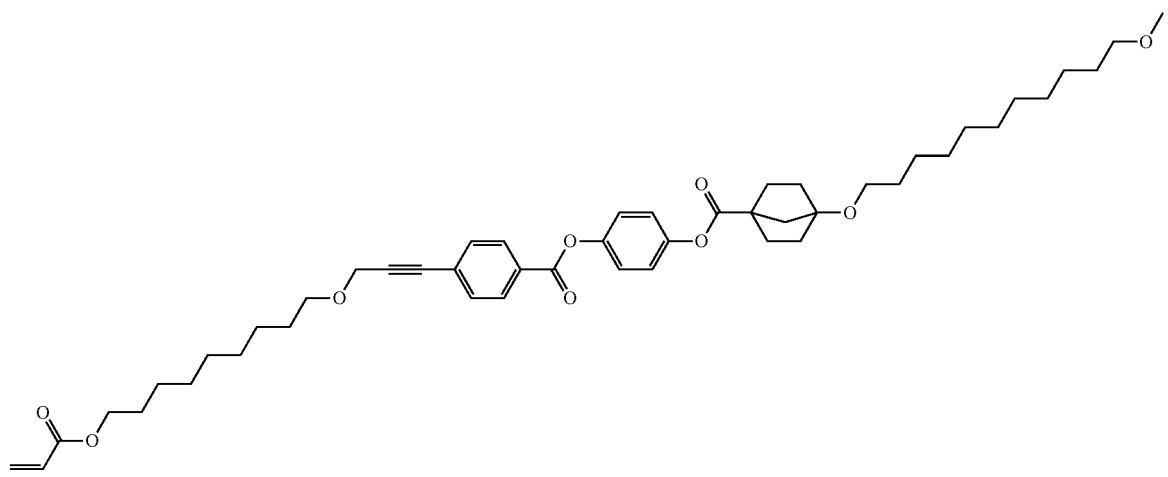
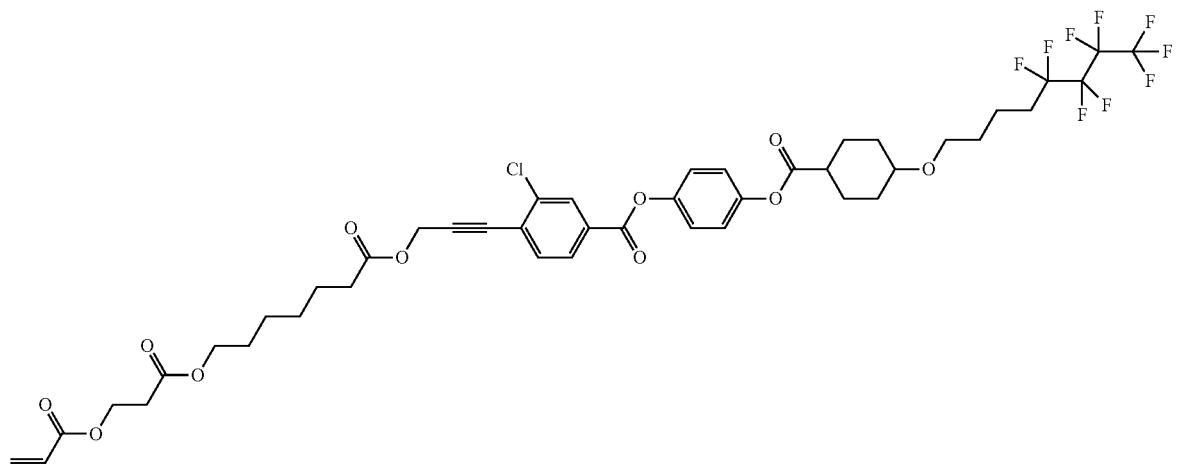

-continued
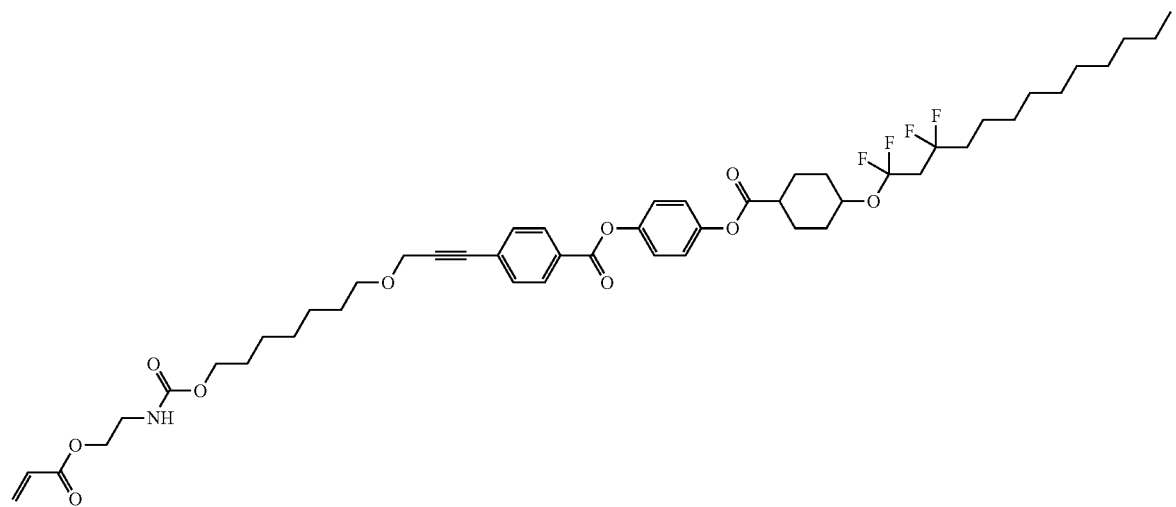
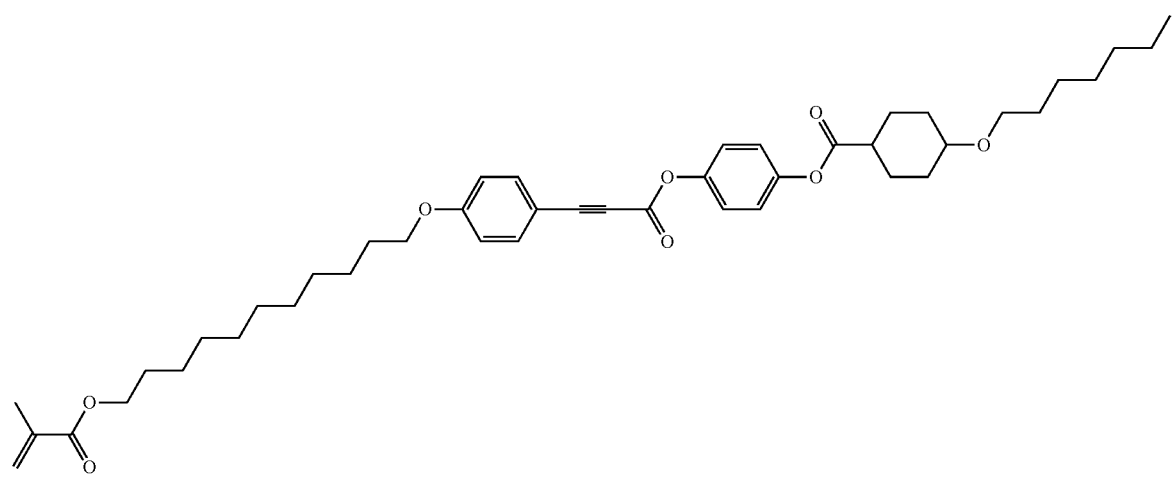
[Chem. 18]
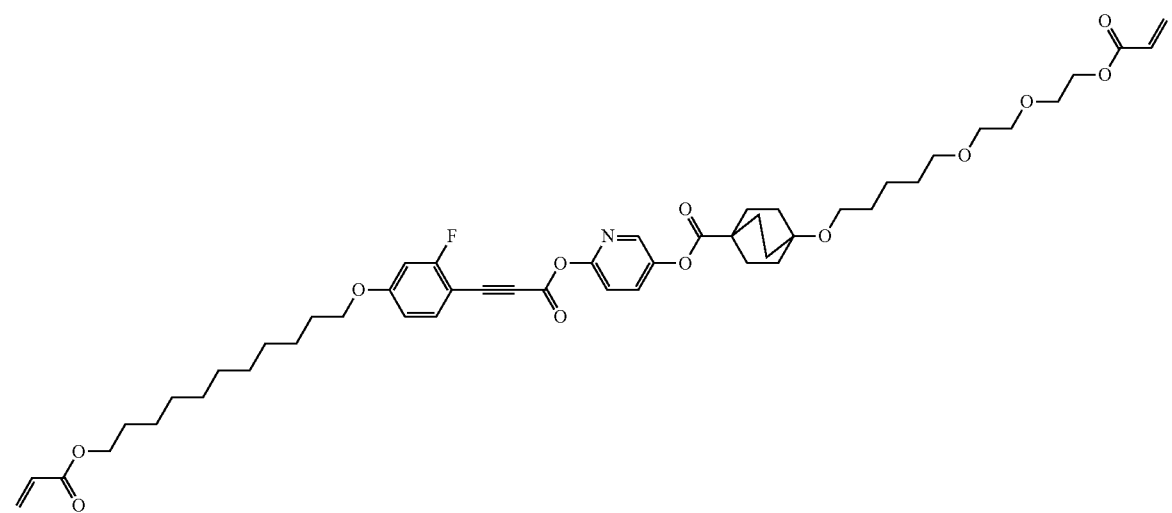

-continued
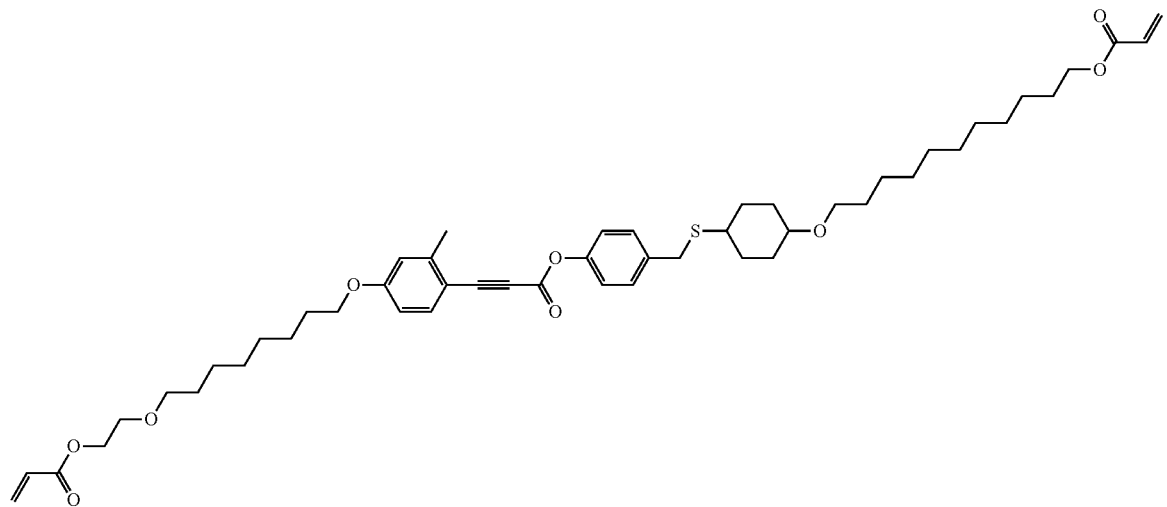
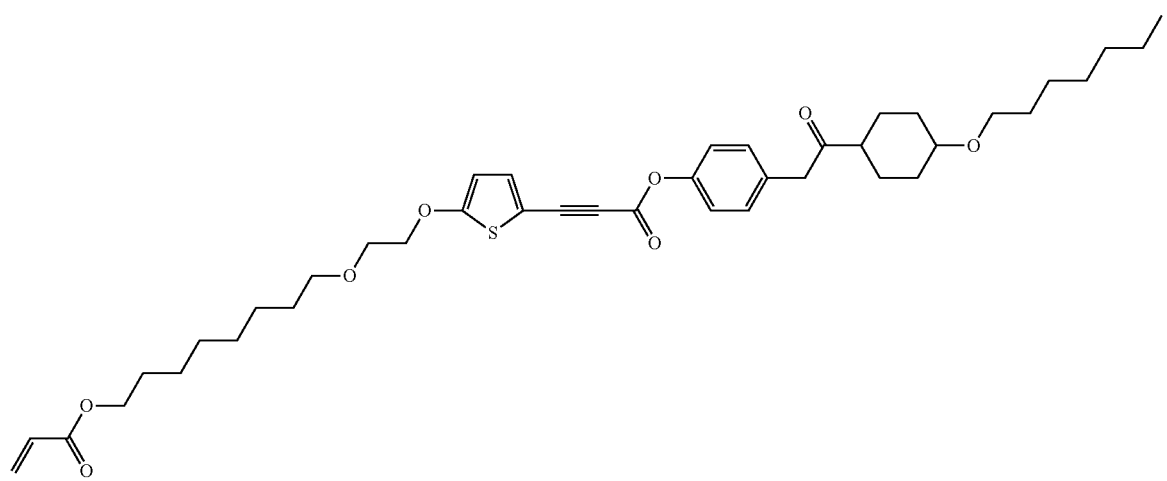
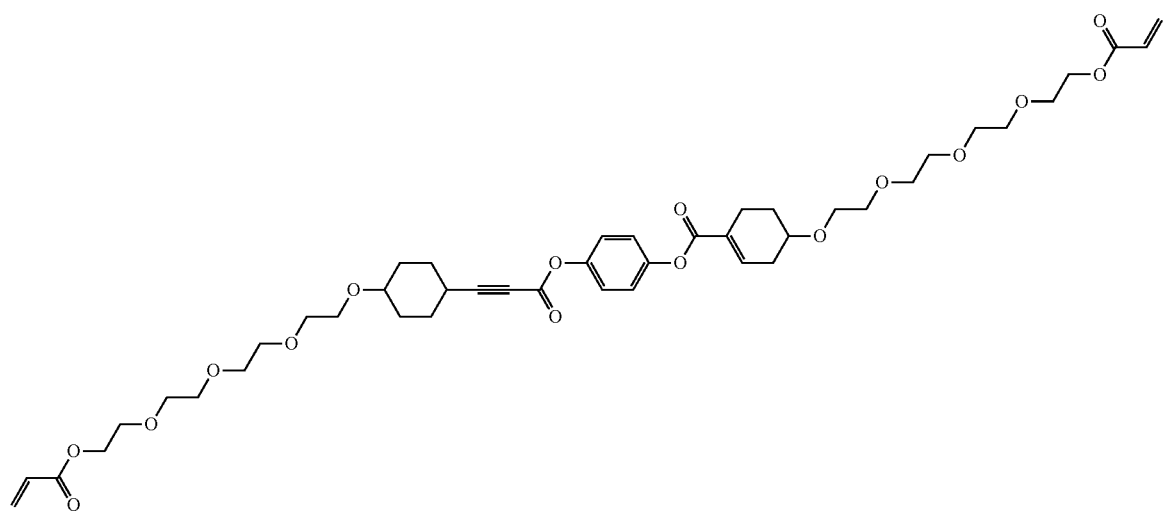

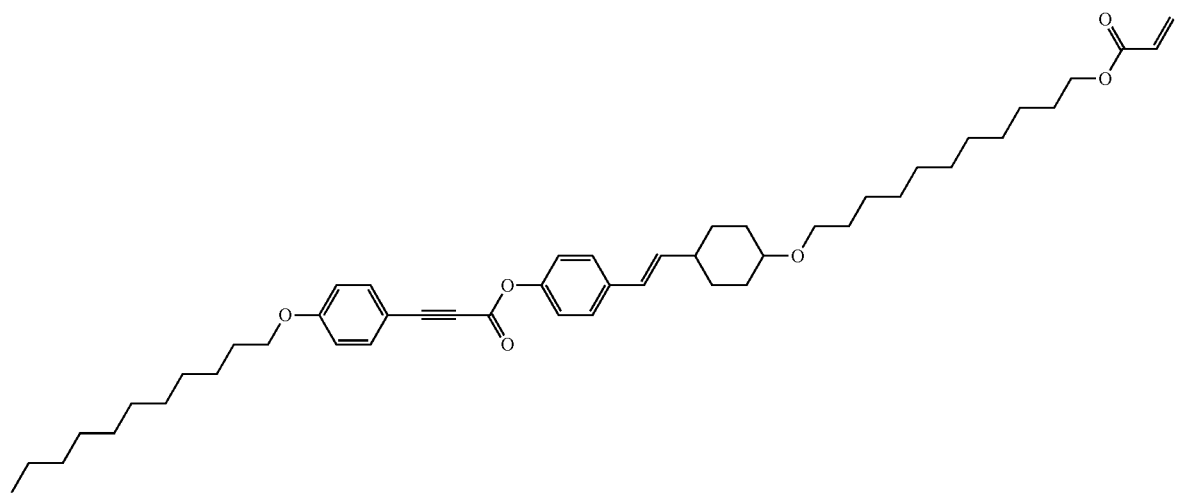
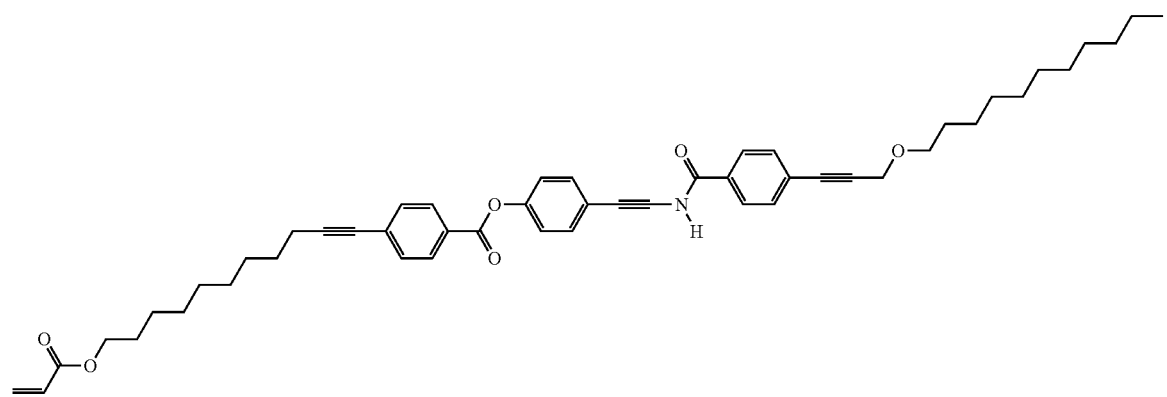
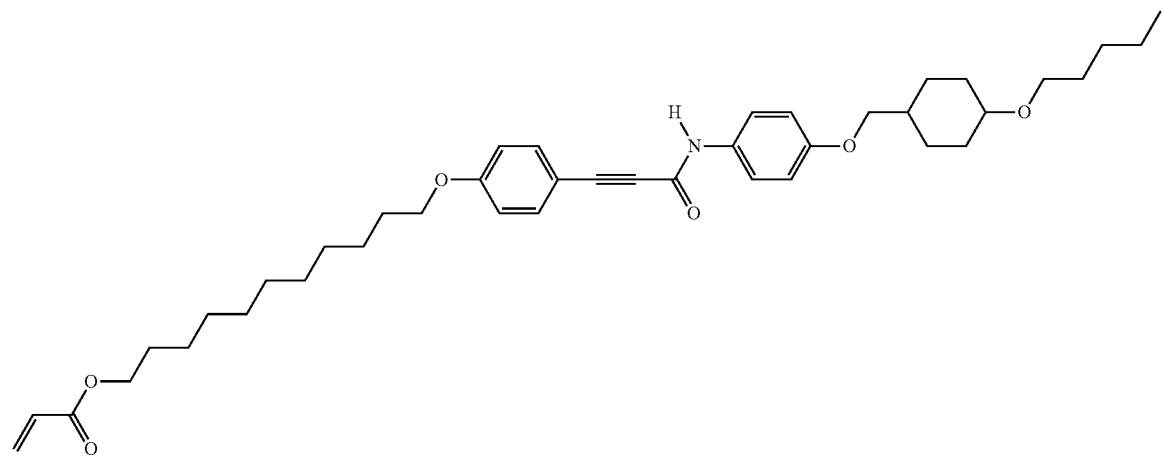

[Chem. 19]
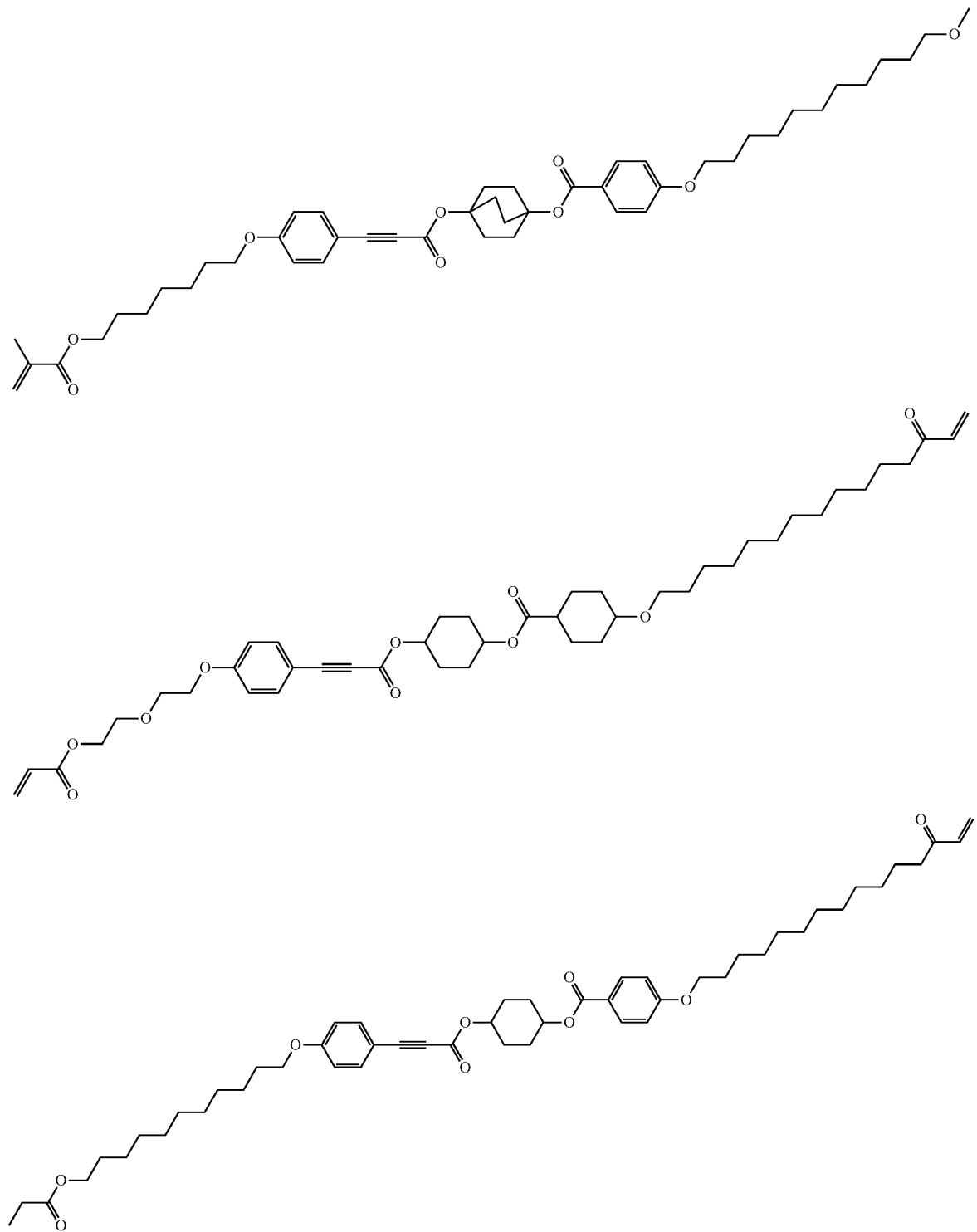

-continued
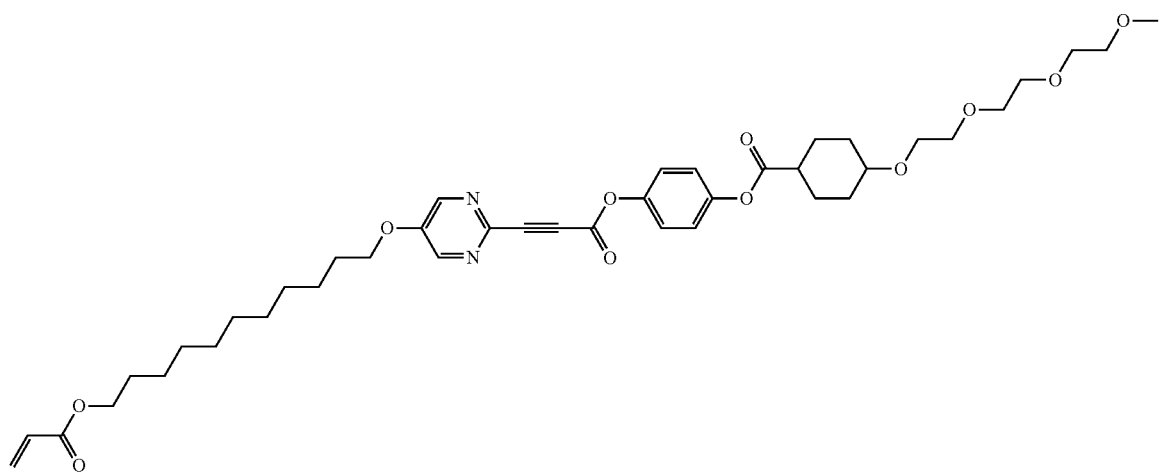
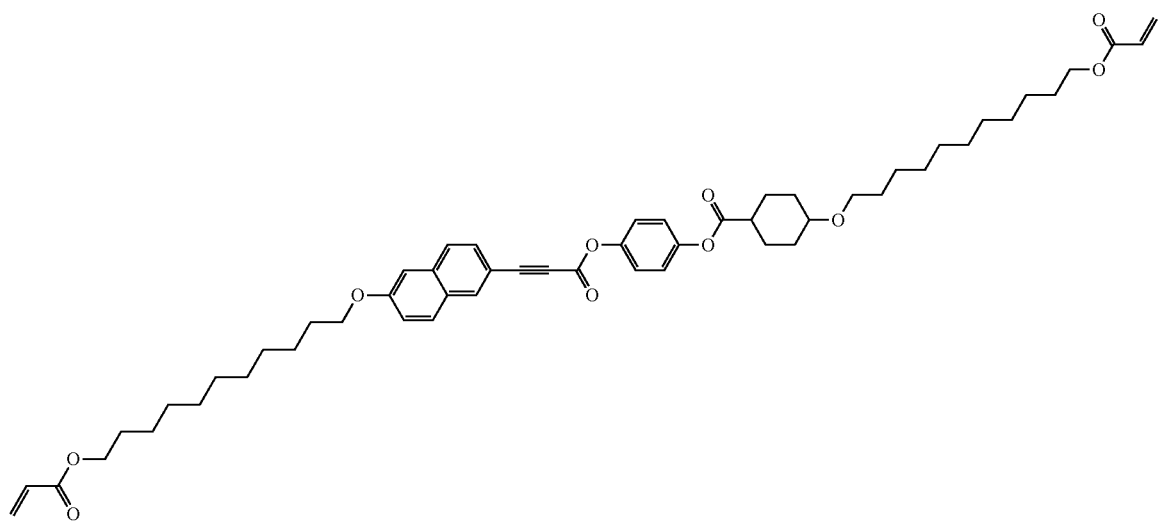
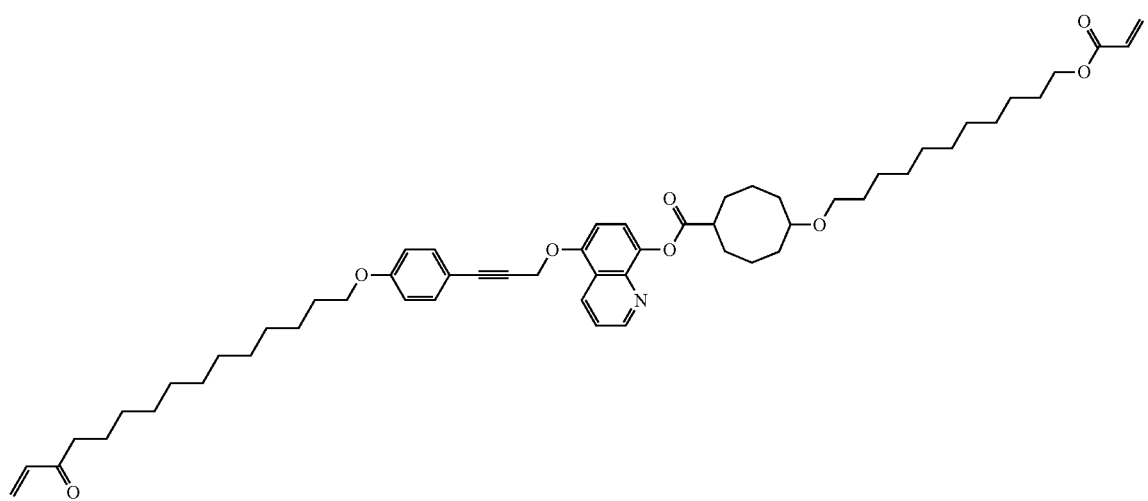

[Chem. 20]
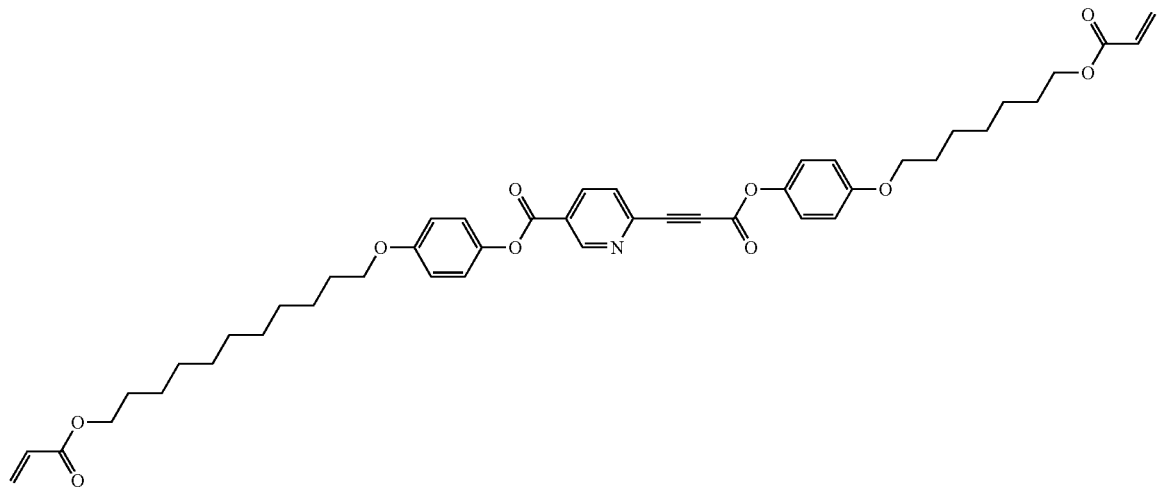
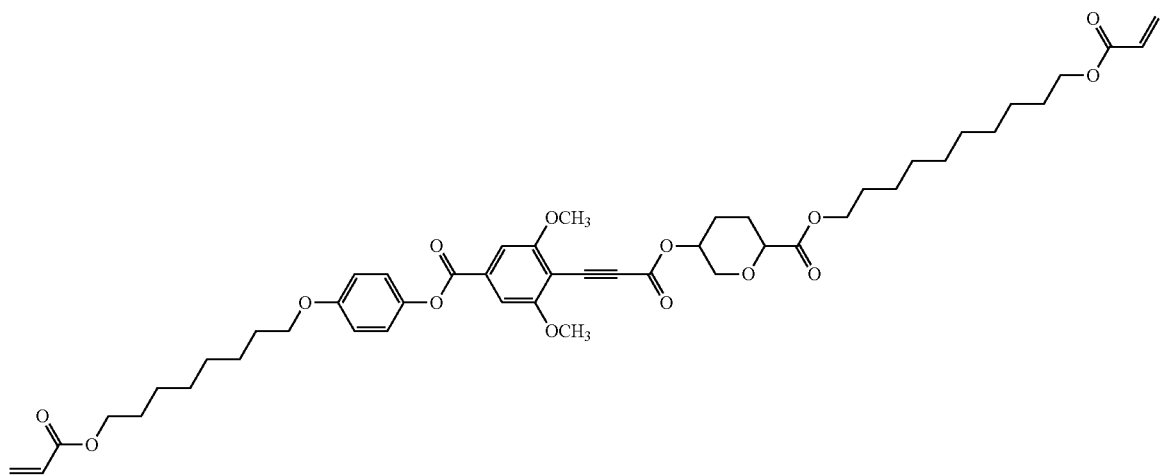
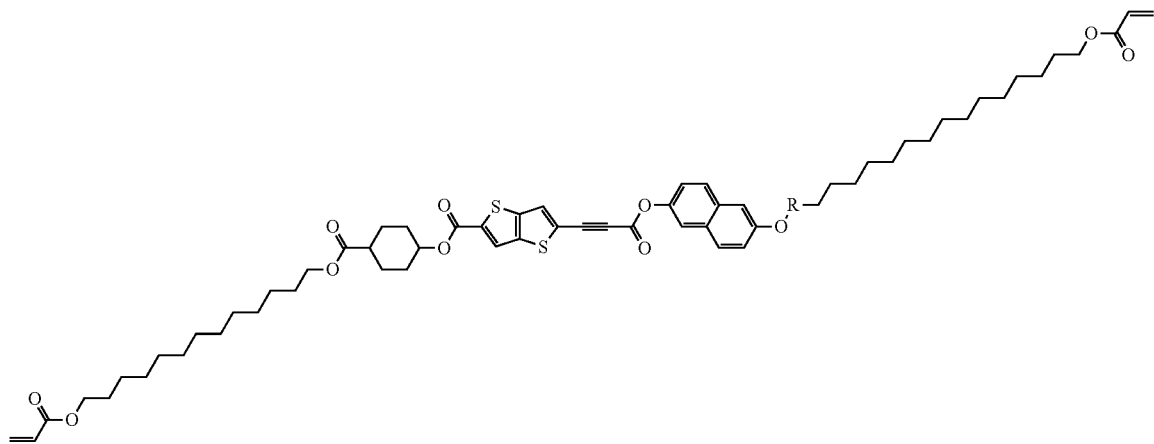

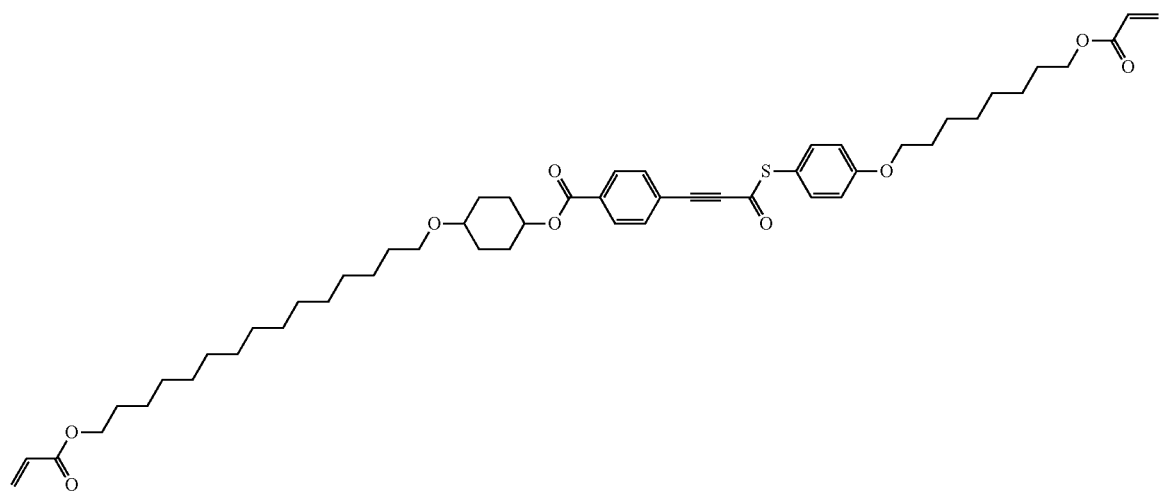
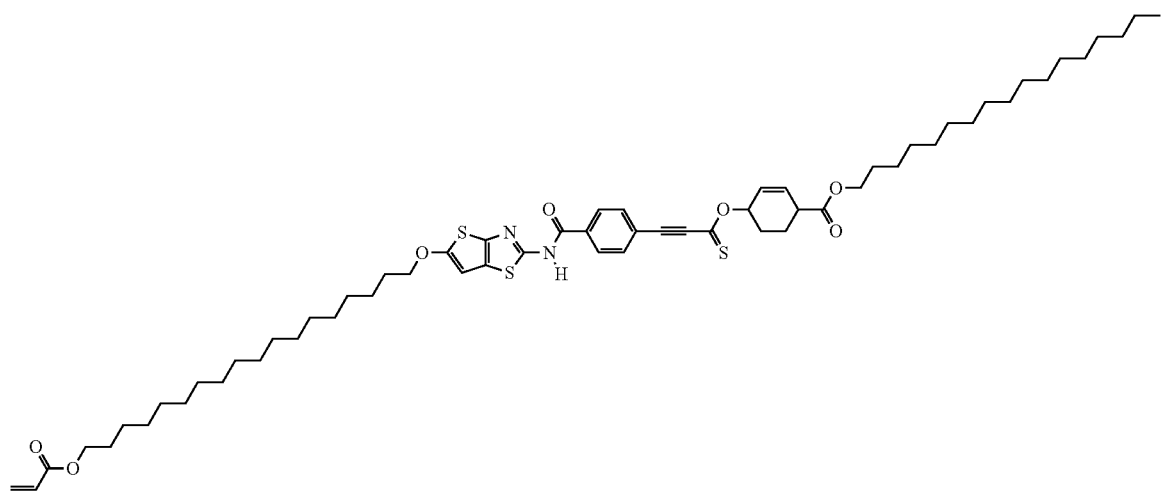
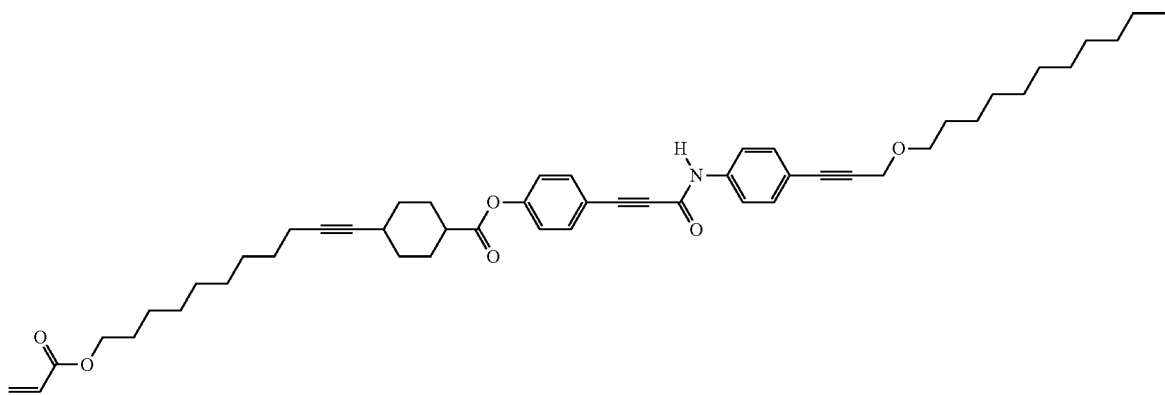

[Chem. 21]
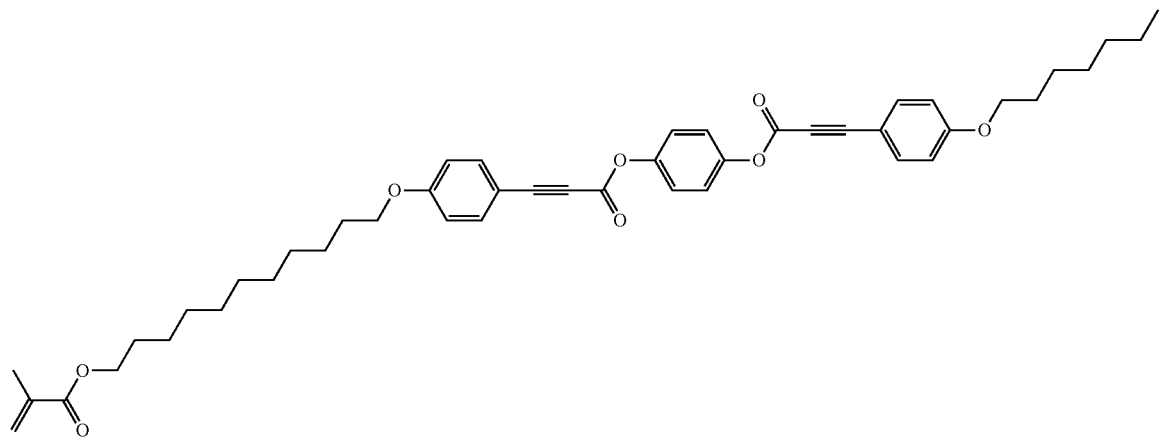
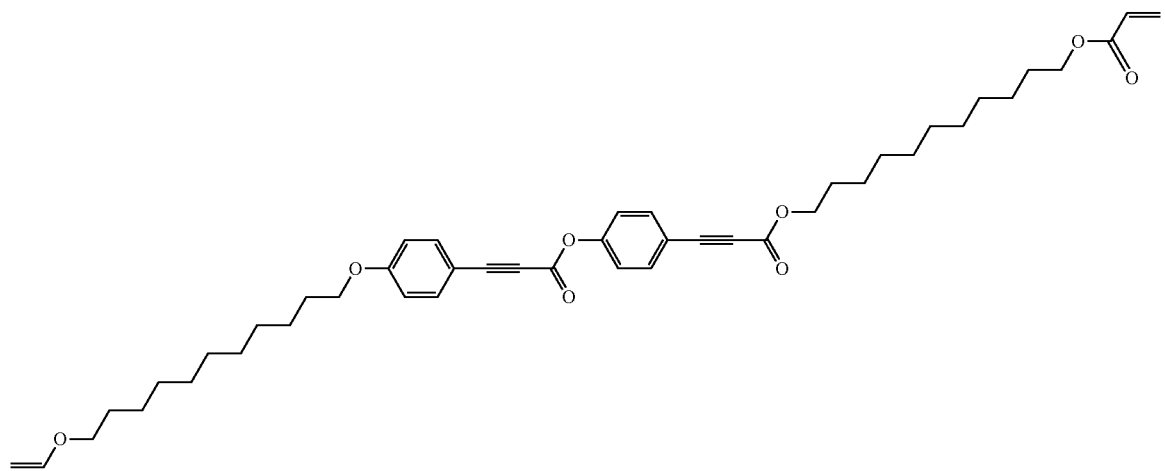
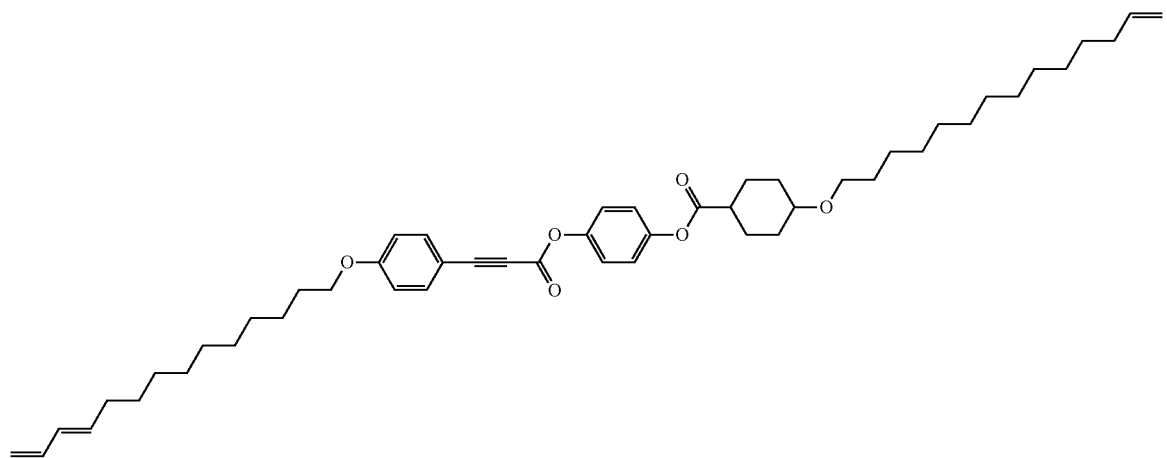

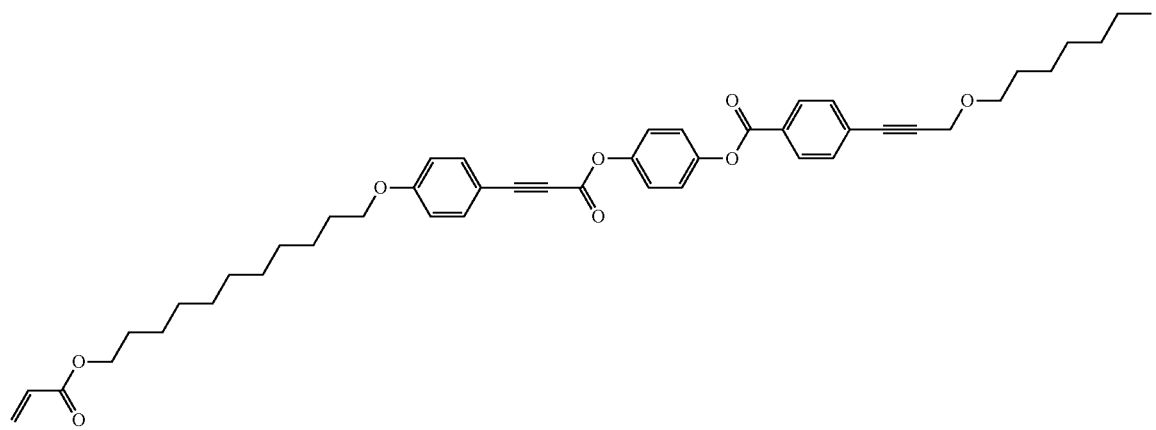
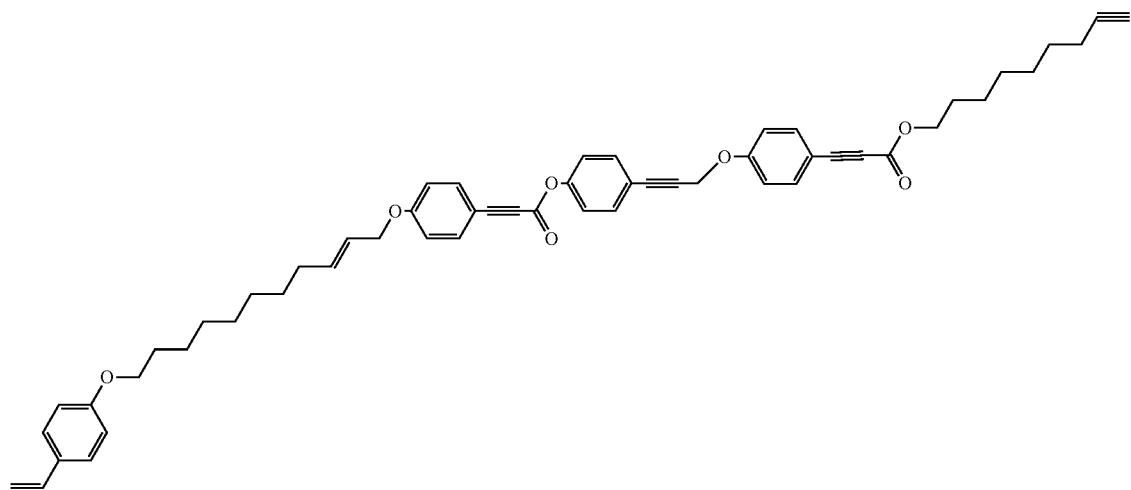
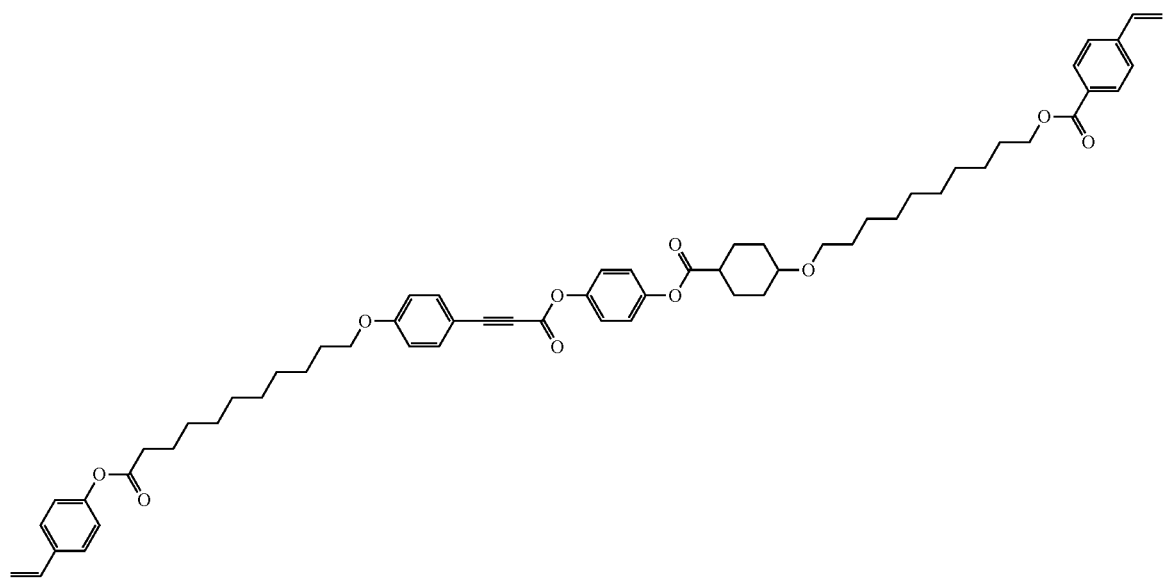

[Chem. 22]
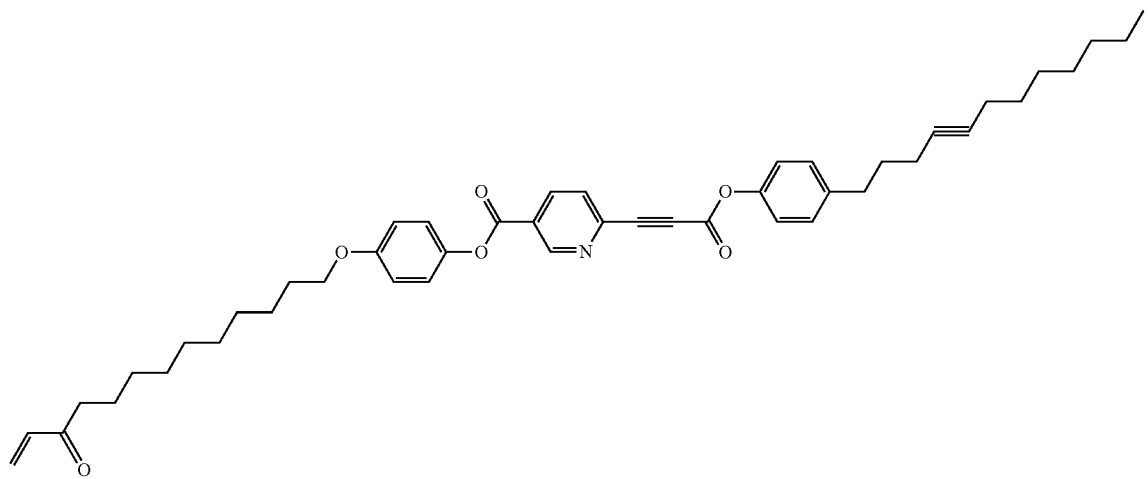
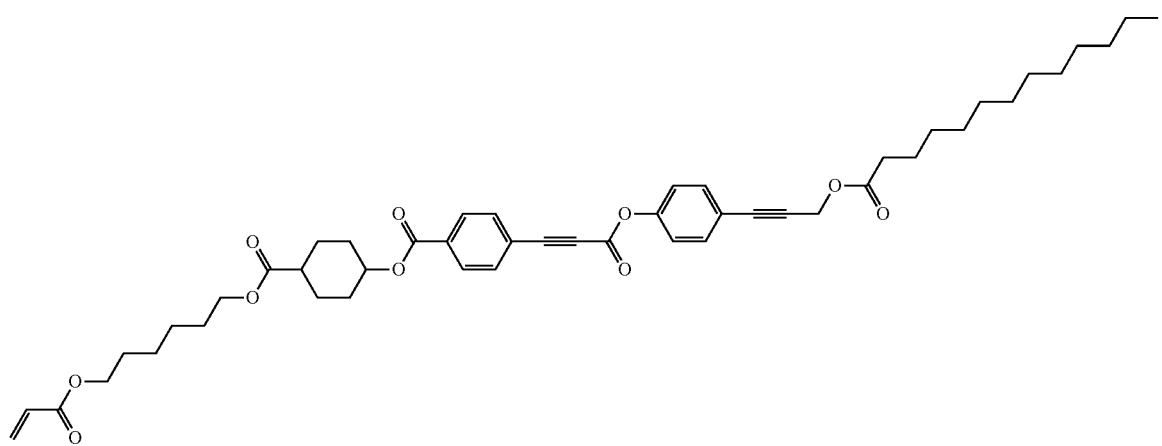
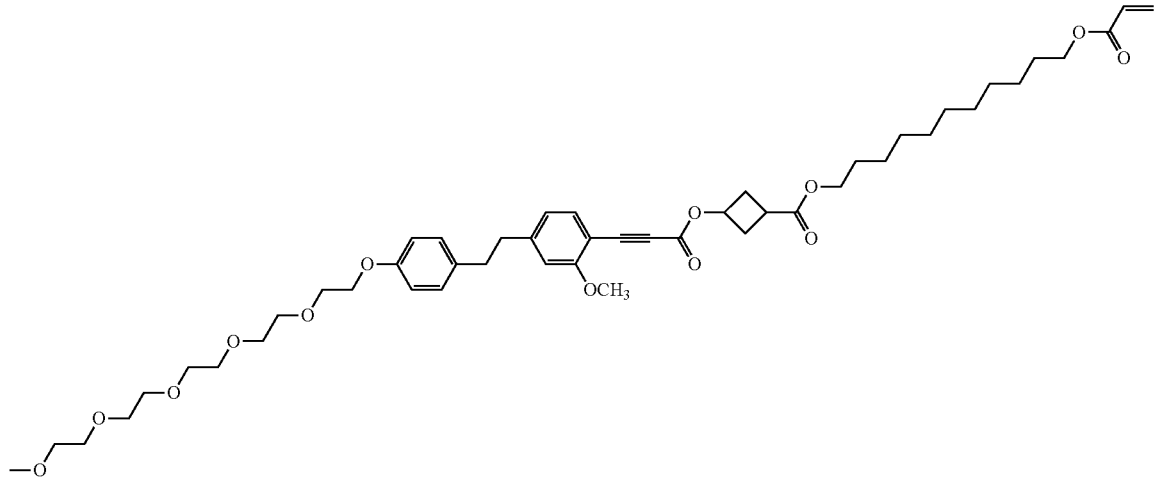

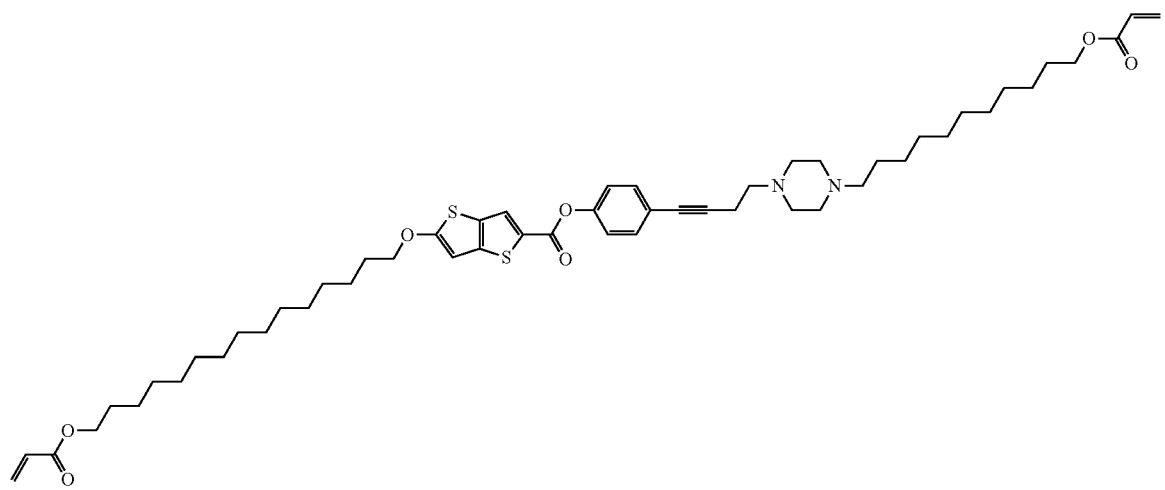
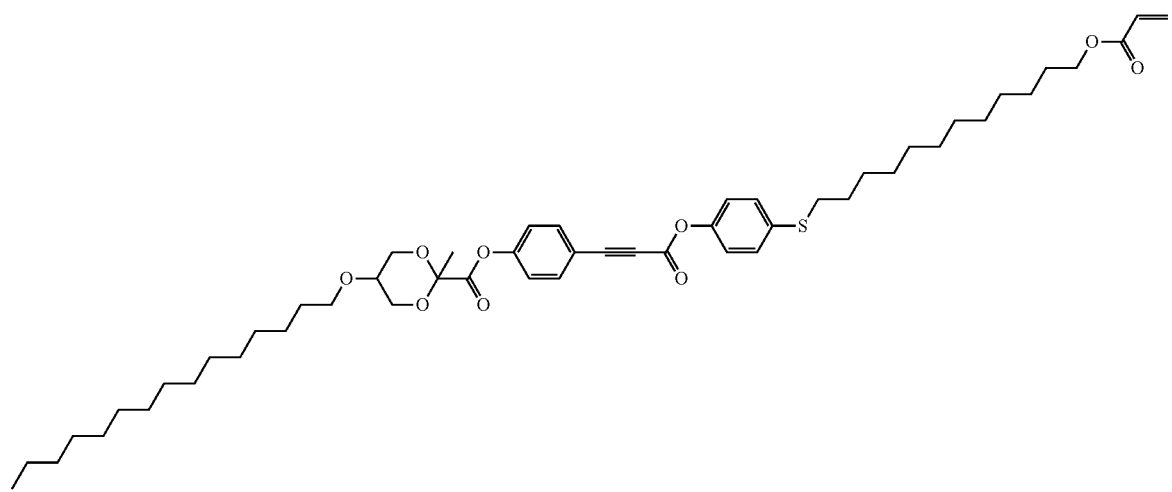
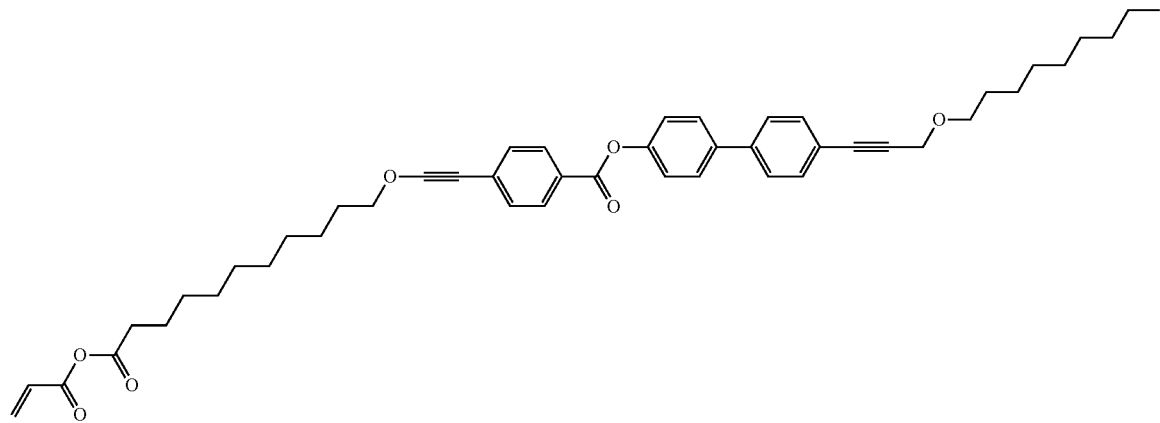

[Chem. 23]
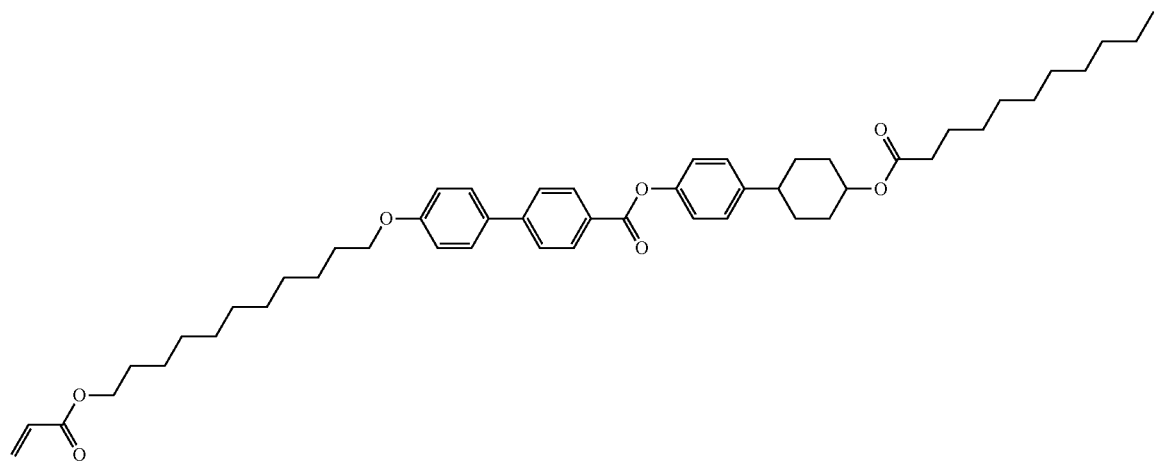
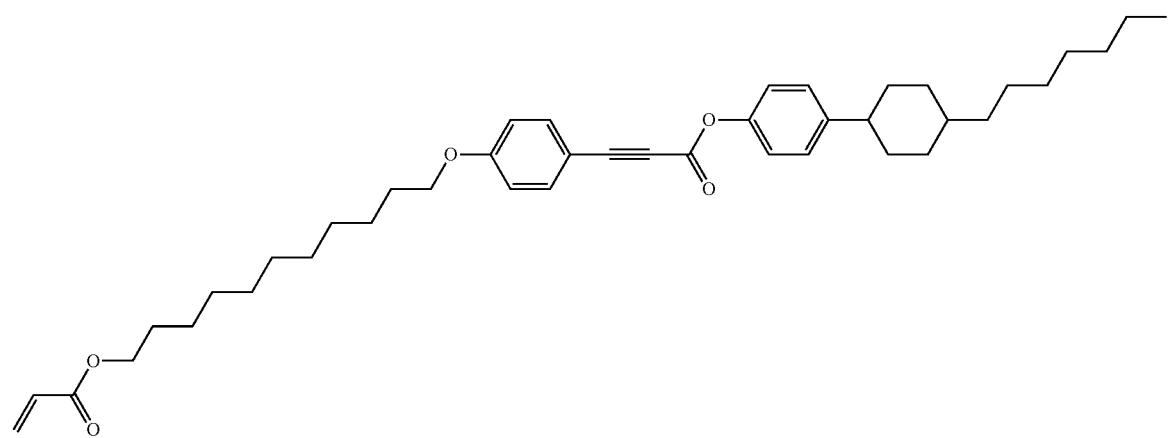
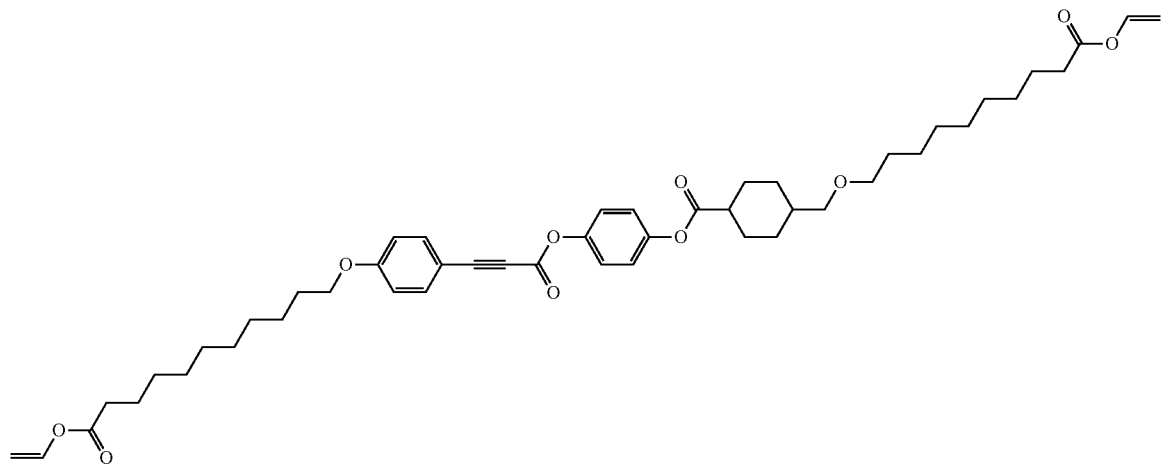

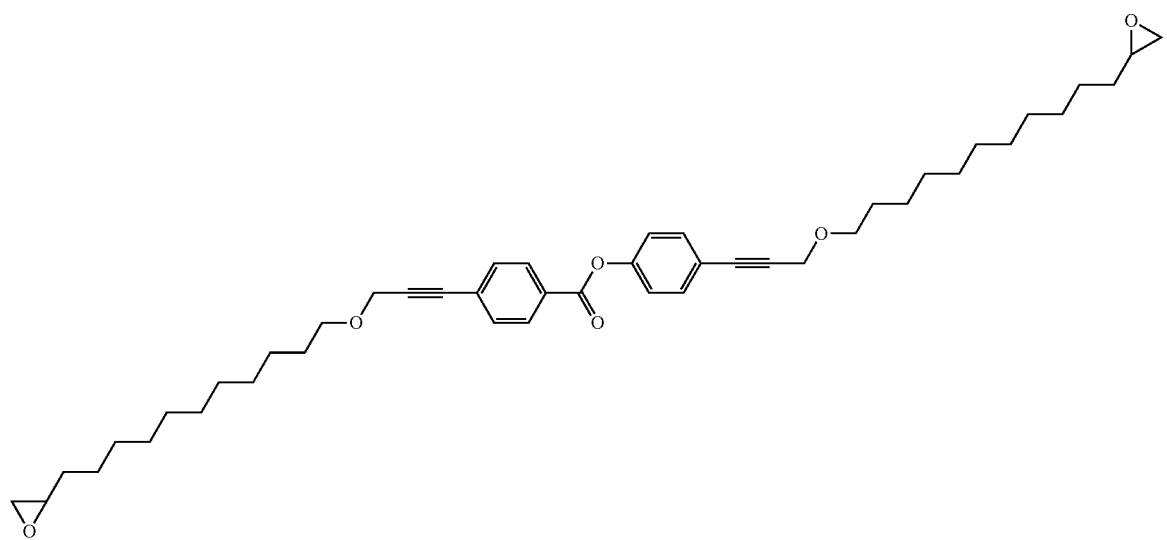
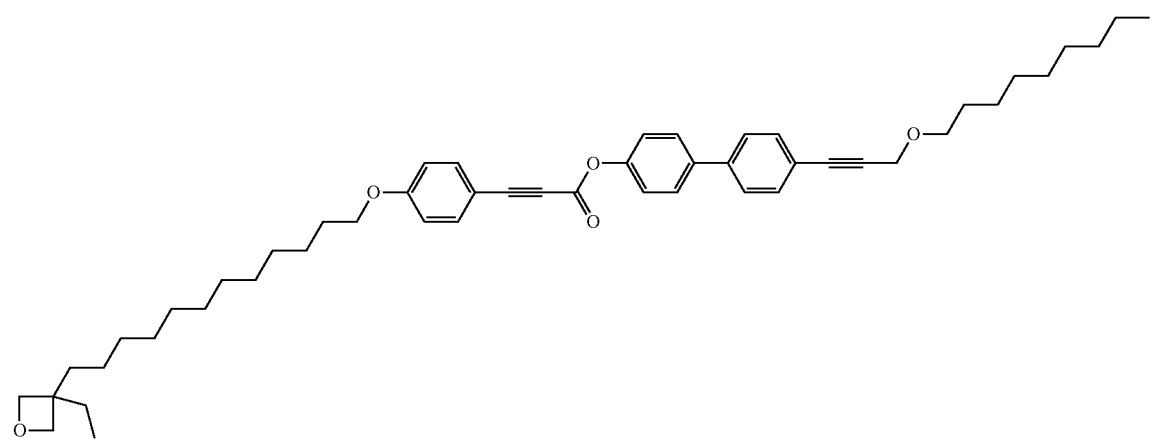
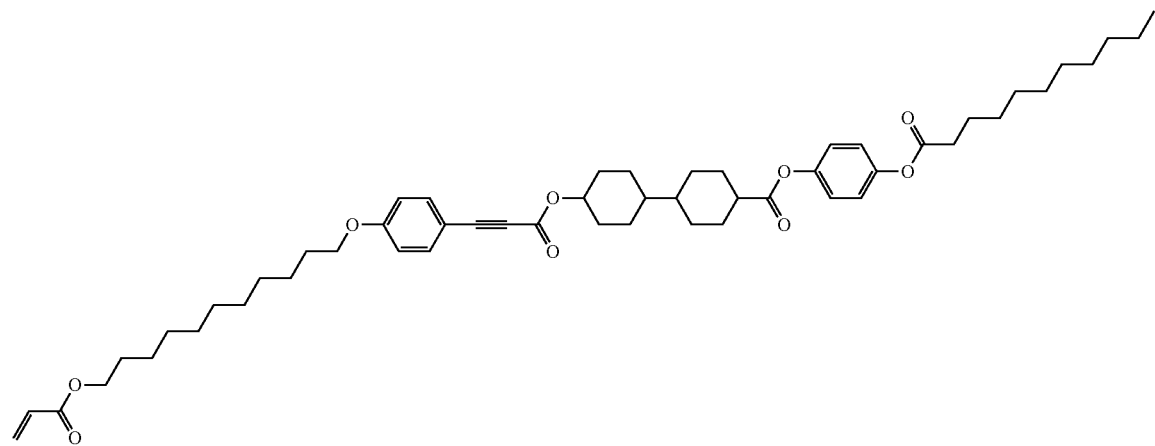

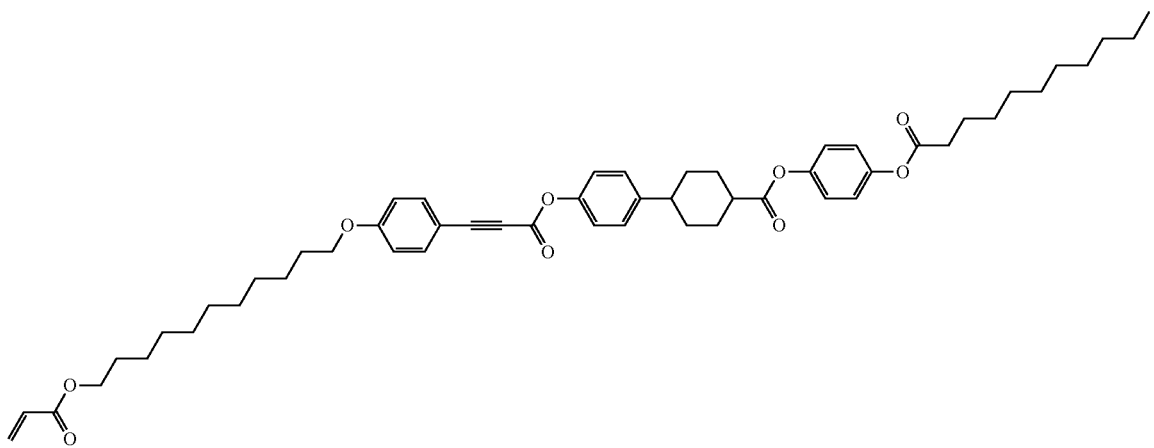
[Chem. 24]
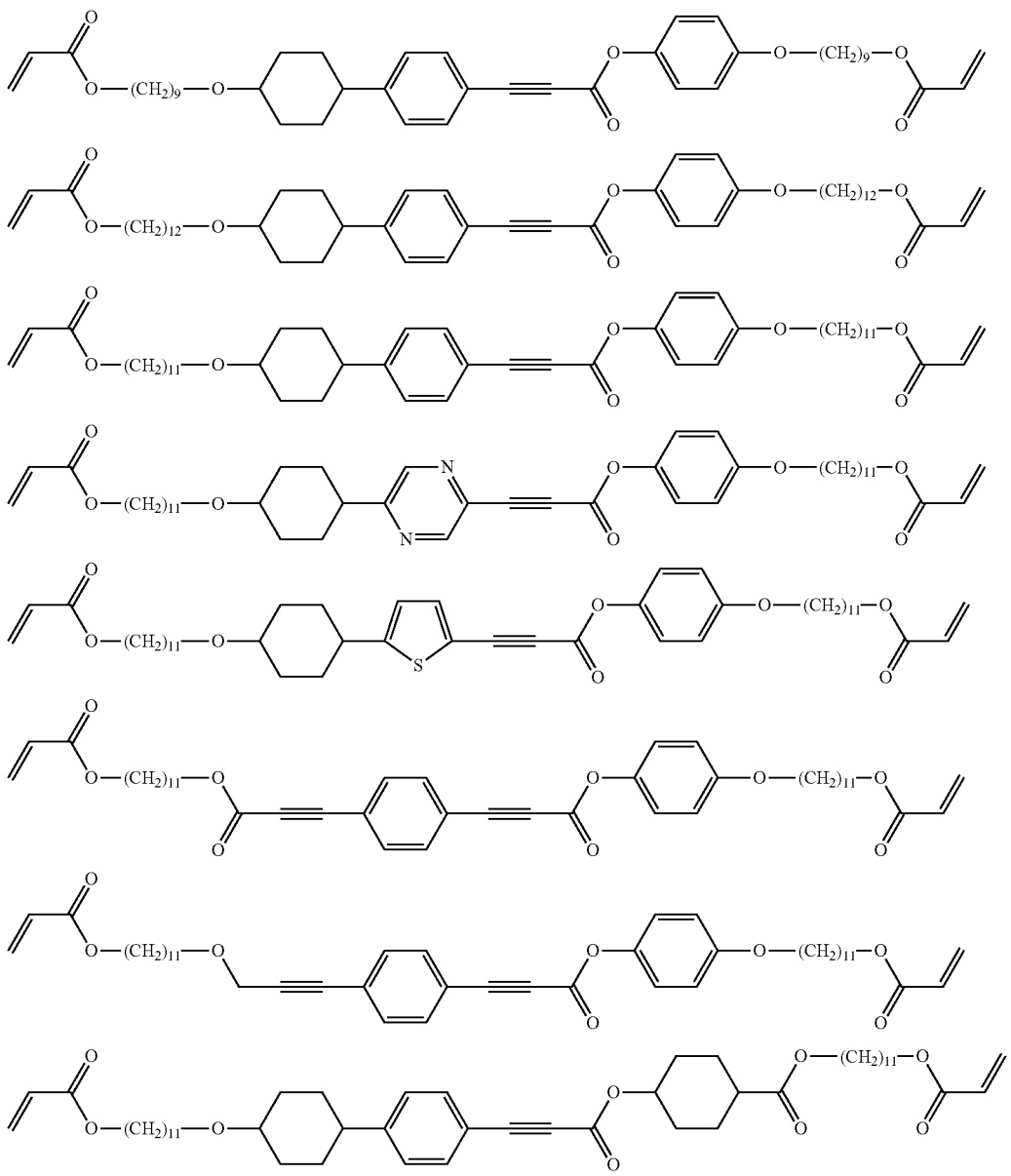

-continued
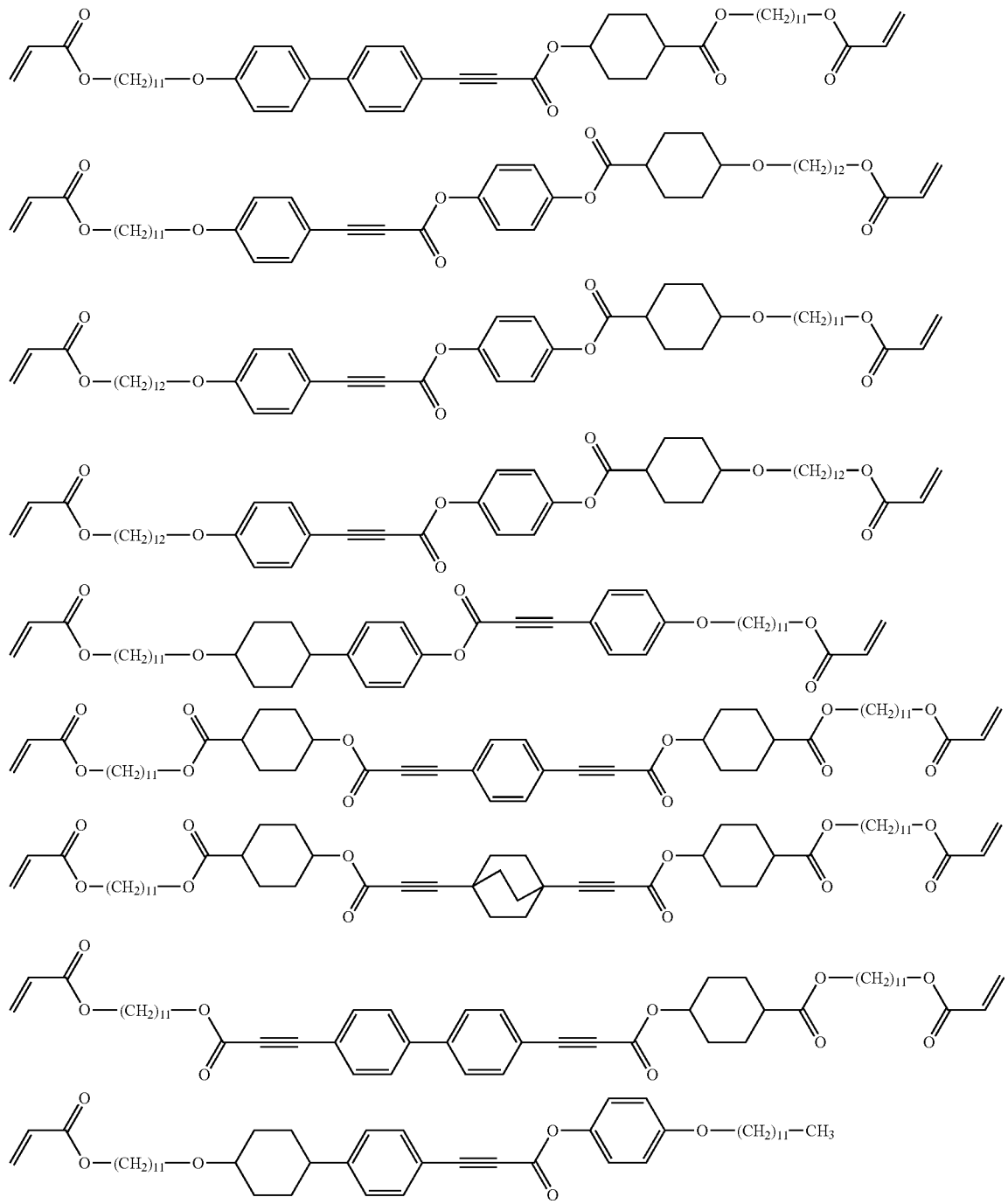

(Content of Liquid Crystal Compound)

The liquid crystal compound included in the anisotropic dye film-forming composition according to the present invention preferably includes the polymerizable liquid crystal compound (2). The anisotropic dye film-forming composition according to the present invention may include only one type of the polymerizable liquid crystal compound alone and may include two or more types of the polymerizable liquid crystal compounds in any combination at any ratio.

The content of the liquid crystal compound in the composition for anisotropic dye films according to the present invention (when two or more types of liquid crystal compounds are used in combination, the total content of the liquid crystal compounds) is preferably 50 parts by mass or more, is more preferably 55 parts by mass or more, is preferably 99 parts by mass or less, and is more preferably 98 parts by mass or less relative to the solid content (100 parts by mass) in the composition for anisotropic dye films. When the content of the liquid crystal compound in the composition for anisotropic dye films is equal to or more than the above lower limit and equal to or less than the above upper limit, the alignment of the liquid crystal molecules is likely to be enhanced.

The composition for anisotropic dye films according to the present invention may include one or more types of polymerizable or nonpolymerizable liquid crystal compounds other than the polymerizable liquid crystal compound (2). In order to produce the advantageous effects of the present invention with further effect by using the polymerizable liquid crystal compound (2), the proportion of the amount of the polymerizable liquid crystal compound (2) to the total amount (100% by mass) of the liquid crystal compounds included in the composition for anisotropic dye films according to the present invention is preferably 5% by mass or more, is more preferably 10% by mass or more, and is particularly preferably 15% to 100% by mass.

(Isotropic Phase Appearance Temperature)

The isotropic phase appearance temperature of the polymerizable liquid crystal compound included in the anisotropic dye film-forming composition according to the present invention is preferably 160° C. or less, is more preferably 140° C. or less, is further preferably 115° C. or less, is still further preferably 110° C. or less, and is particularly preferably 105° C. or less from a process viewpoint.

Note that the term "isotropic phase appearance temperature" used herein refers to the temperature at which a phase transition from liquid crystal to liquid or a phase transition from liquid to liquid crystal occurs. In the present invention, it is preferable that at least one of the above phase transition temperatures be equal to or less than the above upper limit, and it is more preferable that both of the above phase transition temperatures be equal to or less than the above upper limit.

(Method for Producing Polymerizable Liquid Crystal Compound)

The polymerizable liquid crystal compound included in the anisotropic dye film-forming composition according to the present invention can be produced by using publicly known chemical reactions, such as an alkylation reaction, an esterification reaction, an amidation reaction, an etherification reaction, an ipso substitution reaction, and a coupling reaction with a metal catalyst, in a combined manner.

For example, the polymerizable liquid crystal compound included in the anisotropic dye film-forming composition according to the present invention can be synthesized in accordance with the method described in Examples below and the method described in Pages 449 to 468 of "Liquid Crystal Handbook" (Maruzen Co., Ltd., published on October 30, Heisei 12 (2000)).

(Relationship Between Polymerizable Liquid Crystal Compound and Compound According to Present Invention)

In order to readily enhance the alignment of the anisotropic dye film produced using the anisotropic dye film-forming composition, in the anisotropic dye film-forming composition, the difference in molecular length between the polymerizable liquid crystal compound and the dye is preferably small because, in such a case, the intermolecular interaction between liquid crystal molecules and dye molecules is strong and the dye molecules are unlikely to inhibit the association of the liquid crystal molecules.

Thus, in the anisotropic dye film-forming composition according to the present invention, the ratio $(r_{n1}/r_{n2})$ of the number $(r_{n1})$ of the ring structures of the polymerizable liquid crystal compound included in the anisotropic dye film-forming composition to the number $(r_{n2})$ of the ring structures of the compound according to the present invention included in the anisotropic dye film-forming composition is preferably 0.7 to 1.5.

Note that a condensed ring consisting of two or more rings condensed to one another is considered as one ring structure.

The number $(r_{n2})$ of the ring structures included in the compound (1) represented by Formula (1) is the total of the numbers of $A^1$, $A^2$, and $A^3$ of Formula (1). Specifically, when n is 1, $r_{n2}$ is 3; when n is 2, $r_{n2}$ is 4; and when n is 3, $r_{n2}$ is 5.

Note that, even when —Y is a cyclic functional group, such as a pyrrolidinyl group or a piperidinyl group, the ring structure included in —Y is not taken into the calculation of the number $(r_2)$ of the ring structures included in the compound (1) represented by Formula (1).

The number $(r_2)$ of the ring structures included in the compound (11) represented by Formula (11) is the total of the numbers of $A^{41}$, $A^{42}$, and $A^{43}$ of Formula (11). Specifically, when n is 1, $r_{n2}$ is 3; when n is 2, $r_{n2}$ is 4; and when n is 3, $r_{n2}$ is 5.

Note that, even when —Y is a cyclic functional group, such as a pyrrolidinyl group or a piperidinyl group, the ring structure included in —Y is not taken into the calculation of the number $(r_2)$ of the ring structures included in the compound (11) represented by Formula (11).

The number $(r_2)$ of the ring structures included in the compound (21) represented by Formula (21) is the total of the numbers of $A^{21}$, $A^{22}$, and $A^{23}$ of Formula (21). Specifically, when n is 1, $r_{n2}$ is 3; when n is 2, $r_{n2}$ is 4; and when n is 3, $r_{n2}$ is 5.

Note that, even when —Y is a cyclic functional group, such as a pyrrolidinyl group or a piperidinyl group, the ring structure included in —Y is not taken into the calculation of the number $(r_{n2})$ of the ring structures included in the compound (21) represented by Formula (21).

The number $(r_{n2})$ of the ring structures included in the compound (31) represented by Formula (31) is the total of the numbers of $-A^{31}$-, $-A^{32}$-, and $-A^{33}$- of Formula (31). Specifically, when n is 1, $r_{n2}$ is 3; when n is 2, $r_{n2}$ is 4; and when n is 3, $r_{n2}$ is 5.

Note that, even when —Y is a cyclic functional group, such as a pyrrolidinyl group or a piperidinyl group, the ring structure included in —Y is not taken into the calculation of the number $(r_{n2})$ of the ring structures included in the compound (31).

More specifically, when n is 1, $r_{n2}$ is 3 and $r_{n1}$ is preferably 3 or 4; when n is 2, $r_{n2}$ is 4 and $r_{n1}$ is preferably 3, 4, 5, or 6; and when n is 3, $r_{n2}$ is 5 and $r_{n1}$ is preferably 4, 5, 6, or 7 because, in such a case, the ratio ($r_{n1}/r_{n2}$) of the number ($r_{n1}$) of the ring structures of the polymerizable liquid crystal compound included in the anisotropic dye film-forming composition to the number ($r_{n2}$) of the ring structures of the compound according to the present invention included in the anisotropic dye film-forming composition is 0.7 to 1.5.

Note that the ring structures (e.g., an oxirane ring or an oxetane ring) included in the polymerizable group of the polymerizable liquid crystal compound are not taken into the calculation of the number ($r_{n1}$) of the ring structures of the polymerizable liquid crystal compound included in the anisotropic dye film-forming composition.

<Polymerization Initiator>

The anisotropic dye film-forming composition according to the present invention may include a polymerization initiator as needed.

The polymerization initiator is a compound capable of initiating the polymerization reaction of the polymerizable liquid crystal compound. The polymerization initiator is preferably a photopolymerization initiator that generates active radicals upon receiving light.

Examples of usable polymerization initiators include titanocene derivatives; biimidazole derivatives; halomethylated oxadiazole derivatives; halomethyl-s-triazine derivatives; alkylphenone derivatives; oxime ester derivatives; benzophenone derivatives; acylphosphineoxide derivatives; iodonium salts; sulfonium salts; anthraquinone derivatives; acetophenone derivatives; thioxanthone derivatives; benzoic acid ester derivatives; acridine derivatives; phenazine derivatives; anthrone derivatives and the like.

Among these photopolymerization initiators, alkylphenone derivatives, oxime ester derivatives, biimidazole derivatives, acetophenone derivatives, and thioxanthone derivatives are more preferable.

Specifically, the titanocene derivatives include dicyclopentadienyl titanium dichloride, dicyclopentadienyl titanium bisphenyl, dicyclopentadienyl titanium bis(2,3,4,5,6-pentafluorophenyl-1-yl), dicyclopentadienyl titanium bis(2,3,5,6-tetrafluorophenyl-1-yl), dicyclopentadienyl titanium bis(2,4,6-trifluorophenyl-1-yl), dicyclopentadienyl titanium di(2,6-difluorophenyl-1-yl), dicyclopentadienyl titanium di(2,4-difluorophenyl-1-yl), di(methylcyclopentadienyl) titanium bis (2,3,4,5,6-pentafluorophenyl-1-yl), di(methylcyclopentadienyl) titanium bis(2,6-difluorophenyl-1-yl), dicyclopentadienyl titanium [2,6-di-fluoro-3-(pyro-1-yl)-phenyl-1-yl] and the like.

Examples of biimidazole derivatives include 2-(2'-chlorophenyl)-4,5-diphenylimidazole dimer, 2-(2'-chlorophenyl)-4,5-bis(3'-methoxyphenyl)imidazole dimer, 2-(2'-fluorophenyl)-4,5-diphenylimidazole dimer, 2-(2'-methoxyphenyl)-4,5-diphenylimidazole dimer, (4'-methoxyphenyl)-4,5-diphenylimidazole dimer and the like.

Examples of halomethylated oxadiazole derivatives include 2-trichloromethyl-5-(2'-benzofuryl)-1,3,4-oxadiazole, 2-trichloromethyl-5-[β-(2'-benzofuryl)vinyl]-1,3,4-oxadiazole, 2-trichloromethyl-5-[β-(2'-(6"-benzofuryl)vinyl)]-1,3,4-oxadiazole, 2-trichloromethyl-5-furyl-1,3,4-oxadiazole and the like.

Examples of halomethyl-s-triazine derivatives include 2-(4-methoxyphenyl)-4,6-bis(trichloromethyl)-s-triazine, 2-(4-methoxynaphthyl)-4,6-bis(trichloromethyl)-s-triazine, 2-(4-ethoxynaphthyl)-4,6-bis(trichloromethyl)-s-triazine, 2-(4-ethoxycarbonylnaphthyl)-4,6-bis(trichloromethyl)-s-triazines and the like.

Examples of alkylphenone derivatives include diethoxyacetophenone, 2-methyl-1-[4-(methylthio)phenyl]-2-morpholinopropan-1-one, 2-benzyl-2-dimethylamino-1-(4-morpholinophenyl)-butanone-1,2-benzyl-2-dimethylamino-1-(4-morpholinophenyl)butan-1-one, 4-dimethylaminoethylbenzoate, 4-dimethylaminoisoamylbenzoate 4-diethylaminoacetophenone, 4-dimethylaminopropiophenone, 2-ethylhexyl-1,4-dimethylaminobenzoate, 2,5-bis(4-diethylaminobenzal)cyclohexanone, 7-diethylamino-3-(4-diethylaminobenzoyl)coumarin, 4-(diethylamino)chalcone and the like.

Examples of oxime ester derivatives include 2-(benzoyloxyimino)-1-[4-(phenylthio)phenyl]-1-octanone, 0-acetyl-1-[6-(2-methylbenzoyl)-9-ethyl-9H-carbazol-3-yl]ethanone oxime, oxime ester derivatives described in JP2000-80068A, JP2006-36750A, WO2009/131189, etc.

Examples of benzoins include benzoin, benzoin methyl ether, benzoin phenyl ether, benzoin isobutyl ether, benzoin isopropyl ether and the like.

Examples of benzophenone derivatives include benzophenone, Michler's ketone, 2-methylbenzophenone, 3-methylbenzophenone, 4-methylbenzophenone, 2-chlorobenzophenone, 4-bromobenzophenone, 2-carboxybenzophenone, o-benzoylmethyl benzoate, 4-phenylbenzophenone, 4-benzoyl-4'-methyldiphenylsulfide, 3,3',4,4'-tetra(tert-butylperoxycarbonyl)benzophenone, 2,4,6-trimethylbenzophenone and the like.

Examples of acylphosphine oxide derivatives include 2,4,6-trimethylbenzoyldiphenylphosphine oxide, bis-(2,6-dimethoxybenzoyl)-2,4,4-trimethylpentylphosphine oxide bis(2,4,6-trimethylbenzoyl)phenylphosphine oxide and the like.

Examples of iodonium salts include diphenyliodonium.tetrakis(pentafluorophenyl)borate, diphenyliodonium.hexafluorophosphate, diphenyliodonium.hexafluoroantimonate, di(4-nonylphenyl) iodonium hexafluorophosphate and the like.

Examples of sulfonium salts include triphenylsulfonium.hexafluorophosphate, triphenylsulfonium.hexafluoroantimonate, triphenylsulfonium.tetrakis(pentafluorophenyl)borate, diphenyl[4-(phenylthio)phenyl]sulfonium hexafluorophosphate, 4,4'-bis[diphenylsulfonio]diphenylsulfide.bishexafluorophosphate, 4,4'-bis[di(β-hydroxyethoxy)phenylsulfonio]diphenylsulfide.bishexafluoroantimonate, 4,4'-bis[di(β-hydroxyethoxy)phenylsulfonio]diphenylsulfide.bishexafluorophosphate, 7-[di(p-toluyl)sulfonio]-2-isopropylthioxanthone.hexafluoroantimonate, 7-[di(p-toluyl)sulfonio]-2-isopropylthioxanthone.tetrakis(pentafluorophenyl)borate, 4-phenylcarbonyl-4'-diphenylsulfonio-diphenyl sulfide.hexafluorophosphate, 4-(p-tert-butylphenylcarbonyl)-4'-diphenylsulfonio-diphenyl sulfide hexafluoroantimonate, 4-(p-tert-butylphenyl carbonyl)-4'-di(p-toluyl)sulfonio-diphenylsulfide.tetrakis(pentafluorophenyl)borate and the like.

Examples of anthraquinone derivatives include 2-methylanthraquinone, 2-ethylanthraquinone, 2-t-butylanthraquinone, 1-chloroanthraquinone and the like.

Examples of acetophenone derivatives include 2,2-dimethoxy-2-phenylacetophenone, 2,2-diethoxyacetophenone, 1-hydroxycyclohexylphenylketone, α-hydroxy-2-methylphenylpropanone, 1-hydroxy-1-methylethyl-(p-isopropylphenyl)ketone, 1-hydroxy-1-(p-dodecylphenyl)ketone, 2-methyl-(4'-methylthiophenyl)-2-morpholino-1-propanone, 1,1,1-trichloromethyl-(p-butylphenyl)ketone and the like.

Examples of thioxanthone derivatives include thioxanthone, 2-ethylthioxanthone, 2-isopropylthioxanthone, 2-chlorothioxanthone, 2,4-dimethylthioxanthone, 2,4-diethylthioxanthone, 2,4-diisopropylthioxanthone and the like.

Examples of benzoic acid ester derivatives include p-dimethylaminoethyl benzoate, p-diethylaminoethyl benzoate and the like.

Examples of acridine derivatives include 9-phenylacridine, 9-(p-methoxyphenyl)acridine and the like.

Examples of phenazine derivatives include 9,10-dimethylbenzphenazine and the like.

Examples of anthrone derivatives include benzanthrone and the like.

The polymerization initiator may be used alone or in combination of two or more.

The polymerization initiator may also be a commercial product.

Examples of the commercial product include IRGACURE (registered trademark, the same applies hereinafter) 250, IRGACURE 651, IRGACURE 184, DAROCURE 1173, IRGACURE 2959, IRGACURE 127, IRGACURE 907, IRGACURE 369, IRGACURE 379EG, LUCIRIN TPO, IRGACURE 819, IRGACURE 784, OXE-01, and OXE-02 (the above are produced by BASF SE); SEIKUOL (registered trademark) BZ, Z, and BEE (produced by Seiko Chemical Co., Ltd.); KAYACURE (registered trademark) BP100 and UVI-6992 (produced by The Dow Chemical Company); ADEKA OPTOMER SP-152 and SP-170 (produced by ADEKA CORPORATION); TAZ-A and TAZ-PP (produced by Nihon Siber Hegner K.K.); TAZ-104 (produced by Sanwa Chemical Co., Ltd.); and TRONLYTR-PBG-304, TRONLYTR-PBG-309, TRONLYTR-PBG-305, and TRONLYTR-PBG-314 (produced by Changzhou Tronly New Electronic Materials Co., Ltd.).

In the case where the anisotropic dye film-forming composition according to the present invention includes the polymerization initiator, the content of the polymerization initiator in the anisotropic dye film-forming composition according to the present invention is commonly 0.1 to 30 parts by mass, is preferably 0.5 to 10 parts by mass, and is more preferably 0.5 to 8 parts by mass relative to 100 parts by mass of the polymerizable liquid crystal compound because, in such a case, the alignment of the polymerizable liquid crystal compound is unlikely to be disturbed.

The polymerization initiator may be used in combination with a polymerization accelerator as needed. Examples of the polymerization accelerator used include N,N-dialkylaminobenzoic acid alkyl esters, such as an N,N-dimethylaminobenzoic acid ethyl ester; mercapto compounds having a heterocyclic ring, such as 2-mercaptobenzothiazole, 2-mercaptobenzoxazole, and 2-mercaptobenzimidazole; and mercapto compounds, such as an aliphatic polyfunctional mercapto compound.

The above polymerization accelerators may also be used alone or in combination of two or more.

As needed, a sensitizing dye may be used in combination with the polymerization initiator in order to enhance sensitivity. The sensitizing dye is selected appropriately in accordance with the wavelength of the exposure light source used. Examples thereof include the xanthene dyes described in, for example, JP-H4-221958A and JP-H4-219756A; the coumarin dyes having a heterocyclic ring which are described in, for example, JP-H3-239703A and JP-H5-289335A; 3-ketocoumarin dyes described in, for example, JP-H3-239703A and JP-H5-289335A; pyrromethene dyes described in, for example, JP-H6-19240A; and dyes having a dialkylaminobenzene skeleton described in, for example, JP-S47-2528A, JP-S54-155292 A, JP-S45-37377A, JP-S48-84183A, JP-S52-112681A, JP-S58-15503A, JP-S60-88005A, JP-S59-56403A, JP-H2-69A, JP-S57-168088A, JP-H5-107761A, JP-H5-210240A, and JP-H4-288818A. The above sensitizing dyes may also be used alone or in combination of two or more.

<Solvent>

The anisotropic dye film-forming composition according to the present invention may include a solvent as needed.

The solvent that may be included in the anisotropic dye film-forming composition according to the present invention is not limited and may be any solvent that enables a dye or another additive to be dispersed or dissolved in the polymerizable liquid crystal compound to a sufficient degree. Examples thereof include alcohol solvents, such as methanol, ethanol, ethylene glycol, isopropyl alcohol, propylene glycol, ethylene glycol methyl ether, ethylene glycol butyl ether, and propylene glycol monomethyl ether; ester solvents, such as ethyl acetate, butyl acetate, ethylene glycol methyl ether acetate, γ-butyrolactone, propylene glycol methyl ether acetate, and ethyl lactate; ketone solvents, such as acetone, methyl ethyl ketone, cyclopentanone, cyclohexanone, 2-heptanone, and methyl isobutyl ketone; aliphatic hydrocarbon solvents, such as pentane, hexane, and heptane; aromatic hydrocarbons solvents, such as toluene and xylene; nitrile solvents, such as acetonitrile; ether solvents, such as tetrahydrofuran, dimethoxyethane, ethylene glycol dimethyl ether, and ethylene glycol diethyl ether; fluorine-containing solvents, such as perfluorobenzene, perfluorotoluene, perfluorodecalin, perfluoromethylcyclohexane, and hexafluoro-2-propanol; and chlorine-containing solvents, such as chloroform, dichloromethane, chlorobenzene, and dichlorobenzene.

The above solvents may be used alone or in combination of two or more.

The solvent is preferably a solvent in which the polymerizable liquid crystal compound and the dye can be dissolved and is further preferably a solvent in which the polymerizable liquid crystal compound and the dye can be completely dissolved. The solvent is preferably a solvent inactive to a polymerization reaction of the polymerizable liquid crystal compound. The solvent is preferably a solvent having a boiling point of 50° C. to 200° C. in consideration of the application of the anisotropic dye film-forming composition according to the present invention which is described below.

In the case where the anisotropic dye film-forming composition according to the present invention includes a solvent, the proportion of the solvent included in the anisotropic dye film-forming composition is preferably 50% to 98% by mass of the total amount (100% by mass) of the composition according to the present invention. In other words, the solid content in the anisotropic dye film-forming composition according to the present invention is preferably 2% to 50% by mass.

When the solid content in the anisotropic dye film-forming composition is equal to or less than the upper limit, the viscosity of the anisotropic dye film-forming composition is not increased to an excessive degree. As a result, the resulting polarizing film may have a uniform thickness and inconsistencies in the polarizing film are likely to be reduced.

The solid content in the anisotropic dye film-forming composition according to the present invention can be determined in accordance with the thickness of the polarizing film that is to be produced.

The viscosity of the composition for anisotropic dye films according to the present invention is not limited and may be set such that a uniform film free of thickness inconsistency can be prepared by the coating method described below. In order to achieve uniform thickness over large area, productivity, such as coating speed, and in-plane uniformity in optical properties, the viscosity of the anisotropic dye film-forming composition according to the present invention is preferably 0.1 mPa·s or more and 500 mPa·s or less, is more preferably 100 mPa·s or less, and is further preferably 50 mPa·s or less.

<Other Additive>

The anisotropic dye film-forming composition according to the present invention may further include, as needed, as a component other than the dye or the polymerizable liquid crystal compound, in addition to the above-described polymerization initiator, etc., other additives, such as a polymerization inhibitor, a polymerization aid, a polymerizable non-liquid crystal compound, a surfactant, a leveling agent, a coupling agent, a pH-controlling agent, a dispersing agent, an antioxidant, organic and inorganic fillers, organic and inorganic nanosheets, organic and inorganic nanofibers, and metal oxides. The use of the above additives may enhance the coating properties, stability, and the like of the anisotropic dye film-forming composition according to the present invention and the stability of an anisotropic dye film produced using the anisotropic dye film-forming composition according to the present invention.

<Method for Producing Anisotropic Dye Film-Forming Composition>

The method for producing the composition for anisotropic dye films according to the present invention is not limited. For example, a dye including the compound according to the present invention, the polymerizable liquid crystal compound, and, as needed, the solvent, the other additives, and the like are mixed with one another. The resulting mixture is stirred and shaken at 0° C. to 80° C. to dissolve the dye. In the case where the dye is poorly soluble, a homogenizer, a bead mill, a disperser, or the like may be used optionally.

The method for producing the composition for anisotropic dye films according to the present invention may include a filtration step in order to remove foreign matter and the like included in the composition.

The composition that remains after the solvent has been removed from the anisotropic dye film-forming composition according to the present invention may be, but is not necessarily, in a liquid crystal state at predetermined temperatures and preferably exhibits liquid crystallinity at predetermined temperatures.

The isotropic phase appearance temperature of the composition that remains after the solvent has been removed from the anisotropic dye film-forming composition according to the present invention is preferably less than 160° C., is more preferably less than 140° C., is further preferably less than 115° C., is still further preferably less than 110° C., and is particularly preferably less than 105° C. in consideration of the coating process described below.

[Anisotropic Dye Film]

An anisotropic dye film according to the present invention is produced using the anisotropic dye film-forming composition according to the present invention. Thus, the anisotropic dye film according to the present invention includes a dye and one or both of the polymerizable liquid crystal compound and a polymer having a unit based on the polymerizable liquid crystal compound. The dye includes the compound according to the present invention.

The anisotropic dye film according to the present invention may include, as another component, a nonpolymerizable liquid crystal compound, a polymerization initiator, a polymerization inhibitor, a polymerization aid, a polymerizable non-liquid crystal compound, a nonpolymerizable non-liquid crystal compound, a surfactant, a leveling agent, a coupling agent, a pH-controlling agent, a dispersing agent, an antioxidant, organic and inorganic fillers, organic and inorganic nanosheets, organic and inorganic nanofibers, a metal oxide, and the like.

The anisotropic dye film according to the present invention may serve as a polarizing film used for producing linearly polarized light, circularly polarized light, elliptically polarized light, or the like through the use of anisotropy in light absorption. The anisotropic dye film according to the present invention may serve also as various types of anisotropic dye films having refractive anisotropy, conductive anisotropy, or the like by selecting the film formation process, the substrate, and the composition including organic compounds (dye and transparent material).

In the case where the anisotropic dye film according to the present invention is used as a polarizing element included in antireflection films for liquid crystal displays or OLEDs, the alignment properties of the anisotropic dye film can be expressed using a dichroic ratio. When the dichroic ratio is 8 or more, the anisotropic dye film can serve as a polarizing element. The dichroic ratio is preferably 15 or more, is more preferably 20 or more, is further preferably 25 or more, is particularly preferably 30 or more, and is most preferably 40 or more. The dichroic ratio of the anisotropic dye film is preferably maximized. When the dichroic ratio is equal to or more than the lower limit, the anisotropic dye film is useful as the optical element described below and, in particular, as a polarizing element.

In the case where the anisotropic dye film is used as a polarizing element included in an antireflection film for OLEDs, the properties of the antireflection film can be enhanced when the polarizing element has high performance, even if the performance of the peripheral materials, such as a phase difference film, is low. Therefore, when the polarizing element has high performance, the layer structure can be readily simplified and a sufficient degree of function can be readily produced even when the antireflection film has a thin-film structure. Furthermore, the antireflection film can be suitably used in an application in which the antireflection film is subjected to deformation, such as folding or bending, during use. In addition, the costs can be reduced to a low level.

The dichroic ratio (D) according to the present invention is represented by the following formula in the case where the dye is uniformly aligned.

$$D = Az/Ay$$

where $Az$ represents the absorbance observed when the direction in which the light incident on the anisotropic dye film is polarized is parallel to the direction in which the anisotropic dye is aligned, while $Ay$ represents the absorbance observed when the direction in which the light incident on the anisotropic dye film is polarized is perpendicular to the direction in which the anisotropic dye is aligned.

The absorbances ($Az$ and $Ay$) are not limited and any values measured at the same wavelength; various wavelengths may be selected depending on the intended purpose. In the case where the above absorbances express the degree of alignment of the anisotropic dye film, it is preferable to use a value corrected by luminosity within the specific wavelengths (350 to 800 nm) of the anisotropic dye film or a value measured at a local maximum absorption wavelength within a visible range.

The transmittance of the anisotropic dye film according to the present invention at the wavelengths of the intended purpose is preferably 25% or more, is further preferably 35% or more, and is particularly preferably 40% or more. In the case where the anisotropic dye film according to the present invention is used as a dye film having anisotropy all over the visible wavelength range, the transmittance of the anisotropic dye film in the visible wavelength range is preferably 25% or more, is further preferably 35% or more, and is particularly preferably 40% or more. The upper limit for the transmittance of the anisotropic dye film according to the present invention is set in accordance with the intended application. For example, in the case where the degree of polarization is to be increased, the above transmittance is preferably 50% or less. When the above transmittance falls within the above range, the anisotropic dye film is useful as the optical element described below and is particularly useful as an optical element for color liquid crystal displays and an optical element for antireflection films that include an anisotropic dye film and a phase difference film in a combined manner.

The thickness of the anisotropic dye film is preferably 10 nm or more, is more preferably 100 nm or more, and is further preferably 500 nm or more in terms of dry thickness. The thickness of the anisotropic dye film is preferably 30 μm or less, is more preferably 10 μm or less, is further preferably 5 μm or less, and is particularly preferably 3 μm or less. When the thickness of the anisotropic dye film falls within the above range, the dye is likely to be aligned uniformly in the film and a uniform thickness is likely to be achieved.

[Method for Producing Anisotropic Dye Film]

The anisotropic dye film according to the present invention is preferably prepared using the anisotropic dye film-forming composition according to the present invention by a wet deposition method.

The term "wet deposition method" used in the present invention refers to a method in which the composition for anisotropic dye films is applied to a substrate and aligned in some way. Therefore, the composition for anisotropic dye films needs to have flowability and may include, but does not necessarily include, a solvent. In consideration of the viscosity of the composition applied and film uniformity, the composition for anisotropic dye films more preferably include a solvent.

The liquid crystal and dye included in the anisotropic dye film may be aligned as a result of shearing or the like being performed in the application step and may be aligned in the step of removing the solvent by drying. The liquid crystal, dye, and the like may be aligned and laminated on a substrate by performing heating subsequent to the application and drying and again aligning the liquid crystal, dye, and the like. In the wet deposition method, when the composition for anisotropic dye films is applied to the substrate, the dye or the liquid crystal compound is brought into self-association (molecule association state, such as liquid crystal state) and alignment occurs in a microscopic domain in the composition for anisotropic dye films upon the application, in the step of removing the solvent by drying, or after the solvent has been completely removed. Applying an external field to the above-described state causes alignment to be performed in a specific direction over a macroscopic domain and enables an anisotropic dye film having intended properties to be produced. In this regard, the above method is different from a method in which a polyvinyl alcohol (PVA) film or the like is colored with a solution containing a dye, the film is then stretched, and the dye is aligned only by the stretching step. Examples of the external field include the impacts of the alignment treatment layer disposed on the substrate, a shear force, a magnetic field, an electric field, and heat. The above external fields may be used alone or in combination of two or more. As needed, a heating step may be conducted.

The step of applying the composition for anisotropic dye films to a substrate to form a film, the step of applying an external field to perform alignment, and the step of performing drying to remove the solvent may be conducted sequentially or simultaneously.

Examples of the method for applying the anisotropic dye film-forming composition to a substrate in the wet deposition method include a coating method, a dip coating method, an LB film formation method, and publicly known printing methods. Examples of the method also include a method in which an anisotropic dye film prepared by any of the above methods is transferred onto another substrate.

Among these, a coating method is preferably used for applying the anisotropic dye film-forming composition to a substrate.

The direction of alignment of the anisotropic dye film may be different from the direction in which the application is performed. In the present invention, the direction of alignment of the anisotropic dye film is, for example, as for a polarizing film, the axis in which polarized light permeates (polarizing axis) or is absorbed and, as for a phase difference film, the fast or slow axis.

Examples of the method for producing an anisotropic dye film by application of the composition for anisotropic dye films include, but are not limited to, the method described in Pages 253 to 277 of "Coating Engineering", Yuji HARASAKI (Published by Asakura Publishing Co., Ltd., Mar. 20, 1971), the method described in Pages 118 to 149 of "Creation and Applications of Harmonized Molecular Materials" supervised by Kunihiro ICHIMURA (published by CMC Publishing Co., Ltd., Mar. 3, 1998), and a method in which the composition is applied onto a substrate having a step-wise structure (the substrate may be subjected to an alignment treatment in advance) by slot-die coating, spin coating, spray coating, bar coating, roll coating, blade coating, curtain coating, a fountain method, a dipping method, or the like. Among these, slot-die coating and bar coating are preferably used in order to form an anisotropic dye film having high uniformity.

The die coater used in slot-die coating commonly includes a coater that discharges a coating liquid, that is, "slit die". The slit die is disclosed in, for example, JP-H2-164480A, JP-H6-154687A, JP-H9-131559A, "Dispersion, Coating & Drying Process Fundamentals and Application" (2014, Techno System Co., Ltd., ISBN 9784924728707 C 305), "Wet Coating Technology for Display and Optical Element" (2007, Johokiko Co., Ltd., ISBN 9784901677752), and "Precision Coating, Drying Technology in Electronics Field" (2007, Technical Information Institute Co., Ltd., ISBN 9784861041389). These publicly known slit dies enable a coating liquid to be applied even to a flexible member, such as a film or a tape, or a hard member, such as a glass substrate.

Examples of the substrate used for forming the anisotropic dye film according to the present invention include a glass substrate and films composed of a triacetate, an acryl, a polyester, a polyimide, a polyether imide, a polyether ether ketone, a polycarbonate, a cycloolefin polymer, a polyolefin, polyvinyl chloride, triacetyl cellulose, or a urethane.

In order to control the direction of alignment of the dye, the surface of the substrate may be subjected to an alignment treatment (alignment film) using any of the publicly known methods described in, for example, Pages 226 to 239 of "Liquid Crystal Handbook" (Maruzen Co., Ltd., published on October 30, Heisei 12 (2000)) (e.g., a rubbing method, a method in which grooves (fine groove structures) are formed in the surface of the alignment film, a method in which a polarized ultraviolet light and a polarized laser are used (photoalignment method), an alignment method in which an LB film is formed, and an alignment method in which oblique deposition of an inorganic substance is performed). Among these, a rubbing method and an alignment treatment using a photoalignment method are particularly preferable. Examples of the material used in the rubbing method include polyvinyl alcohol (PVA), polyimide (PI), an epoxy resin, and an acrylic resin. Examples of the material used in the photoalignment method include a polycinnamate, polyamic acid, a polyimide, and an azobenzene. In the case where an alignment treatment layer is formed, it is considered that the liquid crystal compound and the dye can be aligned due to the impacts of the alignment treatment of the alignment treatment layer and the shear force applied to the composition for anisotropic dye films during application.

The method with which the composition for anisotropic dye films is fed in the application of the composition for anisotropic dye films and the intervals at which the compositions is fed are not limited. In the case where the thickness of the anisotropic dye film is small, it is desirable to continuously feed and apply the composition for anisotropic dye films because, otherwise, the complexity of the operation of feeding of the coating liquid may be increased and the thickness of the coating film may vary when the coating liquid is started and stopped.

The speed at which the composition for anisotropic dye films is applied is commonly 0.001 m/min or more, is preferably 0.01 m/min or more, is more preferably 0.1 m/min or more, is further preferably 1.0 m/min or more, and is particularly preferably 5.0 m/min or more. The speed at which the composition for anisotropic dye films is applied is commonly 400 m/min or less, is preferably 200 m/min or less, is more preferably 100 m/min or less, and is further preferably 50 m/min or less. When the above coating speed falls within the above range, the anisotropic dye film has the intended anisotropy and uniform coating is likely to be achieved.

The temperature at which the composition for anisotropic dye films is applied is commonly 0° C. or more and 100° C. or less, is preferably 80° C. or less, and is further preferably 60° C. or less.

The humidity at which the composition for anisotropic dye films is applied is preferably 10% RH or more and 80RH % or less.

The anisotropic dye film may be subjected to an insoluble treatment. Insolubilization means a treatment in which the solubility of the compound included in the anisotropic dye film is reduced to control the elution of the compound from the anisotropic dye film and enhance the stability of the film. Specifically, polymerization of the film and overcoating are preferable in consideration of ease of downstream steps, the durability of the anisotropic dye film, and the like.

When the film is polymerized, a film in which the liquid crystal molecules and the dye molecules have been aligned is polymerized using light, heat, and/or radiation.

In the case where the polymerization is performed using light or radiation, it is preferable to use an active energy ray having wavelengths of 190 to 450 nm.

Examples of a light source of the active energy ray having wavelengths of 190 to 450 nm include, but are not limited to, lamp light sources, such as a xenon lamp, a halogen lamp, a tungsten lamp, a high-pressure mercury lamp, an ultra-high-pressure mercury lamp, a metal halide lamp, a medium-pressure mercury lamp, a low-pressure mercury lamp, a carbon arc, and a fluorescent lamp; and laser beam sources, such as an argon ion laser, a YAG laser, an excimer laser, a nitrogen laser, a helium-cadmium laser, and a semiconductor laser. In the case where a light having specific wavelengths is used, an optical filter may also be used. The amount of exposure of the active energy ray is preferably 10 to 10,000 J/m$^2$.

In the case where the film is polymerized using heat, it is preferable to perform the polymerization at 50° C. to 200° C., and it is further preferable to perform the polymerization at 60° C. to 150° C.

The polymerization may be performed using light, heat, and/or radiation. It is preferable to use photopolymerization or use photopolymerization and thermal polymerization in a combined manner because, in such a case, the amount of time required by the film formation process can be reduced and an simple apparatus can be used for the polymerization.

[Optical Element]

An optical element according to the present invention includes the anisotropic dye film according to the present invention.

The optical element according to the present invention is a polarizing element that produces linearly polarized light, circularly polarized light, elliptically polarized light, or the like by using the anisotropy of light absorption, a phase difference element, or an element having refraction anisotropy, conduction anisotropy, or the like. The above functions can be adjusted appropriately by selecting the anisotropic dye film formation process, the substrate, and the composition including organic compounds (dye and transparent material).

The optical element according to the present invention is most preferably used as a polarizing element.

The optical element according to the present invention can also be suitably used for producing flexible displays and the like because a polarizing element can be produced by forming an anisotropic dye film on a substrate by coating or the like.

The optical element may further include another layer in order to maintain or enhance the function of the anisotropic dye film. Examples of the other layer include layers capable of blocking specific wavelengths or specific substances (e.g., barrier films, such as an oxygen-blocking film or a water vapor-blocking film), which are used for enhancing durability, such as lightfastness, heat resistance, or water resistance; and a wavelength cut filter and a layer including a material capable of absorbing specific wavelengths, which are used for changing color gamut or enhancing optical properties.

[Polarizing Element]

A polarizing element (hereinafter, may be referred to as "polarizing element according to the present invention") can be produced using the anisotropic dye film according to the present invention.

The polarizing element according to the present invention may be any polarizing element that includes the anisotropic dye film according to the present invention; the polarizing element may include any other films (layers). For example, the polarizing element can be produced by forming an alignment film on a substrate and forming the anisotropic dye film according to the present invention on the surface of the alignment film.

The polarizing element may include, in addition to the anisotropic dye film, for example, the following components that enhance the polarization performance in a combined manner: an overcoating layer that increases mechanical strength and the like; an adhesive or antireflection layer; an alignment film; and a layer having an optical function, such as a function as a retardation film, a brightness enhancement film, a reflection or antireflection film, a semitransparent reflective film, or a diffusion film. Specifically, the above-described layers having various functions may be stacked on top of one another by coating, bonding, or the like and used as a multilayer body.

The above layers can be formed as needed in accordance with the production process, the intended properties, and the intended functions. The position, order, and the like in which the above layers are stacked are not limited. For example, the positions at which the above layers are formed may be either above the anisotropic dye film or on one of the surfaces of the substrate which is opposite to the surface on which the anisotropic dye film is disposed. The order in which the above layers are formed may be either before or after the anisotropic dye film has been formed.

The layers having an optical function can be formed by the methods described below.

The layer that serves as a retardation film can be formed by stacking a retardation film on another layer constituting the polarizing element by coating, bonding, or the like. The retardation film can be formed by, for example, performing the stretching treatment described in JP-H2-59703 A, JP-H4-230704A, or the like or the treatment described in JP-H7-230007A or the like.

The layer that serves as a brightness enhancement film can be formed by stacking a brightness enhancement film on another layer constituting the polarizing element by coating, bonding, or the like. The brightness enhancement film can be formed by, for example, creating micropores by the method described in JP2002-169025A and JP2003-29030A or superimposing two or more cholesteric liquid crystal layers having different selective reflection center wavelengths on one another.

The layer that serves as a reflection film or a semitransparent reflective film can be formed by, for example, stacking a metal thin-film formed by vapor deposition, sputtering, or the like on another layer constituting the polarizing element by coating, bonding, or the like.

The layer that serves as a diffusion film can be formed by, for example, coating another layer constituting the polarizing element with a resin solution containing microparticles.

The layer that serves as a retardation film or an optical compensation film can be formed by applying a liquid crystalline compound, such as a discotic liquid crystalline compound, a nematic liquid crystalline compound, a smectic liquid crystalline compound, or a cholesteric liquid crystalline compound, to another layer constituting the polarizing element and then performing alignment. Optionally, an alignment film may be formed on the substrate and a retardation film or an optical compensation film may be formed on the surface of the alignment film.

In the case where the anisotropic dye film according to the present invention is used as an anisotropic dye film or the like included in various types of display elements, such as a liquid crystal device (LCD) and an organic electroluminescence element (OLED), the anisotropic dye film according to the present invention may be formed directly on the surfaces of electrode substrates or the like that constitute the above display elements. Alternatively, a substrate on which the anisotropic dye film according to the present invention is formed may be used as a component of the above display elements.

EXAMPLES

The present invention is described further specifically with reference to Examples below. The present invention is not limited by Examples below without departing the summary of the present invention.

In the following description, "part" means "part by mass".

[Method for Identifying Liquid Crystal Phase]

The liquid crystallinity of the anisotropic dye film-forming composition prepared was inspected with a polarizing microscope ("ECLIPSE LV100N POL" produced by Nikon Instech Co., Ltd.) equipped with differential scanning calorimetry ("DSC220CU" produced by Seiko Instruments Inc.), X-ray structure analysis ("NANO-Viewer" produced by Rigaku Corporation), and hot stage ("HCS302-LN190" produced by TOYO Corporation). Liquid crystallinity was identified in accordance with the method described in Pages 9 to 50, Pages 117 to 176, etc. of "Liquid Crystal Handbook" (Maruzen Co., Ltd., published on October 30, Heisei 12 (2000)).

[Measurement of Transmittance of Light Polarized in Direction of Absorption Axis/Polarizing Axis of Anisotropic Dye Film and Dichroic Ratio]

The transmittance of light polarized in the direction of the absorption axis/polarizing axis through the anisotropic dye film prepared was measured using a spectrophotometer (Product name: "RETS-100" produced by Otsuka Electronics Co., Ltd.) equipped with a Glan-Thompson polarizer.

Linearly polarized light was incident on the anisotropic dye film as measurement light. The transmittance of light polarized in the direction of absorption axis through the anisotropic dye film and the transmittance of light polarized in the direction of polarizing axis through the anisotropic dye film were measured. A dichroic ratio (D) was calculated using the following formula.

$$D=Az/Ay$$

(in the above formula, $Ay=-\log(Ty)$;

$Az=-\log(Tz)$;

where Tz represents the transmittance of light polarized in the direction of absorption axis through the anisotropic dye film; and Ty represents the transmittance of light polarized in the direction of polarizing axis through the anisotropic dye film)

Specifically, into a sandwich cell including a glass substrate and a polyimide alignment film (LX1400, produced by HD MicroSystems, Ltd.) disposed thereon (cell gap: 8.0 μm, 10.0 μm, prepared by subjecting a polyimide film to a rubbing treatment with a cloth), the composition for anisotropic dye films was injected in an isotropic phase. Subsequently, cooling was performed to 80° C. at 5° C./min. Hereby, an anisotropic dye film was prepared. Then, while the temperature was reduced to 0° C. at 5° C./min, the dichroic ratio was measured at predetermined temperatures. The dichroic ratio at the temperature and wavelength at which the maximum dichroic ratio was measured was determined as the dichroic ratio of the anisotropic dye film. In addition, at the above temperature, the dichroic ratio at the wavelength at which the absorbance of the anisotropic dye film in the quadrature direction (absorption axis direction) was a local maximum (the dichroic ratio at the wavelength at which the absorbance of the film was a local maximum) was also measured.

[Synthesis of Liquid Crystal Compound]
<Liquid Crystal Compound (I-1)>

A liquid crystal compound (I-1) was synthesized in accordance with the synthesis method described below.

[Chem. 26]

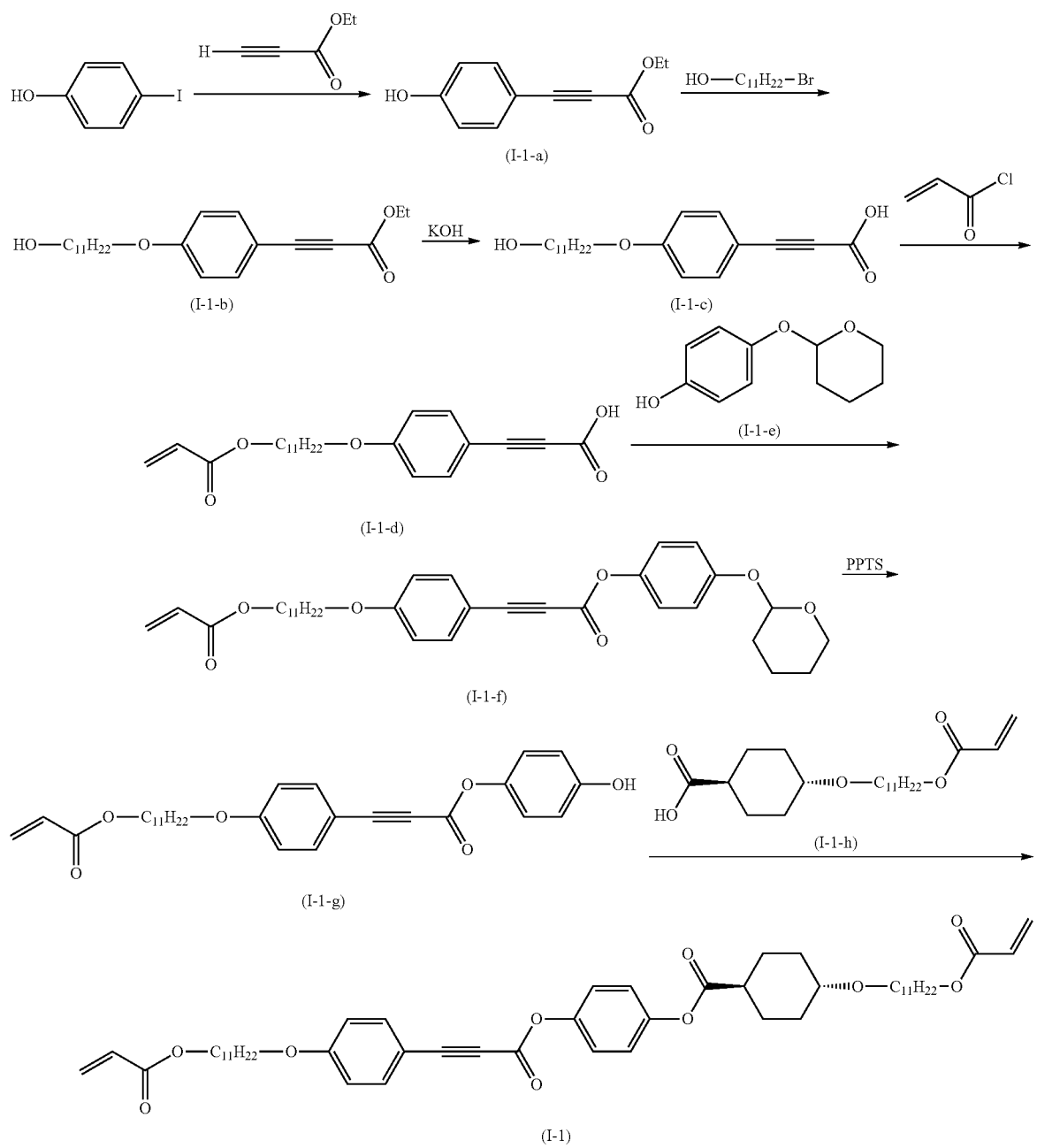

Synthesis of (I-1-a):

Ethyl propiolate (9.7 g, 99 mmol) and copper(I) oxide (7.5 g, 94 mmol) were added to an N,N-dimethylformamide solution (150 mL) of p-iodophenol (11.0 g, 50 mmol). The resulting mixture was stirred at 110° C. for 9 hours and then cooled to room temperature by air cooling. After a precipitate had been collected by filtration, ethyl acetate was added to the precipitate. Subsequently, the mixture was washed with water and then with a saturated saline solution. Subsequently, purification was performed by silica gel column chromatography (hexane/ethyl acetate). Hereby, 7.3 g of brown crystals (I-1-a) were prepared.

Synthesis of (I-1-b):

(I-1-a) (4.20 g, 22.1 mmol), 11-bromo-1-undecanol (5.55 g, 22.1 mmol), potassium carbonate (6.10 g, 44.2 mmol), and N,N-dimethylformamide (30 mL) were mixed with one another, and the resulting mixture was stirred at 80° C. for 4 hours. After a precipitate had been collected by filtration, diethyl ether was added to the precipitate. Subsequently, the mixture was washed with water and then with a saturated saline solution. Subsequently, purification was performed by silica gel column chromatography (hexane/ethyl acetate). Hereby, 5.5 g of an orange solid (I-1-b) was prepared.

Synthesis of (I-1-c):

(I-1-b) (3.6 g, 10 mmol), potassium hydroxide (1.7 g, 30 mmol), and water (20 mL) were mixed with one another, and the resulting mixture was stirred at 100° C. for 2 hours. Then, water (20 mL) was added to the mixture, and the mixture was made acidic with concentrated hydrochloric acid. Subsequently, a precipitate was collected by filtration. The precipitate was washed with acetonitrile by suspension washing. Hereby, 3.2 g of a milky white solid (I-1-c) was prepared.

Synthesis of (I-1-d):

(I-1-c) (2.33 g, 7.0 mmol) and tetrahydrofuran (20 mL) were mixed with each other. Subsequently, N,N-dimethylaniline (1.02 g, 8.4 mmol) and 2,5-di-t-butylphenol (54 mg) were added to the resulting mixture. After cooling had been performed with an ice bath, acryloyl chloride (0.76 g, 8.4 mmol) was gradually added to the mixture. After stirring had been performed for 6 hours in the ice bath, methylene chloride was added to the mixture. Then, the mixture was washed with 1 mol/L hydrochloric acid, then with a saturated aqueous solution of sodium hydrogen carbonate, and subsequently with a saturated saline solution. Subsequently, purification was performed by silica gel column chromatography (chloroform/methanol). Hereby, 2.0 g of a white solid (I-1-d) was prepared.

Synthesis of (I-1-e):

(I-1-e) was synthesized by the synthesis method described in JP2014-262884A.

Synthesis of (I-1-f):

(I-1-d) (2.00 g, 5.17 mmol), (I-1-e) (1.01 g, 5.17 mmol), N,N-dimethylamino-4-pyridine (0.13 g, 1.03 mmol), 2,5-di-t-butylphenol (58 mg), and methylene chloride (30 mL) were mixed with one another. After the resulting mixture had been cooled in an ice bath, 1-ethyl-3-(3-dimethylaminopropyl)carbodiimide hydrochloric acid salt (1.09 g, 5.69 mmol) was added to the mixture. After the mixture had been left to stand overnight, the mixture was washed with an saturated aqueous solution of ammonium chloride and then with a saturated saline solution. Subsequently, purification was performed by silica gel column chromatography (hexane/ethyl acetate). Hereby, 1.9 g of a white solid (I-1-f) was prepared.

Synthesis of (I-1-g):

(I-1-f) (2.6 g, 4.62 mmol), p-toluenesulfonic acid pyridinium salt (0.23 g, 0.92 mmol), 2,5-di-t-butylphenol (44 mg), and ethanol (20 mL) were mixed with one another, and the resulting mixture was stirred at 50° C. for 2 hours. The resulting reaction solution was released in water, and the resulting precipitate was collected by filtration and then dried. Hereby, 2.0 g of a white solid (I-1-g) was prepared.

Synthesis of (I-1-h):

A compound (I-1-h) was synthesized in accordance with the synthesis method described below.

[Chem. 27]

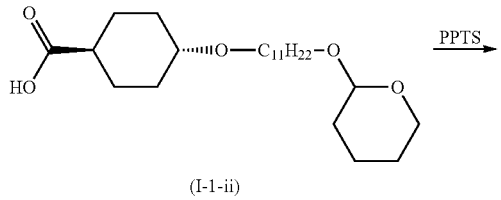

(I-1-ii)

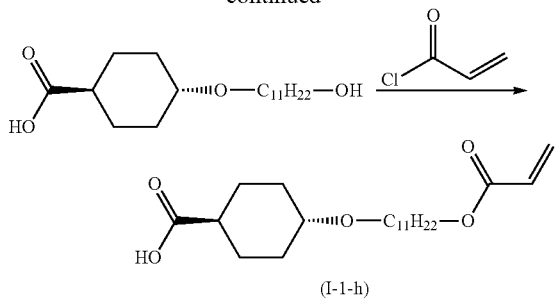

(I-1-h)

(I-1-i) was synthesized in accordance with the method conforming to the compound described in Lub et al., Recl.Trav.ChIm.Pays-Bas, 115, 321-328 (1996).

Subsequently, (I-1-i) (trans isomer only) (42.9 g, 107.6 mmol), p-toluenesulfonic acid pyridinium salt (2.6 g, 10.8 mmol), and ethanol (430 mL) were mixed with one another, and the resulting mixture was stirred at 78° C. for 2 hours. After the solvent had been distilled away, the mixture was dissolved in ethyl acetate (150 mL). Subsequently, hexane (750 mL) was added to the mixture and then cooled. The resulting precipitate was collected by filtration, washed with hexane, and then dried. Hereby, 29.2 g of a white solid (I-1-j) was prepared.

(I-1-j) (37.2 g, 118.3 mmol), N,N-dimethylaniline (21.5 g, 177.5 mmol), 2,5-di-t-butylphenol (0.24 g), and tetrahydrofuran (350 mL) were mixed with one another. After the resulting mixture had been cooled in an ice bath, acryloyl chloride (16.1 g, 177.5 mmol) was gradually added to the mixture. Subsequent to the addition, stirring was performed at 50° C. for 2 hours. Then, the solvent was distilled away until the amount of the liquid reached 190 mL. Subsequently, the mixture was released in 1 mol/L hydrochloric acid cooled with an ice. The resulting precipitate was collected by filtration and subsequently washed with water and hexane. Subsequently, purification was performed by silica gel column chromatography (hexane/ethyl acetate). Hereby, 39.4 g of a white solid (I-1-h) was prepared.

Synthesis of (I-1):

(I-1-g) (494 mg, 1.03 mmol), (I-1-h) (400 mg, 1.09 mmol), N,N-dimethylamino-4-pyridine (27 mg, 0.22 mmol), 2,5-di-t-butylphenol (2 mg), and methylene chloride (10 mL) were mixed with one another. After the resulting mixture had been cooled in an ice bath, 1-ethyl-3-(3-dimethylaminopropyl)carbodiimide hydrochloric acid salt (230 mg, 1.19 mmol) was added to the mixture. After stirring had been performed in the ice bath for 4 hours, the mixture was washed with a saturated aqueous solution of ammonium chloride and then with a saturated saline solution. Subsequently, purification was performed by silica gel column chromatography (hexane/ethyl acetate). Hereby, 530 mg of a liquid crystal compound (I-1) was prepared in the form of a white solid.

The results of the liquid chromatography-mass analysis of the liquid crystal compound (I-1) are described below.

LC-MS(APCI)m/z 851.5 (M+Na$^+$)

The results of structure identification by NMR are described below.

$^1$H-NMR (CDCl$_3$, 400 MHz) δ1.20-1.70 (m, 38H), 1.74-1.85 (m, 2H), 2.05-2.25 (m, 4H), 2.49-2.57 (m, 1H), 3.21-3.29 (m, 1H), 3.46 (t, 2H, J=6.8 Hz), 3.99 (t, 2H, J=6.8 Hz), 4.15 (t, 4H, J=6.8 Hz), 5.80 (d, 2H, J=10.4 Hz), 6.12 (dd, 2H,

J=17.2, 10.4 Hz), 6.39 (d, 2H, J=17.2 Hz), 6.89 (d, 2H, J=6.8 Hz), 7.10 (d, 2H, J=6.8 Hz), 7.19 (d, 2H, J=6.8 Hz), 7.55 (d, 2H, J=6.8 Hz)

The isotropic phase appearance temperature (the temperature at which a phase transition from liquid crystal to liquid occurred and the temperature at which a phase transition from liquid to liquid crystal occurred) of the liquid crystal compound (I-1) was measured by differential scanning calorimetry. The liquid crystal compound used in the differential scanning calorimetry was prepared by adding 0.2 parts by mass of 4-methoxyphenol as a polymerization inhibitor relative to 100 parts by mass of the liquid crystal compound (I-1).

The phase transition temperature from liquid crystal to liquid of the liquid crystal compound (I-1) was 111.0° C.

The phase transition temperature from liquid to liquid crystal of the liquid crystal compound (I-1) was 109.4° C.

The results of a polarizing microscope observation and X-Ray structure analysis confirmed that the above temperature was the isotropic phase appearance temperature.

Synthesis Examples, Examples, and Comparative Examples of First Invention

[Synthesis of Dye]

<Dye (II-1)>

A dye (II-1) was synthesized in accordance with the synthesis method described below.

[Chem. 28]

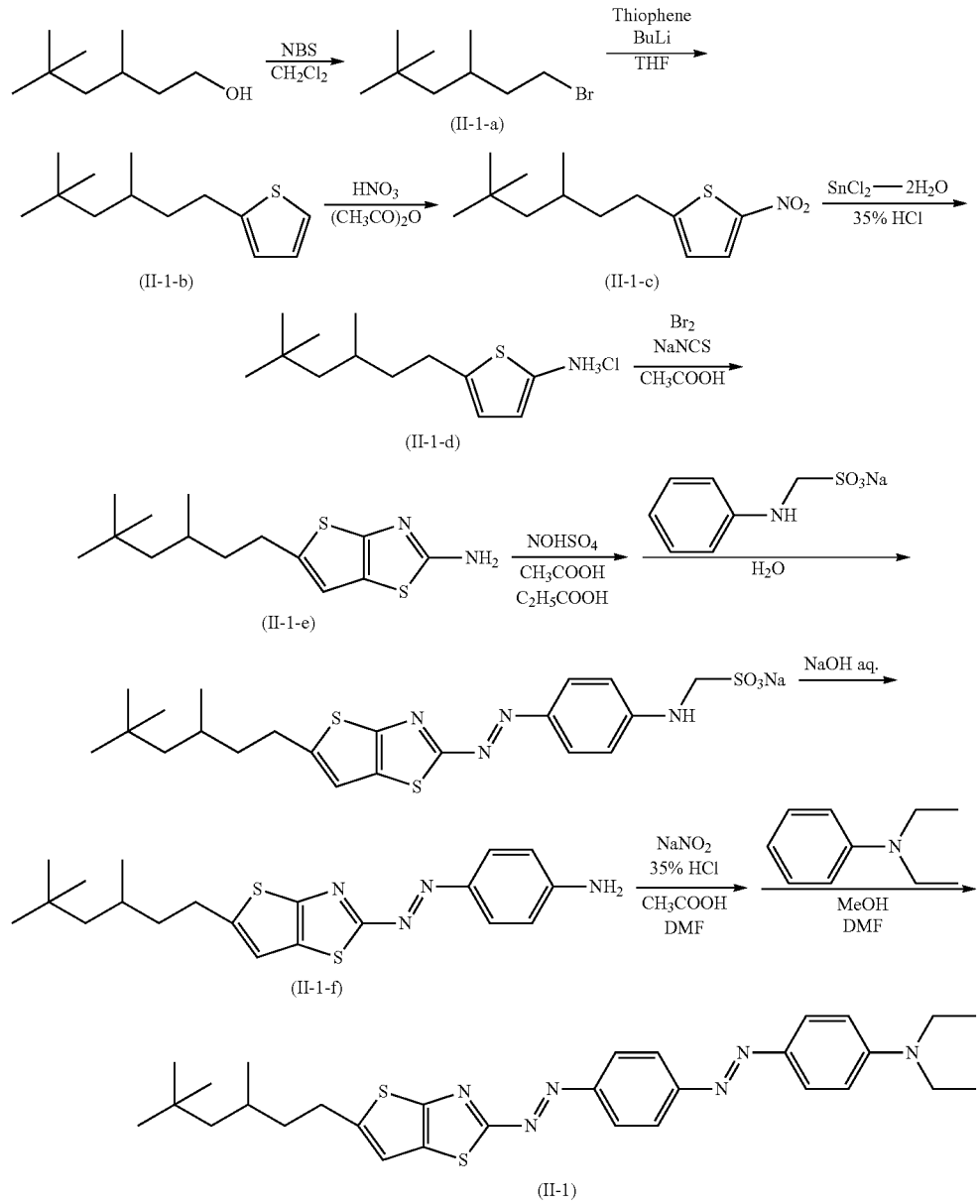

Synthesis of (II-1-a):

In a nitrogen stream, triphenylphosphine (72.7 g, 277.3 mmol), 3,5,5-trimethylhexanol (40.0 g, 277.3 mmol), and dichloromethane (220 mL) were mixed with one another, and the resulting mixture was cooled to 0° C. Subsequently, N-bromosuccinimide (49.4 g, 277.3 mmol) was added to the mixture. Then, stirring was performed at 0° C. for 2 hours. The resulting reaction liquid was concentrated, and diisopropyl ether (200 mL) was added to the reaction liquid. Subsequently, ultrasonic wave was applied to the reaction liquid for 10 minutes. Then, the resulting precipitate was collected by filtration. The above operation was repeated two times, and purification was performed by silica gel chromatography (hexane). Hereby, 43.4 g of (II-1-a) was prepared.

Synthesis of (II-1-b):

In a nitrogen stream, tetrahydrofuran (290 mL) and hexane (195 mL) were mixed with each other, and the resulting mixture was cooled to −20° C. Subsequently, a 1.6 M hexane solution (121 mL) of n-butyllithium was added dropwise to the mixture with a syringe. Then, the temperature was increased to 5° C. Subsequently, thiophene (12.5 g, 154.5 mmol) was added to the mixture over 10 minutes. After the temperature had been increased to 25° C., (II-1-a) (32.0 g, 154.5 mmol) was added to the mixture at a time. Then, stirring was performed at 50° C. for 30 minutes. Subsequently, cold water (500 mL) was added to the mixture, extraction was performed with diisopropyl ether, and an oil layer was concentrated. Then, purification was performed by silica gel chromatography (hexane). Hereby, 27.3 g of (II-1-b) was prepared.

Synthesis of (II-1-c):

Fuming nitric acid (10.6 g, 168.7 mmol) and acetic anhydride (60 mL) were mixed with each other, and the resulting mixture was cooled to −30° C. To the mixture, a solution prepared by mixing (II-1-b) (27.3 g, 129.8 mmol) with acetic anhydride (60 mL) was added dropwise over 2 hours. The resulting mixture was stirred at −30° C. for 1.5 hours. After the mixture had been left to stand at room temperature overnight, crushed ice (200 g) was added to the mixture. Then, the pH of the reaction liquid was adjusted to 4 using a 25% aqueous sodium hydroxide solution. Subsequently, extraction was performed with dichloromethane. The resulting oil layer was concentrated. Hereby, 27.1 g of (II-1-c) was prepared.

Synthesis of (II-1-d):

(II-1-c) (27.1 g, 106.0 mmol) and 35% hydrochloric acid (75 mL) were mixed with each other, and the resulting mixture was heated to 50° C. Tin chloride dihydrate (47.9 g, 212.1 mmol) was added to the mixture in small amounts. Subsequently, the mixture was stirred for 1 hour while being cooled by air cooling. The reaction liquid was cooled to 5° C., and the resulting precipitate was collected by filtration and then washed with 35% hydrochloric acid and diisopropyl ether. Hereby, 8.8 g of (II-1-d) was prepared in an undried state.

Synthesis of (II-1-e):

The undried (II-1-d) (8.8 g), sodium thiocyanate (2.7 g, 33.5 mmol), and N-bromosuccinimide (6.0 g, 33.5 mmol) were mixed with one another. The resulting mixture was stirred at 25° C. for 2 hours. Then, the precipitate was collected by filtration, and purification was performed by silica gel chromatography (hexane/ethyl acetate). Hereby, 7.4 g of (II-1-e) was prepared.

Synthesis of (II-1-f):

(II-1-e) (7.4 g, 26.2 mmol), acetic acid (46 mL), and propionic acid (31 mL) were mixed with one another, and the resulting mixture was cooled to 2° C. Then, 40% nitrosylsulfuric acid (10.0 g, 31.4 mmol) was added to the mixture. After the mixture had been stirred at 2° C. for 1 hour, amidosulfuric acid (7.9 g, 8.1 mmol) was added to the mixture. Hereby, a diazonium solution was prepared.

Aniline (10.0 g, 107.3 mmol), formaldehyde sodium bisulfite (14.4 g, 107.3 mmol), and water (300 mL) were mixed with one another, and the resulting mixture was stirred at 70° C. for 2 hours. After the mixture had been cooled to 3° C., the above diazonium solution was added dropwise to the mixture over 1 hour. Then, stirring was performed at 3° C. for 1 hour. The precipitated solid was collected by filtration and dispersed in a 25% aqueous sodium hydroxide solution (40 mL) and water (200 mL). Subsequently, stirring was performed at 90° C. for 1.5 hours. After air cooling had been performed, the precipitated solid was collected by filtration. The resulting crude product was purified by silica gel chromatography (hexane/ethyl acetate). Hereby, 2.6 g of (II-1-f) was prepared.

Synthesis of (II-1):

(II-1-f) (2.6 g, 6.7 mmol), dimethylformamide (85 mL), and acetic acid (22 mL) were mixed with one another, and the resulting mixture was cooled to 2° C. To the mixture, 35% hydrochloric acid (2 mL) was added, and sodium nitrite (0.5 g, 7.3 mmol) dissolved in water (5 mL) was then added. The resulting mixture was stirred at 2° C. for 2 hours to form a diazonium solution.

Diethylaniline (1.0 g, 6.7 mmol), methanol (32 mL), and dimethylformamide (3 mL) were mixed with one another, and the resulting mixture was cooled to 2° C. Then, while the pH of the mixture was adjusted to 5 with a 25% aqueous sodium hydroxide solution, the above diazonium solution was added dropwise to the mixture over 30 minutes. Subsequently, stirring was performed at 2° C. for 3 hours. The precipitated solid was collected by filtration. The resulting crude product was purified by silica gel chromatography (hexane/dichloromethane). Hereby, 0.5 g of a dye (II-1) was prepared.

The local maximum absorption wavelength (max) and gram absorptivity of the dye (II-1) included in a 10 ppm chloroform solution were 551 nm and 100.7 Lg$^{-1}$cm$^{-1}$, respectively.

The results of structure identification by NMR are described below.

$^1$H-NMR (CDCl$_3$, 400 MHz) δ0.91 (s, 9H), δ1.01 (d, 3H, J=6.3 Hz), δ1.24-1.31 (m, 8H), δ1.59-1.67 (m, 2H), δ1.73-1.81 (m, 1H), δ2.91-2.97 (m, 2H), δ3.48 (q, 4H, J=7.1 Hz), δ6.74 (d, 2H, J=9.2 Hz), δ6.98 (s, 1H), δ7.90 (d, 2H, J=9.2 Hz), δ7.97 (d, 2H, J=8.8 Hz), δ8.10 (d, 2H, J=8.8 Hz),

The solubility of the dye (II-1) in toluene was measured.

To 101 mg of toluene, 3 mg of the dye (II-1) was added, and the resulting mixture was stirred at 80° C. for 5 minutes. The mixture was left to stand for 1 hour at room temperature. The resulting liquid mixture was filtered with a syringe equipped with a syringe filter (produced by Membrane Solutions Limited, PTFE13045, diameter: 0.45 μm). Hereby, a toluene-saturated solution of the dye (II-1) was prepared. The above solution was diluted with 767 mg of tetrahydrofuran, and the concentration of the solution was determined using HPLC (L-2300 Series produced by Hitachi High-Technologies Corporation). A 0.1-mass % tetrahydrofuran solution of the dye (II-1) was prepared, and a calibration curve was prepared at an absorption wavelength of 254 nm. Table 1 lists the results of measurement of the concentration of the toluene-saturated solution using the above calibration curve.

The concentrations of the toluene-saturated solutions of the comparative dyes (III-1) and (III-3) described below were also measured.

<Dye (II-2)>

A dye (II-2) was synthesized in accordance with the synthesis method described below.

Synthesis of (II-2-b):

In a nitrogen stream, (II-2-a) (17.0 g, 110.2 mmol) and acetic anhydride (170 mL) were mixed with each other, and the resulting mixture was cooled to −30° C. Subsequently, nitric acid (8.7 mL, 121.2 mmol) was added to the mixture. Then, stirring was performed for 1 hour at −30° C. and for

[Chem. 29]

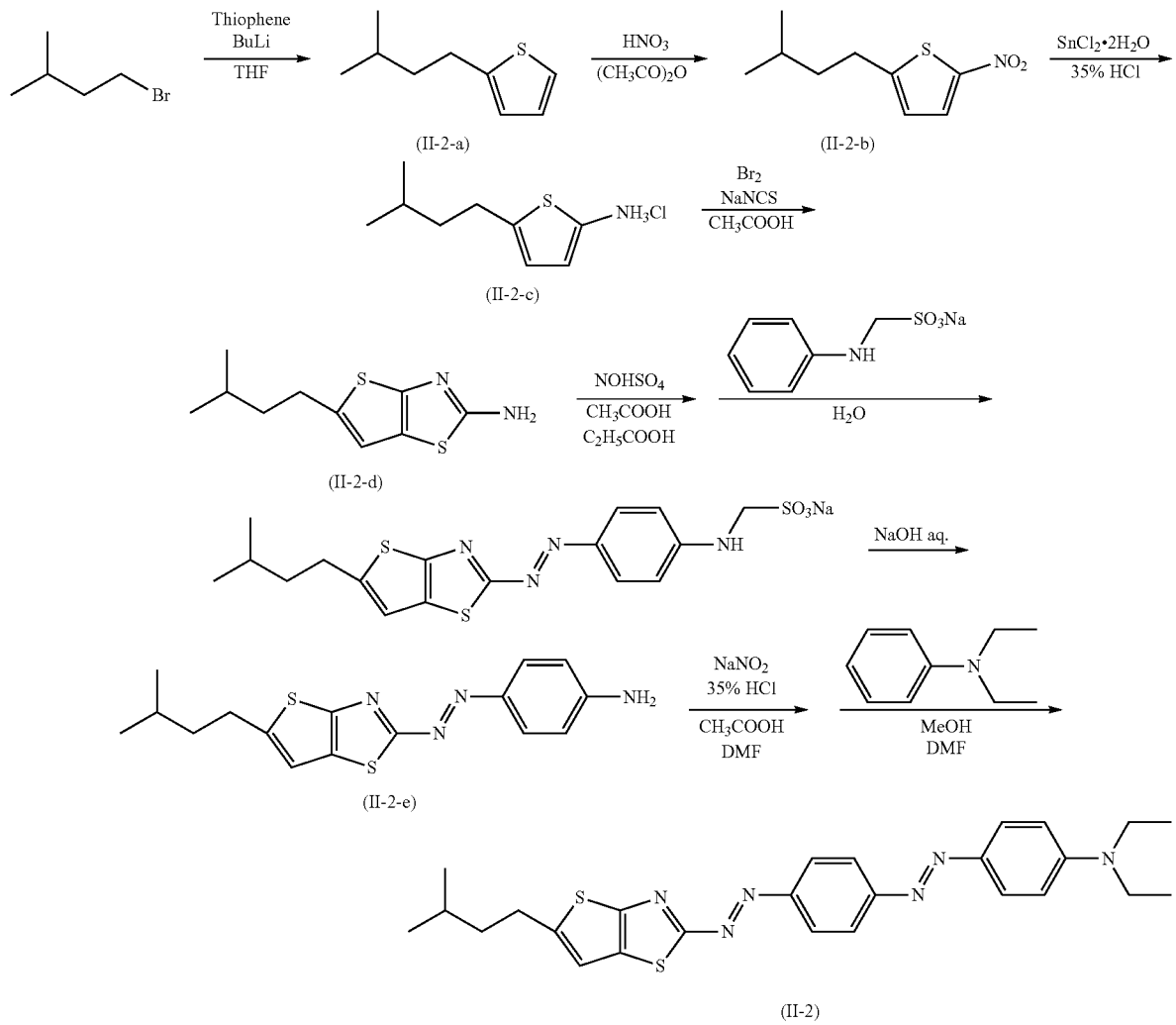

Synthesis of (II-2-a):

In a nitrogen stream, thiophene (12.7 g, 150.9 mmol) and tetrahydrofuran (130 mL) were mixed with each other, and the resulting mixture was cooled to −50° C. Then, a 1.6 M hexane solution (107 mL) of n-butyllithium was added dropwise to the mixture with a syringe. Subsequently, stirring was performed for 1 hour. Then, 1-bromo-3-methylbutane (25.0 g, 165.5 mmol) was added to the mixture at −50° C., and stirring was performed for 30 minutes under the above conditions. Subsequently, stirring was performed at room temperature for 1 hour. After water (300 mL) had been added to the stirred mixture, extraction was performed with hexane. The resulting oil layer was washed with water and a saturated saline solution and subsequently vacuum-concentrated. Then, purification was performed by silica gel chromatography (hexane/ethyl acetate). Hereby, 17.0 g of (II-2-a) was prepared.

another 2 hours at 0° C. After water (500 mL) had been added to the stirred mixture, extraction was performed with dichloromethane. The resulting oil layer was washed with water and brine and subsequently vacuum-concentrated. Then, purification was performed by silica gel chromatography (hexane/ethyl acetate). Hereby, 7.0 g of (II-2-b) was prepared.

Synthesis of (II-2-c):

(II-2-b) (3.2 g, 16.1 mmol) and 35% hydrochloric acid (15 mL) were mixed with each other. Tin chloride dihydrate (10.9 g, 48.3 mmol) was added to the resulting mixture at 2° C. Subsequently, the mixture was stirred vigorously and then stirred at 25° C. for 4 hours. The resulting supernatant was removed by decantation, and the residue was dissolved in ethyl acetate (50 mL). Subsequently, the filtrate collected by filtration was vacuum-concentrated. Hereby, 6.1 g of (II-2-c) was prepared in an undried state.

Synthesis of (II-2-d):

The undried (II-2-c) (6.1 g), acetic acid (30 mL), and sodium thiocyanate (5.2 g, 64.5 mmol) were mixed with one another, and the resulting mixture was cooled to 2° C. Then, a solution prepared by mixing bromine (1.7 mL, 33.9 mmol) with acetic acid (10 mL) was added to the mixture. Subsequently, stirring was performed at 25° C. for 1 hour. After sodium sulfite had been added to the stirred mixture, a 25% aqueous sodium hydroxide solution (30 mL) was added to the mixture. Then, extraction was performed with ethyl acetate. The resulting oil layer was washed with water and a saturated saline solution and subsequently vacuum-concentrated. Then, purification was performed by silica gel chromatography (hexane/ethyl acetate). Hereby, 0.5 g of (II-2-d) was prepared.

Synthesis of (II-2-e):

(II-2-d) (7.4 g, 32.7 mmol), acetic acid (46 mL), and propionic acid (31 mL) were mixed with one another, and the resulting mixture was cooled to 2° C. Then, 40% nitrosylsulfuric acid (12.5 g, 39.2 mmol) was added to the mixture. Subsequently, the mixture was stirred at 2° C. for 1 hour. Hereby, a diazonium solution was prepared.

Aniline (12.5 g, 133.9 mmol), formaldehyde sodium bisulfite (18.0 g, 133.9 mmol), and water (440 mL) were mixed with one another, and the resulting mixture was stirred at 70° C. for 2 hours. After the mixture had been cooled to 3° C., the above diazonium solution was added dropwise to the mixture over 1 hour. Then, stirring was performed at 3° C. for 1 hour. The precipitated solid was collected by filtration and dispersed in a 25% aqueous sodium hydroxide solution (40 mL) and water (200 mL). Subsequently, stirring was performed at 90° C. for 1.5 hours. After air cooling had been performed, the precipitated solid was collected by filtration. Hereby, 11.2 g of a crude product of (II-2-e) was prepared.

Synthesis of (II-2):

(II-2-e) (2.6 g, 6.7 mmol), dimethylformamide (81 mL), and acetic acid (23 mL) were mixed with one another, and the resulting mixture was cooled to 2° C. To the mixture, 35% hydrochloric acid (3 mL) was added, and sodium nitrite (0.6 g, 8.6 mmol) dissolved in water (6 mL) was then added. The resulting mixture was stirred at 2° C. for 2 hours to form a diazonium solution.

Diethylaniline (1.2 g, 7.8 mmol), methanol (33 mL), and dimethylformamide (3 mL) were mixed with one another, and the resulting mixture was cooled to 2° C. Then, while the pH of the mixture was adjusted to 5 with a 25% aqueous sodium hydroxide solution, the above diazonium solution was added dropwise to the mixture over 30 minutes. Subsequently, stirring was performed at 2° C. for 3 hours. The precipitated solid was collected by filtration. The resulting crude product was purified by silica gel chromatography (hexane/dichloromethane). Hereby, 0.5 g of a dye (II-2) was prepared.

The local maximum absorption wavelength (λmax) and gram absorptivity of the dye (II-2) included in a 10 ppm chloroform solution were 550 nm and 110.5 Lg$^{-1}$cm$^{-1}$, respectively.

The results of structure identification by NMR are described below.

$^1$H-NMR (CDCl$_3$, 400 MHz) δ0.97 (d, 6H, J=7.7 Hz), δ1.25 (t, 6H, J=7.1 Hz), δ1.65-1.69 (m, 3H), δ2.96 (t, 2H, J=7.1 Hz), δ3.48 (q, 4H, J=7.1 Hz), δ6.74 (d, 2H, J=9.3 Hz), δ6.98 (s, 1H), δ7.90 (d, 2H, J=9.2 Hz), δ7.97 (d, 2H, J=8.9 Hz), δ8.10 (d, 2H, J=8.8 Hz), The solubility of the dye (II-2) in toluene which was measured (detection absorption wavelength: 254 nm) as in the measurement of the dye (II-1) was 0.7%.

<Dye (II-3)>

A dye (II-3) was synthesized in accordance with the synthesis method described below.

[Chem. 30]

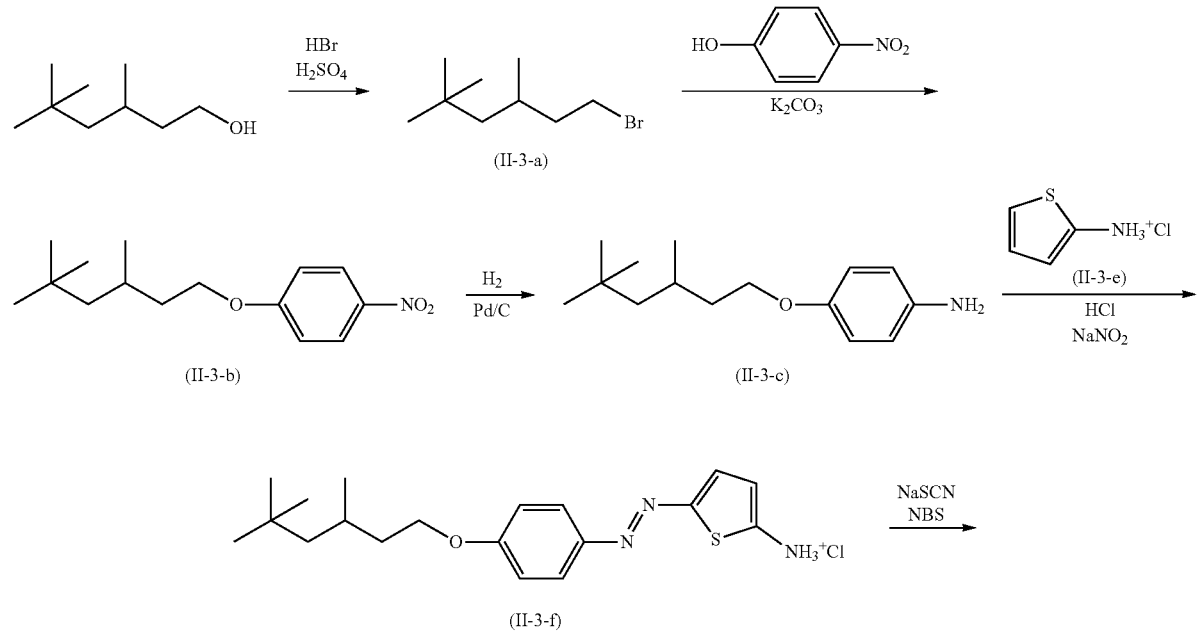

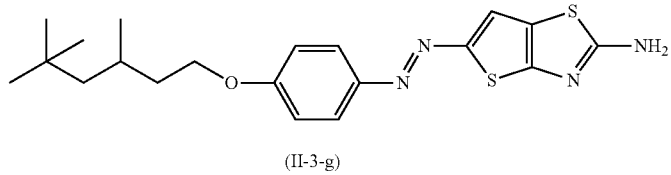

(II-3-g)

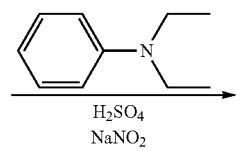

(II-3)

Synthesis of (II-3-a):

3,5,5-triethyl-1-hexanol (38.4 g, 266 mmol), a 47% HBr aqueous solution (50.4 g, 293 mmol), and concentrated sulfuric acid (8.3 g, 82.5 mmol) were mixed with one another, and the resulting mixture was stirred at 120° C. for 5 hours. After the mixture had been cooled to 25° C., the mixture was added to hexane (600 mL). Then, washing with water (1200 mL×3) was performed. After the organic layer had been concentrated, purification was performed by silica gel chromatography (hexane). Hereby, 35.5 g of (II-3-a) was prepared.

Synthesis of (II-3-b):

In a nitrogen stream, 4-nitrophenol (65.0 g, 467 mmol), (II-3-a) (116.2 g, 560 mmol), dimethylformamide (520 mL), and potassium carbonate (129.1 g, 934 mmol) were mixed with one another, and the resulting mixture was stirred at 90° C. for 6 hours. After water (1000 mL) had been added to the stirred mixture, extraction was performed with a liquid mixture containing ethyl acetate/hexane=1/4. The resulting oil layer was concentrated. Then, purification was performed by silica gel chromatography (ethyl acetate/hexane). Hereby, 113.5 g of (II-3-b) was prepared.

Synthesis of (II-3-c):

In an argon stream, (II-3-b) (113.5 g, 427.7 mmol) and ethyl acetate (1100 mL) were mixed with each other. Palladium carbon (5% Pd—C, water content: 55 wt %, 11.4 g) was added to the resulting mixture. Then, stirring was performed at 25° C. for 60 hours in a hydrogen atmosphere. After the inside of the container had been purged with argon, the catalyst was collected by filtration. The catalyst was subjected to extraction with dichloromethane and concentrated together with the organic layer. Then, purification was performed by silica gel chromatography (dichloromethane). Hereby, 99.5 g of (II-3-c) was prepared.

[Chem. 31]

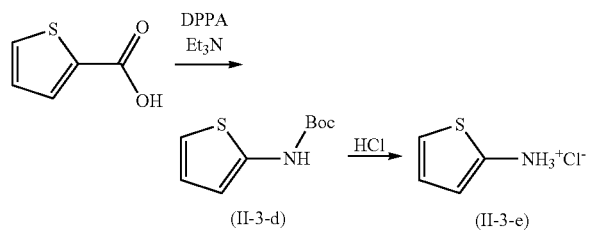

Synthesis of (II-3-d):

2-Thiophenecarboxylic acid (2.00 g, 15.6 mmol), diphenylphosphoryl azide (4.30 g, 15.6 mmol), triethylamine (2.2 mL, 15.6 mmol), and tert-butyl alcohol (20 mL) were mixed with one another, and the resulting mixture was stirred for 5 hours while being heated to reflux. After the stirred mixture had been cooled to 25° C., water (300 mL) was added to the mixture. Then, extraction was performed with diethyl ether. The resulting oil layer was concentrated. Then, purification was performed by silica gel chromatography (hexane/dichloromethane). Hereby, 1.9 g of (II-3-d) was prepared.

Synthesis of (II-3-e):

(II-3-d) (2.00 g, 10.0 mmol), 12 N chloric acid (36 mL), and diethyl ether (85 mL) were mixed with one another, and the resulting mixture was stirred at 25° C. for 30 minutes. Then, the solvent was distilled away. Hereby, 1.36 g of (II-3-e) was prepared.

Synthesis of (II-3-f):

In a nitrogen stream, (II-3-c) (47.3 g, 201 mmol) and 12 N chloric acid (375 mL) were mixed with each other. The resulting mixture was cooled to 0° C. and then stirred for 1 hour. An aqueous solution prepared by mixing sodium nitrite (17.3 g, 251 mmol) with water (130 mL) was added to the stirred mixture. Subsequently, stirring was performed at 5° C. for 1 hour. Hereby, a diazonium solution was prepared.

(II-3-e) (37.2 g, 241 mmol) and MeOH were mixed with each other, and the resulting mixture was cooled to 0° C. To the mixture, the above diazonium solution was added dropwise over 40 minutes. Subsequently, the temperature was increased to 25° C. and stirring was performed for 3 hours. Then, the precipitated solid was collected by filtration. The resulting crude product was washed with hexane. Hereby, 48.1 g of (II-3-f) was prepared.

Synthesis of (II-3-g):

In a nitrogen stream, (II-3-f) (48.1 g, 125.7 mmol), sodium thiocyanate (20.4 g, 251.4 mmol), and acetic acid (720 mL) were mixed with one another. To the resulting mixture, N-bromosuccinimide (24.6 g, 138.3 mmol) was added dropwise. Subsequently, stirring was performed at 25° C. for 3 hours. Then, water (600 mL) was added to and mixed with the stirred mixture, and a solid component was collected by filtration. The solid component was vacuum-dried to prepare a crude product. The crude product was purified by silica gel chromatography (dichloromethane/methanol). Hereby, 31.4 g of (II-3-g) was prepared.

Synthesis of (II-3):

(II-3-g) (0.75 g, 1.86 mmol), acetic acid (3.8 mL), and hydrochloric acid (3.8 mL) were mixed with one another, and the resulting mixture was cooled to 3° C. To the mixture, sodium nitrite (0.17 g, 2.42 mmol) was added. The resulting mixture was stirred at 3° C. for 1 hour to form a diazonium solution.

The concentration of the comparative dye (III-4) described below in a cyclopentanone-saturated solution was also measured.

<Dye (III-2)>

A dye (III-2) was synthesized in accordance with the synthesis method described below.

[Chem. 32]

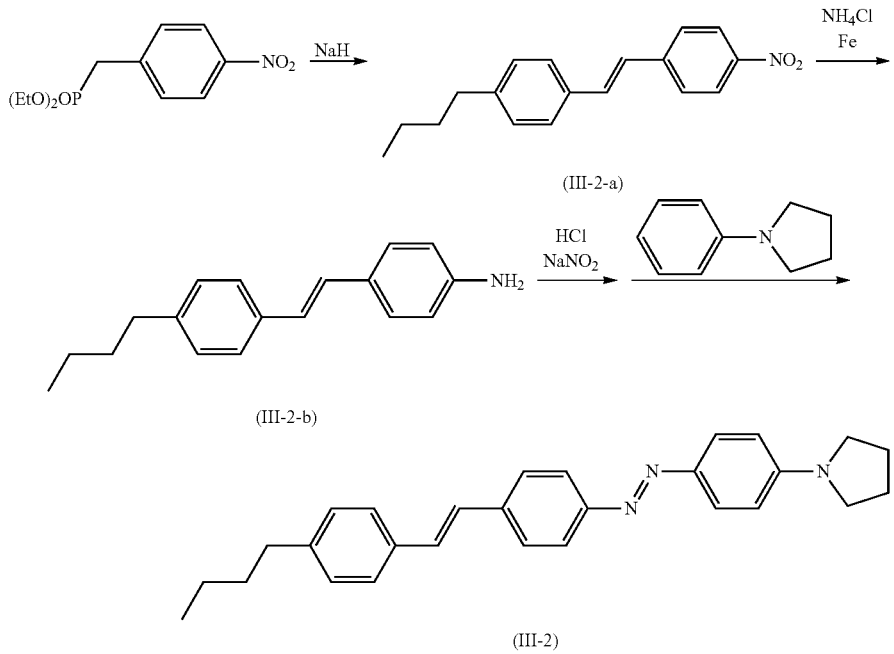

Diethylaniline (0.56 g, 3.73 mmol), tetrahydrofuran (15 mL), and sodium acetate (7.4 g) were mixed with one another, and the resulting mixture was cooled to 3° C. To the mixture, the above diazonium solution was added dropwise over 1 hour. Subsequently, stirring was performed at 3° C. for 3 hours. Then, the temperature was increased to 25° C., and stirring was performed for 12 hours. Subsequently, water (7.5 mL) and methanol (15 mL) were added to the mixture, and stirring was further performed. The precipitated solid was collected by filtration. The resulting crude product was purified by silica gel chromatography (hexane/dichloromethane). Hereby, 0.14 g of a dye (II-3) was prepared.

The local maximum absorption wavelength (λmax) and gram absorptivity of the dye (II-3) included in a 10 ppm chloroform solution were 563 nm and 134.8 $Lg^{-1}cm^{-1}$, respectively.

The results of structure identification by NMR are described below.

$^1$H-NMR (CDCl$_3$, 400 MHz) δ0.93 (s, 9H), 51.03 (d, 3H, J=6.7 Hz), δ1.13-1.18 (m, 1H), δ1.28-1.37 (m, 7H), δ1.65-1.72 (m, 1H), δ1.76-1.91 (m, 2H), δ3.53 (q, 4H, J=7.2 Hz), δ4.09 (t, 2H, J=6.7 Hz), δ6.76 (d, 2H, 9.4 Hz), δ7.00 (d, 2H, 9.1 Hz), δ7.85 (s, 1H), 57.88 (d, 2H, 9.1 Hz), δ7.95 (d, 2H, 9.4 Hz)

The solubility of the dye (II-3) in cyclopentanone, which was measured (detection absorption wavelength: 254 nm) as in the measurement of the solubility of the dye (IV-1) described below in cyclopentanone, was 0.3%.

Synthesis of (III-2-a):

To a reaction container cooled with ice, tetrahydrofuran (100 mL) and sodium hydride (purity: 60%, 6.7 g, 168.0 mmol) were added. To the resulting mixture, a mixture of diethyl (4-nitrobenzyl)phosphonate (18.0 g, 65.9 mmol), 4-butylbenzaldehyde (9.1 g, 56.1 mmol), and tetrahydrofuran (50 mL) was added dropwise over 10 minutes. Subsequently, washing was performed vigorously with tetrahydrofuran (30 mL). Then, stirring was performed at 50° C. for 0.5 hours. The reaction liquid was charged into water. Subsequently, extraction was performed with ethyl acetate. Then, washing was performed with water and a saturated saline solution. Subsequently, the solvent was distilled away. The resulting crude product was dissolved in ethyl acetate (20 mL) while being heated. Then, hexane (50 mL) was added to the solution, and the resulting mixture was cooled. The precipitate was collected by filtration, washed with hexane, and then dried under reduced pressure. Hereby, 15.0 g of (III-2-a) was prepared.

Synthesis of (III-2-b):

(III-2-a) (15.0 g, 53.3 mmol), tetrahydrofuran (150 mL), and an iron powder (13.9 g, 248.9 mmol) were mixed with one another. To the resulting mixture, ammonium chloride (13.3 g, 248.6 mmol) dissolved in water (30 mL) was added dropwise. Subsequently, stirring was performed at 50° C. for 3 hours. Then, filtration was performed with cerite, extraction was performed with ethyl acetate, washing was performed with water and a saturated saline solution, and subsequently the solvent was distilled away. The resulting crude product was suspended in hexane. Subsequently, the precipitate was collected by filtration, washed with hexane, and then dried. Hereby, 10.9 g of (III-2-b) was prepared.
Synthesis of (III-2):

(III-2-b) (2.51 g, 10.0 mmol), N-methylpyrrolidone (40 mL), concentrated hydrochloric acid (2.2 mL), and water (20 mL) were mixed with one another, and the resulting mixture was cooled to 3° C. Subsequently, sodium nitrite (789 mg, 11.4 mmol) was added to the mixture. Then, stirring was performed at 15° C. for 3.5 hours.

1-Phenylpyrrolidine (1.47 g, 10.0 mmol), methanol (60 mL), and water (30 mL) were mixed with one another, and the pH of the resulting mixture was adjusted to 3.5 with concentrated hydrochloric acid. While the pH of the mixture was maintained to be 3 to 5 by the addition of an aqueous sodium hydroxide solution, the above solution containing a diazonium salt was added dropwise to the mixture. Subsequently, stirring was performed at 15° C. for 3 hours.

(hexane/methylene chloride). Hereby, 3.06 g of a dye (III-2), which was a red solid, was prepared.

The local maximum absorption wavelength (λmax) and gram absorptivity of the dye (III-2) included in a 10 ppm chloroform solution were 459 nm and 107.6 $Lg^{-1}cm^{-1}$, respectively.

The results of structure identification by NMR are described below.

1H-NMR ($CDCl_3$, 400 MHz) δ0.94 (t, 3H, J=7.2 Hz), 1.32-1.43 (m, 2H), 1.55-1.68 (m, 2H), 2.00-2.12 (m, 4H), 2.62 (t, 2H, J=7.6 Hz), 3.41 (t, 4H, J=6.4 Hz), 6.63 (d, 2H, J=8.8 Hz), 7.14 (d, 2H, J=8.8 Hz), 7.19 (d, 2H, J=8.0 Hz), 7.45 (d, 2H, J=8.0 Hz), 7.60 (d, 2H, J=8.4 Hz), 7.84 (d, 2H, J=8.4 Hz), 7.88 (d, 2H, J=9.2 Hz)

The chemical structures of the polymerizable liquid crystal compound (I-1) and the dyes (II-1), (III-2), (II-2), and (II-3) synthesized above are described below. In the following formulae, $C_{11}H_{22}$ means that 11 methylene chains are bonded to one another in a straight chain-form.

[Chem. 33]

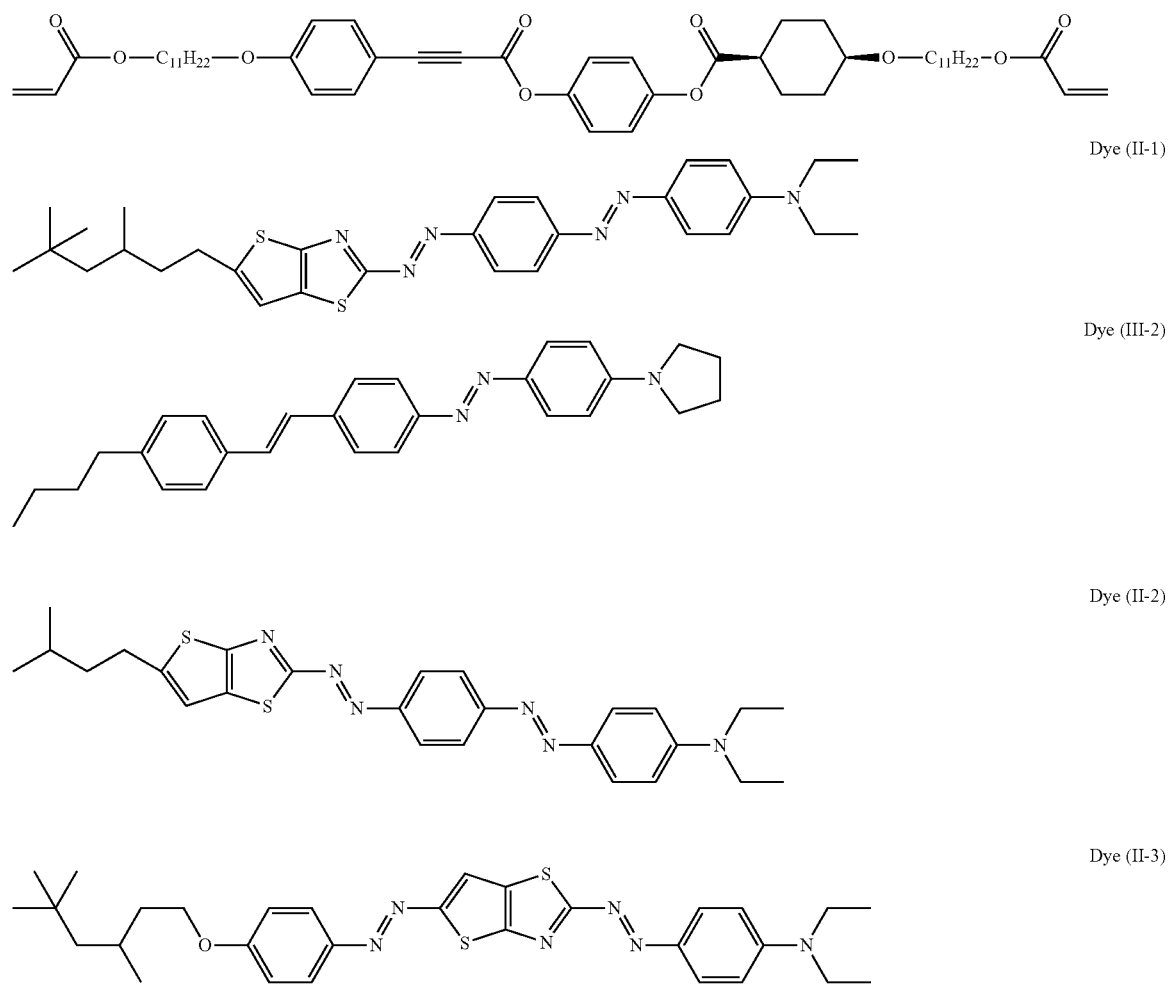

The resulting precipitate was filtered, washed with water, and then dried under reduced pressure. The resulting crude product was purified by silica gel column chromatography The chemical structures of the dyes (III-1), (III-3), and (III-4) used in Examples and Comparative Examples are described below.

[Chem. 34]

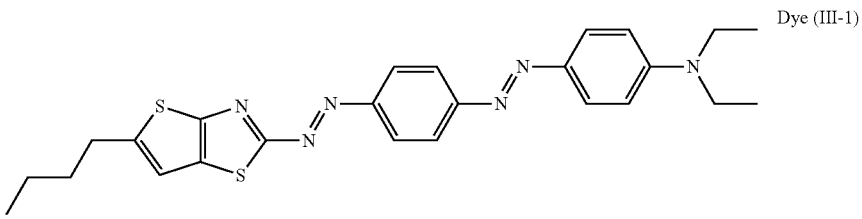
Dye (III-1)

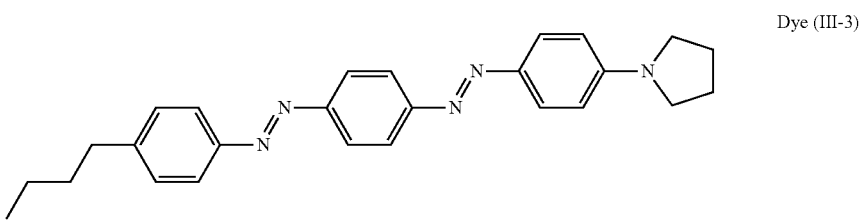
Dye (III-3)

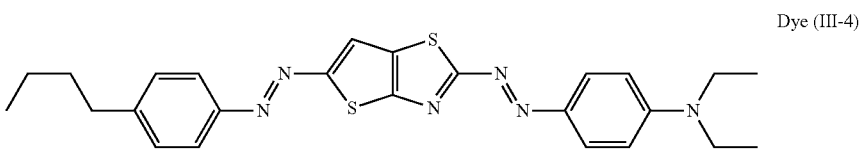
Dye (III-4)

Example I-1

To 2959.1 parts of chloroform, 20.00 parts of the polymerizable liquid crystal compound (I-1) and 0.30 parts of the dye (II-1) were added. The resulting mixture was stirred in order to dissolve the above materials in each other. Subsequently, the solvent was removed. Hereby, an anisotropic dye film-forming composition I-1 was prepared. The $r_{n1}/r_{n2}$ of the anisotropic dye film-forming composition I-1 was 1.

It was confirmed that the anisotropic dye film-forming composition I-1 exhibited liquid crystallinity since birefringence was observed at 40° C. with a polarizing microscope equipped with a hot stage.

In order to determine dichroic ratio by the above-described method, an anisotropic dye film I-1 was prepared using the anisotropic dye film-forming composition I-1 and a sandwich cell having a cell gap of 8.0 μm, and the dichroic ratio of the anisotropic dye film I-1 was determined.

Table 1 lists the results.

Comparative Example I-1

An anisotropic dye film-forming composition I-2 and an anisotropic dye film I-2 were prepared as in Example I-1, except that 0.27 parts of a dye (III-1) (produced by Showa Kako Corp.) was used instead of 0.30 parts of the dye (II-1). The $r_{n1}/r_{n2}$ of the anisotropic dye film-forming composition I-2 was 1.

It was confirmed that the anisotropic dye film-forming composition I-2 exhibited liquid crystallinity since birefringence was observed at 40° C. with a polarizing microscope equipped with a hot stage.

The dichroic ratio of the anisotropic dye film I-2 was determined.

Table 1 lists the results.

TABLE 1

| | Example I-1 | Comparative Example I-1 |
|---|---|---|
| Polymerizable liquid crystal compound | I-1 | I-1 |
| Dye | II-1 | III-1 |
| Temperature at which maximum dichroic ratio was exhibited (° C.) | 40 | 40 |
| Wavelength at which local maximum dichroic ratio was exhibited in the range of 350 to 800 nm (nm) | 645 | 645 |
| Dichroic ratio at the above wavelength | 42.4 | 40.4 |
| Solubility of the dye in toluene (mass %) | 0.5 | 0.2 |

The results described in Table 1 confirm that the solubility of the dye (II-1) used in Example I-1 in toluene was high and that the anisotropic dye film prepared in Example I-1 had a high dichroic ratio. In contrast, in Comparative Example I-1, it was confirmed that high solubility in toluene and a high dichroic ratio could not be achieved at the same time.

Example I-2

To 19.65 parts of the polymerizable liquid crystal compound (I-1), 0.09 parts of the dye (III-2) dissolved in 885.3 parts of chloroform, 0.10 parts of a dye (III-3) (produced by Hayashibara Co., Ltd.) dissolved in 1039.9 parts of chloroform, and 0.23 parts of the dye (II-1) dissolved in 2305.2 parts of chloroform were added. The resulting mixture was stirred in order to dissolve the above materials in one another. Subsequently, the solvent was removed. Hereby, an anisotropic dye film-forming composition I-3 was prepared. The $r_{n1}/r_{n2}$ of the anisotropic dye film-forming composition I-3 was 1 in any combination of liquid crystal and dye.

It was confirmed that the anisotropic dye film-forming composition I-3 exhibited liquid crystallinity since birefringence was observed at 40° C. with a polarizing microscope equipped with a hot stage.

An anisotropic dye film I-3 was prepared using the anisotropic dye film-forming composition I-3 as in Example I-1, and the dichroic ratio of the anisotropic dye film I-3 was determined.

The maximum dichroic ratio of the anisotropic dye film I-3 was 40.5 at 40° C. and a wavelength of 620 nm. The maximum absorption wavelengths of the dyes (III-2) and (III-3) in the polymerizable liquid crystal compound (I-1) were 495 nm and 530 nm, respectively.

Example I-3

To 718.2 parts of cyclopentanone, 243.6 parts of the polymerizable liquid crystal compound (I-1), 4.07 parts of the dye (II-1), 5.58 parts of IRGACURE (registered trademark) 369 (produced by BASF SE), and 3.62 parts of BYK-361N (produced by BYK-Chemie) were added. After the resulting mixture was stirred while being heated at 80° C., the mixture was filtered using a syringe equipped with a syringe filter (produced by Membrane Solutions, PTFE13045, diameter: 0.45 μm). Hereby, a composition for anisotropic dye films I-4 was prepared. The $r_{n1}/r_{n2}$ of the composition for anisotropic dye films I-4 was 1.

The composition for anisotropic dye films I-4 was deposited, by spin coating, on a substrate prepared by forming a polyimide alignment film (LX1400 produced by HD MicroSystems, Ltd., the alignment film was formed by a rubbing method) on a glass plate. After drying had been performed for 2 minutes by heating at 120° C., the temperature was cooled to a liquid crystal phase. Then, polymerization was performed at an exposure of 500 mj/cm$^2$ (in terms of 365 nm). Hereby, an anisotropic dye film I-4 was prepared.

When the anisotropic dye film I-4 was held over a commercial polarizing plate and rotated, it appeared dark and bright alternately. This confirmed that the anisotropic dye film exhibited suitable performance with which the anisotropic dye film can be used as a polarizing film.

Example I-4

An anisotropic dye film-forming composition I-5 and an anisotropic dye film I-5 were prepared as in Example I-1, except that 0.28 parts of the dye (II-2) was used instead of 0.30 parts of the dye (II-1). The $r_{n1}/r_{n2}$ of the anisotropic dye film-forming composition I-5 was 1.

It was confirmed that the anisotropic dye film-forming composition I-5 exhibited liquid crystallinity since birefringence was observed at 40° C. with a polarizing microscope equipped with a hot stage.

The dichroic ratio of the anisotropic dye film I-5 was determined.

Table 2 lists the results.

TABLE 2

|  | Example I-4 |
| --- | --- |
| Polymerizable liquid crystal compound | I-1 |
| Dye | II-2 |
| Temperature (° C.) | 40 |
| Wavelength at which local maximum dichroic ratio was exhibited in the range of 350 to 800 nm (nm) | 645 |

TABLE 2-continued

|  | Example I-4 |
| --- | --- |
| Dichroic ratio at the above wavelength | 41 |
| Solubility of the dye in toluene (mass %) | 0.7 |

The results described in Table 2 confirm that the solubility of the dye (II-2) used in Example I-4 in toluene was high and that the anisotropic dye film prepared in Example I-4 had a high dichroic ratio.

Example I-5

An anisotropic dye film-forming composition I-6 and an anisotropic dye film I-6 were prepared as in Example I-1, except that 0.27 parts of the dye (II-3) was used instead of 0.30 parts of the dye (II-1). The $r_{n1}/r_{n2}$ of the anisotropic dye film-forming composition I-6 was 1.

It was confirmed that the anisotropic dye film-forming composition I-6 exhibited liquid crystallinity since birefringence was observed at 40° C. with a polarizing microscope equipped with a hot stage.

The dichroic ratio of the anisotropic dye film I-6 was determined.

Table 3 lists the results.

Comparative Example I-2

An anisotropic dye film-forming composition I-7 and an anisotropic dye film I-7 were prepared as in Example I-1, except that 0.20 parts of the dye (III-4) was used instead of 0.30 parts of the dye (II-1). The $r_{n1}/r_{n2}$ of the anisotropic dye film-forming composition I-7 was 1.

It was confirmed that the anisotropic dye film-forming composition I-7 exhibited liquid crystallinity since birefringence was observed at 40° C. with a polarizing microscope equipped with a hot stage.

The dichroic ratio of the anisotropic dye film I-7 was determined.

Table 3 lists the results.

TABLE 3

|  | Example I-5 | Comparative Example I-2 |
| --- | --- | --- |
| Polymerizable liquid crystal compound | I-1 | I-1 |
| Dye | II-3 | III-4 |
| Temperature (° C.) | 40 | 40 |
| Wavelength at which local maximum dichroic ratio was exhibited in the range of 350 to 800 nm (nm) | 665 | 665 |
| Dichroic ratio at the above wavelength | 47 | 47 |
| Solubility of the dye in cyclopentanone (mass %) | 0.3 | 0.2 |

The results described in Table 3 confirm that the dye (II-3) used in Example I-5 had a high dichroic ratio in the anisotropic dye film prepared and that the solubility of the dye (II-3) in cyclopentanone was high compared with the dye (III-4) used in Comparative Example I-2.

Synthesis Examples, Examples, and Comparative Examples of Second Invention

[Synthesis of Dye]
<Dye (IV-1)>
A dye (IV-1) was synthesized in accordance with the synthesis method described below.

[Chem. 35]

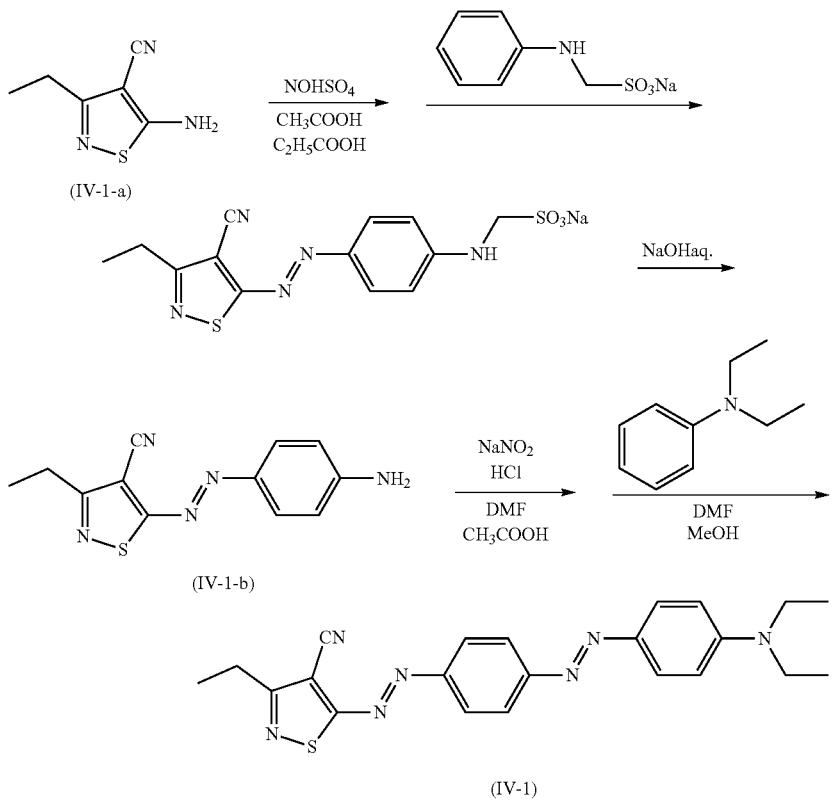

Synthesis of (IV-1-a):
(IV-1-a) was synthesized by the method described in WO2015/048281A.

Synthesis of (IV-1-b):
(IV-1-a) (0.5 g, 3.3 mmol), acetic acid (5 mL), and propionic acid (3 mL) were mixed with one another, and the resulting mixture was cooled to 0° C. To the mixture, a solution prepared by mixing concentrated sulfuric acid (2 mL) with water (2 mL) was added. Then, 40% nitrosylsulfuric acid (1.1 g, 3.4 mmol) was added to the mixture. Subsequently, stirring was performed at 0° C. for 1 hour. To the stirred mixture, a 10% amidosulfuric acid solution (0.3 g, 0.3 mmol) was added. Hereby, a diazonium solution was prepared.

Aniline (1.3 g, 13.4 mmol), formaldehyde sodium bisulfite (1.8 g, 13.4 mmol), and water (50 mL) were mixed with one another, and the resulting mixture was stirred at 70° C. for 2 hours. After the mixture had been cooled to 0° C., the above diazonium solution was added dropwise to the mixture over 30 minutes. Then, stirring was performed at 0° C. for 2 hours. The precipitated solid was collected by filtration and dispersed in a 1 M aqueous sodium hydroxide solution (3 mL) and water (14 mL). Subsequently, stirring was performed at 90° C. for 2 hours. After air cooling had been performed, the precipitated solid was collected by filtration. The solid was washed with water and then vacuum-dried at 40° C. Hereby, 0.6 g of (IV-1-b) was prepared.

Synthesis of (IV-1):
(IV-1-b) (0.6 g, 2.4 mmol), dimethylformamide (20 mL), and acetic acid (5 mL) were mixed with one another. To the resulting mixture, 35% hydrochloric acid (1 mL) was added. Subsequently, the temperature was reduced to 3° C. Then, sodium nitrite (0.2 g, 2.7 mmol) dissolved in water (2 mL) was added to the mixture. Subsequently, stirring was performed at 3° C. for 1 hour. To the stirred mixture, a 10% amidosulfuric acid solution (0.2 g, 0.2 mmol) was added. Hereby, a diazonium solution was prepared.

Diethylaniline (0.4 g, 2.4 mmol), methanol (8 mL), and dimethylformamide (1 mL) were mixed with one another, and the resulting mixture was cooled to 3° C. Then, while the pH of the mixture was adjusted to 3 to 4 with a 25% aqueous sodium hydroxide solution, the above diazonium solution was added dropwise to the mixture over 30 minutes. Subsequently, stirring was performed at 3° C. for 2 hours. The precipitated solid was collected by filtration. The resulting crude product was purified by silica gel column chromatography (hexane/dichloromethane). Hereby, 0.2 g of a dye (IV-1) was prepared.

The local maximum absorption wavelength (λmax) and gram absorptivity of the dye (IV-1) included in a 10 ppm chloroform solution were 581 nm and 95.1 $Lg^{-1}cm^{-1}$, respectively.

The results of structure identification by NMR are described below.

¹H-NMR (CDCl₃, 400 MHz) δ1.26 (t, 6H, J=7.1 Hz), δ1.44 (t, 3H, J=7.5 Hz), δ3.04 (q, 2H, J=7.6 Hz), δ3.49 (q, 4H, J=7.2 Hz), δ6.75 (d, 2H, J=9.3 Hz), δ7.91 (d, 2H, J=9.2 Hz), δ7.97 (d, 2H, J=8.8 Hz), δ8.12 (d, 2H, J=8.8 Hz)

The solubility of the dye (IV-1) in cyclopentanone was measured.

To 103 mg of cyclopentanone, 3 mg of the dye (IV-1) was added, and the resulting mixture was stirred at 80° C. for 5 minutes. The mixture was left to stand for 1 hour at room temperature. The resulting liquid mixture was filtered with a syringe equipped with a syringe filter (produced by Membrane Solutions Limited, PTFE13045, diameter: 0.45 μm). Hereby, a cyclopentanone-saturated solution of the dye (IV-1) was prepared. The above solution was diluted with 746 mg of tetrahydrofuran, and the concentration of the solution was determined using HPLC (L-2300 Series produced by Hitachi High-Technologies Corporation). A 0.1-mass % tetrahydrofuran solution of the dye (IV-1) was prepared, and a calibration curve was prepared at an absorption wavelength of 254 nm. The concentration of the cyclopentanone-saturated solution was measured using the above calibration curve. Table 4 lists the results.

<Dye (IV-2)>

A dye (IV-2) was synthesized in accordance with the synthesis method described below.

the stirred mixture, a 10% amidosulfuric acid solution (0.3 g, 0.3 mmol) was added. Hereby, a diazonium solution was prepared.

Aniline (1.0 g, 10.8 mmol), formaldehyde sodium bisulfite (1.5 g, 10.8 mmol), and water (50 mL) were mixed with one another, and the resulting mixture was stirred at 70° C. for 2 hours. After the mixture had been cooled to 3° C., the above diazonium solution was added dropwise to the mixture over 30 minutes. Then, stirring was performed at 3° C. for 2 hours. The precipitated solid was collected by filtration and dispersed in a 25% aqueous sodium hydroxide solution (1 mL) and water (16 mL). Subsequently, stirring was performed at 90° C. for 2 hours. After air cooling had been performed, the precipitated solid was collected by filtration. The solid was washed with water and then vacuum-dried at 40° C. Hereby, 0.4 g of (IV-2-a) was prepared.

Synthesis of (IV-2):

(IV-2-a) (0.4 g, 1.5 mmol), dimethylformamide (14 mL), and acetic acid (4 mL) were mixed with one another. After 35% hydrochloric acid (1 mL) had been added to the resulting mixture, the mixture was cooled to 3° C. Then, to the mixture, sodium nitrite (0.1 g, 1.6 mmol) dissolved in water (1 mL) was added. The resulting mixture was stirred at 3° C. for 3 hours. To the stirred mixture, a 10% amido-

[Chem. 36]

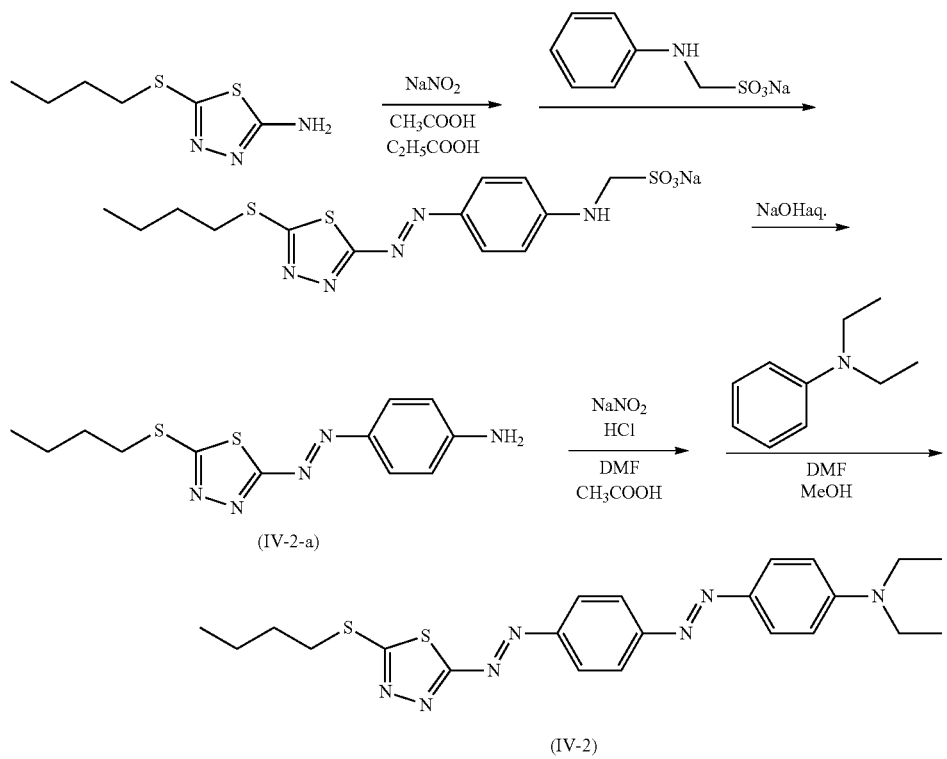

Synthesis of (IV-2-a):

Concentrated sulfuric acid (1 mL) and sodium nitrite (0.2 g, 2.8 mmol) were mixed with each other. The resulting mixture was stirred at 60° C. for 30 minutes and then cooled to 3° C. Then, to the mixture, acetic acid (5 mL) and propionic acid (2 mL) were added, and 5-butylthio-1,3,4-thiadiazole-2-amine (0.5 g, 2.6 mmol) was further added. Subsequently, stirring was performed at 3° C. for 1 hour. To sulfuric acid solution (0.1 g, 0.1 mmol) was added. Hereby, a diazonium solution was prepared.

Diethylaniline (0.2 g, 1.5 mmol), methanol (5 mL), and dimethylformamide (1 mL) were mixed with one another, and the resulting mixture was cooled to 3° C. Then, while the pH of the mixture was adjusted to 3 to 4 with a 25% aqueous sodium hydroxide solution, the above diazonium solution was added dropwise to the mixture over 30 minutes.

Subsequently, stirring was performed at 3° C. for 2 hours. The precipitated solid was collected by filtration. The resulting crude product was purified by silica gel column chromatography (hexane/ethyl acetate). Hereby, 0.1 g of a dye (IV-2) was prepared.

The local maximum absorption wavelength (λmax) and gram absorptivity of the dye (IV-2) included in a 10 ppm chloroform solution were 551 nm and 83.9 Lg$^{-1}$cm$^{-1}$, respectively.

The results of structure identification by NMR are described below.

1H-NMR (CDCl$_3$, 400 MHz) δ0.99 (t, 3H, J=7.4 Hz), δ1.26 (t, 6H, J=7.1 Hz), δ1.48-1.58 (m, 2H), 51.81-1.89 (m, 2H), 53.42-3.52 (m, 6H), 56.74 (d, 2H, J=9.2 Hz), δ7.90 (d, 2H, J=9.2 Hz), δ7.96 (d, 2H, J=8.8 Hz), δ8.10 (d, 2H, J=8.8 Hz)

The solubility of the dye (IV-2) in cyclopentanone was measured (detection absorption wavelength: 254 nm) as in the measurement of the solubility of the dye (IV-1). Table 4 lists the results.

<Dye (IV-3)>

A dye (IV-3) was synthesized in accordance with the synthesis method described below.

[Chem. 37]

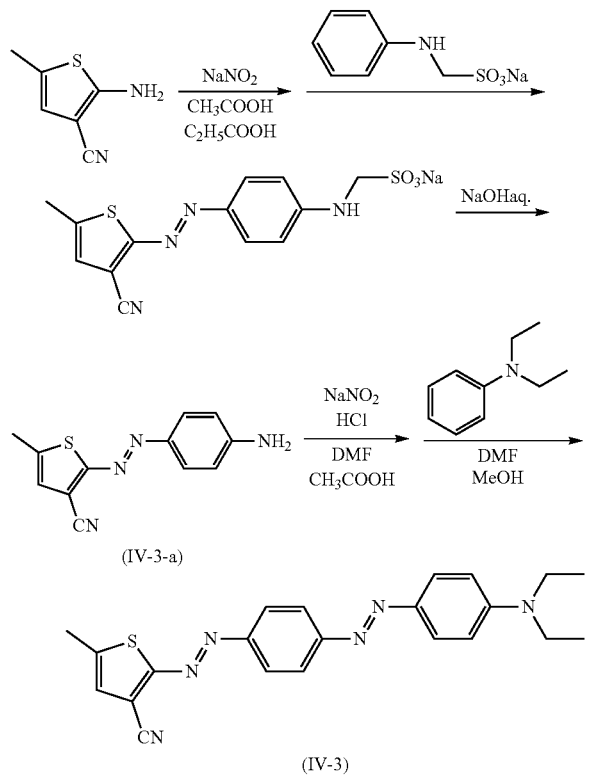

(IV-3)

Synthesis of (IV-3-a):

2-Amino-5-methyl-3-thiophene carbonitrile (0.5 g, 3.6 mmol), acetic acid (5 mL), and propionic acid (3 mL) were mixed with one another. The resulting mixture was cooled to 3° C. Then, to the mixture, a solution prepared by mixing concentrated sulfuric acid (2 mL) with water (2 mL) was added, and a 40% nitrosylsulfuric acid (1.2 g, 3.8 mmol) was further added. Subsequently, stirring was performed at 3° C. for 1 hour. To the stirred mixture, a 10% amidosulfuric acid solution (0.4 g, 0.4 mmol) was added. Hereby, a diazonium solution was prepared.

Aniline (1.4 g, 14.8 mmol), formaldehyde sodium bisulfite (2.0 g, 14.8 mmol), and water (50 mL) were mixed with one another, and the resulting mixture was stirred at 70° C. for 2.5 hours. After the mixture had been cooled to 3° C., the above diazonium solution was added dropwise to the mixture over 30 minutes. Then, stirring was performed at 3° C. for 2 hours. The precipitated solid was collected by filtration and dispersed in a 25% aqueous sodium hydroxide solution (1 mL) and water (16 mL). Subsequently, stirring was performed at 90° C. for 2 hours. After air cooling had been performed, the precipitated solid was collected by filtration. The solid was washed with water and then vacuum-dried at 40° C. Hereby, 0.6 g of (IV-3-a) was prepared.

Synthesis of (IV-3):

(IV-3-a) (0.6 g, 2.5 mmol), dimethylformamide (20 mL), and acetic acid (5 mL) were mixed with one another. After 35% hydrochloric acid (1 mL) had been added to the resulting mixture, the mixture was cooled to 3° C. Then, to the mixture, sodium nitrite (0.2 g, 2.8 mmol) dissolved in water (2 mL) was added. The resulting mixture was stirred at 3° C. for 1 hour. To the stirred mixture, a 10% amidosulfuric acid solution (0.2 g, 0.2 mmol) was added. Hereby, a diazonium solution was prepared.

Diethylaniline (0.4 g, 2.5 mmol), methanol (7 mL), and dimethylformamide (1 mL) were mixed with one another, and the resulting mixture was cooled to 3° C. Then, while the pH of the mixture was adjusted to 3 to 4 with a 25% aqueous sodium hydroxide solution, the above diazonium solution was added dropwise to the mixture over 30 minutes. Subsequently, stirring was performed at 3° C. for 1.5 hours. The precipitated solid was collected by filtration. The resulting crude product was purified by silica gel column chromatography (hexane/ethyl acetate). Hereby, 0.2 g of a dye (IV-3) was prepared.

The local maximum absorption wavelength (λmax) and gram absorptivity of the dye (IV-3) included in a 10 ppm chloroform solution were 541 nm and 100.0 Lg$^{-1}$cm$^{-1}$, respectively.

The results of structure identification by NMR are described below.

1H-NMR (CDCl$_3$, 400 MHz) δ1.25 (t, 6H, J=7.1 Hz), δ2.55 (s, 3H), 53.48 (q, 4H, J=7.1 Hz), δ6.74 (d, 2H, J=9.3 Hz), 57.05 (s, 1H), 57.90 (d, 2H, J=9.2 Hz), δ7.94 (d, 2H, J=8.9 Hz), δ8.05 (d, 2H, J=8.9 Hz)

The solubility of the dye (IV-3) in cyclopentanone was measured (detection absorption wavelength: 254 nm) as in the measurement of the solubility of the dye (IV-1). Table 4 lists the results.

<Dye (IV-4)>

A dye (IV-4) was synthesized in accordance with the synthesis method described below.

[Chem. 38]

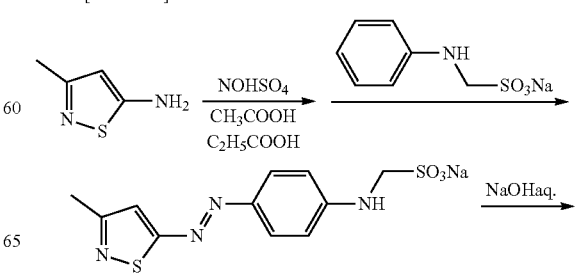

-continued

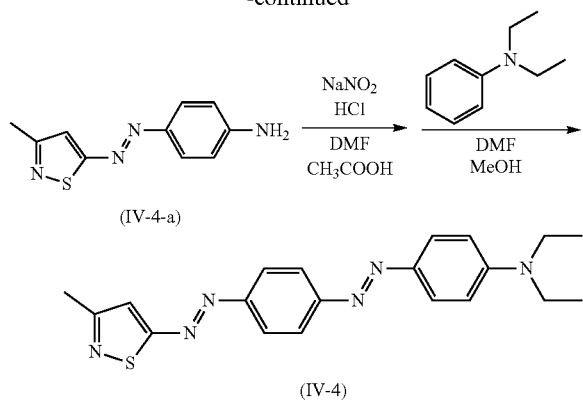

(IV-4-a)

(IV-4)

Synthesis of (IV-4-a):

5-Amino-3-methylisothiazole (0.5 g, 4.4 mmol), acetic acid (5 mL), and propionic acid (3 mL) were mixed with one another. The resulting mixture was cooled to 0° C. Then, to the mixture, a solution prepared by mixing concentrated sulfuric acid (2 mL) with water (2 mL) was added, and a 40% nitrosylsulfuric acid (1.5 g, 4.6 mmol) was further added. Subsequently, stirring was performed at 0° C. for 1 hour. To the stirred mixture, a 10% amidosulfuric acid solution (0.4 g, 0.4 mmol) was added. Hereby, a diazonium solution was prepared.

Aniline (1.7 g, 18.0 mmol), formaldehyde sodium bisulfite (2.4 g, 18.0 mmol), and water (50 mL) were mixed with one another, and the resulting mixture was stirred at 70° C. for 2.5 hours. After the mixture had been cooled to 0° C., the above diazonium solution was added dropwise to the mixture over 1 hour. Then, stirring was performed at 0° C. for 2 hours. The precipitated solid was collected by filtration and dispersed in a 25% aqueous sodium hydroxide solution (1 mL) and water (16 mL). Subsequently, stirring was performed at 60° C. for 3 hours. After air cooling had been performed, the precipitated solid was collected by filtration.

The solid was washed with water and then vacuum-dried at 40° C. Hereby, 0.6 g of (IV-4-a) was prepared.

Synthesis of (IV-4):

(IV-4-a) (0.6 g, 2.9 mmol), dimethylformamide (21 mL), and acetic acid (5 mL) were mixed with one another. After 35% hydrochloric acid (1 mL) had been added to the resulting mixture, the mixture was cooled to −3° C. Then, to the mixture, sodium nitrite (0.2 g, 3.2 mmol) dissolved in water (2 mL) was added. The resulting mixture was stirred at −3° C. for 1 hour. To the stirred mixture, a 10% amidosulfuric acid solution (0.3 g, 0.3 mmol) was added. Hereby, a diazonium solution was prepared.

Diethylaniline (0.4 g, 2.9 mmol), methanol (8 mL), and dimethylformamide (1 mL) were mixed with one another, and the resulting mixture was cooled to −3° C. Then, while the pH of the mixture was adjusted to 3 to 4 with a 25% aqueous sodium hydroxide solution, the above diazonium solution was added dropwise to the mixture over 30 minutes. Subsequently, stirring was performed at 0° C. for 1 hour. The precipitated solid was collected by filtration. The resulting crude product was washed with water and hexane. Hereby, 0.5 g of a dye (IV-4) was prepared.

The local maximum absorption wavelength (λmax) and gram absorptivity of the dye (IV-4) included in a 10 ppm chloroform solution were 528 nm and 104.9 Lg$^{-1}$cm$^{-1}$, respectively.

The results of structure identification by NMR are described below.

$^1$H-NMR (CDCl$_3$, 400 MHz) δ1.25 (t, 6H, J=7.0 Hz), δ2.54 (s, 3H), δ3.47 (q, 4H, J=7.1 Hz), δ6.74 (d, 2H, J=9.2 Hz), δ7.72-7.75 (m, 1H), δ7.88 (d, 2H, J=9.2 Hz), δ7.96 (d, 2H, J=8.9 Hz), δ8.09 (d, 2H, J=8.9 Hz)

The solubility of the dye (IV-4) in cyclopentanone was measured (detection absorption wavelength: 254 nm) as in the measurement of the solubility of the dye (IV-1). Table 4 lists the results.

<Dye (V-1)>

A dye (V-1) was synthesized in accordance with the synthesis method described below.

[Chem. 39]

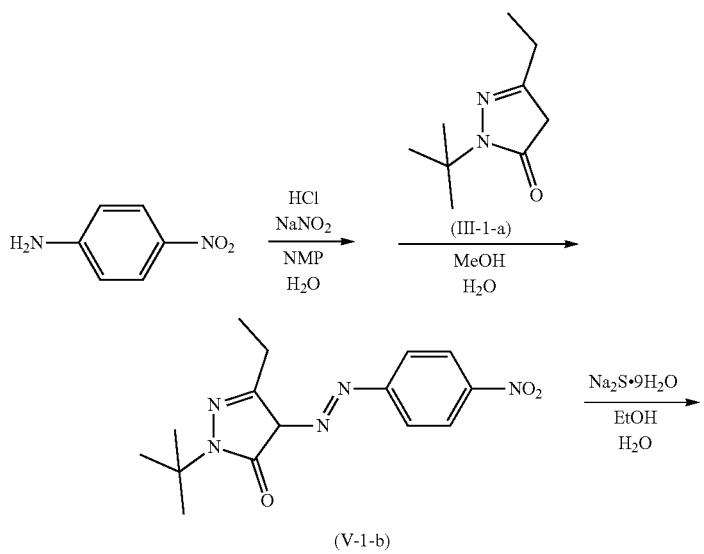

(V-1-b)

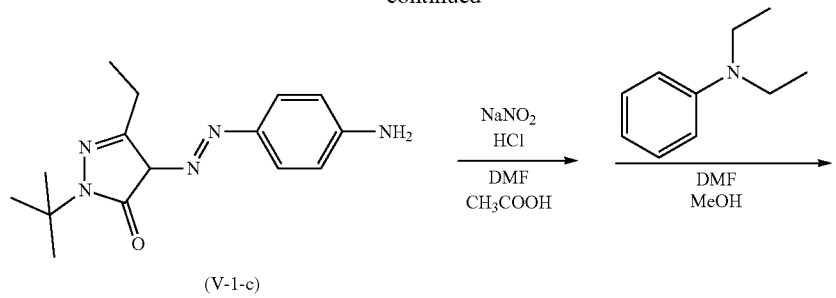

(V-1-c)

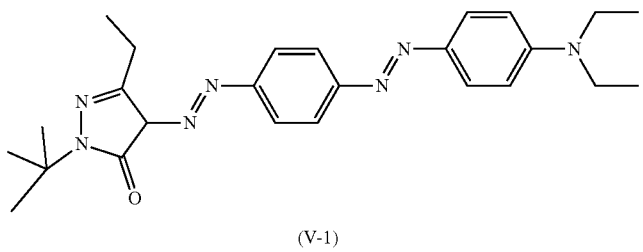

(V-1)

Synthesis of (V-1-a):

(V-1-a) was synthesized by the method described in WO2010/126163A.

Synthesis of (V-1-b):

4-Nitroaniline (0.5 g, 3.6 mmol), N-methylpyrrolidone (10 mL), and water (8 mL) were mixed with one another. To the resulting mixture, 35% hydrochloric acid (1 mL) was added. Subsequently, the temperature was reduced to 3° C. Then, sodium nitrite (0.3 g, 4.0 mmol) dissolved in water (3 mL) was added to the mixture. Subsequently, stirring was performed at 3° C. for 1 hour. To the stirred mixture, a 10% amidosulfuric acid solution (0.4 g, 0.4 mmol) was added. Hereby, a diazonium solution was prepared.

(V-1-a) (0.6 g, 3.6 mmol), methanol (6 mL), and water (1 mL) were mixed with one another, and the resulting mixture was cooled to 3° C. Subsequently, the above diazonium solution was added dropwise to the mixture over 30 minutes. Then, stirring was performed at 3° C. for 2 hours. The precipitated solid was collected by filtration, washed with water, and then vacuum-dried at 40° C. Hereby, 1.1 g of (V-1-b) was prepared.

Synthesis of (V-1-c):

(V-1-b) (1.1 g, 3.5 mmol) and ethanol (70 mL) were mixed with each other, and the resulting mixture was heated to 80° C. To the mixture, sodium sulfide nonahydrate (3.3 g, 13.9 mmol) dissolved in water (20 mL) was added. Subsequently, stirring was performed at 60° C. for 5 hours. Then, the reaction liquid was air-cooled, concentrated, washed with water, and then vacuum-dried at 40° C. Hereby, 0.4 g of (V-1-c) was prepared.

Synthesis of (V-1):

(V-1-c) (0.4 g, 1.4 mmol), dimethylformamide (13 mL), and acetic acid (3 mL) were mixed with one another. After 35% hydrochloric acid (1 mL) had been added to the resulting mixture, the mixture was cooled to 3° C. Then, to the mixture, sodium nitrite (0.1 g, 1.5 mmol) dissolved in water (1 mL) was added. The resulting mixture was stirred at 3° C. for 1 hour. To the stirred mixture, a 10% amidosulfuric acid solution (0.3 g, 0.3 mmol) was added. Hereby, a diazonium solution was prepared.

Diethylaniline (0.5 g, 3.6 mmol), methanol (6 mL), and dimethylformamide (1 mL) were mixed with one another, and the resulting mixture was cooled to 3° C. Then, while the pH of the mixture was adjusted to 3 to 4 with a 25% aqueous sodium hydroxide solution, the above diazonium solution was added dropwise to the mixture over 30 minutes. Subsequently, stirring was performed at 3° C. for 2 hours. The precipitated solid was collected by filtration. The resulting crude product was purified by silica gel column chromatography (hexane/ethyl acetate). Hereby, 0.2 g of a dye (V-1) was prepared.

The local maximum absorption wavelength (λmax) and gram absorptivity of the dye (V-1) included in a 10 ppm chloroform solution were 502 nm and 114.0 $Lg^{-1}cm^{-1}$, respectively.

The results of structure identification by NMR are described below.

1H-NMR ($CDCl_3$, 400 MHz) δ1.24 (t, 6H, J=7.1 Hz), δ1.32 (t, 3H, J=7.6 Hz), δ1.53 (s, 9H), 52.67 (q, 2H, J=7.6 Hz), 53.45 (q, 4H, J=7.1 Hz), δ6.72 (d, 2H, J=9.2 Hz), 57.44 (d, 2H, J=8.9 Hz), δ7.84 (d, 2H, J=9.2 Hz), δ7.88 (d, 2H, J=8.9 Hz)

The solubility of the dye (V-1) in cyclopentanone was measured (detection absorption wavelength: 254 nm) as in the measurement of the solubility of the dye (IV-1). Table 4 lists the results.

<Dye (V-2)>

A dye (V-2) was synthesized in accordance with the synthesis method described below.

[Chem. 40]

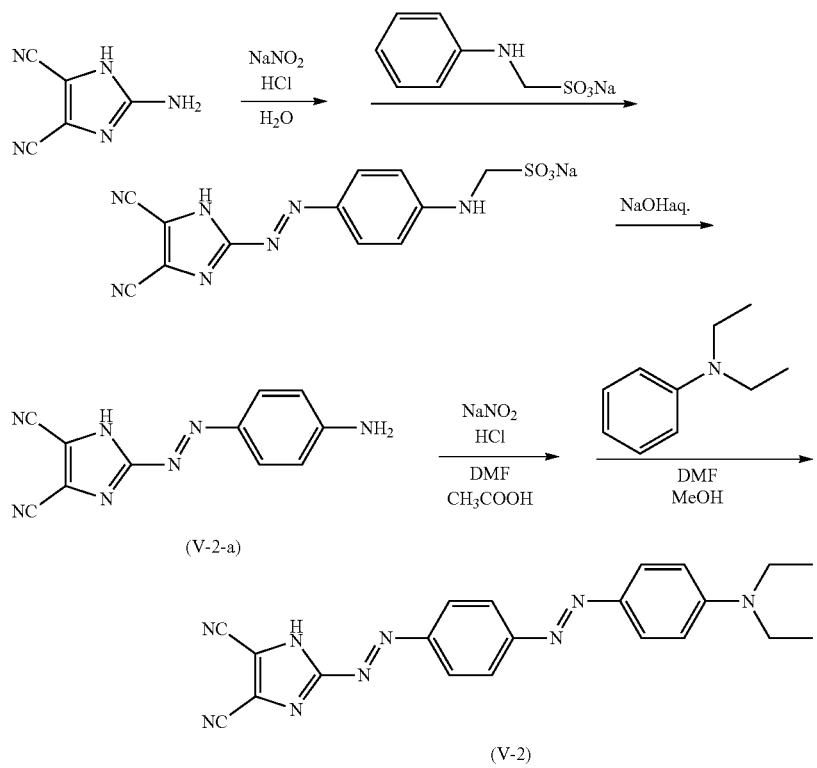

Synthesis of (V-2-a):

2-Amino-4,5-dicyano-1H-imidazole (2.0 g, 8.4 mmol) and water (60 mL) were mixed with each other. To the resulting mixture, 35% hydrochloric acid (2 mL) was added. Then, the mixture was cooled to 3° C. Subsequently, sodium nitrite (0.6 g, 9.3 mmol) dissolved in water (3 mL) was added to the mixture. Then, stirring was performed at 3° C. for 1 hour. To the stirred mixture, a 10% amidosulfuric acid solution (0.8 g, 0.8 mmol) was added. Hereby, a diazonium solution was prepared.

Aniline (5.7 g, 18.0 mmol), formaldehyde sodium bisulfite (2.4 g, 18.0 mmol), and water (50 mL) were mixed with one another, and the resulting mixture was stirred at 70° C. for 2 hours. After the mixture had been cooled to 3° C., the above diazonium solution was added dropwise to the mixture over 1 hour. Then, stirring was performed at 3° C. for 2 hours. The precipitated solid was collected by filtration and dispersed in a 25% aqueous sodium hydroxide solution (1 mL) and water (14 mL). Subsequently, stirring was performed at 90° C. for 3 hours. After air cooling had been performed, the precipitated solid was collected by filtration. The solid was washed with water and then vacuum-dried at 40° C. Hereby, 0.3 g of (V-2-a) was prepared.

Synthesis of (V-2):

(V-2-a) (0.3 g, 1.1 mmol), dimethylformamide (9 mL), and acetic acid (2 mL) were mixed with one another. After 35% hydrochloric acid (1 mL) had been added to the resulting mixture, the mixture was cooled to 3° C. Then, to the mixture, sodium nitrite (0.1 g, 1.3 mmol) dissolved in water (1 mL) was added. The resulting mixture was stirred at 3° C. for 2 hours. To the stirred mixture, a 10% amidosulfuric acid solution (0.2 g, 0.2 mmol) was added. Hereby, a diazonium solution was prepared.

Diethylaniline (0.2 g, 1.1 mmol), methanol (8 mL), and water (1 mL) were mixed with one another, and the resulting mixture was cooled to 3° C. Then, while the pH of the mixture was adjusted to 3 to 4 with a 25% aqueous sodium hydroxide solution, the above diazonium solution was added dropwise to the mixture over 30 minutes. Subsequently, stirring was performed at 3° C. for 2 hours. The precipitated solid was collected by filtration. The resulting crude product was purified by silica gel column chromatography (hexane/ethyl acetate). Hereby, 0.1 g of a dye (V-2) was prepared.

The local maximum absorption wavelength (λmax) and gram absorptivity of the dye (V-2) included in a 10 ppm chloroform solution were 545 nm and 80.5 $Lg^{-1}cm^{-1}$, respectively.

The results of structure identification by NMR are described below.

1H-NMR (DMSO-d6, 400 MHz) δ1.17 (t, 6H, J=7.0 Hz), 53.49 (q, 4H, J=7.0 Hz), δ6.85 (d, 2H, J=9.3 Hz), δ7.84 (d, 2H, J=9.2 Hz), δ7.97 (d, 2H, J=8.7 Hz), δ8.06 (d, 2H, J=8.7 Hz)

The solubility of the dye (V-2) in cyclopentanone was measured (detection absorption wavelength: 254 nm) as in the measurement of the solubility of the dye (IV-1). Table 4 lists the results.

<Dye (V-3)>

A dye (V-3) was synthesized in accordance with the synthesis method described below.

[Chem. 41]

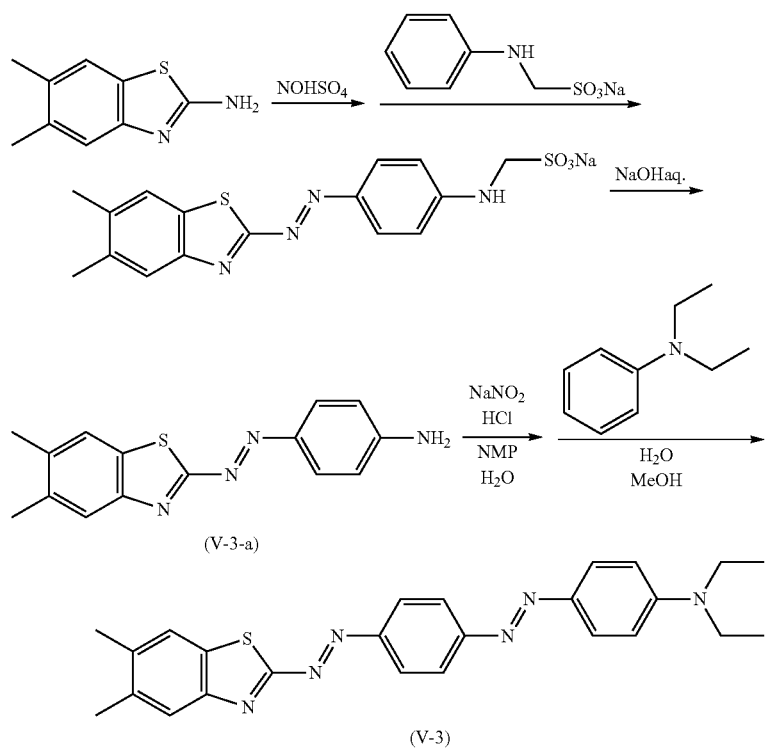

Synthesis of (V-3-a):

2-Amino-5,6-dimethylbenzothiazole (2.5 g, 14.0 mmol) and 85% phosphoric acid (38 mL) were mixed with each other, and the resulting mixture was heated to 80° C. and then dispersed. The dispersed mixture was cooled to 5° C. to 10° C. Then, 40% nitrosylsulfuric acid (5.6 g, 17.6 mmol) was added to the mixture. Subsequently, stirring was performed at 5° C. to 10° C. for 1 hour. Hereby, a diazonium solution was prepared.

Aniline (4.3 g, 46.3 mmol), formaldehyde sodium bisulfite (6.2 g, 46.3 mmol), and water (431 mL) were mixed with one another, and the resulting mixture was stirred at 70° C. for 2 hours. Then, the mixture was cooled to 5° C. to 10° C., and amidosulfuric acid (0.3 g, 2.8 mmol) was added to the mixture. After the above diazonium solution was added dropwise to the mixture over 1 hour, stirring was performed at 5° C. to 10° C. for 30 minutes. Subsequently, sodium chloride (30 g) was added to the mixture, which was then stirred for 10 minutes. The precipitated solid was collected by filtration and dispersed in a 1 M aqueous sodium hydroxide solution (250 mL). Subsequently, stirring was performed at 90° C. for 2 hours. After air cooling had been performed, the precipitated solid was collected by filtration and then washed with methanol. The solid was dissolved in chloroform, and cerite filtration was performed to remove the insoluble component. The filtrate was concentrated, and the resulting crude product was purified by silica gel column chromatography (chloroform). Subsequently, reprecipitation was performed using dimethylformamide (10 mL)/water (15 mL). Then, the solid collected by filtration was washed with methanol and subsequently, vacuum-dried at 40° C. Hereby, 2.0 g of (V-3-a) was prepared.

Synthesis of (V-3):

(V-3-a) (2.0 g, 7.1 mmol) and N-methylpyrrolidone (24 mL) were mixed with each other, and the resulting mixture was cooled to 5° C. to 10° C. After 35% hydrochloric acid (2 mL) and water (14 mL) had been added to the mixture, sodium nitrite (0.5 g, 7.8 mmol) dissolved in water (31 mL) was added to the mixture. Subsequently, the mixture was stirred at 5° C. to 10° C. for 1 hour. To the stirred mixture, a 10% amidosulfuric acid solution (0.1 g, 0.1 mmol) was added. Hereby, a diazonium solution was prepared.

Diethylaniline (1.1 g, 7.1 mmol), methanol (30 mL), and water (30 mL) were mixed with one another. The pH of the resulting mixture was adjusted to 3.5 using 35% hydrochloric acid. Then, the temperature was reduced to 5° C. to 10° C. and, while the pH of the mixture was adjusted to 5 to 6 with a 25% aqueous sodium hydroxide solution, the above diazonium solution was added dropwise to the mixture over 45 minutes. Subsequently, stirring was performed at 5° C. to 10° C. for 1 hour. To the stirred mixture, water (350 mL) was added. The precipitated solid was collected by filtration and washed with water and methanol. The solid was suspended and washed with methanol (80 mL) and then reprecipitated in dichloromethane (50 mL)/methanol (150 mL). The resulting crude product was purified by silica gel column chromatography (hexane/dichloromethane). Hereby, 0.6 g of a dye (V-3) was prepared.

The local maximum absorption wavelength (λmax) and gram absorptivity of the dye (V-3) included in a 10 ppm chloroform solution were 546 nm and 106.0 Lg$^{-1}$cm$^{-1}$, respectively.

The results of structure identification by NMR are described below.

$^1$H-NMR (CDCl$_3$, 400 MHz) δ1.26 (t, 6H, J=7.1 Hz), δ2.43 (s, 6H), δ3.49 (q, 4H, J=7.1 Hz), δ6.74 (d, 2H, J=8.9 Hz), δ7.66 (s, 1H), δ7.90-8.00 (m, 5H), δ8.17 (d, 2H, J=8.6 Hz)

The solubility of the dye (V-3) in cyclopentanone was measured (detection absorption wavelength: 254 nm) as in the measurement of the solubility of the dye (IV-1). Table 4 lists the results.

<Dye (V-4)>

A dye (V-4) was synthesized in accordance with the synthesis method described below.

precipitate was collected by filtration, washed with hexane, and then dried. Hereby, 10.9 g of (V-4-b) was prepared.

Synthesis of (V-4):

(V-4-b) (2.51 g, 10.0 mmol), N-methylpyrrolidone (40 mL), concentrated hydrochloric acid (2.2 mL), and water (20 mL) were mixed with one another, and the resulting mixture was cooled to 3° C. Subsequently, sodium nitrite (789 mg,

[Chem. 42]

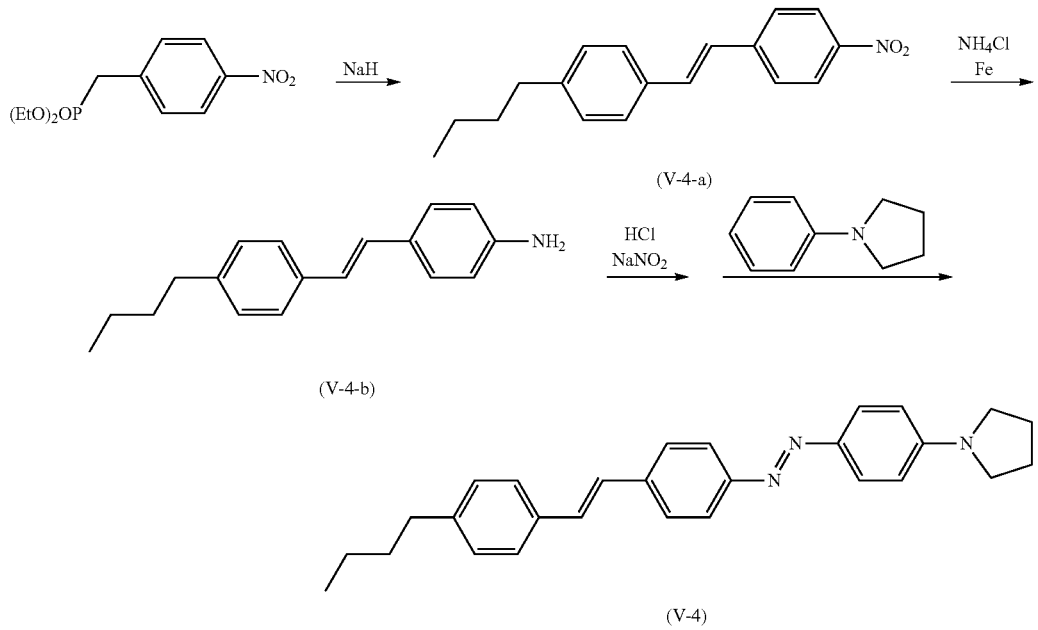

Synthesis of (V-4-a):

To a reaction container cooled with ice, tetrahydrofuran (100 mL) and sodium hydride (purity: 60%, 6.7 g, 168.0 mmol) were added. To the resulting mixture, a mixture of diethyl (4-nitrobenzyl)phosphonate (18.0 g, 65.9 mmol), 4-butylbenzaldehyde (9.1 g, 56.1 mmol), and tetrahydrofuran (50 mL) was added dropwise over 10 minutes. Subsequently, washing was performed vigorously with tetrahydrofuran (30 mL). Then, stirring was performed at 50° C. for 0.5 hours. The reaction liquid was charged into water. Subsequently, extraction was performed with ethyl acetate. Then, washing was performed with water and a saturated saline solution. Subsequently, the solvent was distilled away. The resulting crude product was dissolved in ethyl acetate (20 mL) while being heated. Then, hexane (50 mL) was added to the solution, and the resulting mixture was cooled. The precipitate was collected by filtration, washed with hexane, and then dried under reduced pressure. Hereby, 15.0 g of (V-4-a) was prepared.

Synthesis of (V-4-b):

(V-4-a) (15.0 g, 53.3 mmol), tetrahydrofuran (150 mL), and an iron powder (13.9 g, 248.9 mmol) were mixed with one another. To the resulting mixture, ammonium chloride (13.3 g, 248.6 mmol) dissolved in water (30 mL) was added dropwise. Subsequently, stirring was performed at 50° C. for 3 hours. Then, filtration was performed with cerite, extraction was performed with ethyl acetate, washing was performed with water and a saturated saline solution, and subsequently the solvent was distilled away. The resulting crude product was suspended in hexane. Subsequently, the 11.4 mmol) was added to the mixture. Then, stirring was performed at 15° C. for 3.5 hours.

1-Phenylpyrrolidine (1.47 g, 10.0 mmol), methanol (60 mL), and water (30 mL) were mixed with one another, and the pH of the resulting mixture was adjusted to 3.5 with concentrated hydrochloric acid. While the pH of the mixture was maintained to be 3 to 5 by the addition of an aqueous sodium hydroxide solution, the above solution containing a diazonium salt was added dropwise to the mixture. Subsequently, stirring was performed at 15° C. for 3 hours.

The resulting precipitate was filtered, washed with water, and then dried under reduced pressure. The resulting crude product was purified by silica gel column chromatography (hexane/methylene chloride). Hereby, 3.06 g of a dye (V-4), which was a red solid, was prepared.

The local maximum absorption wavelength (λmax) and gram absorptivity of the dye (V-4) included in a 10 ppm chloroform solution were 459 nm and 107.6 $Lg^{-1}cm^{-1}$, respectively.

The results of structure identification by NMR are described below.

$^1$H-NMR (CDCl$_3$, 400 MHz) δ0.94 (t, 3H, J=7.2 Hz), 1.32-1.43 (m, 2H), 1.55-1.68 (m, 2H), 2.00-2.12 (m, 4H), 2.62 (t, 2H, J=7.6 Hz), 3.41 (t, 4H, J=6.4 Hz), 6.63 (d, 2H, J=8.8 Hz), 7.14 (d, 2H, J=8.8 Hz), 7.19 (d, 2H, J=8.0 Hz), 7.45 (d, 2H, J=8.0 Hz), 7.60 (d, 2H, J=8.4 Hz), 7.84 (d, 2H, J=8.4 Hz), 7.88 (d, 2H, J=9.2 Hz)

The chemical structures of the polymerizable liquid crystal compound and the dyes synthesized above are described below. In the following formulae, $C_{11}H_{22}$ means that 11 methylene chains are bonded to one another in a straight chain-form.

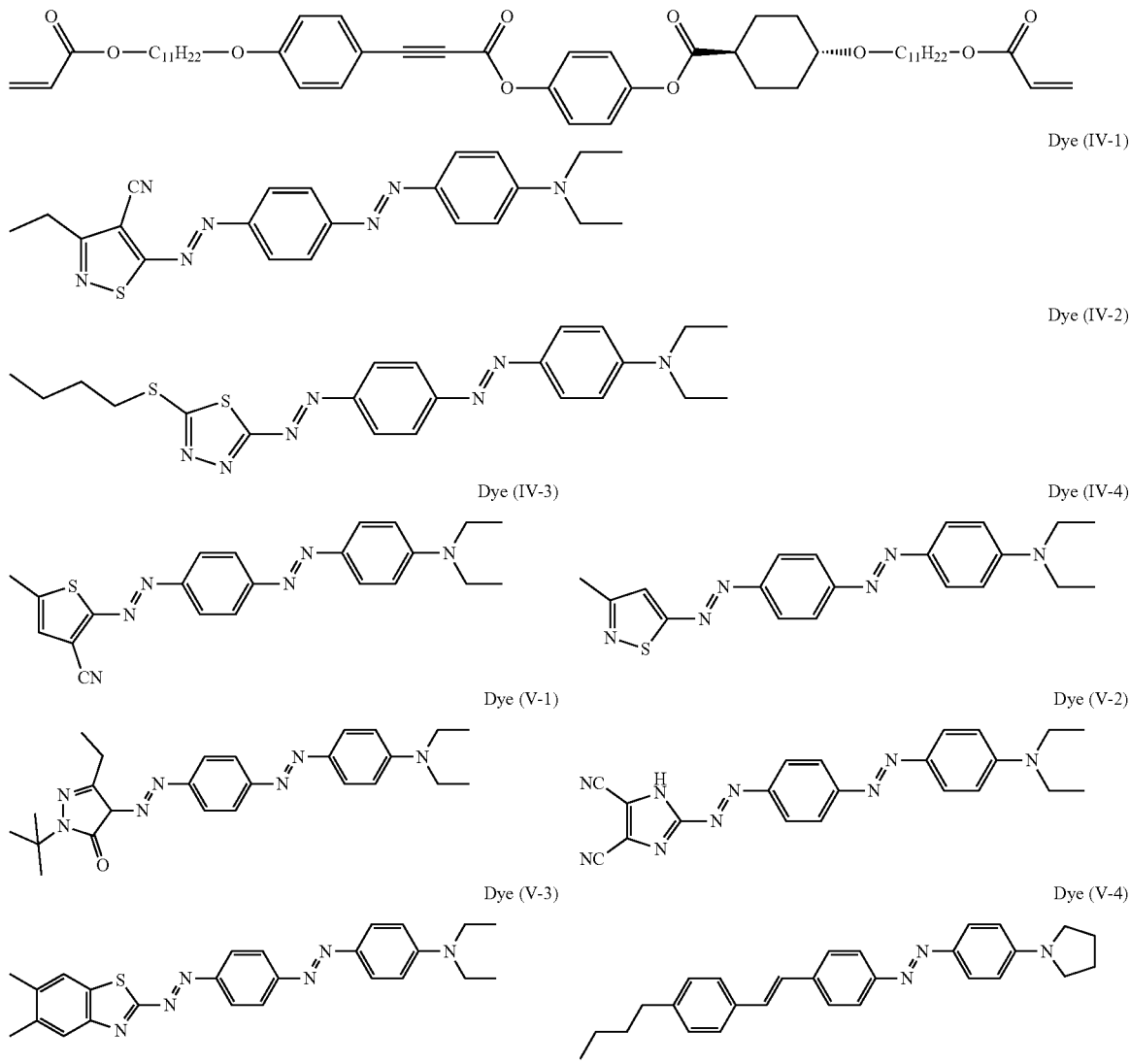

The chemical structure of the dye (V-5) used in Examples is described below.

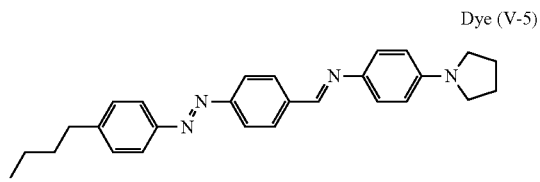

Example II-1

To 3154.6 parts of chloroform, 20.00 parts of the polymerizable liquid crystal compound (I-1) and 0.32 parts of the dye (IV-1) were added. The resulting mixture was stirred in order to dissolve the above materials in each other. Subsequently, the solvent was removed. Hereby, an anisotropic dye film-forming composition II-1 was prepared. The $r_{n1}/r_{n2}$ of the anisotropic dye film-forming composition II-1 was 1.

It was confirmed that the anisotropic dye film-forming composition II-1 exhibited liquid crystallinity since birefringence was observed at 40° C. with a polarizing microscope equipped with a hot stage.

In order to determine dichroic ratio by the above-described method, an anisotropic dye film II-1 was prepared using the anisotropic dye film-forming composition II-1 and a sandwich cell having a cell gap of 8.0 μm, and the dichroic ratio of the anisotropic dye film II-1 was determined.

Table 4 lists the results.

Example II-2

An anisotropic dye film-forming composition II-2 and an anisotropic dye film II-2 were prepared as in Example II-1, except that 0.36 parts of the dye (IV-2) was used instead of 0.32 parts of the dye (IV-1). The $r_{n1}/r_{n2}$ of the anisotropic dye film-forming composition II-2 was 1.

It was confirmed that the anisotropic dye film-forming composition II-2 exhibited liquid crystallinity since birefringence was observed at 40° C. with a polarizing microscope equipped with a hot stage.

The dichroic ratio of the anisotropic dye film II-2 was determined.

Table 4 lists the results.

Example II-3

An anisotropic dye film-forming composition II-3 and an anisotropic dye film II-3 were prepared as in Example II-1, except that 0.28 parts of the dye (IV-3) was used instead of 0.32 parts of the dye (IV-1). The $r_{n1}/r_{n2}$ of the anisotropic dye film-forming composition II-3 was 1.

It was confirmed that the anisotropic dye film-forming composition II-3 exhibited liquid crystallinity since birefringence was observed at 40° C. with a polarizing microscope equipped with a hot stage.

The dichroic ratio of the anisotropic dye film II-3 was determined.

Table 4 lists the results.

Example II-4

An anisotropic dye film-forming composition II-4 and an anisotropic dye film II-4 were prepared as in Example II-1, except that 0.29 parts of the dye (IV-4) was used instead of 0.32 parts of the dye (IV-1). The $r_{n1}/r_{n2}$ of the anisotropic dye film-forming composition II-4 was 1.

It was confirmed that the anisotropic dye film-forming composition II-4 exhibited liquid crystallinity since birefringence was observed at 40° C. with a polarizing microscope equipped with a hot stage.

The dichroic ratio of the anisotropic dye film II-4 was determined.

Table 4 lists the results.

Comparative Example II-1

An anisotropic dye film-forming composition II-5 and an anisotropic dye film II-5 were prepared as in Example II-1, except that 0.26 parts of the dye (V-1) was used instead of 0.32 parts of the dye (IV-1). The $r_{n1}/r_{n2}$ of the anisotropic dye film-forming composition II-5 was 1.

The dichroic ratio of the anisotropic dye film II-5 was determined.

Table 4 lists the results.

Comparative Example II-2

An anisotropic dye film-forming composition II-6 and an anisotropic dye film II-6 were prepared as in Example II-1, except that 0.37 parts of the dye (V-2) was used instead of 0.32 parts of the dye (IV-1). The $r_{n1}/r_{n2}$ of the anisotropic dye film-forming composition II-6 was 1.

The dichroic ratio of the anisotropic dye film II-6 was determined.

Table 4 lists the results.

Comparative Example II-3

An anisotropic dye film-forming composition II-7 and an anisotropic dye film II-7 were prepared as in Example II-1, except that 0.28 parts of the dye (V-3) was used instead of 0.32 parts of the dye (IV-1). The $r_{n1}/r_{n2}$ of the anisotropic dye film-forming composition II-7 was 1.

The dichroic ratio of the anisotropic dye film II-7 was determined.

Table 4 lists the results.

TABLE 4

| | Examples | | | | Comparative Examples | | |
|---|---|---|---|---|---|---|---|
| | II-1 | II-2 | II-3 | II-4 | II-1 | II-2 | II-3 |
| Dye | IV-1 | IV-2 | IV-3 | IV-4 | V-1 | V-2 | V-3 |
| Temperature at which maximum dichroic ratio was exhibited (° C.) | 40 | 40 | 40 | 40 | 40 | 40 | 40 |
| Wavelength at which local maximum dichroic ratio was exhibited in the range of 350 to 800 nm (nm) | 720 | 650 | 655 | 620 | 615 | 630 | 645 |
| Dichroic ratio at the above wavelength | 30.1 | 44.0 | 20.5 | 41.4 | 3.7 | 5.9 | 20.8 |
| Solubility of the dye in cyclopentanone (mass %) | 0.6 | 2.2 | 2.7 | 1.8 | 2.6 | 3.0 | 0.1 |

The results described in Table 4 confirm that the dyes (IV-1) to (IV-4) used in Examples II-1 to II-4 had high solubility in cyclopentanone and exhibited a high dichroic ratio in the anisotropic dye films prepared. In contrast, it was confirmed that, in Comparative Examples II-1 to II-3, both high solubility in cyclopentanone and high dichroic ratio could not be achieved at the same time.

Example II-5

To 19.65 parts of the polymerizable liquid crystal compound (I-1), 0.09 parts of the dye (V-4) dissolved in 885.3 parts of chloroform, 0.10 parts of a dye (V-5) (produced by Hayashibara Co., Ltd.) dissolved in 1039.9 parts of chloroform, and 0.22 parts of the dye (IV-2) dissolved in 2237.2 parts of chloroform were added. The resulting mixture was stirred in order to dissolve the above materials in one another. Subsequently, the solvent was removed. Hereby, an anisotropic dye film-forming composition II-8 was prepared.

It was confirmed that the anisotropic dye film-forming composition II-8 exhibited liquid crystallinity since birefringence was observed at 40° C. with a polarizing microscope equipped with a hot stage.

In order to determine dichroic ratio, an anisotropic dye film II-8 was prepared using the anisotropic dye film-forming composition II-8 by the above-described method, and the dichroic ratio of the anisotropic dye film II-8 was determined.

The maximum dichroic ratio of the anisotropic dye film II-8 was 38.0 at 40° C. and a wavelength of 645 nm. The maximum absorption wavelengths of the dyes (V-4) and (V-5) in the polymerizable liquid crystal compound (I-1) were 495 nm and 530 nm, respectively.

Example II-6

To 718.2 parts of cyclopentanone, 243.6 parts of the polymerizable liquid crystal compound (I-1), 3.95 parts of the dye (IV-2), 5.58 parts of IRGACURE (registered trademark) 369 (produced by BASF SE), and 3.62 parts of BYK-361N (produced by BYK-Chemie) were added. After the resulting mixture was stirred while being heated at 80° C., the mixture was filtered using a syringe equipped with a syringe filter (produced by Membrane Solutions, PTFE13045, diameter: 0.45 μm). Hereby, a composition for anisotropic dye films II-9 was prepared.

The composition for anisotropic dye films II-9 was deposited, by spin coating, on a substrate prepared by forming a polyimide alignment film (LX1400 produced by HD MicroSystems, Ltd., the alignment film was formed by a rubbing method) on a glass plate. After drying had been performed for 2 minutes by heating at 120° C., the temperature was cooled to a liquid crystal phase. Then, polymerization was performed at an exposure of 500 mj/cm$^2$ (in terms of 365 nm). Hereby, an anisotropic dye film II-9 was prepared.

When the anisotropic dye film II-9 was held over a commercial polarizing plate and rotated, it appeared dark and bright alternately. This confirmed that the anisotropic dye film exhibited suitable performance with which the anisotropic dye film can be used as a polarizing film.

INDUSTRIAL APPLICABILITY

Although the present invention has been described in detail by way of the specific modes, it is apparent for those skilled in the art that various changes can be made without departing from the spirit and scope of the present invention.

The present application is based on Japanese Patent Application No. 2020-131810 filed on Aug. 3, 2020, and Japanese Patent Application No. 2020-131811 filed on Aug. 3, 2020, the entire contents of which are incorporated herein by reference.

INDUSTRIAL APPLICABILITY

Since the anisotropic dye film-forming composition according to the present invention includes the specific dye and the specific polymerizable liquid crystal compound, excellent coating film properties, high dichroism, and excellent optical performance can be achieved.

Since the anisotropic dye film according to the present invention is produced using the anisotropic dye film-forming composition according to the present invention, excellent optical performance can be achieved.

Since the optical element according to the present invention includes the anisotropic dye film according to the present invention, excellent optical performance can be achieved.

The invention claimed is:

1. A compound of formula (1) or (11):

  (1)

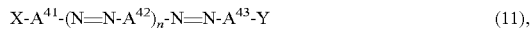  (11), wherein
-A$^1$- and -A$^2$- are independently an unsubstituted or substituted divalent group of an aromatic heterocyclic ring comprising an S, atoms in the aromatic heterocyclic ring other than a carbon atom not being adjacent to one another, an unsubstituted or substituted divalent group of a benzisothiazole ring, or an unsubstituted or substituted divalent group of an aromatic hydrocarbon ring,
-A$^3$- is an unsubstituted or substituted divalent group of an aromatic hydrocarbon ring,
—X is a branched alkyl, alkoxy, or alkylsulfanyl group having 3 or more carbon atoms,
—Y is a monovalent organic group,
n is 1, 2, or 3, when n is 2 or 3, a plurality of -A$^2$-s and/or -A$^{42}$-s optionally differing,
wherein -A$^1$- and -A$^2$- are not both an unsubstituted or substituted divalent group of an aromatic hydrocarbon ring,
at least one -A$^{42}$- is an unsubstituted or substituted divalent group of an aromatic heterocyclic ring comprising an S,
-A$^{41}$- and -A$^{43}$- are independently an unsubstituted or substituted divalent group of an aromatic hydrocarbon ring.

2. The compound of claim 1, wherein, in formula (1), the aromatic heterocyclic ring comprising an S is a thiophene ring, a benzothiophene ring, a thiazole ring, a thienopyrrole ring, a thienothiophene ring, a furothiazole ring, a thienofuran ring, a thienothiazole ring, or a benzothiazole ring.

3. The compound of claim 1, wherein, in formula (1), -A$^3$- is an unsubstituted or substituted phenylene group.

4. The compound of claim 1, wherein, in formula (1), -A$^2$- is an unsubstituted or substituted phenylene group.

5. The compound of claim 1, wherein, in formula (1), —Y is —O—R$^x$ or —N(—R$^y$)—R$^x$,
wherein —R$^x$ and —R$^y$ are independently a linear or branched alkyl group having 1 to 15 carbon atoms, a cycloalkyl group having 5 to 14 ring-forming atoms, or an aryl group having 5 to 14 ring-forming atoms, —R$^x$ and —R$^y$ optionally being bonded to each other to form a ring, the linear or branched alkyl group having 1 to 15 carbon atoms and the aryl group having 5 to 14 ring-forming atoms optionally being substituted, one or more methylene groups in the linear or branched alkyl group having 1 to 15 carbon atoms, the cycloalkyl group having 5 to 14 ring-forming atoms, or the ring formed by —R$^x$ and —R$^y$ being bended to each other may be replaced with —O—, —S—, —NH—, —N(R$^z$)—, —C(=O)—, —C(=O)—O—, —C(=O)—NH—, —CHF—, —CF$_2$—, —CHCl—, —CCl$_2$—, an acryloyloxy group, a methacryloyloxy group, or a glycidyloxy group, and
wherein R$^z$ is a linear or branched alkyl group having 1 to 6 carbon atoms.

6. The compound of claim 1, wherein, in formula (11), n is 2 or 3, and
wherein -A$^{42}$-s are independently the unsubstituted or substituted divalent group of an aromatic hydrocarbon ring or the unsubstituted or substituted divalent group of an aromatic heterocyclic ring comprising an S.

7. The compound of claim 1, wherein, in formula (11) above, the aromatic heterocyclic ring of -A$^{42}$- is a thiophene ring, a benzothiophene ring, a thiazole ring, an isothiazole ring, a 1,3,4-thiadiazole ring, a thienopyrrole ring, a thienothiophene ring, a furothiazole ring, a thienofuran ring, a thienothiazole ring, a benzisothiazole ring, or a benzothiazole ring.

8. The compound of claim 1, wherein, in formula (11) above, -A$^{43}$- is an unsubstituted or substituted phenylene group.

9. The compound of claim 1, wherein, in formula (11) above, -A$^{41}$- is an unsubstituted or substituted phenylene group.

10. An anisotropic dye film-forming composition, comprising:
the compound of claim 1; and
a polymerizable liquid crystal compound.

11. An anisotropic dye film-forming composition, comprising:
a polymerizable liquid crystal compound; and
a compound of formula (21):

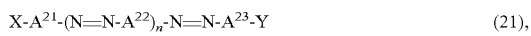

wherein
-A$^{21}$- and -A$^{22}$- are independently an unsubstituted or substituted divalent group of an aromatic heterocyclic ring comprising an S or an unsubstituted or substituted divalent group of an aromatic hydrocarbon ring,
-A$^{23}$- is an unsubstituted or substituted divalent group of an aromatic hydrocarbon ring,
—X is a branched alkyl, alkoxy, or alkylsulfanyl group having 3 or more carbon atoms,
—Y represents is a monovalent organic group, group;
n is 1, 2, or 3, when n is 2 or 3, a plurality of -A$^{22}$-s optionally differing, and
at least one of -A$^{21}$- and -A$^{22}$- is-being an unsubstituted or substituted divalent group of an aromatic heterocyclic ring comprising an S.

12. An anisotropic dye film-forming composition, comprising:
a polymerizable liquid crystal compound; and
a compound of formula (31):

wherein
-A$^{31}$ is an unsubstituted or substituted group of any one of formulae (a-2) to (a-7), with * being a linkage to —N and S$_4$ to S$_{14}$ being a position at which a substituent is attached to the group when the group is substituted:

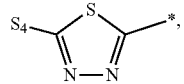
(a-2)

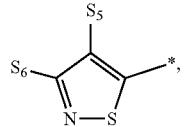
(a-3)

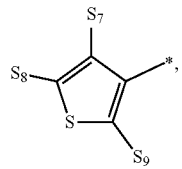
(a-4)

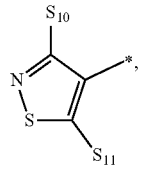
(a-5)

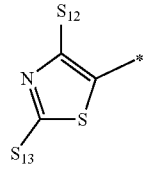
(a-6)

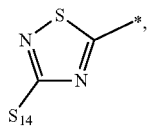
(a-7)

-A$^{32}$- is an unsubstituted or substituted divalent group of an aromatic hydrocarbon ring or an unsubstituted or substituted divalent group of an aromatic heterocyclic ring,
-A$^{33}$- is an unsubstituted or substituted phenylene group,
—Y is a monovalent organic group, and
n is 1, 2, or 3, and when n is 2 or 3, a plurality of -A$^{32}$-s optionally differ.

13. The anisotropic dye film-forming composition of claim 12, wherein, in formula (31), -A$^{32}$- is an unsubstituted or substituted divalent group of an aromatic hydrocarbon ring.

14. The anisotropic dye film-forming composition of claim 12, wherein, in formula (3), —Y is —O—R$^x$ or —N(—R$^y$)—R$^x$,
wherein —R$^x$ and —R$^y$ are independently a linear or branched alkyl group having 1 to 15 carbon atoms, a cycloalkyl group having 5 to 14 ring-forming atoms, or an aryl group having 5 to 14 ring-forming atoms, —R$^x$ and —R$^y$ optionally being bonded to each other to form a ring,
wherein the linear or branched alkyl group having 1 to 15 carbon atoms and the aryl group having 5 to 14 ring-forming atoms are optionally substituted,
wherein one or more methylene groups in the linear or branched alkyl group having 1 to 15 carbon atoms, the cycloalkyl group having 5 to 14 ring-forming atoms, or the ring formed by —R$^x$ and —R$^y$ being bended to each other is optionally replaced with —O—, —S—, —NH—, —N(R$^z$)—, —C(=O)—, —C(=O)—O—, —C(=O)—NH—, —CHF—, —CF$_2$—, —CHCl—, —CCl$_2$—, an acryloyloxy group, a methacryloyloxy group, or a glycidyloxy group, and
wherein R$^z$ is a linear or branched alkyl group having 1 to 6 carbon atoms.

15. The anisotropic dye film-forming composition of claim 10, wherein an r$_{n1}$/r$_{n2}$ ratio of a number, r$_{n1}$, of ring structures in the polymerizable liquid crystal compound to the number, r$_{n2}$, ring structures in the compound of formula (1), (11), (21), or (31) is in a range of from 0.7 to 1.5.

16. The anisotropic dye film-forming composition of claim 10, wherein the polymerizable liquid crystal compound is a compound having a carbon-carbon triple bond.

17. The anisotropic dye film-forming composition of claim 10, further comprising:
a dye,
wherein a wavelength at which an absorption curve of the dye is a maximum in a wavelength range of from 350 to 800 nm is smaller than a wavelength at which an absorption curve of the compound of formula (1), (11), (21), or (31) is a maximum in a wavelength range of from 350 to 800 nm.

18. An anisotropic dye film, produced using the anisotropic dye film-forming composition of claim 10.

19. An optical element, comprising:
the anisotropic dye film of claim 18.
20. A method for producing an anisotropic dye film, the method comprising:
applying the anisotropic dye film-forming composition of claim 10.

\* \* \* \* \*